United States Patent
Chandramouli et al.

(10) Patent No.: US 9,292,493 B2
(45) Date of Patent: Mar. 22, 2016

(54) SYSTEMS AND METHODS FOR AUTOMATICALLY DETECTING DECEPTION IN HUMAN COMMUNICATIONS EXPRESSED IN DIGITAL FORM

(75) Inventors: Rajarathnam Chandramouli, Holmdel, NJ (US); Xiaoling Chen, Sugar Land, TX (US); Koduvayur P. Subbalakshmi, Holmdel, NJ (US); Rohan Perera, Philadelphia, PA (US)

(73) Assignee: The Trustees of The Stevens Institute of Technology, Hoboken, NJ (US)

( * ) Notice: Subject to any disclaimer, the term of this patent is extended or adjusted under 35 U.S.C. 154(b) by 595 days.

(21) Appl. No.: 13/659,445

(22) PCT Filed: Apr. 26, 2011

(86) PCT No.: PCT/US2011/033936
§ 371 (c)(1),
(2), (4) Date: Feb. 11, 2013

(87) PCT Pub. No.: WO2011/139687
PCT Pub. Date: Nov. 10, 2011

(65) Prior Publication Data
US 2013/0138428 A1 May 30, 2013

Related U.S. Application Data

(63) Continuation-in-part of application No. PCT/US2011/020390, filed on Jan. 6, 2011.

(60) Provisional application No. 61/328,158, filed on Apr. 26, 2010, provisional application No. 61/328,154, filed on Apr. 26, 2010.

(51) Int. Cl.
*G06F 17/27* (2006.01)
*G06F 17/28* (2006.01)
(Continued)

(52) U.S. Cl.
CPC .............. *G06F 17/28* (2013.01); *G06F 17/274* (2013.01); *G06F 17/2785* (2013.01); *G06Q 10/107* (2013.01); *H04L 63/1416* (2013.01)

(58) Field of Classification Search
USPC ...................................... 704/9, 270
See application file for complete search history.

(56) References Cited

U.S. PATENT DOCUMENTS 8,428,948 B1 * 4/2013 Roizen et al. ................. 704/251
2005/0210008 A1 * 9/2005 Tran et al. ......................... 707/3
(Continued)

FOREIGN PATENT DOCUMENTS

WO    WO2011/085108    7/2011

OTHER PUBLICATIONS

Grant et al., "CVX: Matlab Software for Disciplined Convex Programming", Nov. 2008; printed Apr. 17, 2013.
(Continued)

*Primary Examiner* — Vu B Hang
(74) *Attorney, Agent, or Firm* — Greenberg Traurig, LLP

(57) ABSTRACT

An apparatus and method for determining whether text is deceptive has a computer programmed with software that automatically analyzes text in digital form by at least one of statistical analysis of psycho-linguistic cues, IP geo-location, gender analysis, authorship analysis, and analysis to detect coded/camouflaged messages. The computer has truth data against which the text message can be compared and a graphical user interface. The computer may be connectable to the Internet and may obtain the text automatically. Speech-to-text software may be used to convert verbal messages to text for analysis. The system may be made available on a webpage, web service, on a computer or by a wireless device. The text may be emails, website content, tweets. In one embodiment, the system detects coded messages.

23 Claims, 47 Drawing Sheets

(51) Int. Cl.
  *G06Q 10/10* (2012.01)
  *H04L 29/06* (2006.01)

(56) References Cited

U.S. PATENT DOCUMENTS

| | | | |
|---|---|---|---|
| 2006/0095251 | A1 | 5/2006 | Shaw |
| 2007/0010993 | A1* | 1/2007 | Bachenko et al. ............... 704/9 |
| 2007/0039038 | A1 | 2/2007 | Goodman et al. |
| 2007/0233477 | A1* | 10/2007 | Halowani et al. ............ 704/232 |
| 2008/0016490 | A1 | 1/2008 | Pabalate et al. |
| 2008/0114567 | A1* | 5/2008 | Jeske et al. .................... 702/179 |
| 2008/0306365 | A1 | 12/2008 | Bunce et al. |
| 2009/0077617 | A1 | 3/2009 | Levow et al. |
| 2011/0300833 | A1* | 12/2011 | Shaw ........................... 455/413 |
| 2014/0095418 | A1* | 4/2014 | Scholand et al. ............... 706/46 |

OTHER PUBLICATIONS

"Traceroute", Oct. 2008 [Online], available http://www.traceroute.org/and ping, as discussed in "ping" Oct. 2008 [Online], available http://en.wikipedia.org/wiki/Ping.
Linguistic Inquiry and Word Count, http://liwc.net/, Jun. 2007, printed Apr. 17, 2013.
Teahan et al., "Tag Based Models of English Text", Waikato University, Hamilton, New Zealand, PhD Thesis, 1997.
Fong et al., "Detecting Word Substitutions in Text", IEEE Transactions on Knowledge and Data Engineering, vol. 20, No. 8, Aug. 2008, 10 pages.
Smith et al., "Forensic Psycholinguistics Using Language Analysis for Identifying and Assessing Offenders", http://www.diogenestic.com/statementlinguists.pdf, May 6, 2012.
Juola et al., "Learning to Translate: A Psycholinguistic Approach to the Induction of Grammars and Transfer Functions", http://citeseerx.ist.psu.edu, 1995.
International Search Report and Written Opinion for PCT/US2011/020390, mailed Mar. 16, 2011.
Abbasi et al., "Visualizing authorship for identification," In proceedings of the 4th IEEE symposium on Intelligence and Security Informatics, San Diego, CA, 2006.
Abbasi et al., "Writeprints: A stylometric approach to identity-level identification and similarity detection in cyberspace," ACM Transactions on Information Systems, No. 2, pp. 7:1-7:29, Mar. 2008.
Abi-Nimen, et al., "A comparison of machine learning techniques for phishing detection". In: processings of the eCrime researchers summit (2007).
Agrawal, et al, "Mining association rules between sets of items in large databases," ACM SOGMOD Record, No. 2, pp. 207-216,1993.
Apache software foundation, Spamassassin public corpus, http://spamassassin.apache.org/publiccorpus/, Jun. 2006.
Argamon, et al., "Style mining of electronic messages for multiple authorship discrimination: first results," in Proceedings of 2003 SIGKDD, Washington, DC, U.S.A, 2003.
Bell, "DMC data compression scheme" http://comjnl.oxfordjournals.org/content/32/1/16.abstract.
Benevenuto, et al., "Detecting Spammers on Twitter" CEAS 2010-Seventh annual Collaboration, Electronic messaging, Anti-Abuse and Spam Conf., Jul. 13-14, 2010, Redmond, Washington, US.
Bergholz, et al., "Improved phishing detection using model-based features," in In Proceedings of the Conference on Email and Anti-Spam (CEAS), 2008.
Biswas, et al., "Semidefinite programming based algorithms for sensor network localization," in ACM Transactions on Sensor Networks, vol. 2, No. 2,2006, pp. 188-220.
Bratko, et al. Spam filtering using statistical data compression models. J. Mach. Learn. Res.,7:2673-2698, 2006.
Buller et al., "Interpersonal deception theory," Communication Theory, vol. 6, No. 3, pp. 203-242,1996, Chapter 7, pp. 97-109.
Burgoon et al., "Interpersonal deception: Iii. effects of deceit on perceived communication and nonverbal behavior dynamics." Journal of Nonverbal Behavior, vol. 18, No. 2, pp. 155-184, 1994.
Burgoon, J. P. Blair, T. Qin, and J. F. Nunamaker, "Detecting deception through linguistic analysis," /S/, pp. 91-101,2003.
Carlson, et al., "Deception in computer-mediated communication", Academy of Management Journal, under Review, (2001).
Chakrabarti, et al., "Focused Crawling: A New Approach to Topic-Specific Resource Discovery," in Computer Networks, 1997, pp. 1-22.
Chandrasekaran, et al., "Phishing email detection based on structural properties", In: NYS Cyber Security Conference (2006).
China Natural Language Open Platform(CNLOP), China Natural Language Open Platform http://www.nlp.org.cn/.
Cleary et al., Unbounded length contexts for PPM, The Computer J., vol. 40, pp. 67-75,1997.
Cleary, et al., "Data compression using adaptive coding and partial string matching", IEEE Transactions on Communications, vol. 32 (4), pp. 396-402, (1984).
Cormack et al., Data Compression Using Dynamic Markov Modeling, The Computer Journal, vol. 30, No. 6, 1987, pp. 541-550.
Corney, et al., "Gender-preferential text mining of e-mail discourse," in 18th Annual Computer Security Applications Conference, 2002, pp. 21-27.
Corney, et al., "Identifying the authors of suspect email," http://eprints.qut.edu.au/archive/00008021/, Oct. 2008.
Cunningham, "GATE, a General Architecture for Text Engineering," Computers and the Humanities, vol. 36, No. 2, pp. 223-254, 2002.
Dabek, et al., "Vivaldi: A decentralized network coordinate system," in ACM SIGCOMM 2004, Aug. 2004.
de Vel, "Mining e-mail authorship," in Proceedings of KDD-2000 Workshop on Text mining, Boston, U.S.A, Aug. 2000.
deVel, et al., "Mining email content for author identification forensics," ACM SIGMOD Record, vol. 30, pp. 55-64, 2001.
Diliegenti, et al., "Focused crawling using context graphs," in In 26th International Conference on Very Large Databases, VLDB 2000, 2000, pp. 527-534.
Drucker et al., Support vector machines for spam categorization, IEEE Transactions on Neural Networks, 10 (1999), pp. 1048-1054.
Ekman et al.,"Who can catch a liar?" American Psychologist, vol. 46, pp. 913-920,1991.
Farach, "Optimal suffix tree construction with large alphabets. In Proceedings of the 38th Annual Symposium on Foundations of Computer Science" (FOCS '97). (1997) IEEE Computer Society, Washington, DC, USA, 137.
Fette, et al., A., "Learning to Detect Phishing Emails", In: Proceedings of International World Wide Web conference, Banff, Canada. (2007) pp. 1-8.
Fraley et al., How Many Clusters? Which Clustering Method? Answers Via Model-Based Cluster Analysis, The Computer Journal, 41, pp. 578-588, 1998.
Frank, et al., "Text categorization using compression models," in In Proceedings IEEE Data Compression Conference, Snowbird,Utah, 2000.
Gayo-Avello et al., "Ovencoming Spammers in Twitter-A Tale of Five Algorithms", CER1 2010, Madrid, Espana, pp. 41-52.
Goodman, et al.,"The use of stylometry for email author identification: a feasibility study." http://utopia. csis.pace.edu/cs691/2007-2008/team2/docs/7.'1     EAM2-TechnicalPaper.061213-Final.pdf, Oct. 2008.
Google Translate Toolkit (GTT), "The Internet, Google Translate and Google Translator Toolkit-Nuisance or Necessity in Translator Training?", http://lodel.irevues.inist.fr/tralogy/index.php?id=113, 1 page, printed Sep. 27, 2012.
GTrace—A Graphical Traceroute, Nov. 2008. [Online]. Available: http://www.caida.org/tools/visualization/gtrace/; 2 pages, printed Oct. 3, 2012.
Gueye, et al., "Constraint-based geolocation of internet hosts," in IEEE/ACM Transactions on Networking, vol. 14, No. 6, Dec. 2006.
Gusfield, "Algorithms on Strings, Tree and Sequences", Cambridge university press.
Hancock, "Automated linguistic analysis of deceptive and truthful synchronous computer-mediated communication," in Proceedings of the 38th Hawaii International Conference on System Sciences, Hawaii, U.S.A., 2005.

(56) References Cited

OTHER PUBLICATIONS

Hancock, et al., "Lies in conversation: An examination of deception using automated linguistic analysis," in Proceedings of the 26th Annual Conference of the Cognitive Science Society, 2005, pp. 534-539.
Iqbal, et al., "A novel approach of mining write-prints for authorship attribution in e-mail forensics," Digital investigation, vol. 5, pp. S42-S51, 2008.
Khmeler et al., "A repetition based measure for verification of text collections and for text categorization," in Proc. of the 26th annual international ACM SIGIR conference on Research and development in information retrieval, 2003, pp. 104-110.
Kraut, "Verbal and nonverbal cues in the perception of lying," Journal of Personality and Social Psychology, pp. 380-391,1978.
Lee, et al., "Uncovering social Spammers: Social Honeypots+Machine Learning", SIGIR'10, Jul. 19-23, 2010, Geneva, Switzerland.
Linguistic inquiry and word count, http://www.liwc.net/, Jun. 2007, printed Sep. 25, 2012.
Lucas, W., "Effects of e-mail on the organization", European Management Journal, 16(1), 18-3, (1998).
Madhusudan, "On a text-processing approach to facilitating autonomous deception detection," in Proceedings of the 36th Hawaii International Conference on System Sciences, Hawaii, U.S.A., 2003, pp. 1-10.
Marton, et al., "On Compression-Based Text Classification," Proceedings of the 27th European Conference on IR Research (ECIR), Santiago de Compostela, Spain, 2005, pp. 300-314.
Mealand, "Correspondence Analysis of Luke", http://llc.oxfordjournals.org/content/10/3/171.abstract, 1 page, printed Oct. 17, 2012.
Menczer et al., "Adaptive information agents in distributed textual environments," in Proceedings of the Second International Conference on Autonomous Agents, Minneapolis USA, 1998.
Menczer, "Arachnid: Adaptive retrieval agents choosing heuristic neighborhoods for information discovery," in Machine Learning: Proceedings of the 14th International Conference (ICML97), Nashville, USA, 1997.
Moffat, "Implementing the PPM data compression scheme", IEEE Transactions on Communications, 38(11): 1917-192 (1990).
Natural Language Toolkit, 2009, 2 pages, http://www.nitk.org/.
Newman et al., "Emotion, disclosure, and health. American Psychological Association", 1995, and M. L. Newman, J. W. Pennebaker, D. S. Berry, and J. M. Richards, "Lying words: Predicting deception from linguistic styles," Personality and Social Psychology Bulletin, vol. 29, pp. 665-675, 2003.
Ng et al., "Predicting internet network distance with coordinates-based approaches," in IEEE INFOCOM, Jun. 2002.
Nigam, et al., "Semi-Supervised Text Classification Using EM", In Chapelle, 0., Zien, A., and Scholkopf, B. (Eds.) Semi-Supervised Learning. MIT Press: Boston. 2006.
Padmanabhan et al., "An investigation of geographic mapping techniques for internet hosts," in ACM SIGCOMM 2001, Aug. 2001.
Pampapathi et al.. "A suffix tree approach to anti-spam email filtering", Machine Learning, vol. 65 Issue 1, (2006) pp. 1-39.
Peng, et al., "Automated authorship attribution with character level language models," in Processings of the 10th Conference of European Chapter of the Association for Computational Linguistics, 2003.
Phishing corpus, http://monkey.org/7Ejose/wiki/doku.php?id=PhishingCorpus, Aug 2007.
Pig Busters, http://www.pigbusters.net/ScamEmails.htm.
Pinkerton, "Web crawling: Finding what people want," in Proceedings of the First World Wide Web Conference, Geneva,Switzerland, 2000, 105 pages.
Planetlab, 2008. [Online]. Available: http://www.planet-lab.org.
Qin, et al., "An exploratory study on promising cues in deception detection and application of decision tree," in Proceedings of the 37th Hawaii International Conference on System Sciences, Hawaii, U.S.A., 2004.
Qin, et al., "Modality effects in Deception Detection and Applications in Automatic-deception-detection", Proceedings of the 38th Hawaii International Conference on System Sciences. Hawaii, U.S.A (2005), pp. 1-10.
The Radicati Group, Radicati Group http://www.radicati.com/.
Richards, "Emotion regulation and memory: The cognitive costs of keeping one's cool," Journal of Personality and Social Psychology, vol. 79, pp. 410-424, 2000.
Richards et al., "Composure at any cost? The cognitive consequences of emotion suppression," Personality and Social Psychology Bulletin, vol. 25, pp. 1033-1044,1999.
Roussinov, et al., "Detecting word substitutions: Pmi vs. hmm." in SIGIR. ACM, 2007, pp. 885-886.
Sahami et al., A bayesian approach to filtering junk e-mail, in Proceedings of the AAAI-98 Workshop on Learning for Text Categorization, 1998.
Shah, "Implementing of an effective web crawler," http://www.devbistro.com/articles/Misc/Implementing-Effective-Web-Crawler, printed Sep. 26, 2012.
Scam-O-Rama. [Online]. Available: http://scamorama.com; pp. 1-46, printed Oct. 4, 2012.
Sharman, "Maximum likelihood parameter estimation by simulated annealing," in Acoustics, Speech, and Signal Processing, ICASSP-88, Apr. 1988.
Shkapenyuk et al., 2002S, "Design and implementation of a high performance distributed crawler," in Proceedings of 18th International Conference on Daa Engineering(ICDE), San Jose,USA, 2002.
Skillicorn, "Beyond keyword filtering for message and conversation detection," in IEEE International Conference on Intelligence and Security Informatics, 2005.
Smets et al., Automatic Vandalism Detection in Wikipedia: Towards a Machine Learning Approach, Association for the Advancement of Artificial Intelligence (2008) pp. 43-48 (no other info).
Snopes.com, "Thousand dollar bill" [Online], 18 pages Available:http://www.snopes.com/inboxer/nothingibillgate.asp; printed Oct. 24, 2012.
Spam Assassin "The Apache SpamAssassin Project Public Corpus", http://spamassassin.apache.org/publiccorpus/ 2 pages, printed Sep. 27, 2012.
Spence, "The deceptive brain," Journal of the Royal Society of Medicine, vol. 97, No. 1, pp. 6-9, Jan. 2004. [Online] .http://www.ncbi.nlm.nih.gov/pmc/ articles/PMC1079256/pdf/0970006.pdf ("Spence").
Spracklin, et al., "Using the complexity of the distribution of lexical elements as a feature in authorship attribution," in Proceeding of LREC, 2008, pp. 3506-3513.
Tang et al., "Virtual landmarks for the internet," in ACM Internet Measurement Conf. 2003, Oct. 2003.
Teahan et al., "Using compression-based language models for text categorization," in Proceedings of 2001 Workshop on Language Modeling and Information Retrieval, 2001.
The cooperative association for internet data analysis, Nov. 2008.
The Free Dictionary by FARLEX http://www.thefreedictionary.com, printed Aug. 3, 2012.
The Yahoo! Geo Technologies Blog. WOIEDS Are Trending on Twitter [Online]. Available: http://web.archive.org/web/20091205160022/http://www.ygeoblog.com/2009/11/woeids-are-trending-on-twitter/; printed Oct. 4, 2012.
Twitter Scam Incidents Growing: The 5 Most Common Types of Twitter Scams—and 10 Ways to Avoid Them, http://www.scambusters.org/twitterscam.html,2010, 4 pages, printed Sep. 27, 2012.
Twitter Spam: 3 Ways Scammers are Filling Twitter With Junk, http://web.archive.org/web/20090618173995/http://mashable.com/2009/06/15/twitter-scams/, 2009, printed Oct. 4, 2012.
Ukkonen, "On-line construction of suffix tree", Algorithmica, vol. 14, pp. 249-260, (1995).
Vrij, et al., "Detecting deceit via analysis of verbal and nonverbal behavior," Journal of Nonverbal Behavior, pp. 239-264, 2000.
Wang,"Don't Follow Me: Spam Detection in Twitter, Int'l Conf. on Security and Cryptography (SECRYPT)", 2010.
Weiner, "Linear pattern matching algorithm", 14th Annual IEEE Symposium on Switching and Automata Theory. pp. 1-11 (1973).

(56) References Cited

OTHER PUBLICATIONS

WinRAR archiver, a powerful tool to process RAR and ZIP files, http://www.markosweb.com/http://www.rarlab.com/, 7 pages, printed Sep. 25, 2012.

Witten et al., The zero-frequency problem: Estimating the probabilities of novel events in adaptive text compression, IEEE Trans. Inf. Theory, vol. 37, No. 4, pp. 1085-1094, Jul. 1991.

Wong, et al., "Octant: A comprehensive framework for the geolocalization of internet hosts," in Proceedings of Symposium on Networked System Design and Implementation, Cambridge, Massachusetts, Apr. 2007.

Xu, et al., "Training Sparn Assassin with Active Semi-supervised Learning", CEAS 2009—Sixth Conf. on Email and Anti-Spare Jul. 16-17, 2009, Mountain View, California USA.

Yardi, et al., "Detecting spam in a Twitter network", First Monday, 15(1), Jan. 2010, pp. 1-16, printed Sep. 27, 2012.

Yeung, A first course in information theory. Springer, 2002.

Yin, et al., "A New Intrusion Detection Method Based on Behavioral Model," Proceedings of the 5th World Congress on Intelligent Control and Automation; Hangzhou, P.R. China, Jun. 2004, pp. 4370-4374.

Zheng, et al., "A framework for authorship identification of online messages: Writing-style features and classification techniques," Journal of the American society for Information and Technology, vol. 57, No. 3, pp. 378-393, 2006.

Zheng, et al., "Internet Routing Policies and Roundtrip-Times," Passive and Active Measurement Workshop (PAM 2005), Mar. 2005, pp. 1-14.

Zhou et al., "Can online behavior unveil deceivers?—an exploratory investigation of deception in instant messaging," in Proceedings of the 37th Hawaii International Conference on System Sciences, Hawaii, U.S.A., 2004.

Zhou et al., "Modeling and handling uncertainty in deception detection," in Proceedings of the 38th Hawaii International Conference on System Sciences, Hawaii, U.S.A., 2005.

Zhou, "An empirical investigation of deception behavior in instant messaging," IEEE Transactions on Professional Communication, vol. 48, No. 2, pp. 147-160, Jun. 2005.

Zhou, "Automating linguistics-based cues for detecting deception in text-based asynchronous computer-mediated communication," Group Decision and Negotiation, vol. 13, pp. 81-106, 2004.

Zhou, et al., "A comparison of classification methods for predicting deception in computer-mediated communication," Journal of Management Information Systems, vol. 20, No. 4, pp. 139-165, 2004.

Zhou, et al., "A Longitudinal Analysis of Language Behavior of Deception in E-mail," Proceedings of Intelligence and Security Informatics, vol. 2665, (2003), pp. 102-110.

Zhou, et al., "An exploratory study into deception detection in text-based computer-mediated communication," in Proceedings of the 36th Hawaii International Conference on System Sciences, Hawaii, U.S.A., 2003.

Zhou, et al., "Language dominance in interpersonal deception in computer-mediated communication," Computers in Human Behavior, vol. 20, pp. 381-402, 2004.

Zhou, et al.,"A statistical language modeling approach to online deception detection", IEEE Transactions on Knowledge and Data Engineering 20, 8, 1077-1081 (2008).

Zhu, Semi-Supervised Learning Literature Survey, Computer Sciences Technical Report 1530, Univ. of Wisconsin, Madison, 2006.

Ziviani, et al., "Improving the accuracy of measurement-based geographic location of Internet hosts," Computer Networks, vol. 47, No. 4, Mar. 2005, pp. 1-21.

Ziviani, et al., "Toward a measurement-based geographic location service," in Passive and Active Measurement Workshop (PAM 2004), Apr. 2004.

\* cited by examiner

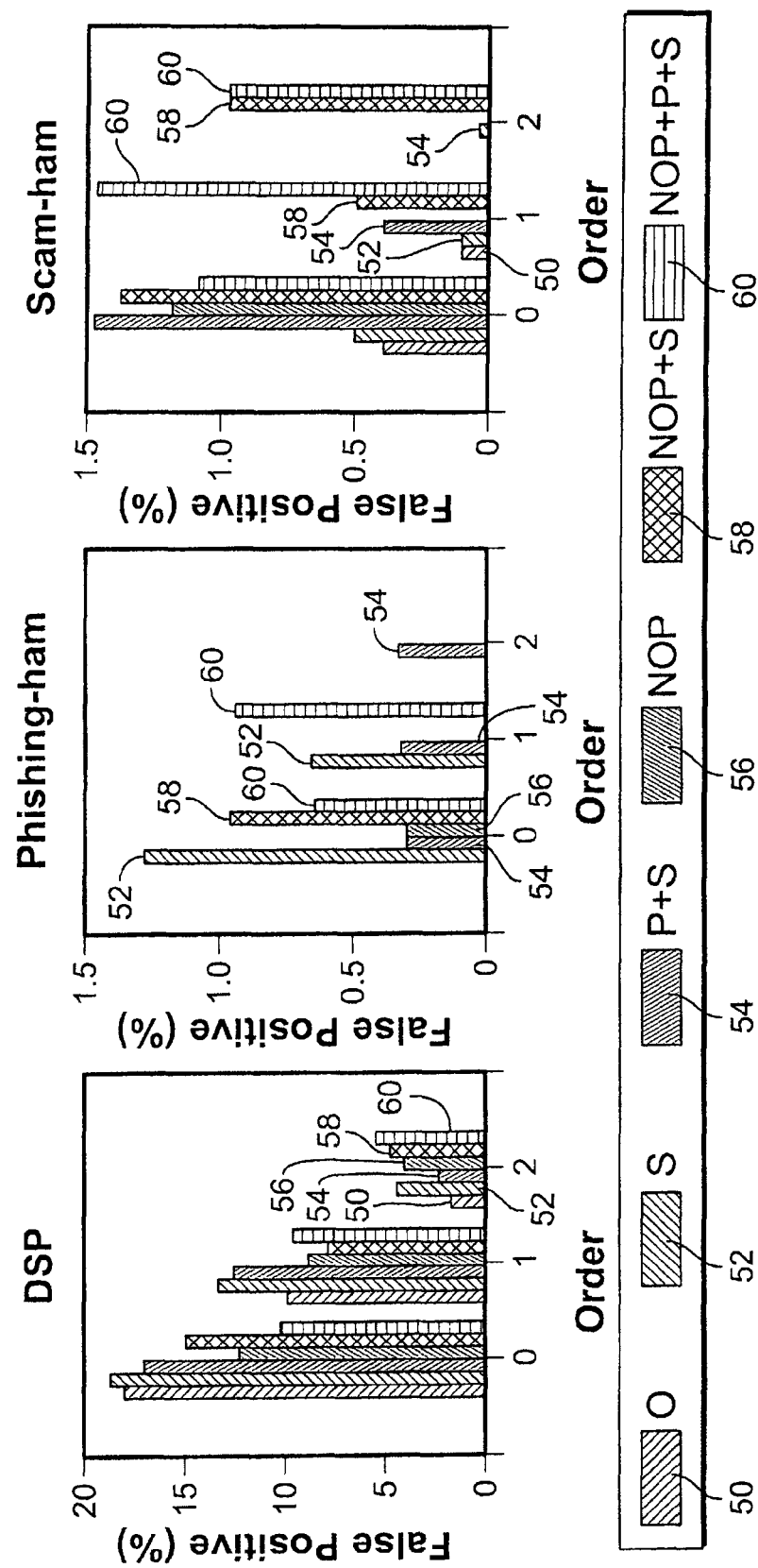

STEVENS
Institute of Technology

Electrical and Computer Engineering

Home   About us   Help

Text Analytics: Deception Detection and Gender Identification from Text

Deception: Is falsification of information. Detecting deception from text is a challenging problem. Deceptive text content for example, may be found in social networking sites, emails scams, email phishing, blogs, chat rooms, etc. Our approach uses a combination of psychology, linguistics and statistical analysis to detect deception. Try Id. We do not capture any personal information. The text your enter will be stored for further research.

Click the text files below to see examples of deceptive text content:

| Example Description | FileName | Deceptive Cue | Too High? |
|---|---|---|---|
| Deceptive Example 1 | employment.txt | article | too low |
| Deceptive Example 2 | Gates.txt | you | too high |
| Deceptive Example 3 | ******.txt | ***** | too high |
| Deceptive Example 4 | rental.txt | swear | too low |
| Deceptive Example 5 | obama.txt | ! | too low |
| Canada Tax. Revenue Scam | letter.txt | othref | too high |

Click on the link below to See Scam Examples From Craigslist:

Craigslist scam examples

Determine deceptiveness of text content. By Entering Your Own Text, Uploading A File Or Entering the Website URL:

Enter Your Own Text to Detect Deceptive Content

Upload file to detect deceptive content

Determine Deceptiveness of Web URL

Where Am I?

FIG. 23

SYSTEMS AND METHODS FOR AUTOMATICALLY DETECTING DECEPTION IN HUMAN COMMUNICATIONS EXPRESSED IN DIGITAL FORM

CROSS-REFERENCE TO RELATED APPLICATIONS

The present application is continuation in part of PCT Application No. PCT/US11/20390, filed on Jan. 6, 2011 entitled PSYCHO-LINGUISTIC STATISTICAL DECEPTION DETECTION FROM TEXT CONTENT, which claims the benefit of Provisional Application No. 61/293,056, filed on Jan. 7, 2010. The present application also claims the benefit of Provisional Application No. 61/328,154, filed on Apr. 26, 2010, entitled HUMAN-FACTORS DRIVEN INTERNET FORENSICS: ANALYSIS AND TOOLS and Provisional Application No. 61/328,158, filed on Apr. 26, 2010. The disclosure of each and all of the foregoing applications are incorporated herein by reference in their entireties for all purposes.

FIELD

The present invention relates to systems and methods for automatically detecting deception in human communications expressed in digital form, such as in text communications transmitted over the Internet, and more particularly utilizing psycho-linguistic analysis, statistical analysis and other text analysis tools, such as gender identification, authorship verification, as well as geolocation for detecting deception in text content, such as, an electronic text communication like an email text.

STATEMENT REGARDING FEDERALLY SPONSORED RESEARCH

This invention was made with Government support under ONR Grant No. FA8240-07-C-0141 awarded by the Office of Naval Research. The Government has certain rights in the invention.

BACKGROUND

The Internet has evolved into a medium where people communicate with each other on a virtually unlimited range of topics, e.g., via e mail, social networking, chat rooms, blogs and e-commerce. They exchange ideas and confidential information and conduct business, buying, selling and authorizing the transfer of wealth over the Internet. The Internet is used to establish and maintain close personal relationships and is otherwise used as the virtual commons on which the whole world conducts vital human communication. The ubiquitous use of the Internet and the dependence of its users on information communicated through the Internet has provided an opportunity for deceptive persons to harm others, to steal and to otherwise abuse the communicative power of the Internet through deception. Deception, the intentional attempt to create a false belief in another, which the communicator knows to be untrue, has many modes of implementation. For example, deception can be conducted by providing false information (e.g., email scam, phishing etc.) or falsifying the authorship, gender or age of the author of text content (e.g., impersonation). The negative impact of deceptive activities on the Internet has immense psychological, economic, emotional, and even physical implications. Research into these issues has been conducted by others and various strategies for detecting deception have been proposed.

To prevent e-commerce scams, some organizations have offered guides to users, such as eBay's spoof email tutorial, and the Federal Trade Commission's phishing prevention guide. Although these guides offer sufficient information for users to detect phishing attempts, they are often ignored by the web surfers. In many email phishing scams, in order to get the user's personal information such as name, address, phone number, password, and social security number, the email is usually directed to a deceptive website that has been established only to collect a user's personal information, that may be used for identity theft. Due to the billions of dollars lost because of phishing, anti-phishing technologies have drawn much attention. Carnegie Mellon University (CMU) researchers have developed an anti-phishing game that helps to raise the awareness of Internet phishing among web surfers.

Most e-commerce companies also encourage customers to report scams or phishing emails. This is a simple method to alleviate scams and phishing to a certain level. However, it is important to develop algorithms and software tools to detect deception based on Internet schemes and phishing attempts. Anti-phishing tools are being developed by different entities, such as Google, Microsoft, and McAfee. Attempts to solve this problem include anti-phishing browser toolbars, such as Spoofguard and Netcraft. However, studies show that even the best anti-phishing toolbars can detect only 85% of fraudulent websites. Most of the existing tools are built based on network properties like the layout of website files or email headers. Microsoft, for example, has integrated Sender ID techniques into all of its email products and services, which detect and block almost 25 million deceptive email messages every day. The Microsoft Phishing Filter in the browser is also used to help determine the legitimacy of a website. Also, a PIL-FER (Phishing Identification by Learning on Features of Email Received) algorithm was proposed based on features such as IP-based URLs, age of linked-to domain names, and nonmatching URLs. A research prototype called Agent99, developed by the University of Arizona, and COPLINK, a tool that analyzes criminal databases, are also intended to aid in routing out Internet deception.

Notwithstanding the foregoing efforts, improved systems and methods for detecting deception in digital human communications remain desirable.

SUMMARY

The disclosed subject matter overcomes the disadvantages and shortcomings of the prior art discussed above by providing a system for detecting deception in communications having a computer programmed with software that automatically analyzes a text message in digital form for deceptiveness by at least one of statistical analysis of text content to ascertain and evaluate psycho-linguistic cues that are present in the text message, IP geo-location of the source of the message, gender analysis of the author of the message, authorship similarity analysis, and analysis to detect coded/camouflaged messages. The computer has means to obtain the text message in digital form and store the text message within a memory of said computer, as well as means to access truth data against which the veracity of the text message can be compared. A graphical user interface is provided through which a user of the system can control the system and receive results concerning the deceptiveness of the text message analyzed thereby.

BRIEF DESCRIPTION OF THE DRAWINGS

For a more complete understanding of the present invention, reference is made to the following detailed description of a exemplary embodiments considered in conjunction with the accompanying drawings:

FIG. 23 is an illustration of a user interface screen;

DETAILED DESCRIPTION OF EXEMPLARY EMBODIMENTS

Figure 1:
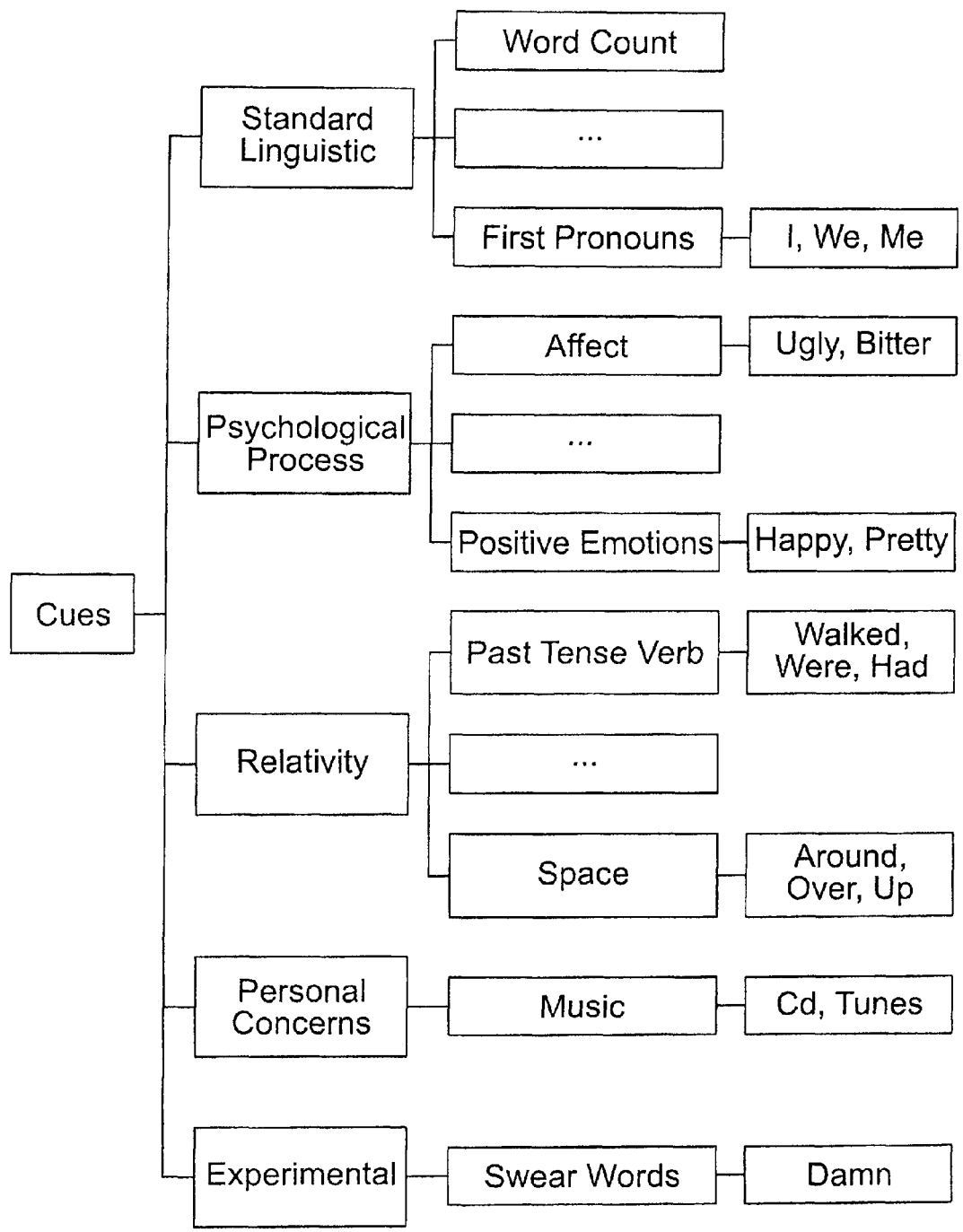
FIG. 1 is a diagram of psycho-linguistic cues.

Deception may be defined as a deliberate attempt, without forewarning, to create in another, a belief which the communicator considers to be untrue. A. Vrij, "Detecting Lies and Deceit: The Psychology of Lying and the Implications for Professional Practice, Wiley 2001," which is incorporated by reference herein. It is the manipulation of a message to cause a false impression or conclusion, as discussed in Burgoon, et al., "Interpersonal deception: Ill effects of deceit on perceived communication and nonverbal behavior dynamics." Journal of Nonverbal Behavior, vol. 18, no. 2, pp. 155-184 (1994), which is incorporated by reference herein. Psychology studies show that a human being's ability to detect deception is poor. Therefore, automatic techniques to detect deception are important.

Deception may be differentiated into that which involves: a) hostile intent and b) hostile attack. Hostile intent (e.g., email phishing) is typically passive or subtle, and therefore challenging to measure and detect. In contrast, hostile attack (e.g., denial of service attack) leaves signatures that can be easily measured. Intent is typically considered a psychological state of mind. This raises the questions, "How does this deceptive state of mind manifest itself on the Internet?" The inventors of the present application also raise the question, "Is it possible to create a statistically-based psychological Internet profile for someone?" To address these questions, ideas and tools from cognitive psychology, linguistics, statistical signal processing, digital forensics, and network monitoring are required.

Several studies show that deception is a cognitive process, as discussed in S. Spence, "The deceptive brain," *Journal of the Royal Society of Medicine*, vol. 97, no. 1, pp. 6-9, January 2004. [Online]. http://www.ncbi.nlm.nih.gov/pmc/articles/PMC1079256/pdf/0970006.pdf ("Spence"), the disclosure of which is hereby incorporated by reference, and that there are many shades of deception, from outright lies to "spin." Deception-based hostile intent on the Internet manifests itself in several forms including, deception with predatory intent on social networking web-sites and Internet chat rooms. Instant messengers (e.g. Yahoo!, MSN Messenger) are used extensively by a large population ranging in age. These popular communication tools provide users great convenience, but they also provide some opportunities for criminal acts via deceptive messaging. After contacts were made through instant messages, indecent assault, robbery, and sex crimes have occurred in some cases. Several recent public reports of deception in popular social networking (e.g., Myspace) web-sites and user-generated content have serious implications for child safety, public safety, and criminal justice policies. For example, 75% of the items offered in some categories on eBay are scams according to MSNBC on Jul. 29, 2002. Recent cases of predation included a woman pretending to be a teenage boy on Myspace ("myspace mom" case). Deceptive ads (e.g., social, job, financing, etc.) are posted on Craigslist, one of which event led to a homicide (the "Craigslist killer").

Another form of Internet deception includes deceptive website content, such as the "Google work from home scam". In 2009, several deceptive newspaper articles appeared on the Internet with headings like "Google Job Opportunities", "Google money master", and "Easy Google Profit" and were accompanied by impressive logos, including ABC, CNN, and USA Today. Other deception examples are falsifying personal profile/essay in online dating services, witness testimonies in a court of law, and answers to job interview questions. E-commerce (e.g., ebay) and online classified advertisement websites (e.g., craigslist) are also prone to deceptive practices.

Email scams constitute a common form of deception on the Internet, e.g., emails that promise free cash from Microsoft or free clothing from the Gap if a user forwards them to their friends. Among the email scams, email phishing has drawn much attention. Phishing is a way to steal an online identity by employing social engineering and technical subterfuge to obtain consumers' identity data or financial account credentials. Users may be deceived into changing their password or personal details on a phony website, or to contact some fake technical or service support personnel to provide personal information.

Email is one of the most commonly used communication mediums today. Trillions of communications are exchanged through email each day. Beside's the scams referred to above, email is abused by the generation of unsolicited junk mail (spam). Threats and sexual harassment are also common examples of email abuses. In many misuse cases, the senders attempt to hide their true identities to avoid detection. The email system is inherently vulnerable to hiding a true identity. For example, the sender's address can be routed through an anonymous server or the sender can use multiple user names to distribute messages via anonymous channels. Also, the accessibility of the Internet through many public places such as airports and libraries foster anonymity.

Authorship analysis can be used to provide empirical evidence in identity tracing and prosecution of an offending user. Authorship analysis or stylometry, is a statistical method to analyzing text to determine its authorship. The author's unique stylistic features can be used as the author's profile, which can be described as text fingerprints or writeprint, as described in F. Peng, D. Schuurmans, V. Deselj, and S. Wang, "Automated authorship attribution with character level language models," in *Processings of the 10th Conference of European Chapter of the Association for Computational Linguistics,* 2003, the disclosure of which is hereby incorporated by reference.

The major authorship analysis tasks include authorship identification, authorship characterization, and similarity detection, as described in R. Zheng, J. Li, H. Chen, and Z. Huang, "A framework for authorship identification of online messages: Writing-style features and classification techniques," *Journal of the American society for Information and Technology*, vol. 57, no. 3, pp. 378-393, 2006, the disclosure of which is hereby incorporated by reference.

Authorship identification determines the likelihood of anonymous texts to be produced by a particular author by examining other texts belonging to that author. In general, authorship identification can be divided into authorship attribution and verification problems. For authorship attribution, several examples from known authors are given and the goal is to determine which one wrote a given text for which the author is unknown/anonymous. For example, given three sets of texts, each respectively attributable to three different authors, when confronted with a new text of unknown authorship, authorship attribution is intended to ascertain to which of the three authors the new text is attributable—or that it was not authored by any of the three. For authorship verification, several text examples from one known author are given and the goal is to determine whether the new, anonymous text is attributable to this author or not. Authorship characterization perceives characteristics of an author (e.g. gender, educational background, etc.) based on their writings. Similarity detection compares multiple anonymous texts and determines whether they were generated by a single author when no author identities are known a priori.

In accordance with the present disclosure, authorship similarity detection is conducted at two levels, namely, (a) authorship similarity detection at the identity-level, i.e., to compare two authors' texts to decide the similarity of the identities; and (b) authorship similarity detection at message-level. This is to compare two texts of unknown authorship to decide the similarity of the identities, i.e., were the two texts written by the same author?

What follows then is a description of methods in accordance with the present disclosure for detecting deception on the Internet, in particular deception indicating hostile intent and how those detection methods can be implemented, followed by a description of methods for analyzing stated authorship.

Deception Detection of Internet Hostile Intent

In text-based media, individuals with hostile intentions often hide their true intent by creating stories based on imagined experiences or attitudes. Deception usually precedes or constitutes a hostile act. Presenting convincing false stories requires cognitive resources, as referenced in J. M. Richards and J. J. Gross, "Composure at any cost? The cognitive consequences of emotion suppression," *Personality and Social Psychology Bulletin*, vol. 25, pp. 1033-1044, 1999, and "Emotion regulation and memory: The cognitive costs of keeping one's cool,"*Journal of Personality and Social Psychology*, vol. 79, pp. 410-424, 2000, the disclosures of which are hereby incorporated by reference, which increases the difficulty for deceivers to completely hide their state of mind. Psychology research suggests that one's state of mind, such as physical and mental health, and emotions, can be gauged by the words they use, as described in J. W. Pennebaker, *Emotion, disclosure, and health*. American Psychological Association, 1995, and M. L. Newman, J. W. Pennebaker, D. S. Berry, and J. M. Richards, "Lying words: Predicting deception from linguistic styles," *Personality and Social Psychology Bulletin*, vol. 29, pp. 665-675, 2003, the disclosures of which are hereby incorporated by reference.

Therefore, even for trained deceivers, their state of mind may unknowingly influence the type of words they use. However, psychology studies show that a human being's ability to detect deception is poor. For that reason, the present disclosure relates to automatic techniques for detecting deception, such as mathematical models based on psychology and linguistics.

Detecting deception from text-based Internet media (e.g., email, websites, blogs, etc.) is a binary statistical hypothesis test or data classification problem described by equation (2.1), which is still in its infancy. It is usually treated as a hypothesis test problem. Given website content or a text message, a good automatic deception classifier will determine the content's deceptiveness with high detection rate and low false positive.

$H_o$:Data is deceptive, $H_1$:Data is truthful. (2.1)

Deception in face-to-face communication has been investigated in many disciplines in social science, psychology and linguistics, as described in J. K. Burgoon and D. B. Buller, "Interpersonal deception: Iii. effects of deceit on perceived communication and nonverbal behavior dynamics." *Journal of Nonverbal Behavior*, vol. 18, no. 2, pp. 155-184, 1994, P. Ekman and M. O'Sullivan, "Who can catch a liar?" *American Psychologist*, vol. 46, pp. 913-920, 1991, R. E. Kraut, "Verbal and nonverbal cues in the perception of lying," *Journal of Personality and Social Psychology*, pp. 380-391, 1978, A. Vrij, K. Edward, K. P. Robert, and R. Bull, "Detecting deceit via analysis of verbal and nonverbal behavior," *Journal of Nonverbal Behavior*, pp. 239-264, 2000, D. B. Buller and J. K. Burgoon, "Interpersonal deception theory," *Communication Theory*, vol. 6, no. 3, pp. 203-242, 1996 and J. K. Burgoon, J. P. Blair, T. Qin, and J. F. Nunamaker, "Detecting deception through linguistic analysis,"/S/, pp. 91-101, 2003, the disclosures of which are hereby incorporated by reference.

In face-to-face communications and vocal communication (e.g., cell phone communication), both verbal and non-verbal features (also called cues) can be used to detect deception. While detection of deceptive behavior in face-to-face communication is sufficiently different from detecting Internet-based deception, it still provides some theoretical and evidentiary foundations for detecting deception conducted using the Internet. It is more difficult to detect deception in textual communications than in face-to-face communications because only the textual information is available to the deception detector—no other behavioral cues being available. Based on the method and the type/amount of statistical information used during detection, deception detection schemes can be classified into the following three groups:

Psycho—Linguistic Cues Based Detection:

In general, cues-based deception detection includes three steps, as described in L. Zhou, J. K. Burgoonb, D. P. Twitchell, T. Qin, and J. F. N. JR., "A comparison of classification methods for predicting deception in computer-mediated communication," *Journal of Management Information Systems*, vol. 20, no. 4, pp. 139-165, 2004, the disclosures of which are hereby incorporated by reference:

a) identify significant cues that indicate deception;

b) automatically obtain cues from various media; and c) build classification models to predict deception for new content.

In psycho-linguistic models, the cues extracted from the Internet text content are used to construct a psychological profile of the author and can be used to detect the deceptiveness of the content. Several studies have looked for the cues that accurately characterize deceptiveness. Some automated linguistics-based cues (LBC) for deception for both synchronous (instant message) and asynchronous (emails) computer-mediated communication (CMC) can be derived by reviewing and analyzing theories that are usually used in detecting deception in face-to-face communication. The theories include media richness theory, channel expansion theory, interpersonal deception theory, statement validity analysis, and reality monitoring, as described in L. Zhou, D. P. Twitchell, T. Qin, J. K. Burgoon, and J. F. N. JR., "An exploratory study into deception detection in text-based computer-mediated communication," in *Proceedings of the 36th Hawaii International Conference on System Sciences*, Hawaii, U.S.A., 2003; L. Zhou, "Automating linguistics-based cues for detecting deception in text-based asynchronous computer-mediated communication," *Group Decision and Negotiation*, vol. 13, pp. 81-106, 2004; L. Zhou, J. K. Burgoonb, D. Zhanga, and J. F. N. JR., "Language dominance in interpersonal deception in computer-mediated communication," *Computers in Human Behavior*, vol. 20, pp. 381-402, 2004 and L. Zhou, "An empirical investigation of deception behavior in instant messaging," *IEEE Transactions on Professional Communication*, vol. 48, no. 2, pp. 147-160, June 2005, the disclosures of which are hereby incorporated by reference.

Some studies have shown that some cues to deception change over time, as discussed in L. Zhou, J. K. Burgoon, and D. P. Twitchell, "A longitudinal analysis of language behavior of deception in e-mail," in *Proceedings of Intelligence and Security Informatics*, vol. 2665, 2003, pp. 102-110, the disclosure of which is hereby incorporated by reference.

For the asynchronous CMC, only the verbal cues can be considered. For the synchronous CMC, nonverbal cues, which may include keyboard-related, participatory, and sequential behaviors, may be used, thus making the information much richer, as discussed in L. Zhou and D. Zhang, "Can online behavior unveil deceivers?—an exploratory investigation of deception in instant messaging," in *Proceedings of the 37th Hawaii International Conference on System Sciences*, Hawaii, U.S.A., 2004 and T. Madhusudan, "On a text-processing approach to facilitating autonomous deception detection," in *Proceedings of the 36th Hawaii International Conference on System Sciences*, Hawaii, U.S.A., 2002, the disclosures of which are hereby incorporated by reference.

In addition to the verbal cues, the receiver's response and the influence of the sender's motivation for deception are useful in detecting deception in synchronous CMC, as discussed in J. T. Hancock, L. E. Curry, S. Goorha, and M. T. Woodworth, "Lies in conversation: An examination of deception using automated linguistic analysis," in *Proceedings of the 26th Annual Conference of the Cognitive Science Society*, 2005, pp. 534-539, and "Automated linguistic analysis of deceptive and truthful synchronous computer-mediated communication," in *Proceedings of the 38th Hawaii International Conference on System Sciences*, Hawaii, U.S.A., 2005, the disclosures of which are hereby incorporated by reference.

The relationship between modality and deception is described in J. R. Carlson, J. F. George, J. K. Burgoon, M. Adkins, and C. H. White, "Deception in computer-mediated communiction," *Academy of Management Journal*, p. under Review, 2001, and T. Qin, J. K. Burgoon, J. P. Blair, and J. F. N. Jr., "Modality effects in deception detection and applications in automatic-deception-detection," in *Proceedings of the 38th Hawaii International Conference on System Sciences*, Hawaii, U.S.A., 2005, the disclosures of which are hereby incorporated by reference.

Several software tools can be used to automatically extract the psycho-linguistic Cues. For example, GATE (General Architecture for Text Engineering), as discussed in H. Cunningham, "A general architecture for text engineering," *Computers and the Humanities*, vol. 36, no. 2, pp. 223-254, 2002, the disclosure of which is hereby incorporated by reference, a Java-based, component-based architecture, object-oriented framework, and development environment, can be used to develop tools for analyzing and processing natural language. Many psycho-linguistics cues' value can be derived using GATE. LIWC (Linguistic Inquiry and Word Count), as discussed in Linguistic inquiry and word count," http://www.liwc.net/, June 2007, the disclosure of which is hereby incorporated by reference, is a text analysis program. LIWC can calculate the degree of different categories of words on a word-by-word basis, including punctuation. For example, LIWC can determine the rate of emotion words, self-references, or words that refer to music or eating within a text document.

In building classification models, machine learning and data mining methods are widely used. Machine learning methods like discriminant analysis, logistic regression, decision trees, and neural networks may be applied to deception detection. Comparison of the various machine learning techniques for deception detection indicates that neural network methods achieve the most consistent and robust performance, as described in L. Zhou, J. K. Burgoonb, D. P. Twitchell, T. Qin, and J. F. N. JR., "A comparison of classification methods for predicting deception in computer-mediated communication," *Journal of Management Information Systems*, vol. 20, no. 4, pp. 139-165, 2004, the disclosures of which are hereby incorporated by reference. Decision tree methods may be used to detect deception in synchronous communications, as described in T. Qin, J. K. Burgoon, and J. F. N. Jr., "An exploratory study on promising cues in deception detection and application of decision tree," in *Proceedings of the 37th Hawaii International Conference on System Sciences*, Hawaii, U.S.A., 2004, the disclosure of which is hereby incorporated by reference.

A model of uncertainty may be utilized for deception detection. In L. Zhou and A. Zenebe, "Modeling and handling uncertainty in deception detection," in *Proceedings of the 38th Hawaii International Conference on System Sciences*, Hawaii, U.S.A., 2005. the disclosures of which are hereby incorporated by reference, a neuro-fuzzy method was proposed to detect deception and it outperformed the previous cues-based classifiers.

Statistical Detection

Although cues-based methods can be effectively used for deception detection, such methods have limitations. For example, the data sets used to validate the cues must be large enough to draw a general conclusion about the features that indicate deception. The features derived from one data set may not be effective in another data set and this increases the difficulty of detecting deception. To Applicants' present knowledge, there are no general psycho-linguistic features to characterize deception on the Internet. Some cues cannot be extracted automatically and are labor-intensive. For example, the passive voice in text content is hard to extract automatically. In contrast to cues-based methods, statistical methods rely only on the statistics of the words in the text. In L. Zhou, Y. Shi, and D. Zhang, "A statistical language modeling approach to online deception detection," *IEEE Transactions on Knowledge and Data Engineering*, 2008, the disclosure of which is hereby incorporated by reference, the authors propose a statistical language model for detecting deception. Instead of considering the psycho-linguistic cues, all the words in a text are considered, avoiding the limitations of traditional cues-based methods.

Psycho-Linguistic Based Statistical Detection

In accordance with the present disclosure, psycho-linguistic based statistical methods combine both psycho-linguistic cues (since deception is a cognitive process) and statistical modeling. In general, developing cues-based statistical deception detection method includes several steps: a) identifying psycho-linguistic cues that indicate deceptive text; b) computing and representing these cues from the given text; c) ranking the cues from the most to least significant d) statistical modeling of the cues; e) designing an appropriate hypothesis test for the problem; and f) testing with real-life data to assess performance of the model.

Automated Cues Extraction

The number of deceptive cues already investigated by others is small. In L. Zhou, D. P. Twitchell, T. Qin, J. K. Burgoon, and J. F. N. JR., "An exploratory study into deception detection in text-based computer-mediated communication," in *Proceedings of the 36th Hawaii International Conference on System Sciences*, Hawaii, U.S.A., 2003, the disclosure of which is hereby incorporated by reference, the authors focused on 27 cues, and in L. Zhou, J. K. Burgoonb, D. Zhanga, and J. F. N. JR., "Language dominance in interpersonal deception in computer-mediated communication," *Computers in Human Behavior*, vol. 20, pp. 381-402, 2004, the disclosure of which is hereby incorporated by reference, they focused on 19 cues. Furthermore, many of the cues previously investigated cannot be automatically computed and the process is labor intensive. In accordance with the present disclosure, LIWC software is used to automatically extract the deceptive cues. LIWC is available from http://www.liwc.net. Using LIWC2001, up to 88 output variables can be computed for each text, including 19 standard linguistic dimensions (e.g., word count, percentage of pronouns, articles, etc.), 25 word categories tapping psychological constructs (e.g., affect, cognition, etc.), 10 dimensions related to "relativity" (time, space, motion, etc.), 19 personal concern categories (e.g., work, home, leisure activities, etc.), 3 miscellaneous dimensions (e.g., swear words, nonfluencies, fillers) and 12 dimensions concerning punctuation information, as discussed in "Linguistic inquiry and word count," http://www.liwc.net/, June 2007, the disclosure of which is hereby incorporated by reference.

FIG. 1 shows linguistic variables that may act as cues, including those reflecting linguistic style, structural composition and frequency of occurrence. Some of the cues to deception are mentioned in L. Zhou, "Automating linguistics-based cues for detecting deception in text-based asynchronous computer-mediated communication," *Group Decision and Negotiation*, vol. 13, pp. 81-106, 2004, the disclosure of which is hereby incorporated by reference, such as first and third-person pronouns. Many of the variables have not been investigated before and in accordance with the present disclosure this information is useful in determining deception. An embodiment of the deception detection methods disclosed herein is based on an analysis of variables of this type.

Experimental Data Sets

Obtaining ground truth data is a major challenge in addressing the deception detection problem. The following exemplary data sets may be utilized to represent data which may be used to define ground truth and which may be processed by an embodiment of the present disclosure. These data sets are examples and other data sets that are known to reflect ground truth may be utilized.

Test Data from the University of Arizona

The University of Arizona conducted an experiment with 60 undergraduate students who were randomly divided into 30 pairs. The students were then asked to discuss a Desert Survival Problem (DSP) by exchanging emails. The primary goal for the student participants was to agree on a rank ordering of useful items needed to survive in a desert. One random participant from each pair was asked to deceive his/her partner. The participants were given three days to complete the task. This DSP data set contains 123 deceptive emails and 294 truthful emails. Detailed information about this data set can be found in L. Zhou, D. P. Twitchell, T. Qin, J. K. Burgoon, and J. F. N. JR., "An exploratory study into deception detection in text-based computer-mediated communication," in *Proceedings of the 36th Hawaii International Conference on System Sciences*, Hawaii, U.S.A., 2003, the disclosure of which is hereby incorporated.

Phishing Email Corpus

Several types of fraudulent Internet text documents can be considered to be deceptive for the purposes of the present disclosure. For example, both person specific (potentially unique) deceptive email and large scale email scams fall under this category. Email scams typically aim to obtain financial or other gains by means of deception including fake stories, fake personalities, fake photos and fake template letters. The most often reported email scams include phishing emails, foreign lotteries, weight loss claims, work at home scams and Internet dating scams. Phishing emails attempt to deceptively acquire sensitive information from a user by masquerading the source as a trustworthy entity in order to steal an individual's personal confidential information, as discussed in I. Fette, N. Sadeh, and A. Tomasic, "Learning to detect phishing emails," in *Proceedings of International World Wide Web conference*, Banff, Canada, 2007.

The phishing email corpus, as described in, "Phishing corpus," http://monkey.org/7Ejose/wiki/doku.php?id=Phishing Corpus, August 2007, the disclosure of which is hereby incorporated by reference, is an exemplary data set that may be utilized to represent data in which ground truth is available and which may be processed by an embodiment of the present disclosure. These phishing emails were collected by Nazario and made publicly available on his website. When used by an embodiment of the present disclosure, only the body of the emails was used. Duplicate emails were deleted, resulting in 315 phishing emails in the final data set. 315 truthful emails from the legitimate (ham) email corpus (20030228-easy-ham-2), as discussed in "Apache software foundation," Spamassassin public corpus, http://spamassassin.apache.org/publiccorpus/, June 2006, the disclosure of which is hereby incorporated by reference, were randomly selected. This corpus contains spam emails as well as legitimate emails collected from the SpamAssassin developer mailing list and has been used in many spam filtering research, as discussed in A. Bergholz, J. H. Chang, G. Paab, F. Reichartz, and S. Strobel, "Improved phishing detection using model-based features," in *In Proceedings of the Conference on Email and Anti-Spam (CEAS)*, 2008, the disclosure of which is hereby incorporated by reference.

Scam Email Collection

A third data exemplary data set contains 1,022 deceptive emails that were contributed by Internet users. The email collection can be found at http://www.pigbusters.net/ScamEmails.htm. All the emails in this data set were distributed by scammers. This data set contains several types of email scams, such as "request for help scams", and "Internet dating scams". This collection can be utilized to gather scammers' email addresses and to show examples of the types of "form" emails that scammers use. An example of a scam email from this data set is shown below.

"MY NAME IS GORDON SMEITH. I AM A DOWN TO EARTH MAN SEEKING FOR LOVE. I AM NEW ON HERE AND I AM CURRENTLY SINGLE. I AM CARING, LOVING, COMPASSIONATE, LAID BACK AND ALSO A GOD FEARINBG MAN. YOU GOT A NICE PROFILE AND PICS POSTED ON HERE AND I WOULD BE DELIGHTED TO BE FRIENDS WITH SUCH A BEAUTIFUL AMD CHARMING ANGEL (YOU) . . . . IF YOU ARE. INTTERSTED IN BEING MY FRIEND YOU CAN ADD ME ON YAHOO MESSANGER SO WE CAN CHAT BETTER ON THERE AND GET TO KNOW EACH OTHER MORE MY YAHOO ID IS gordonsmiths@yahoo.com . . . . I WILL BE LOOKING FORWARD TO HEARING FROM YOU."

TABLE 1

Summary of three test email data sets

| Data sets | Size | deceptive | truthful |
| --- | --- | --- | --- |
| DSP | 417 | 123 (29.5%) | 294 (70.5%) |
| phishing-ham | 630 | 315 (50%) | 315 (50%) |
| scams-ham | 2044 | 1022 (50%) | 1022 (50%) |

Evaluations Metrics

In order to review the performance of deception detection, evaluation metrics should be defined. Table 2 shows the confusion matrix for the deception detection problem.

TABLE 2

A confusion matrix for deception detection
Predicted

| | | Deceptive | Normal |
| --- | --- | --- | --- |
| Actual | Deceptive | A (+ve) | B (−ve) |
| | Normal | C (−ve) | D (+ve) |

Evaluation metrics in accordance with an embodiment of the present disclosure:

Accuracy is the percentage of texts that are classified correctly, $$\text{Accuracy} = \frac{A + D}{A + B + C + D}$$

Detection rate (R) is the percentage of deceptive texts that are classified correctly.

$$R = \frac{A}{A+B}$$

False positive is the percentage of truthful texts that are classified as deceptive.

$$\text{False positive} = \frac{C}{C+D}$$

Precision (P) is the percentage of predicted deceptive texts that are actually deceptive. It is defined as $$P = \frac{A}{A+C}$$

$F_1$ is a precision statistic considering both detection rate and precision performance.

$$F_1 = \frac{2RP}{R+P}$$

All the detection results are measured using the 10-fold cross validation in order to test the generality of the proposed methods.

Analysis of Psycho-Linguistic Cues

In accordance with an embodiment of the present disclosure, in order to avoid the manual extraction of psycho-linguistic cues, the cues can be automatically extracted by LIWC. As an exemplary initial analysis, the cues in three data sets are examined and the important deceptive cues analyzed. The mean, standard deviation and standard error of mean are computed on both deceptive case and normal case. Then a t-test is performed to test the difference in means of two cases where significance level λ=0.05. Table 2.3 shows the statistics measurements of some selected cues.

From Table 2.3, for different data sets, the important deceptive cues may be different. For example, word count is an important cue for DSP and phishing-ham. In these two data sets, the deceptive emails are longer than the truthful cases. The p-value is smaller than 0.05 and it supports this hypothesis. However, the word count in scam-ham is not included in this case. The mean of word count in the deceptive case is smaller than in the truthful case. After examining the statistics measurement of all the cues, there are several cues that have the common trends in three data sets. These trends are listed and include: a) The number of unique words in deceptive cases are smaller than in truthful cases. b) Deceivers use more first person plural words than honest users. c) The inclusive words are used more often in deceptive cases than in truthful cases. d) Deceivers use less past tense verbs than honest users. e) Deceivers use more future tense verbs than honest users. f) Deceivers use more social process words than honest users. g) Deceivers use more other references than honest users.

TABLE 3

Statistics measurement of the selected cues

| Cues | Data sets | Means $D^1$ | $T^1$ | Std. D | dev. T | Std D | error mean T | p-value |
|---|---|---|---|---|---|---|---|---|
| Word count | DSP | 184.46 | 118.64 | 142.93 | 91.37 | 12.89 | 5.33 | 0.000 |
| | phishing-ham | 183.30 | 154.04 | 152.79 | 113.98 | 8.61 | 6.38 | 0.0064 |
| | scam-ham | 215.66 | 248.68 | 142.48 | 684.76 | 4.46 | 21.42 | 0.13 |
| Unique | DSP | 0.62 | 0.67 | 0.12 | 0.13 | 0.01 | 0.01 | 0.003 |
| | phishing-ham | 0.62 | 0.69 | 0.09 | 0.11 | 0.01 | 0.01 | 0.000 |
| | scam-ham | 0.61 | 0.69 | 0.11 | 0.13 | 0.00 | 0.00 | 0.000 |
| 1st person | DSP | 0.03 | 0.02 | 0.03 | 0.02 | 0.00 | 0.00 | 0.002 |
| | phishing-ham | 0.03 | 0.00 | 0.02 | 0.01 | 0.00 | 0.00 | 0.000 |
| | scam-ham | 0.01 | 0.00 | 0.01 | 0.01 | 0.00 | 0.00 | 0.000 |
| 1st person | DSP | 0.03 | 0.02 | 0.03 | 0.02 | 0.00 | 0.00 | 0.002 |
| | phishing-ham | 0.03 | 0.00 | 0.02 | 0.01 | 0.00 | 0.00 | 0.000 |
| | scam-ham | 0.01 | 0.00 | 0.01 | 0.01 | 0.00 | 0.00 | 0.000 |
| Total | DSP | 0.02 | 0.01 | 0.02 | 0.02 | 0.00 | 0.00 | 0.278 |
| | phishing-ham | 0.07 | 0.01 | 0.03 | 0.02 | 0.00 | 0.00 | 0.000 |
| | scam-ham | 0.04 | 0.01 | 0.03 | 0.02 | 0.00 | 0.00 | 0.000 |
| Other | DSP | 0.05 | 0.04 | 0.03 | 0.03 | 0.00 | 0.00 | 0.002 |
| | phishing-ham | 0.10 | 0.03 | 0.03 | 0.02 | 0.00 | 0.00 | 0.000 |
| | scam-ham | 0.06 | 0.03 | 0.03 | 0.02 | 0.00 | 0.00 | 0.000 |
| Inclusive | DSP | 0.06 | 0.04 | 0.02 | 0.03 | 0.00 | 0.00 | 0.0001 |
| | phishing-ham | 0.06 | 0.05 | 0.02 | 0.02 | 0.00 | 0.00 | 0.000 |
| | scam-ham | 0.07 | 0.05 | 0.02 | 0.02 | 0.00 | 0.00 | 0.000 |
| Affective | DSP | 0.03 | 0.02 | 0.02 | 0.02 | 0.00 | 0.00 | 0.103 |
| | phishing-ham | 0.04 | 0.03 | 0.02 | 0.02 | 0.00 | 0.00 | 0.000 |
| | scam-ham | 0.07 | 0.03 | 0.03 | 0.02 | 0.00 | 0.00 | 0.000 |
| Exclusive | DSP | 0.03 | 0.03 | 0.02 | 0.02 | 0.00 | 0.00 | 0.608 |
| | phishing-ham | 0.02 | 0.04 | 0.01 | 0.02 | 0.00 | 0.00 | 0.000 |
| | scam-ham | 0.02 | 0.03 | 0.01 | 0.02 | 0.00 | 0.00 | 0.000 |
| Past tense | DSP | 0.01 | 0.02 | 0.02 | 0.02 | 0.00 | 0.00 | 0.011 |
| | phishing-ham | 0.01 | 0.02 | 0.01 | 0.02 | 0.00 | 0.00 | 0.000 |
| | scam-ham | 0.02 | 0.02 | 0.02 | 0.02 | 0.00 | 0.00 | 0.000 |
| Present | DSP | 0.11 | 0.10 | 0.04 | 0.05 | 0.00 | 0.00 | 0.004 |
| | phishing-ham | 0.07 | 0.11 | 0.02 | 0.03 | 0.00 | 0.00 | 0.000 |
| | scam-ham | 0.14 | 0.09 | 0.03 | 0.04 | 0.00 | 0.00 | 0.000 |
| Future | DSP | 0.03 | 0.02 | 0.02 | 0.02 | 0.00 | 0.00 | 0.000 |
| | phishing-ham | 0.02 | 0.02 | 0.01 | 0.02 | 0.00 | 0.00 | 0.000 |
| | scam-ham | 0.02 | 0.01 | 0.01 | 0.01 | 0.00 | 0.00 | 0.000 |

TABLE 3-continued

Statistics measurement of the selected cues

| Cues | Data sets | Means D[1] | T[1] | Std. D | dev. T | Std D | error mean T | p-value |
|---|---|---|---|---|---|---|---|---|
| Social | DSP | 0.07 | 0.05 | 0.04 | 0.04 | 0.00 | 0.00 | 0.007 |
| | phishing-ham | 0.12 | 0.05 | 0.03 | 0.03 | 0.00 | 0.00 | 0.000 |
| | scam-ham | 0.12 | 0.06 | 0.04 | 0.03 | 0.00 | 0.00 | 0.000 |

D:Deceptive,
T:Truthful

The t-test reveals that the DSP data set is harder to detect than the other two data sets. Since the t-test p-values for most of the cues are larger than $\lambda=0.05$, the cues value in deceptive cases and truthful cases in DSP is difficult to tell the difference. Therefore, the detection result in DSP is expected to be worse than the other two data sets.

Cues Matching Methods

In accordance with an embodiment of the present disclosure, two deception detectors may be used: (1) unweighted cues matching, (2) weighted cues matching. The basic idea behind cues matching is straightforward. The higher the number of deceptive indicator cues that match a given text, then the higher the probability that the text is deceptive. For example, if the cues computed for a text match 10 of the 16 deceptive indicator cues, then this text has a high probability of being deceptive. A threshold data set may be used to measure the degree that the cue matching is an accurate indicator of the probability of correct detection and false positive.

Unweighted Cues Matching

In general, deceptive cues can be categorized into two groups: (1) cues with an increasing trend and (2) cues with a decreasing trend. If a cue has an increasing trend, its value (normalized frequency of occurrence) will be higher for a deceptive email than a truthful email. For cues with a decreasing trend, their values are smaller for a deceptive email.

In accordance with an embodiment of the present invention, unweighted cue matching gives the same importance to all the cues and works as follows. For the increasing trend cues, if an email's ith deceptive cue value, $\alpha_i$ is higher than the average value $\overline{\alpha}_{i\_dec}$, computed from the deceptive email training data set, then this deceptive cue is a match for this email. $c_{i,}=1$ is assigned to the deceptive coefficient for this cue. If the cue value is smaller than the average value $\overline{\alpha}_{itr}$, computed from the truthful email training set, then this email is said not to match this cue and $\alpha_i$ is set to 0. If the ith cue value for the email is between $\overline{\alpha}_{i\_tru}$ and $\overline{\alpha}_{i\_dec}$, then the closeness of this value to $\overline{\alpha}_{i\_dec}$ is computed, and is assigned a deceptive coefficient number between 0 to 1. A similar procedure applies for the cues with a decreasing trend as well. Intuitively, the higher the value of $c_i$ indicates that the ith cue is a strong indicator of deception. After comparing all of the cues, all of the deceptive coefficients are added and its deceptive value may be designated d. This value is then compared with a threshold t. If d>t, the email is declared to be deceptive. Otherwise, it is a truthful email. The steps involved in this deception detection algorithm are shown below, where n is the number of cues used.

If $\overline{\alpha}_{ide} > \overline{\alpha}_{itr}$
  if $\alpha_i \geq \overline{\alpha}_{ide}$, $c_i = 1$, $i = 1, \ldots, n$
  if $\alpha_i \leq \overline{\alpha}_{itr}$, $c_i = 0$, $i = 1, \ldots, n$
  if $\overline{\alpha}_{tr} < \alpha_i < \overline{\alpha}_{de}$, $c_i = \dfrac{\alpha_i - \overline{\alpha}_{itr}}{\overline{\alpha}_{ide} - \overline{\alpha}_{itr}}$ $i = 1, \ldots, n$ If $\overline{\alpha}_{ide} < \overline{\alpha}_{itr}$
  if $\alpha_i \leq \overline{\alpha}_{ide}$, $c_i = 1$, $i = 1, \ldots, n$
  if $\alpha_i \geq \overline{\alpha}_{itr}$, $c_i = 0$, $i = 1, \ldots, n$
  if $\overline{\alpha}_{ide} < \alpha_i < \overline{\alpha}_{itr}$, $c_i = \dfrac{\overline{\alpha}_{itr} - \alpha_i}{\overline{\alpha}_{itr} - \overline{\alpha}_{ide}}$ $i = 1, \ldots, n$ $$d = \sum_{i=1}^{n} c_i$$

If d > t, deceptive
If d < t, truthful

Weighted Cues Matching

In the heuristic cues matching method, all the cues play equal role in detection. However, in accordance with an embodiment of the present disclosure, it may be better for cues that have a higher differentiating power between deceptive and truthful texts to have a higher weight. Simulated Annealing (SA) may be used to compute the weights for the cues. Simulated Annealing is a stochastic simulation method as discussed in K. C. Sharman, "Maximum likelihood parameter estimation by simulated annealing," in *Acoustics, Speech, and Signal Processing, ICASSP*-88, April 1988, the disclosure of which is hereby incorporated by reference.

The algorithm contains a quantity $T_j$ as in equation (2.2) below, called the "system temperature" and starts with an initial guess at the optimum weights. A cost function that maximizes the difference between the detection rate and false positive is used in this process. Note that a 45° line in the receiver Operating Characteristic Curve (ROC), see e.g., FIG. 1 where the difference between the detection rate and false positive is zero corresponds to purely random guesses. At each iteration j, the cost function is computed as $E_j$. weights$_j$ is sequence of weights during SA and each time a random change to the weights$_j$. The random change to the weights$_j$ is chosen according to a certain "generating probability" density function and it depends on the system temperature. The system temperature is a scalar that controls the "width" of the density.

$$T_j = \frac{C}{\log(j+1)} \quad (2.2)$$

That is, at high temperature, the density has a "wide spread" and the new parameters are chosen randomly at a wide range. At low temperature, local parameters are chosen. The difference change is $\Delta E_j = E_j - E_{j-1}$. If $\Delta E_j$ is positive, then an increase in the cost function and the new weights are always accepted. On the other hand, if $\Delta E_j$ is negative, meaning that the new weights lead to a reduction in the cost function, then the new weights are accepted with an "acceptance probability". The acceptance probability distribution is a function that depends on ΔEj and system temperature as in equation (2.3) below.

$$\text{Prob} = (1 + \exp(-\Delta E_j/T_j))^{-1} \quad (23)$$

This algorithm can accept both increases and decreases in the cost function so that it allows escape from local maximum. Because the weights should be positive, any element of the weights that is negative during the iteration will be set to be 0 at that iteration.

The simulated annealing algorithm used is as follows:
Step 1: Initialization: total iteration number N, weight$_1$=1.5rand(1, n) (vector of n random weights), j=1.
Step 2: Compute detection rate and false positive using weight$_1$ on deceptive and truthful training data. Choose detection threshold tmax=is that maximizes the cost function E$_{max}$=E$_i$=detection rate-false positive.
Step 3: Set SA temperature T$_j$=0.1/log (j+1); newweight$_j$=weight$_j$+T$_j$*rand(1,n), j=j+1.
Step 4: Compute the detection rate and false positive using newweight$_j$ on deceptive and truthful training emails. Chosen detection threshold t$_{max}$=t$_j$ that maximizes the cost function Ej=detection rate-false positive.
Step 5: ΔE$_j$=E$_j$-E$_{max}$. If ΔE$_j$>0, weight$_j$= newweight$_{j-1}$E$_{max}$=E$_{max}$=E$_j$, t$_{max}$=t$_j$ else prob=(1+exp(-ΔE$_j$/T$_i$))$^{-1}$ and random probability r$_p$=rand(1). If prob>r$_p$, weight$_j$=weight$_{j-1}$; else weight$_j$=newweight$_{j-1}$, t$_{max}$=t$_j$.
Step 6: repeat step 3 to step 5 until j=N. w*weight$_N$ and final detection threshold t=tmax The optimum final weight vector obtained by SA is w*={w$_i$*}. Then the deceptive value d is computed using d=$\Sigma_{i=1}^{n}$c$_i$w$_i$*, i=1, . . . , n.

Detection Results

After computing the statistical value of 88 variables in deceptive and normal case respectively, for the cues listed in table 2.4, below, the difference between two cases is more apparent than others. All these features are called the deceptive cues and will be used in cues matching methods.

Figure 2:
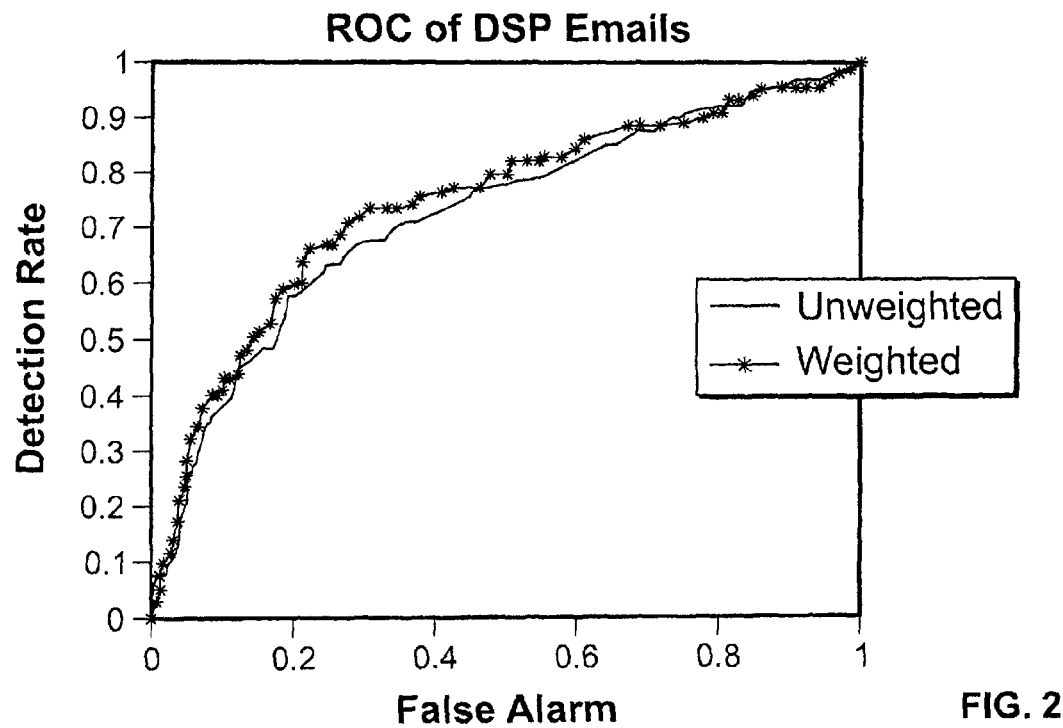
FIG. 2 is an graph of a receiver operating characteristic (ROC) of cue matching on a data set (DSP)
Figure 3:
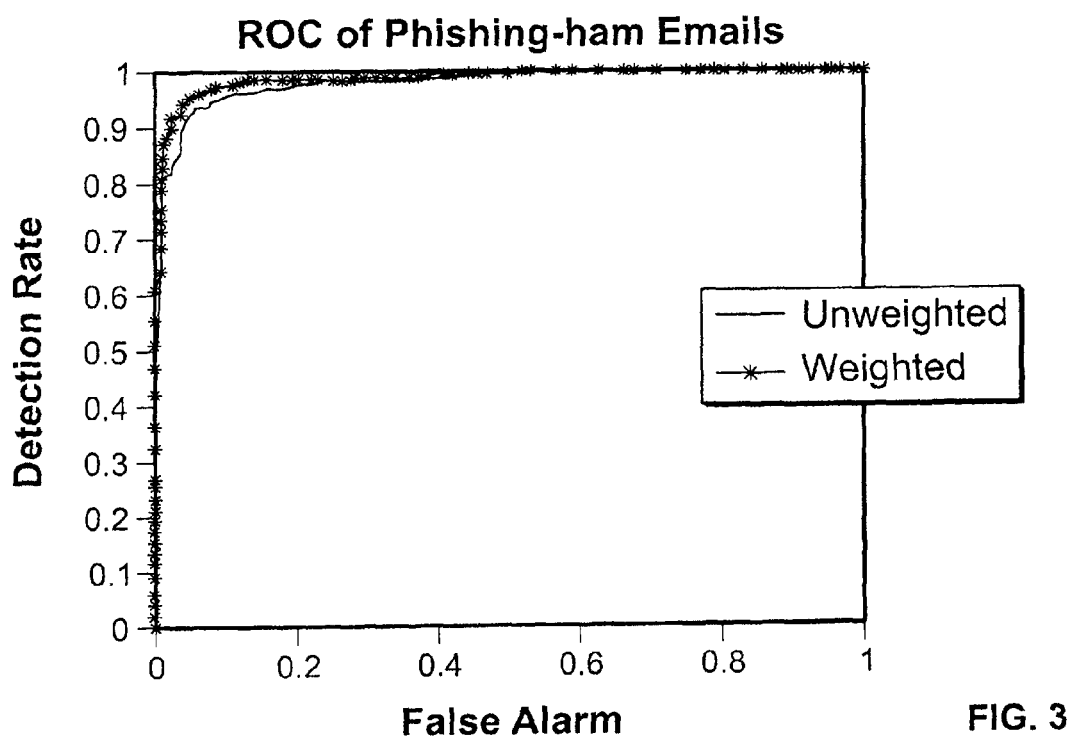
FIG. 3 is an graph of a receiver operating characteristic (ROC) of cue matching on a data set (Phishing-ham)
Figure 4:
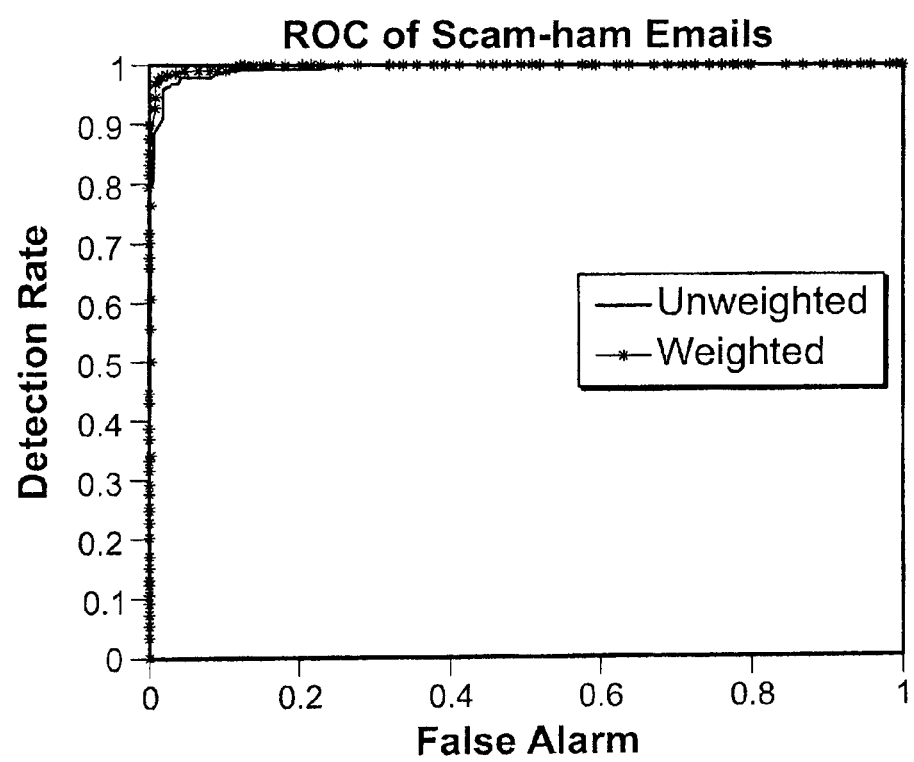
FIG. 4 is an graph of a receiver operating characteristic (ROC) of cue matching on a data set (scam-ham)

FIGS. 2-4 show the Receiver Operating Characteristic (ROC) of the DSP, phishing-ham, scam-ham data set using unweighted cues matching and weighted cues matching respectively.

TABLE 2.4

| Cues | |
|---|---|
| 1 | words count |
| 7 | unique |
| 8 | first person singular |
| 2 | first person plural |
| 3 | inclusive words |
| 13 | exclusive words |
| 4 | affective words |
| 5 | optimism and energy words |
| 6 | social process words |
| 9 | other references |
| 10 | assent words |
| 11 | insight words |
| 12 | tentative words |
| 14 | past verbs |
| 15 | present verbs |
| 16 | futures verbs |

These graphs suggest that weighted cues matching performs slightly better than unweighted cues matching. The results of weighted and unweighted cues matching are listed in table 2.5. The use of SA weights improves the detection results for the data sets.

TABLE 2.5

Detection result of cues matching methods

| | Unweighted cues matching | | | | |
|---|---|---|---|---|---|
| data sets | Accuracy | Detection | False | Precision | F$_1$ |
| DSP | 69.97% | 61.00% | 26.26% | 49.45% | 54.44% |
| phishing-ham | 93.51% | 93.08% | 6.13% | 93.82% | 93.45% |
| scam-ham | 97.61% | 96.57% | 1.94% | 98.05% | 97.30% |

| | Weighted cues matching | | | | |
|---|---|---|---|---|---|
| data sets | Accuracy | Detection rate | False positive | Precision | F$_1$ |
| DSP | 70.85% | 65.83% | 27.08% | 50.31% | 55.07% |
| phishing-ham | 94.96% | 94.97% | 5.09% | 94.92% | 94.94% |
| scam-ham | 97.90% | 97.40% | 1.86% | 98.13% | 97.76% |

Detection Method Based on the Markov Chain Model

In accordance with an embodiment of the present disclosure, a detection method based on the Markov chain is proposed. The Markov chain is a discrete-time stochastic process with the Markov properties, i.e., the future state only depends on the present state and is independent of the previous states. Given the present state, the future states will be reached by a stochastic probability. Also, the transition from the present state to the future state is independent of time.

The Markov chain model can be denoted as Ω=(S, P, π). S={S$_1$, S$_2$, . . . , S$_n$} is the set of states, P is the transition probabilities, P(S$_i$, S$_j$)=Ps$_i$,s$_j$ denotes the transition probability of state i to state j, and it is a matrix of n*n. π$_{si}$ is the initial probability of state i. And $\Sigma_{j=1}^{n}$P(S$_i$, S$_j$)=1 should be satisfied.

The probability of the/consecutive states that before time t can be computed, using the transition probabilities as following:

$$P_l(S_1, S_2, \ldots, S_l) = P_{l-1}(S_1, S_2, \ldots, S_{l-1}) * P(S_l | S_1, S_2, \ldots S_{l-1}) \quad (2.4)$$

$$= P_{l-2}(S_1, S_2, \ldots, S_{l-2}) *$$

$$P(S_{l-1} | S_1, S_2, \ldots S_{l-2}) * P_{S_{l-1}, S_l}$$

$$= \vdots$$

$$= P_2(S_1, S_2) * \prod_{i=2}^{l-1} P_{S_i, S_{i+1}}$$

$$= \pi_{S_l} \prod_{i=1}^{l-1} P_{S_i, S_{i+1}}$$

Markov Chain to Deception Detection

Figure 5:
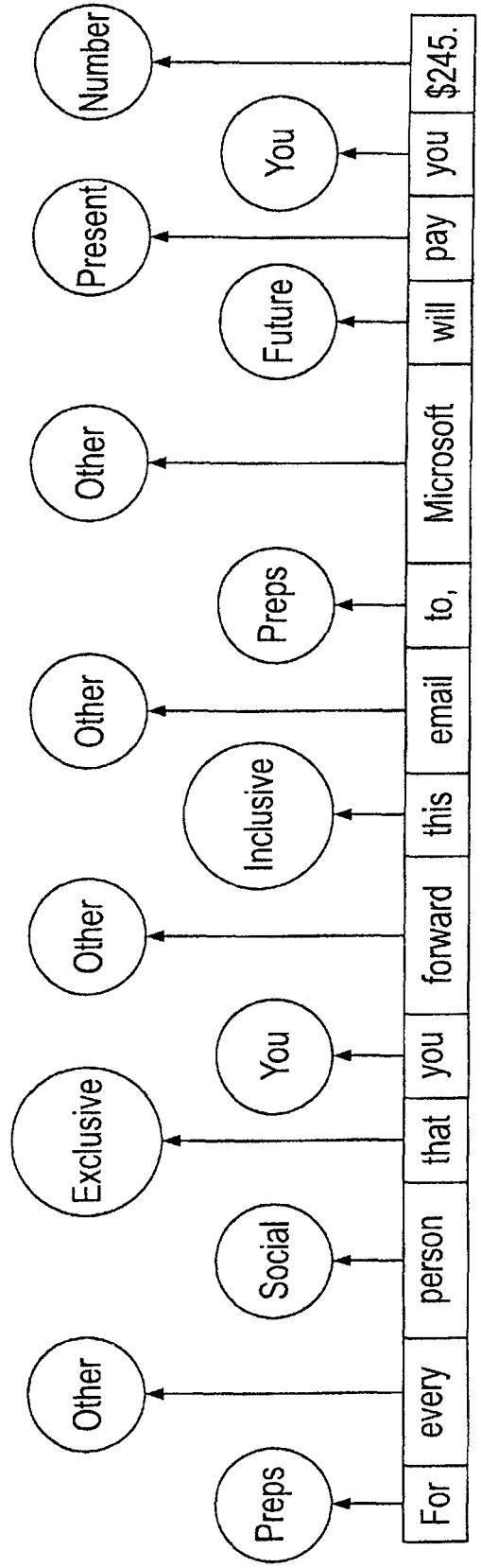
FIG. 5 is a diagram of the assignment of words in a sentence to be analyzed to cues.

Different combinations of words have different meanings. For example, "how are you?" and "how about you?" mean quite different things, although the difference is only one word. Considering: "is the sequence of words helpful in deception detection?" Note that the sequence of words has dependency due to the grammatical structure and other linguistic and semantic reasons. Clearly, considering even the first order sequence of words (i.e., considering statistics of adjacent words in a sequence) results in a large sample space. In order to alleviate the explosion of the state space, the sequence of cues is considered instead. For reasons mentioned above, the sequence of cues exhibits dependence. In accordance with an embodiment of the present disclosure, this can be modeled using a Markov chain. First, m cues are defined. In a text, every word must belong to one cue. If a word does not belong to any cue, it will be assigned to the m+lth cues. FIG. 5 shows an example of text words to cue category assignment.

Defining one cue as one state, there are, in total, m+1 states. After assigning the state to every word in a text, a text is a sequence of states from 1 to m+1. The longer the text, the longer the state sequence is. For convenience, the index of the state in the text is denoted time t. Let $S_t$ denote a state at time t, where t=1, 2, . . . .

Two assumptions can be made about the cue Markov chain similar to Q. Yin, L. Shen, R. Zhang, and X. Li, "A new intrusion detection method based on behavioral model," in *Proceedings of the 5th world congress on intelligent control and automation*, Hangzhou, June 2004, the disclosure of which is hereby incorporated by reference.

(1) the probability distribution of the cue at time t+1 depends only on the cue at time t, but does not depend on the previous cues; and (2) the probability of a cue transition from time t to t+1 does not depend on the time t.

Figure 6:
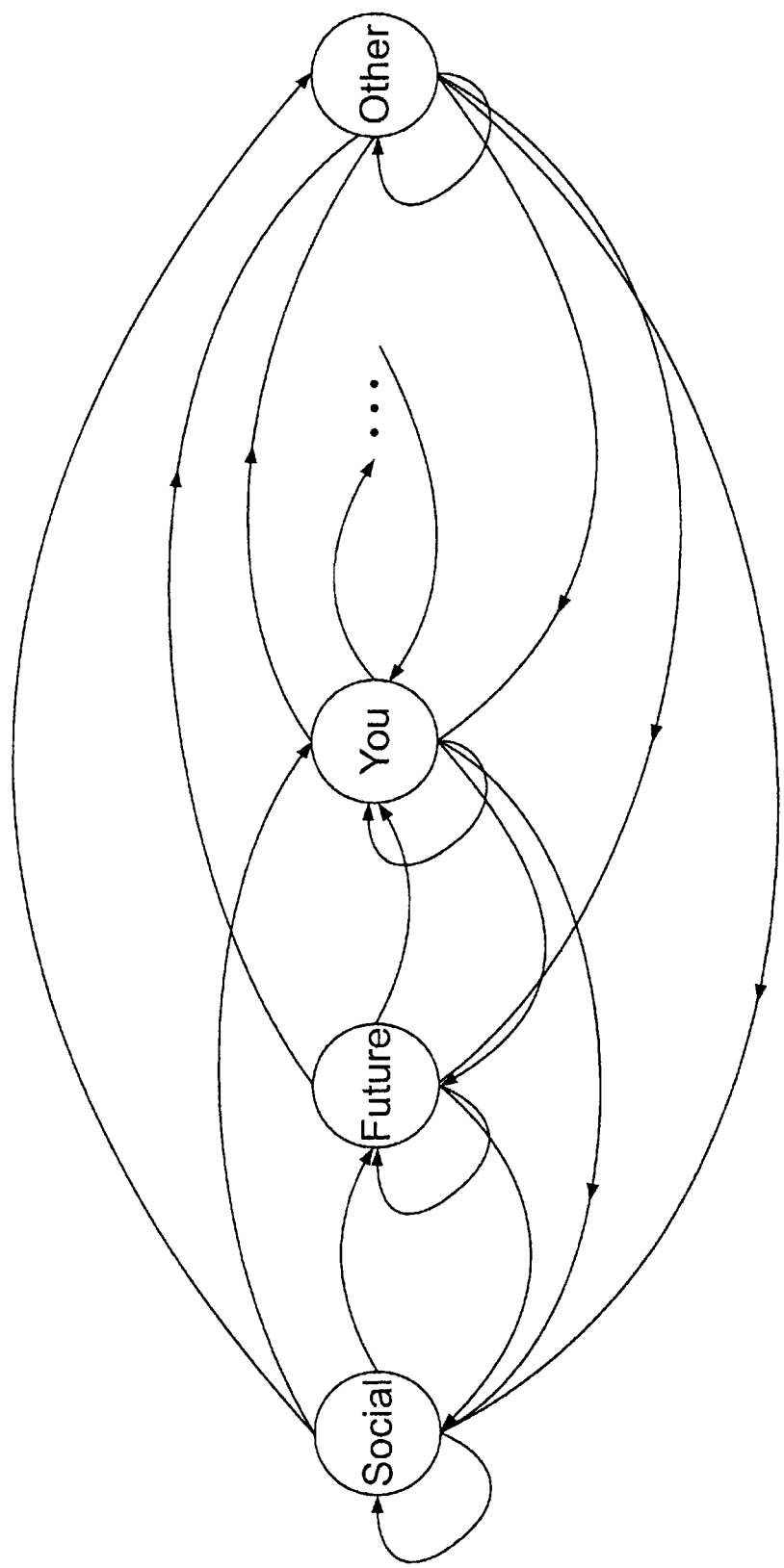
FIG. 6 is a diagram of a Markov chain.

FIG. 6 shows the Markov chain model for the sample set of cue categories 14. Two transition probability matrices can be obtained from the training data. One is the deceptive transition probability matrix $P_d$, and the other is the truthful transition probability matrix $P_r$. The transition probability matrix is the average transition probability of all the texts in the training data set and is normalized to satisfy that $\Sigma_{j=1}^m P(S_i, S_j)=1$. With respect to a text, there are three steps to decide whether it is deceptive or truthful, namely, Step 1: Let n denote the length of the text. Assign each word in the text a state between 1 to m+1.

Step 2: Using equation 2.4, compute the probability of n consecutive states using the transition probability matrices $P_{dec}$ and $P_{tru}$, and denote these as $P_n^{dec}$ and $P_n^{tru}$, Step 3: Maximum likelihood detector: if $P_{ndec} > P_n^{tru}$, then the email is deceptive. Otherwise it is truthful.

Detection Results

To test the Markov chain method on the data set, only the cues analyzed above are considered. In table 2.4 above, the cue "word count" and "unique" are about the text structure information and no single word can be assigned to these two cues. In accordance with an embodiment of the present disclosure, the remaining 14 cues are considered along with a new cue called "others". This modified set of cues, along with their state numbers corresponding to a Markov chain model, are shown in Table 2.6. Fourteen cues shown in table 2.6 are used in the Markov Chain method. Cues in a given text are computed and mapped to one of these 14 states. If a computed cue does not belong to any of the first 14 cues, it is assigned to the 15th cue called "others".

Table 2.7 shows the detection results.

TABLE 2.6

Modified cues and corresponding Markov chain states.

| 1 | first person singular | 2 | first person plural |
|---|---|---|---|
| 3 | other references | 4 | assent words |
| 5 | affective language | 6 | optimism and energy words |
| 7 | tentative words | 8 | insight words |
| 9 | social process words | 10 | past verbs |
| 11 | present verbs | 12 | future verbs |
| 13 | inclusive words | 14 | exclusive words |
| 15 | others | | |

TABLE 2.7

Detection results

| data sets | Accuracy | Detection rate | False positive | Precision | Ti |
|---|---|---|---|---|---|
| DSP | 69.71% | 60.67% | 26.50% | 50.92% | 55.37% |
| phishing-ham | 95.91% | 96.91% | 5.01% | 95.02% | 95.96% |
| scam-ham | 96.20% | 98.46% | 4.69% | 95.45% | 96.93% |

Detection Method Based on Sequential Probability Ratio Test

Sequential Probability Ratio Test (SPRT) is a method of sequential analysis for quality control problems that was initially developed by Wald, as discussed in A. Wald, Sequential Analysis. London: Chapman and Hall, LTD, 1947, the disclosure of which is hereby incorporated by reference.

For two simple hypotheses, the SPRT can be used as a statistical device to decide which one is more accurate. Let there be two hypotheses $H_o$ and $H_1$. The distribution of the random variable x is $f(x, \theta_0)$ when $H_o$ is true and is $f(x, \theta 1)$ when $H_1$ is true. The successive observations of x is denoted as $x_1, x_2, \ldots$ . Given m samples, $x_1, \ldots, x_m$, when $H_1$ is true, the probability of hypothesis $H_i$ is $$p_{1m} = f(x_1, \theta_1) \ldots f(x_m, \theta_1). \quad (2.5)=$$

When $H_o$ is true, the probability of hypothesis $H_o$ is $$P_{0m} = f(x_1, \theta_0) \ldots f(x_m, \theta_0). \quad (2.6)$$

The SPRT for testing $H_0$ against $H_1$ is as follows: two positive constants A and B(B<A) are chosen. At each stage of the observation, the probability ratio is computed. If $$\frac{p_{1m}}{p_{0m}} \geq A, \quad (2.7)$$

the experiment is terminated and $H_1$ is accepted. While $$\frac{p_{1m}}{p_{0m}} \leq B, \quad (2.8)$$

the experiment is terminated and $H_o$ is accepted. While $$B < \frac{p_{1m}}{p_{0m}} < A, \quad (2.9)$$

the experiment is continued by extending another observation.

The constants A and B depend on the desired detection rate 1—α and false positive β. In practice, (2.10) and (2.11) are usually used to determine A and B.

$$A = \frac{1-\beta}{\alpha} \quad (2.10)$$

$$B = \frac{\beta}{1-\alpha} \quad (2.11)$$

Deception Detection Using SPRT

To apply the SPRT technique to deception detection, an most important step is to create the test sequence $x_1 \ldots, x_n$ from the text. Using the deceptive cues explored as the test sequence is one approach to classify the texts. However, there are two difficulties when using the deceptive cues analyzed in the previous research, as discussed in L. Zhou, D. P. Twitchell, T. Qin, J. K. Burgoon, and J. F. N. JR., "An exploratory study into deception detection in text-based computer-mediated communication," in *Proceedings of the 36th Hawaii International Conference on System Sciences*, Hawaii, U.S.A., 2003 and L. Zhou, "Automating linguistics-based cues for detecting deception in text-based asynchronous computer-mediated communication," *Group Decision and Negotiation*, vol. 13, pp. 81-106, 2004, the disclosures of which are hereby incorporated by reference.

First, the number of cues already investigated is small. In L. Zhou, D. P. Twitchell, T. Qin, J. K. Burgoon, and J. F. N. JR., "An exploratory study into deception detection in text-based computer-mediated communication," in *Proceedings of the 36th Hawaii International Conference on System Sciences*, Hawaii, U.S.A., 2003, the authors focus on 27 cues, and in L. Zhou, J. K. Burgoonb, D. Zhanga, and J. F. N. JR., "Language dominance in interpersonal deception in computer-mediated communication," *Computers in Human Behavior*, vol. 20, pp. 381-402, 2004 they focus on 19 cues. Using SPRT in accordance with an embodiment of the present disclosure, the test sequence can be extended when the ratio is between A and B. In addition, many of the cues in previous research cannot be automatically computed, which is potentially labor intensive. For example, the passive voice is hard to extract automatically. To avoid these two limitations, in accordance with an embodiment of the present disclosure, information which we can be automatically extracted from texts using LIWC software is used as the test sequence.

There are two issues to resolve in order to use the SPRT technique. First, the probability distributions of the psycho-linguistic cues are unknown. Although the probability distribution can be estimated from the training data set, different assumptions about the distributions will lead to different results. To make the problem easier, the probability distribution of different cues may be estimated using the same kind of kernel function. Further, in the original SPRT, the test variables are IID (independent, identical distribution). This assumption is not true for the psycho-linguistic cues. Therefore, the order of the psycho-linguistic cues sequence will influence the test result.

To apply the SPRT technique, first an assumption that all the cues are independent is made. The Probability Density Functions (PDFs) can be obtained by applying a distribution estimation technique, such as kernel distribution estimator, on the training data. As mentioned above, a different order of cues in the test, and different assumptions about the probability distribution, will lead to different results. To illustrate the algorithm, a normal distribution may be used as an example. The detection result using other distributions will be given below for comparison.

For each text, all the values of the cues are computed using LIWC2001, defined as x. It is a vector with size (1*88). Then the likelihood ratio at the mth stage is $$l_m = \frac{f(x_1, x_2, \ldots, x_m : H_1)}{f(x_1, x_2, \ldots, x_m : H_0)} \quad (2.12)$$

-continued $$= \frac{\prod_{i=1}^{m} \frac{1}{\sqrt{2\pi}\,\sigma_{1i}} \exp\left\{-\frac{1}{2}\left(\frac{x_i - \theta_{1i}}{\sigma_{1i}}\right)^2\right\}}{\prod_{i=1}^{m} \frac{1}{\sqrt{2\pi}\,\sigma_{0i}} \exp\left\{-\frac{1}{2}\left(\frac{x_i - \theta_{0i}}{\sigma_{0i}}\right)^2\right\}} \quad (2.13)$$

Therefore, $$\log(l_m) = \sum_{i=1}^{m} \log\left(\frac{\sigma_{0i}}{\sigma_{1i}}\right) + \frac{1}{2}\sum_{i=1}^{m}\left[\left(\frac{x_i - \theta_{0i}}{\sigma_{0i}}\right)^2 - \left(\frac{x_i - \theta_{1i}}{\sigma_{1i}}\right)^2\right] \quad (2.14)$$

where $\theta_{0i}$, $\sigma_{0i}^2$ are the mean and variance of ith cues in deceptive cases, and $\theta_{1i}$, $\sigma_{1i}^2$ are the mean and variance of ith variables in truthful cases. According to the SPRT, for a detection rate $1-\alpha$ and false positive $\beta$, the detection threshold can be obtained using equations (2.10) and (2.11). Then, if $\log(l_m) \geq \log(A)$, accept $H_1$, email is truthful (2.15)

if $\log(l_m) \leq \log(B)$, accept $H_0$, email is deceptive (2.16)

Figure 7:
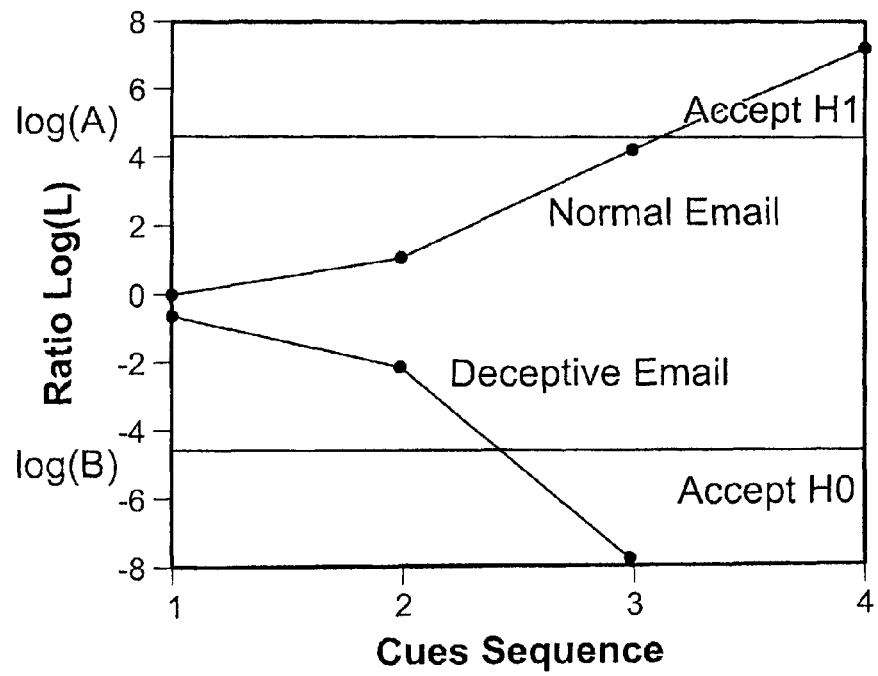
FIG. 7 is a graph of a data generated by a deception detection procedure (SPRT)

If $\log(B) < \log(l_m) < \log(A)$, the text needs an additional observation and the test sequence should be extended (m=m+1). If $\log(B) < \log(l_m) < \log(A)$ still exists after m=88, the text cannot be determined to be deceptive or truthful because no more cues can be extended. However, when $\log(l_m) > 0$, the probability of a text being truthful is bigger than the probability of being a deceptive text, so we will choose the hypothesis $H_1$. Otherwise, we will choose $H_0$. The following algorithm may be used to implement the SPRT test procedure, FIG. 7 illustrating the SPRT procedure.

---

Cues Sequence
Algorithm 1 SPRT test procedure

Input: 88 variable values, α and β
Output: deceptive, truthful, possible deceptive or possible truthful $$A = \frac{1-\beta}{\alpha}, B = \frac{\beta}{1-\alpha};$$

foreach Internet content i do
    Calculate 88 variables,
    foreach Variable $x_{ij}$ do
        Find the probability $f_j(x_{ij} : H_1)$ and $f_j(x_{ij} : H_0)$
    end
    Initial j = 1, stop = 1, $p_1 = p_0 = 1$
    while stop=1 do
        $p_1 = f_j(x_{ij} : H_1) * p_1$,
        $p_0 = f_j(x_{ij} : H_0) * p_0$, $\text{ratio} = \dfrac{p_1}{p_0}$, if log(ratio) ≥ log(A) then
            Internet content i is truthful, stop = 0
        end
        if log(ratio) ≤ log(B) then
            Internet content i is deceptive, stop = 0
        end
        if log(B) < log(ratio) < log(A) then
            stop = 1, j = j + 1
        end
        if j > 88, stop=1 then
            if log(ratio) > 0 then
                stop = 0, Internet content i is truthful.
            end

```
            |   |   |   if log(ratio) < 0 then
            |   |   |       stop = 0, Internet content i is deceptive.
            |   |   |   end
            |   |   end
            |   end
            end
```

Relative Efficiency

The number of cues is consistent for most of the detection methods. For example, the cues matching methods required 16 cues. For SPRT, the number of cues used for each test varies and depends on $\alpha$ and $\beta$. The SPRT is more efficient than the existing fixed length tests. Because the mean and variance of every variable is different, it is difficult to analyze the average test sample for SPRT and fixed sample tests according to $\alpha$ and $\beta$. Let's define $$Z_i = \log\left(\frac{f(x_i, \theta_{1i}, \sigma_{1i})}{f(x_i, \theta_{0i}, \sigma_{0i})}\right) \quad (2.17)$$

Figure 8:
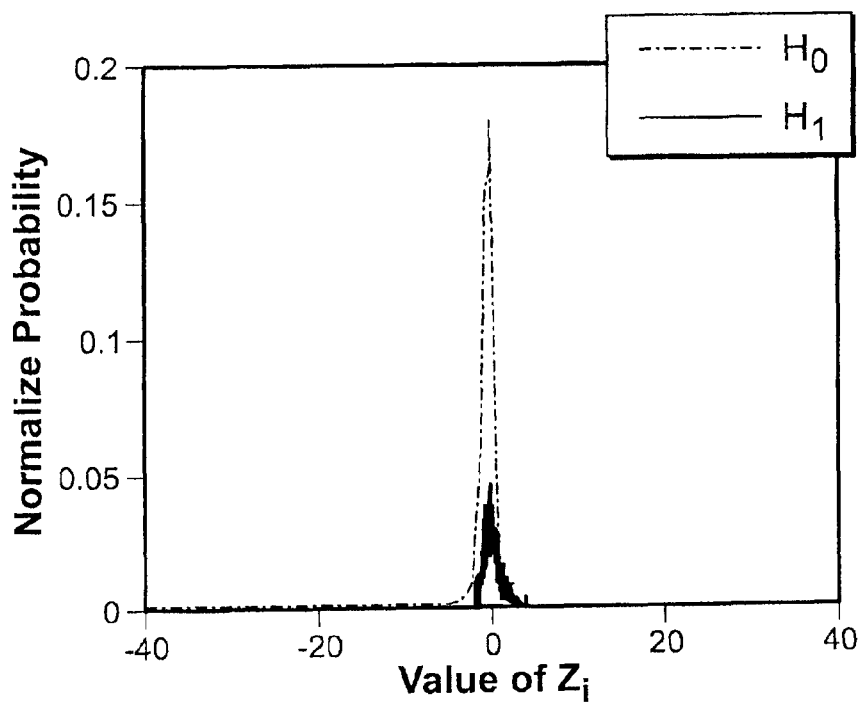
FIG. 8 is a of the normalized probability of value $Z_i$ from the Phishing-ham email data set.
Figure 9:
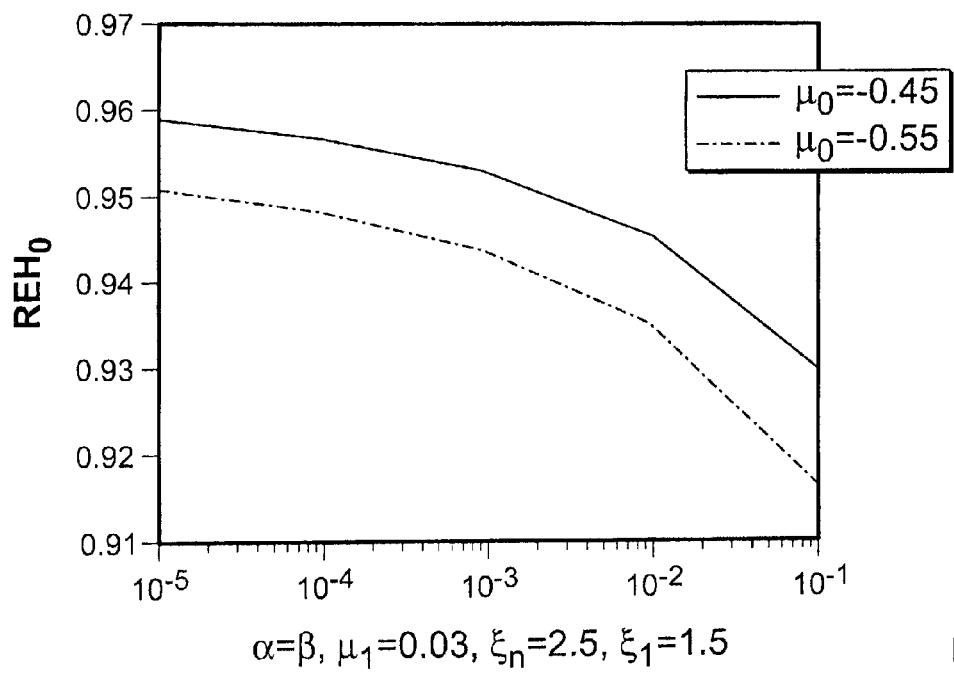
FIG. 9 is a graph of the relative efficiency of SPRT.

$Z_i$ is a variable depending on the $\theta_{1i}, \theta_{0i}, \sigma_{1i}, \sigma_{0i}$. Although the analysis including all the parameters is difficult, it is known that when $H_i$ is true, most of the $Z_i$ will be larger than 0, and when $H_0$ is true, most of the $Z_1$ will be smaller than 0. Thus, the distribution of $Z_i$ might be approximated to some common distribution. FIG. 8 shows the normalized probability of ratio $Z_i$ from the phishing-ham email data set. The mean of $Z_i$ in $H_1$ is a little larger than the mean of $Z_i$ in $H_0$, while the variance in $H_1$ is smaller than the variance in $H_0$. Both distributions can be approximated to a normal distribution.

Let $$E_{H_0}[Z_i] = \mu_0; E_{H_1}[Z_i] = \mu_1$$

$$Var_{H_0}[Z_i] = \xi_0; Var_{H_1}[Z_i] = \xi_1$$

$$\mu_0 < \mu_1; \xi_0 > \xi_1$$

For a fixed n length test, let's define the test statistic:

$$Z_n = \sum_{i=1}^{n} Z_i > T \quad (2.18)$$

After deriving the distribution of $Z_n$, T and n can be computed according to false positive $\beta$ and miss probability $\alpha$. Because of the central limit theorem, when n is large, $Z_n$ can be approximated to be a Gaussian distribution with mean $E[Z_n: H_i] = n\mu_i$, and $Var[Z_n: H_i] = n\xi_i$, $i=0, 1$. For the fixed length Neyman-Pearson test:

$$\int_{\Gamma_0} f(Z_n|H_1) dZ_n = \beta \quad (2.19)$$

$$\int_{\Gamma_1} f(Z_n|H_0) dZ_n = \alpha \quad (2.20)$$

where $\Gamma_0$ and $\Gamma_1$ is the sample space of $Z_n$ in $H_0$ and $H_1$ respectively. T is the detection threshold between $\Gamma_0$ and $\Gamma_1$. After solving (2.19) and (2.20), the test length of the fixed length test satisfying a and $_3$ can be obtained. If $E[Z_n: H_1] > E[Z_n: H_0]$, the test length is:

$$n_{Fss} = \left(\frac{\Phi^{-1}(1-\alpha)\sqrt{\xi_0} - \Phi^{-1}(\beta)\sqrt{\xi_1}}{\mu_1 - \mu_0}\right)^2 \quad (2.21)$$

Where $\Phi^{-1}(\bullet)$ is the inverse Gaussian function.

For the SPRT, the average number of variables used is denoted as $E_{H_i}[n]$ [48] and can be decided by (2.22).

$$E_{H_i}[n] = \begin{cases} \dfrac{L(H_i)\log(B) + (1 - L(H_i))\log(A)}{E_{H_i}[Z]} & \text{if } E_{H_i}[Z_i] \neq 0 \\ \dfrac{-\log(A)\log(B)}{E_{H_i}[Z^2]} & \text{if } E_{H_i}[Z_i] = 0, \end{cases} \quad (2.22)$$

$L(H_i)$ is the operating characteristic function which gives the probability of accepting Ho when $H_i$, i=0, 1 is the case. Then when $E_{H_i}[Z_i] \neq 0$, $$E_{H_0}[n] = \frac{(1-\alpha)\log\left(\frac{\beta}{1-\alpha}\right) + \alpha\log\left(\frac{1-\beta}{\alpha}\right)}{\mu_0}$$

$$E_{H_1}[n] = \frac{\beta\log\left(\frac{\beta}{1-\alpha}\right) + (1-\beta)\log\left(\frac{1-\beta}{\alpha}\right)}{\mu_1}$$

When $E_{H_i}[Z_i] = 0$ $$E_{H_0}[n] = \frac{(1-\alpha)\log\left(\frac{\beta}{1-\alpha}\right) + \alpha\log\left(\frac{1-\beta}{\alpha}\right)}{\xi_0}$$

$$E_{H_1}[n] = \frac{\beta\log\left(\frac{\beta}{1-\alpha}\right) + (1-\beta)\log\left(\frac{1-\beta}{\alpha}\right)}{\xi_1}$$

To compare the relative efficiency of SPRT over fixed length test, let's define $$RE_{H_i} = 1 - \frac{E_{H_i}[n]}{n_{Fss}} \quad (2.23)$$

FIG. 8 shows the relative efficiency of SPRT. $RE_{Hi}$ increases as the risk probabilities decrease. The SPRT is about 90% more efficient than the fixed length test.

Improvement of SPRT

In accordance with an embodiment of the present disclosure, there are two methods to improve the performance of SPRT in deception detection. A first method is the selection of important variables, and the second is truncated SPRT.

The Selection of Important Variables

Figure 10:
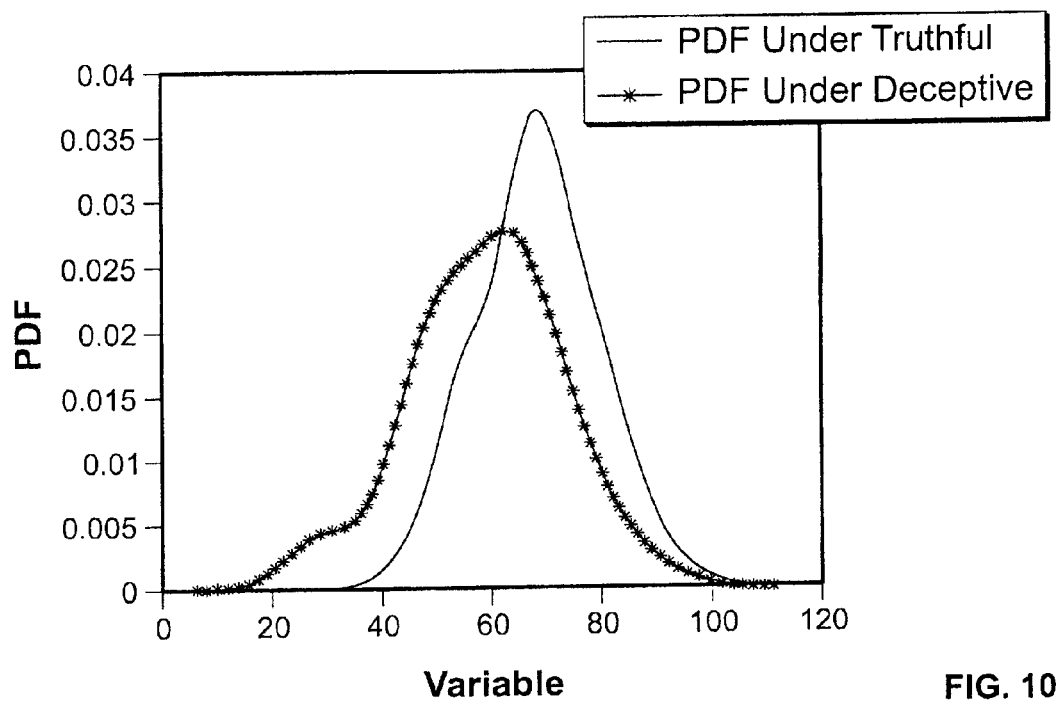
FIG. 10 is a graph of PDF of a first variable.
Figure 11:
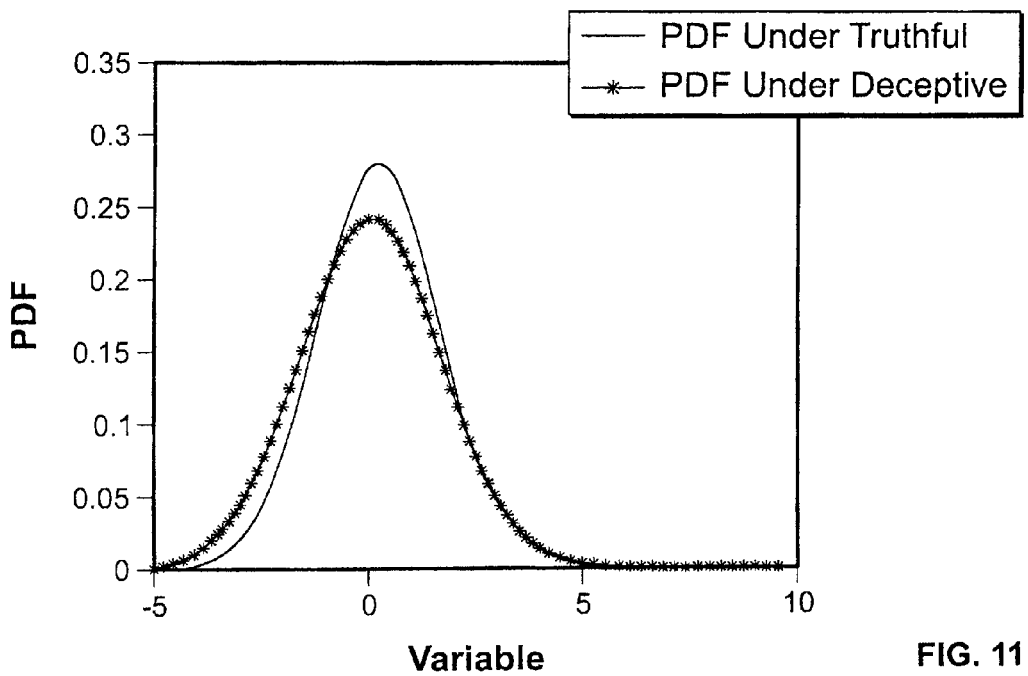
FIG. 11 is a graph of PDF of a second variable.

Some cues, like the cues in Table 2.4, will play more important roles in determining deception than other cues. From the PDF point, the more different the PDF are under two conditions, then the more important the cue is. Deciding the importance of each cue requires more consideration. Sorting the cues according to their importance will help to make the SPRT algorithm more effective. FIGS. 10 and 11 show two variables' PDF in different conditions.

Since the probability scale and cue value scale are different for different cues, it is hard to tell which cue is more important. For example, the value of "word count" is an integer while the value of "first person plural" is a number between zero and one. Remembering that the probability ratio depends on the ratio of two probabilities in two PDFs, the importance of a cue should reflect the shape of the PDFs and the distance between two PDFs. In accordance with an embodiment of the present invention, a method to compute the importance of cues by utilizing the ratio of the mean probabilities and the central of the PDFs is shown in algorithm 2 below. After computing the importance of all the cues, the cues sequence $x_i$ can be sorted in an importance descending order. Then, in the SPRT algorithm, the important cues will be considered first, and then it can reduce the average test sequence length.

---
Algorithm 2 Cues sorting
---

Input: PDF $f_i$ ($H_1$) and $f_i$ ($H_0$), i =1 ... 88
Output: importance value
foreach Cue i do
| Calculate $f_{mean}$ = mean($f_i$ : $H_1$)
| and $g_{mean}$ = mean($f_i$ : $H_0$)
| Calculate r = $\frac{f_{mean}}{g_{mean}}$
| if r < then
|   | r = 1/r
| end
| $fx_{max}$ = $\max_x f_i$ : ($H_1$)
| $gx_{max}$ = $\max_x f_i$ : ($H_0$)
| importance value = r * abs($fx_{max}$ − $gx_{max}$)
end

---

Truncated SPRT

When using SPRT, if α and β are very small, or if the actual distribution parameter is not already known, the average sample number that needs to be tested might become extremely large. Truncated SPRT combines the SPRT technique and the fixed length test technique and avoids the extremely large test sample. For truncated SPRT, the truncated sample number N is set. The differences between SPRT and truncated SPRT are: 1) at every stage, the decision boundaries are changed; 2) at every stage, if m=N, a quick decision is made to choose the hypothesis with the larger SPR.

Here we use the time-varying decision boundaries that are usually used in truncated SPRT. The bounds are:

$$T_1 = \log(A)\left(1 - \frac{m}{N}\right)^{r_1}$$
$$T_2 = \log(B)\left(1 - \frac{m}{N}\right)^{r_2}$$

$r_1$ and $r_2$ are parameters which can control the convergence rate of the test statistic to the boundaries. For every stage, if $l_m \geq T_1$, choose $H_1$ (2.24)

if $l_m \leq T_2$, choose $H_0$ (2.25)

If neither of (2.24) or (2.25) is satisfied and m≠N, then m=m+1. If m=N, the hypothesis with the larger SPR is chosen. For online deception detection, due to 88 variables can be used totally, SPRT is a special case of truncated SPRT when N=88, $r_1$=$r_2$=0. The average number of sample used in $H_1$ case by truncated SPRT is defined by $E_T[n:H_1]$.

$$E_T[n:H_1] \approx \frac{E[n:H_1]}{1 + \frac{r_1}{N}E[n:H_1]} \quad (2.26)$$

The error probability α' of truncated SPRT is $$\alpha' = \alpha \cdot \left[1 + \frac{r_1 \cdot \log(A) \cdot E[n:H_1]}{N + r_1 \cdot E[n:H_1]}\right]$$

The truncated SPRT uses fewer variables to test and the amount of reduction is controlled by $r_1$.

Figure 12:
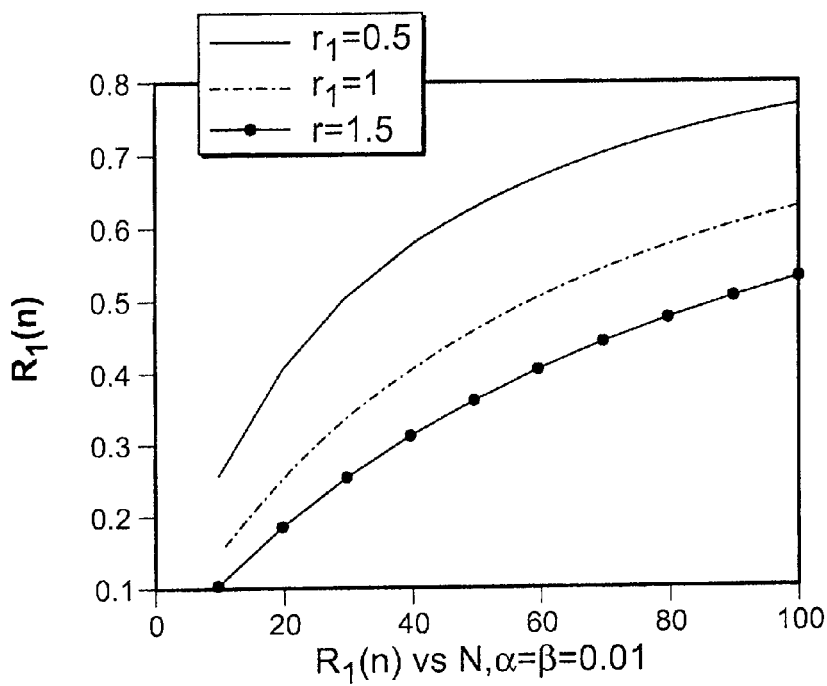
FIG. 12 is a graph of the saving of truncated SPRT over SPRT vs. N.
Figure 13:
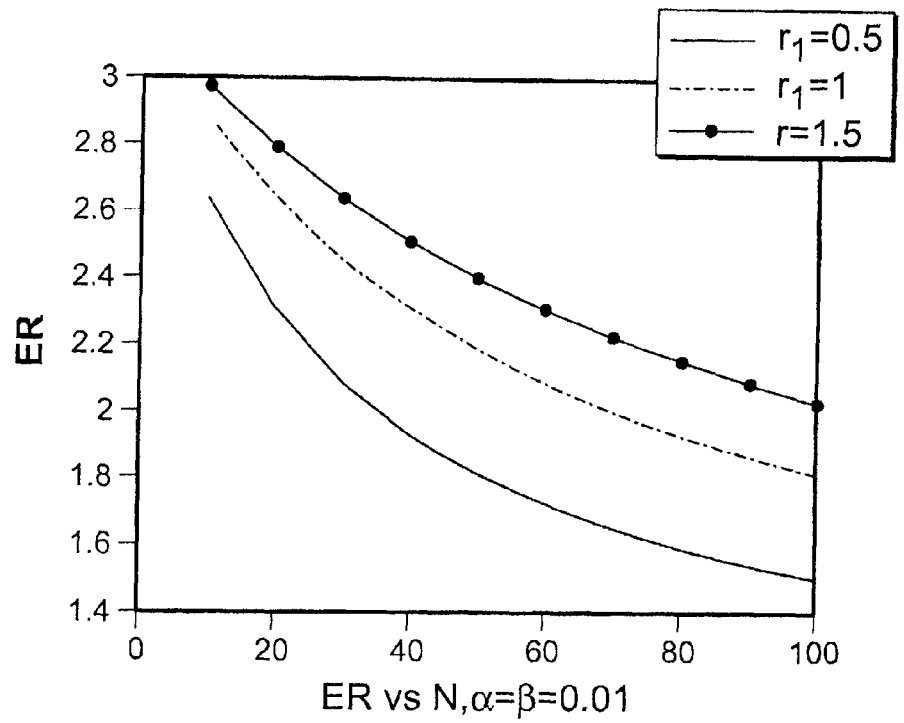
FIG. 13 is a graph of the ER value vs. N at different $r_1$.

To see the amount of reduction by truncated SPRT, Let's define $R_1$ (n)=$E_T[n:H_1]$/$E[n:H_1]$. FIG. 12 shows the plot of $R_1$ (n) versus truncated number N. The larger N is, the closer $E_T[n:H_1]$ and $E[n H_1]$ will be. One may also let $$ER = \frac{\alpha'}{\alpha}$$

to compare the error probability of truncated SPRT and SPRT. FIG. 13 shows the plot of ER versus N at different $r_1$. Although there is a gain in efficiency, there is a trade off between the test sequence length and the error probability.

Detection Results

In order to test the generality of the method in accordance with an embodiment of the present disclosure, all the detection results are measured using a 10-fold cross validation. One may also consider different kinds of the kernel function and the kernel density estimator is used on the training data to obtain the PDFs.

For all the implementations, a=β=0.01. For the deception detection problem, a=β=0.01 is low enough when the trade off between sequence length and error probabilities is considered. Tables 2.8, 2.10 and 2.12 show the detection results using SPRT without sorting the importance of cues in three data sets. The order used here is the same as the output of LIWC. Tables 2.9, 2.11, and 2.13 show the detection results using SPRT with the sorting algorithm. For the DSP data set, the detection rate is good. However, it has a high false positive, so the overall accuracy is dropped down. The normal kernel function with cues sorting works best with an accuracy of 71.4%. The average number of cues used is about 12. For the Phishing-ham data set, all of the results are above 90%. The triangle kernel function with cues sorting achieves the best result with 96.09% accuracy. The normal kernel function gets 95.47%. The sorting algorithm reduces the average number of cues. Without sorting the cues, the average number of cues used is about 15. While sorting, it is reduced to about 8. For the scams-ham data set, most of the results are about 96% and not much different between using different kernel functions. However, sorting the cues leads to a smaller average number of cues. For all three data sets, normal kernel function works well. Sorting the cues can improve the detection results and lead to a smaller average number of cues. Although 88 cues were utilized, in most of the cases, only a few cues are needed in the detection. This is advantageous approach. For a single text, fewer cues can avoid the noise of non-important cues and over-fitting.

TABLE 2.8

Detection result on DSP without sorting cues

| kernel function | normal | box | triangle | epanechnikov |
|---|---|---|---|---|
| Accuracy | 54.42% | 46.98% | 37.21% | 33.72% |
| Detection rate | 83.85% | 86.92% | 93.08% | 86.92% |
| False positive | 70.33% | 62.33% | 87.00% | 89.33% |
| Precision | 38.70% | 35.03% | 31.73% | 44.15% |
| $F_1$ | 52.96% | 49.93% | 47.33% | 47.33% |
| No. average cues | 12.24 | 21.11 | 16.8 | 15.8 |

TABLE 2.9

Detection result on DSP with sorting cues

| kernel function | normal | box | triangle | epanechnikov |
|---|---|---|---|---|
| Accuracy | 71.40% | 47.44% | 60.23% | 63.02% |
| Detection rate | 79.23% | 90.77% | 85.38% | 79.23% |
| False positive | 32.00% | 71.33% | 50.67% | 44.00% |
| Precision | 52.69% | 36.48% | 45.19% | 47.26% |
| $F_1$ | 63.29% | 52.05% | 59.10% | 59.21% |
| No.average cues | 12.95 | 16.00 | 12.60 | 14.18 |

TABLE 2.10

Detection result on phishing-ham without sorting cues

| kernel function | normal | box | triangle | epanechnikov |
|---|---|---|---|---|
| Accuracy | 93.59% | 90.16% | 92.66% | 90.00% |
| Detection rate | 97.19% | 96.56% | 97.50% | 97.19% |
| False positive | 9.69% | 16.25% | 12.19% | 17.19% |
| Precision | 91.16% | 85.84% | 89.01% | 85.20% |
| $F_1$ | 94.08% | 90.89% | 93.06% | 90.80% |
| No.average cues | 15.88 | 15.70 | 16.09 | 15.84 |

TABLE 2.11

Detection result on phishing-ham with sorting cues

| kernel function | normal | box | triangle | epanechnikov |
|---|---|---|---|---|
| Accuracy | 95.47% | 78.91% | 96.09% | 94.53% |
| Detection rate | 94.37% | 98.75% | 95.00% | 93.75% |
| False positive | 3.44% | 4.0% | 2.81% | 4.19% |
| Precision | 96.63% | 71.67% | 97.17% | 95.28% |
| $F_1$ | 95.49% | 83.06% | 96.07% | 94.51% |
| No.average cues | 7.58 | 8.95 | 7.37 | 7.15 |

TABLE 2.12

Detection result on scam-ham without sorting cues

| kernel function | normal | box | triangle | epanechnikov |
|---|---|---|---|---|
| Accuracy | 95.92% | 96.60% | 96.60% | 96.36% |
| Detection rate | 97.57% | 97.57% | 97.67% | 96.80% |
| False positive | 5.73% | 4.37% | 4.47% | 4.08% |
| Precision | 94.48% | 96.65% | 95.67% | 95.99% |
| $F_1$ | 96.00% | 96.65% | 96.66% | 96.39% |
| No.average cues | 8.88 | 9.42 | 9.15 | 9.09 |

TABLE 2.13

Detection result on scam-ham with sorting cues

| kernel function | normal | box | triangle | epanechnikov |
|---|---|---|---|---|
| Accuracy(%) | 96.84% | 93.20% | 96.17% | 96.65% |
| Recall(%) | 97.69% | 98.64% | 98.06% | 97.77% |
| False positive(%) | 4.17% | 12.23% | 5.73% | 4.47% |
| Precision(%) | 95.95% | 89.07% | 94.52% | 95.65% |
| $F_1$ | 96.95% | 93.61% | 96.26% | 96.70% |
| No.average cues | 6.45 | 8.88 | 6.82 | 6.88 |

Figure 14:
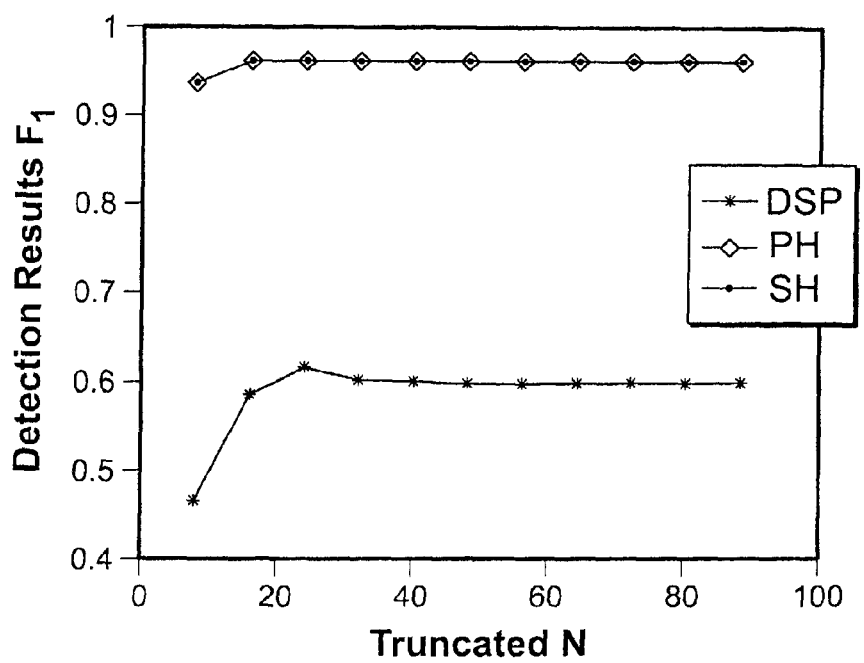
FIG. 14 is a graph of detection result $F_1$ of truncated SPRT vs. N.

In order to investigate how many cues are enough for the SPRT, the truncated SPRT is implemented. Although the average number of cues used in three data sets is less than twenty (20), some emails may still need a large number of cues to detect. Therefore, changing the truncated number N will lead to different detection results. FIG. 14 shows the F1 result using truncated SPRT in three data sets. Here $r_1=r_2$ is set to 0.01. The normal kernel function is used and the cues are sorted by the sorting algorithm. When N is small, increasing N will improve the detection result. When N is about 25, the detection result is close to the result of SPRT. The cues sorted after 25 do not really help in the detection. In these three data sets, the first 25 cues are enough to detect deceptiveness.

Figure 15:
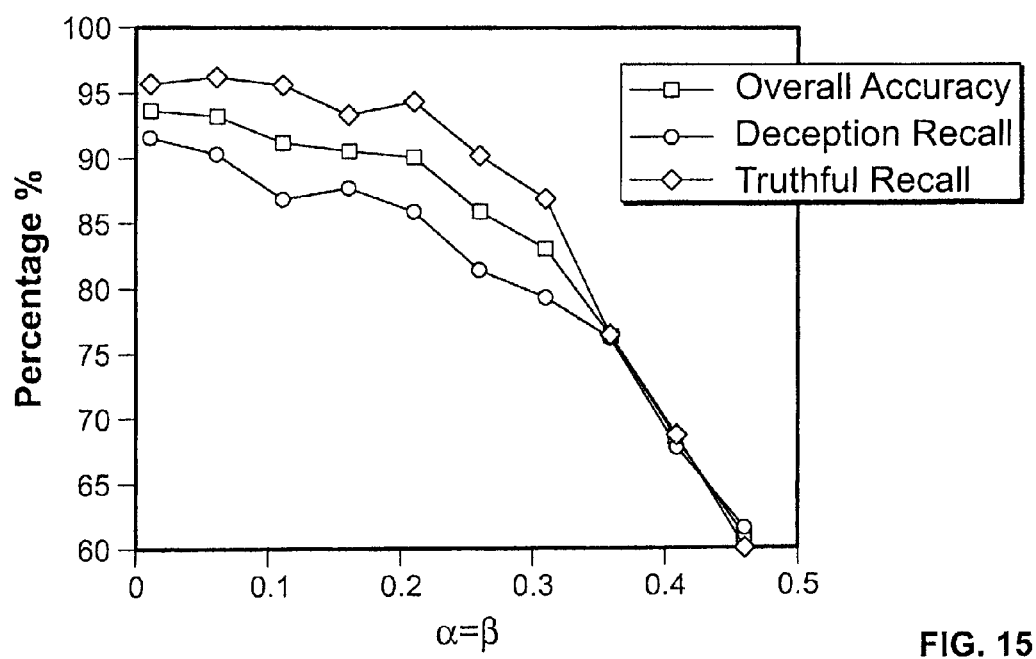
FIG. 15 is a graph of detection result vs. $\alpha$ and $\beta$ on the Phishing-ham data set.

The values of α and β could also be changed according to certain environments. For example, if the system has a higher requirement in deception rate but has a lower requirement in false positive, then a should be set to a small number and 0 can be a larger number according to the false positive. The major difference between this proposed method and previous methods is that the detection results can be controlled. FIG. 15 shows the detection result with different values of α and β on the phishing-ham data set. Increasing α and β will decrease the detection result and the 10-fold cross validation detection results are close to the desired result.

Comparison of Detection Methods

For comparison, two popular classification methods (decision tree and support vector machine (SVM)) were implemented in the data sets to enable comparison to an embodiment of the present disclosure. Decision tree methodology utilizes a tree structure where each internal node represents an attribute, each branch corresponds to an attribute value, and each leaf node assigns a classification. It trains its rules by splitting the training data set into subsets based on an attribute value test and repeating on each derived subset in a recursive manner until certain criteria satisfies, as shown in T. M. Mitchell, *Machine Learning*. McGraw Hill, 1968, the disclosure of which is hereby incorporated by reference.

SVM is an effective learner for both linear and nonlinear data classification. When the input attributes of two classes are linearly separable, SVM maximizes the margin between the two classes by searching a linear optimal separating hyperplane. On the other hand, when the input attributes of two classes are linearly inseparable, SVM will first map the feature space into a higher-dimension space by a nonlinear mapping, and then search the maximum-margin hyperplane in the new space. By choosing an appropriate nonlinear mapping function, input attributes from the two classes can always be separated. Several different kernel functions were explored, namely, linear, polynomial, and radial basis functions, and the best results were obtained with a polynomial kernel function:

$$k(x,x')=(x \cdot x'+1)^d \qquad (2.27)$$

TABLE 2.14

Detection results on DSP

| Methods | Accuracy | Recall | False positive | Precision | $F_1$ |
|---|---|---|---|---|---|
| Unweighted cue matching | 67.97% | 61.00% | 26.26% | 49.45% | 54.55% |
| Weighted cue matching | 70.85% | 65.83% | 27.08% | 50.31% | 55.07% |
| Markov chain model | 69.71% | 60.67% | 26.50% | 50.92% | 55.37% |
| SPRT | 71.40% | 79.23% | 32.00% | 52.69% | 63.29% |
| Decision tree | 66.34% | 50.83% | 27.24% | 43.68% | 46.98% |
| SVM | 77.21% | 59.23% | 15.00% | 62.35% | 59.71% |

The input of the decision tree and SVM learner is the same 88 psycho-linguistic cues extracted by LIWC. Table 2.14 shows the detection result on DSP emails. SPRT achieves the best $F_1$ performance among six methods. Although the accuracy of SVM (77.21%) is higher than SPRT (71.40%), the number of deceptive emails and truthful emails is not balanced and SVM has a lower detection rate. For the $F_1$ measurement, which considers both detection rate and precision performance. SPRT outperforms the SVM. For the DSP data set, all the methods achieve low accuracy. This might be due either to: 1) The small sample size, or 2) the time required to complete the testing. Other factors to consider are that deceivers may manage their deceptive behavior in several messages, but not in a single one; and some of the messages from deceivers may not exhibit deceptive behavior.

Table 2.15 shows the detection results on phishing-ham emails. In this case, SPRT achieves the best results among six methods and then the Markov Chain Model. Table 2.16 shows the detection results on scam-ham emails. In this case, weighted cues matching achieves the best results among the six methods, followed by the SPRT method. In all three data sets, each of the four methods in accordance with the embodiments of the present disclosure perform comparably and work better than the decision tree method.

TABLE 2.15

Detection results on phishing-ham email data

| Methods | Accuracy | Recall | False positive | Precision | $F_1$ |
|---|---|---|---|---|---|
| Unweighted cue matching | 93.51% | 93.08% | 6.13% | 93.82% | 93.45% |
| Weighted cue matching | 94.96% | 94.97% | 5.09% | 94.92% | 94.94% |
| Markov chain model | 95.91% | 96.91% | 5.07% | 95.02% | 95.96% |
| SPRT | 96.09% | 95.00% | 2.81% | 97.17% | 96.07% |
| Decision tree | 91.77% | 92.26% | 8.71% | 91.60% | 93.27% |
| SVM | 95.63% | 94.37% | 3.13% | 96.89% | 95.57% |

The detection methods in accordance with an embodiment of the present disclosure can be used to detect online hostile content. However, the SPRT approach has some advantages over other methods, namely: (a) Cues matching methods and Markov chain methods use a fixed number of cues to detect, while SPRT use various cues in detection. For the fixed number methods, deception cues analyzed here might not be suitable for other data sets. The SPRT approach does not depend on the deception cues by using all of the linguistic style and verbal information, which can be easily obtained automatically.

TABLE 2.16

Detection results on scam-ham email data

| Methods | Accuracy | Recall | False positive | Precision | $F_1$ |
|---|---|---|---|---|---|
| Unweighted cue matching | 97.61% | 96.57% | 1.94% | 98.05% | 97.30% |
| Weighted cue matching | 97.90% | 97.40% | 1.86% | 98.13% | 97.76% |
| Markov chain model | 96.20% | 98.46% | 4.69% | 95.45% | 96.93% |
| SPRT | 96.84% | 97.69% | 4.17% | 95.95% | 96.95% |
| Decision tree | 96.05% | 91.67% | 2.26% | 97.24% | 94.37% |
| SVM | 96.65% | 93.69% | 0.39% | 99.61% | 96.31% | approach does not depend on the deception cues by using all of the linguistic style and verbal information, which can be easily obtained automatically.

(b) The detection procedure is efficient. For most of the texts, a few cues are enough to determine deceptiveness, compared to other methods.

(c) The SPRT approach depends on the statistical properties of the information contained in the text. The detection result can be controlled.

As noted above, in accordance with an embodiment of the present invention, a psycho-linguistic modeling and statistical analysis approach was utilized for detecting deception in text. The psycho-linguistic cues were extracted automatically using LIWC2001 and were used in accordance with the above-described methods. Sixteen (16) psycho-linguistic cues that are strong indicators of deception were identified. Four new detection methods were described and their detection results on three real-life data sets were shown and compared. Based on the foregoing, the following observations can be made:

(a) Psycho-linguistic cues are good indicators of deception in text, if the cues are carefully chosen.

(b) It is possible to achieve 97.9% accuracy with 1.86% false alarm while detecting deception.

(c) Weighting the cues results in a small improvement in the overall accuracy compared to treating all the cues with equal importance.

(d) All the four proposed detectors perform better than decision trees for each of the three data sets considered.

(e) Investigating more psycho-linguistic cues using a similar approach may give additional insights about deceptive language.

Deception Detection, from Text Based on Compression Based Probabilistic Language Model Techniques In accordance with an embodiment of the present invention, deception may be detected in text using compression-based probabilistic language modeling. Some efforts to discern deception utilizes feature-based text classification. The classification depends on the extraction of features indicating deceptiveness and then various machine learning based classifiers using the extracted feature set are applied. Feature-based deception detection approaches exhibit certain limitations, namely:

(a) Defining an accurate feature set that indicates deception is a hard problem (e.g., L. Zhou, "Automating linguistics-based cues for detecting deception in text-based asynchronous computer-mediated communication," *Group Decision and Negotiation*, vol. 13, pp. 81-106, 2004.).

One reason for this is that deception has been shown to be a cognitive process by psychologists.

(b) The process of automatically extracting deception indicators (features) is hard, especially when some deception indicators are implicit (e.g., psychologically based).

(c) Static features can get easily outdated when new types of deceptive strategies are devised. A predefined, fixed set of features will not be effective against new classes of deceptive text content. That is, these feature-based methods are not adaptive.

(d) Even though deception is a cognitive process, it is unclear whether deception indicators are language-dependent (e.g., deception in English vs. Spanish).

(e) Feature sets must be designed for every category of deceptive text content. Even then, an ensemble averaged feature set may fail for a particular text document.

(f) The extracted features are typically assumed to be statistically independent for ease of analysis, but, this assumption may be violated if the features depend on the word sequence in a text, which is highly correlated in languages.

In accordance with an embodiment of the present invention, some of these issues may be mitigated by compression-based data-adaptive probabilistic modeling and information theoretic classification. A similar approach for authorship attribution has been used in Y. Marton, N. Wu, and L. Hellerstein, "On compression-based text classification," in *In Proceedings of the 27th European Conference on IR Research (ECIR)*, Santiago de Compostela, Spain, 2005, pp. 300-314, the disclosure of which is hereby incorporated by reference.

An embodiment of the present disclosure uses compression-based language models both at the word-level and character-level for classifying a target text document as being deceptive or not. The idea of using data compression models for text categorization has been used previously (e.g., W. J. Teahan and D. J. Harper, "Using compression-based language models for text categorization," in *Proceedings of 2001 Workshop on Language Modeling and Information Retrieval*, 2001 and E. Frank, C. Chui, and I. H. Witten, "Text categorization using compression models," in *In Proceedings IEEE Data Compression Conference*, Snowbird, Utah, 2000, the disclosure of which is hereby incorporated by reference), however, applicants are not aware of the successful application of such models for deception detection. Compared to the traditional feature-based approaches, the compression-based approach does not require a feature selection step and therefore, avoids the drawbacks discussed above. Instead, it treats the text as a whole and yields an overall judgment about it. In character-level modeling and classification, this approach also avoids the problem of defining word boundaries.

Compression-Based Language Model for Deception Detection

Considering a stationary, ergodic information source, $X=\{X_i\}$ over a finite alphabet with probability distribution P. Let $X=(X_1, X_2, \ldots, X_n)$ be a random vector. Then, by the Shannon-McMillan-Breiman theorem, as discussed in R. Yeung, A first course in information theory. Springer, 2002, the disclosure of which is hereby incorporated by reference, we see that $$P\left[-\lim_{n\to\infty} \frac{1}{n} \log P(X) = H(X)\right] = 1$$

where H(X) is the entropy of the generic random variable X.

Therefore for large n we have $$-\lim_{n\to\infty} \frac{1}{n} \log P(X) = H(X), P-a.s.$$

This means that the entropy of the source can be estimated by observing a long sequence X generated with the probability distribution P. Let the entropy rate of the source $\{X_i\}$ be $H_X=\lim_{n\to\infty} H(X_n|X_{n-1}, \ldots, X_1)$ and the conditional entropy be $H'_X=\lim_{n\to\infty} H(X_n|X_{n-1}, \ldots, X_1)$. Then if X is a stationary then the entropy rate exists and $H_X=H'_X$ [54]. as discussed in R. Yeung, "A first course in information theory". Springer, 2002.

Many lossless data compression schemes such as Huffman encoding use the knowledge of P to compress the source optimally. However, in many real-life situations, P is unknown. So in accordance with an embodiment of the present disclosure, P can be approximated. Approximation techniques include assuming a model, computing the model using part of the data, learning the model as the data stream is observed, etc. Suppose Q is an approximate model for the unknown P. Then, the discrepancy between P and its model Q (i.e., model error) can be computed using the cross-entropy, $$H(P,Q)=E_P[-\log Q]=H(P)+D(P\|Q) \quad (3.1)$$

here H(P) is the entropy and $D(P\|Q)$ is the Kullback-Leibler divergence, as discussed in R. Yeung, A first course in information theory. Springer, 2002. Since X is discrete $H(P, Q)=-\Sigma_x P(x)\log Q(x)$. Using the similar argument given above we can observe that $$H(P, Q) = \lim_{n\to\infty} -\frac{1}{n} E_P[\log Q(X)] \quad (3.2)$$

$$= \lim_{n\to\infty} -E_P[\log Q(X_n | X_{n-1}, \ldots, X_1)]$$

$$= \lim_{n\to\infty} -\frac{1}{n} \log Q(X_n, \ldots, X_1), P-a.s.$$

Note that (3.2) is true since the source is ergodic. Since $D(P\|Q)\geq 0$, it can be seen from (3.1) that $H(P)\leq H(P, Q)$. Therefore using (3.2)

$$H(P) = \lim_{n\to\infty} -\frac{1}{n} \log Q(X_n, \ldots, X_1)$$

can be obtained. This means that the right hand side of this inequality can be computed using an a priori model Q or computing Q by observing the random vector X.

In deception detection problem, the goal is to assign an unlabeled text to one of the two classes, namely, deceptive class D and truthful class T. Each class is considered as a different source and each text document in a class can be treated as a message generated by that source. Therefore, given a target text document with (unknown) probability distribution P, model probability distributions $P_D$ and $P_T$ for the two classes, we solve the following optimization problem to declare the class of the target document:

$$C = \arg\min_{\theta \in \{D,T\}} H(P, P_\theta) \quad (3.3)$$

Therefore C=D means the target document is deceptive; otherwise, it is non-deceptive. Note that H(P, P₀) in (3.3) denotes the cross-entropy and is computed using (3.2) that depends only the target data. The models $P_D$ and $P_T$ are built using two training data sets containing deceptive and non-deceptive text documents, respectively.

3.22 Model Computation Via Prediction by Partial Matching

Clearly, the complexity of model computation increases with n since it leads to a state space explosion. In order to alleviate this problem, we assume the source model to be a Markov process. This is a reasonable approximation for languages since the dependence in a sentence, for example, is high for only a window of few adjacent words. We then use Prediction by Partial Matching (PPM) for model computation. PPM lossless compression algorithm was first proposed in [55]. For a stationary, ergodic source sequence, PPM predicts the nth symbol using preceding n−1 source symbols.

If $\{X_i\}$ is a kth order Markov process then $$P(X_n|X_{n-1}, \ldots, X_1) = P(X_n|X_{n-1}, \ldots, X_{n-k}), k \leq n \quad (3.4)$$

Then, for θ=D, T the cross-entropy is given by:

$$H(P, P_\theta) = -\frac{1}{n} \log P_\theta(X) \quad (3.5)$$

$$= -\frac{1}{n} \log \prod_{i=1}^{n} P_\theta(X_i \mid X_{i-1}, \ldots, X_{i-k})$$

$$= \frac{1}{n} \sum_{i=1}^{n} -\log P_\theta(X_i \mid X_{i-1}, \ldots, X_{i-k})$$

We consider PPM to get a finite context model of order k. That is, the preceding k symbols are used by PPM to predict the next symbol. k can take integer values from 0 to some maximum value. The source symbols that occur after every block of k symbols are noted along with their counts of occurrences. These counts (equivalently probabilities) are used to predict the next symbol given the previous symbols. For every choice of k (model), a prediction probability distribution is obtained.

If the symbol is novel to a context (i.e., not occurred before) of order k, an escape probability is computed and the context is shortened to (model order) k−1. This process continues until a symbol is not novel to the preceding context. To ensure the termination of the process, a default model of order −1 is used, which contains all possible symbols and uses a uniform distribution over them. To compute the escape probabilities, several escape policies have been developed to improve the performance of PPM. The "method C" described by Moffat, in A. Moffat, "Implementing the ppm data compression scheme," *IEEE Transactions on Communications*, vol. 38, no. 11, pp. 1917-1921, 1990, the disclosure of which is hereby incorporated by reference, called PPMC has become the benchmark version, and it will be used in this paper. The "Method C" counts the number of distinct symbols encountered in the context and gives this amount to the escape event. Moreover, the total context count is inflated by the same amount.

Let's take a simple example to illustrate the PPMC scheme. Let the source of class M is the string "abcabaabcbd" and the fixed order k=2. Table 3.1 shows the PPMC model note after processing the training context where A is the alphabet used.

It gives all the previous occurring contexts along with occurrence counts (c) and relative probability (p). For example, aa→b, 1, ½ means the occurrence count of symbol b following aa is 1 and the relative probability is ½ since the total context count is inflated by the distinct symbols after aa.

TABLE 3.1

PPMC model note after training string "abcabaabcbd" (k = 2)

| Order 2 Predictions | c | p | Order 1 Predictions | c | p | Order 0 Predictions | c | p | Order −1 Predictions | c | p |
|---|---|---|---|---|---|---|---|---|---|---|---|
| aa →b | 1 | 1/2 | a →a | 1 | 1/6 | a | 4 | 4/15 | A | 1 | $\frac{1}{|A|}$ |
| →Esc | 1 | 1/2 | →b | 3 | 3/6 | b | 4 | 4/15 | | | |
| ab →a | 1 | 1/5 | →Esc | 2 | 2/6 | c | 2 | 2/15 | | | |
| →c | 2 | 2/5 | b →a | 1 | 1/7 | d | 1 | 1/15 | | | |
| →Esc | 2 | 2/5 | →c | 2 | 2/7 | Esc | 4 | 4/15 | | | |
| ba →a | 1 | 1/2 | →d | 1 | 1/7 | | | | | | |
| →Esc | 1 | 1/2 | →Esc | 3 | 3/7 | | | | | | |
| bc →a | 1 | 1/4 | c →a | 1 | 1/4 | | | | | | |
| →b | 1 | 1/4 | →b | 1 | 1/4 | | | | | | |
| →Esc | 2 | 2/4 | →Esc | 2 | 2/4 | | | | | | |
| ca →b | 1 | 1/2 | | | | | | | | | |
| →Esc | 1 | 1/2 | | | | | | | | | |
| cb →d | 1 | 1/2 | | | | | | | | | |
| →Esc | 1 | 1/2 | | | | | | | | | |

Now we want to estimate the cross-entropy of string "abe" under class M. Assume we know the preceding symbols of "abe" is "ab". To compute the cross-entropy of string "abe", first the prediction of ab→a is searched in the note and a probability s is used. The code length is 2.3219 bit as shown in table 3.2. Then, the code length to predict symbol "b" after "ba" is computed. The prediction of ba→b is searched in the highest order model, and it is not predictable from the context "ba". Consequently, an escape event occurs with probability 1/2 and then the lower order model k=1 is used. The desired symbol can be predicted through the prediction a→b with probability 3/6. The PPM model has a mechanism called "exclusion" to obtain a more accurate estimate of the prediction probability. It corrects the probability to 3/5 by noting that the symbol "a" cannot possibly occur otherwise it would have been predicted in order 2. Thus the code length to predict "b" is 1.73 bits. Finally, we predict the symbol "e" after "ab". Since symbol "e" had never been encountered before, the escaping would take place repeatedly down to the level k=−1 with code length 10.71 bits when assuming a 256-character alphabet. Then the total code length needed to predict "abe" using model M is 14.77 bits and the cross-entropy is 4.92.

TABLE 3.2

String encoding

| $s_i$ | probabilities no exclusions | probabilities exclusions | code length |
|---|---|---|---|
| a | $\frac{1}{5}$ | $\frac{1}{5}$ | $-\log_2 \frac{2}{5} = 2.3219$ bits |
| b | $\frac{1}{2}, \frac{3}{6}$ | $\frac{1}{2}, \frac{3}{5}$ | $-\log_2 \frac{1}{2} \frac{3}{5} = 1.737$ bits |
| e | $\frac{2}{5}, \frac{3}{7}, \frac{4}{15}, \frac{1}{|A|}$ | $\frac{2}{5}, \frac{3}{4}, \frac{4}{8}, \frac{1}{|A|-4}$ | $-\log_2 \left(\frac{2}{5} \frac{3}{4} \frac{4}{8} \frac{1}{252}\right) =$ 10.7142 bits |

Deception Detection

The PPM scheme can be character-based and word-based. In E. Frank, C. Chui, and I. H. Witten, "Text categorization using compression models," in *In Proceedings IEEE Data Compression Conference*, Snowbird, Utah, 2000, the disclosure of which is hereby incorporated by reference, character-based analysis is observed to outperform the word-based approach for text categorization. In W. J. Teahan, *Modelling English text*. Waikato University, Hamilton, New Zealand: PhD Thesis, 1998, the disclosure of which is hereby incorporated by reference, it is shown that word-based models consistently outperform the character-based methods for a wide range of English text analysis experiments.

We consider both word-based and character-based PPMC with different orders for deception detection and compare the experimental results. Without loss of generality, let us consider text as the target document. Therefore, the goal is to detect if a given target text is deceptive or not. We begin with two (training) sets each containing a sufficiently large number of texts that are deceptive and not deceptive (or truthful), respectively. Each set is considered as a random source of texts. For each of these two sets we compute PPMC models, namely, $P_D$ and $P_T$ using the two training sets. Therefore, given a target text, its cross-entropies with models $P_D$ and $P_T$ are computed, respectively. The class with minimum cross-entropy is then chosen as the target text's class. The classification procedure follows a three step process:

Step 1. Build models $P_D$ and $P_T$ from deceptive and truthful training text data sets.

Step 2. Compute the cross-entropy $H(P_x, P_D)$ of the test or target document X with model $P_D$ and $H(P_x, P_T)$ with model PT using equation (3.5).

Step 3. If $H(P_x, P_D) < H(P_x, P_T)$ then classify a document as deceptive otherwise non-deceptive.

Let's take a simple example to illustrate the procedure. Suppose we want to detect a text with only one source sentence X={Thank you for using Paypal!} with an order k=1 PPMC model. Then first the relative probabilities of each word with respect to its preceding word will be searched in the PPMC model notes obtained using deceptive and truthful text training sets. For the beginning word, the 0th order probability will be used. Let us assume that after searching the PPMC model notes, the relative probabilities with exclusion are as shown in Table 3.3. Then using (3.5) and Table 3.3 we get $H(Px, P_D) = -1/6 \log_2(0.001 \times 0.2 \times 0.123 \times 0.087 \times 0.0032 \times 0.03) = 5.3196$ and $H(Px, P_T) = -1/6 \log_2(0.002 \times 0.20 \times 0.010 \times 0.070 \times 0.0016 \times 0.001) = 6.8369$. Since $H(Px, P_D) < H(Px, P_T)$ this sentence will be classified as deceptive.

TABLE 3.3

Word probabilities under the two models.

| model | P(thank) | P(you/thank) | P(for/you) | P(using/for) | P(paypal/using) | P(!/paypal) |
|---|---|---|---|---|---|---|
| PD | 0.001 | 0.24 | 0.123 | 0.087 | 0.0032 | 0.03 |
| PT | 0.002 | 0.20 | 0.010 | 0.070 | 0.0016 | 0.001 |

Detection Based on Approximate Minimum Description Length

In the previous section, deception detection using PPMC compression-based language models was discussed. In order to investigate the effectiveness of other compression methods, in this section, an Approximate Minimum Description Length (AMDL) approach will be developed in deception detection. The main attraction of AMDL is that the deception detection task will be easy to apply using standard off-the-shelf compression methods. In this section, first the AMDL for deception detection will be introduced. Then three standard compression methods will be described.

AMDL for Deception Detection

The AMDL was proposed by Khmelev in the authorship attribution tasks. In PPMC model, given two classes of training documents, namely, deceptive and truthful, a table of PPMC model for each class is trained, $P_D$ and P. Then for each test file X, the cross-entropy of $H(P_x, P_D)$ and $H(P_x, P_t)$ are computed. AMDL is a procedure which attempts to approximate the cross-entropy with the off-the-shelf compression methods. In AMDL, for each class, all the training documents are concatenated into a single file. That is, $A_D$ for deceptive and $A_T$ for truthful. Compression programs will be run on $A_D$ and $A_T$ to produce two compressed files, with length $|A_D|$ and $|A_T|$ respectively. To compute the cross-entropy of test file X in different class, first the text file X is appended to $A_D$ and $A_T$ producing $|A_DX|$ and $|A_TX|$. The length of new files, $|A_DX|$ and $|A_TX|$, will be computed by running the compression programs on them. Then the approximate cross-entropy can be obtained by:

$$H(P_X, P_D) = |A_D X| - |A_D| \quad (3.6)$$

$$H(P_X, P_T) = |A_T X| - |A_T| \quad (3.7)$$

The text file will be assigned to the target class which minimizes the approximate cross-entropy.

$$C = \arg \min_{\theta \in \{D,T\}} H(P, P_\theta) \quad (3.8)$$

The main attraction of AMDL is that it can be easily applied on different compression programs. It does not require to go deep into the algorithms while the preprocessing procedure can be focused on. Although AMDL has those advantages, it also has drawbacks in comparison to PPMC. One of the drawbacks is its slow running time. For PPMC, the models are built for once in the training process. Then in the classification process, for each test file, the probabilities will be calculated using the training table. For AMDL, for each time, the text file is concatenated to the training files. Thus the models for the training files will be recomputed for each test file. Moreover, since the off-the-shelf compression programs are character-based without changing the source code, the second drawback is that it can only be applied in character-level. However, the PPMC scheme can be character-based and word-based. Both character-based and word-based PPM have been implemented in different text categorization tasks. In E. Frank, C. Chui, and I. H. Witten, "Text categorization using compression models," in *In Proceedings IEEE Data Compression Conference*, Snowbird, Utah, 2000, the disclosure of which is hereby incorporated by reference, the authors found that character-based method often outperforms the word-based approach while in W. J. Teahan, *Modelling English text*. Waikato University, Hamilton, New Zealand: PhD Thesis, 1998, the disclosure of which is hereby incorporated by reference, they showed that word-based models consistently outperformed the character-based methods in a wide range of English text compression experiments.

Standard Compression Methods

Three different popular compression programs: Gzip, Bzip2 and RAR, will be used in AMDL and described in this subsection.

Gzip, which is short for GNU zip, is a compression program used in early Unix systems, "Gnu operating system." [59]. Gzip is based on the DEFLATE algorithm, which is a combination of LempelZiv compression (LZ77) and Huffman coding. The LZ77 Algorithm is a dictionary-based algorithm for lossless data compression. Series of strings are compressed by converting the strings into a dictionary offset and string length. The dictionary in LZ77 is a sliding window containing the last N symbols encoded instead of an external dictionary that lists all known symbol strings. In our experiment, the typical size of the sliding window is used, which is assumed to be 32K.

Bzip2 is a well-known, block-sorting, lossless data compression method based on Burrows-Wheeler transform (BWT). It was developed by Julian Seward in 1996, as discussed in bzip2:home, the disclosure of which is hereby incorporated by reference. Data is compressed into blocks of size between 100 and 900 kB. BWT is used to convert frequently-recurring character sequences into strings of letters. Move-to-front transform (MTF) and Huffman coding are then applied after BWT. Bzip2 achieves good compression rate and runs considerably slower than Gzip.

RAR is a proprietary compression program, developed by a Russian software engineer, Eugene Roshal. The current version of RAR is based on PPM compression mentioned in the previous section. In particular, RAR implements the PPMII algorithm due to Dmitry Shkarin, as discussed in "Rarlab," http://www.rarlab.com/, the disclosure of which is hereby incorporated by reference. It was shown that the performance of RAR was similar to the performance of PPMC in classification tasks, as discussed in D. K. and W. J. Teahan, "A repetition based measure for verification of text collections and for text categorization," in *Proc. of the 26th annual international ACM SIGIR conference on Research and development in information retrieval*, 2003, pp. 104110, the disclosure of which is hereby incorporated by reference.

Testing Conducted with Three Datasets

Data Preprocessing

The python Natural Language Toolkit (NLTK), as discussed in "Natural language toolkit," 2009, http://www.nitk.org/, the disclosure of which is hereby incorporated by reference, was used to implement the data preprocessing procedure. This toolkit provides basic classes for representing data relevant to natural language processing, standard interfaces for performing tasks, such as tokenization, tagging, and parsing. The four preprocessing steps we implemented for all the data sets are tokenization, stemming, pruning and no punctuation (NOP):

Tokenization: is a process of segmenting a string of characters into word tokens. Tokenization is typically done for word-based PPMC but not for character-based algorithms.

Stemming: is used to remove the suffixes from words to get their common origin. For example, "processed" and "processing" are all converted to their origin "process".

Stemming was used only for word-based PPMC.

Pruning: a major disadvantage of the compression-based approach is the large memory requirement. In order to address this problem, we also applied vocabulary pruning by removing words that only occurred once in the data sets. Pruning was done for word-based PPMC only.

NOP: since previous studies have shown that punctuation may indicate deceivers' rhetoric strategies, as discussed in L. Zhou, Y. Shi, and D. Zhang, "A statistical language modeling approach to online deception detection," *IEEE Transactions on Knowledge and Data Engineering*, 2008, the disclosure of which is hereby incorporated by reference, we also considered the effectiveness of punctuation in compression-based deception detection. We created a modified version of data sets by removing all punctuation and replacing all white spaces (tab, line and paragraph) with spaces. This was done for both word-based and character-based algorithms.

To evaluate the influence of preprocessing steps on the detection accuracy, different combinations of the preprocessing steps were used in the experiments.

Experiment Results of PPMC

To evaluate the performance of the different models, the data sets and evaluation metrics mentioned in section 2.3 and 2.4 will be used. Only PPMC models up to order 2 at the word-level and up to order 4 at the character-level since previous studies (e.g., E. Frank, C. Chui, and I. H. Witten, "Text categorization using compression models," in *In Proceedings IEEE Data Compression Conference*, Snowbird, Utah, 2000, the disclosure of which is hereby incorporated by reference) indicate that these were reasonable parameters. Table 3.4 shows the deception detection accuracies of the word-based PPMC model on the three data sets with different orders. In order to evaluate the influence of vocabulary pruning and stemming, the marginal effect of stemming and combination of stemming and pruning are also presented. Moreover, the marginal effect of punctuation is presented alone as well as the results of combination of NOP and stemming, and results of combination of stemming, pruning and NOR.

For the DSP data set, increasing the order number does not improve the Accuracy.

TABLE 3.4

Accuracy of word-based deception detection for different PPMC model orders

| Data set | Order | O | S | P + S | NOP | NOP + S | NOP + P + S |
|---|---|---|---|---|---|---|---|
| DSP | 0 | 81.50% | 82.54% | 84.11% | 81.55% | 81.02% | 79.93% |
| | 1 | 78.65% | 78.37% | 79.39% | 78.15% | 76.49% | 76.00% |
| | 2 | 79.38% | 77.45% | 78.15% | 78.20% | 79.58% | 76.03% |
| phishing-ham | 0 | 97.46% | 97.76% | 99.05% | 97.94% | 98.09% | 98.10% |
| | 1 | 99.05% | 97.76% | 98.08% | 97.93% | 97.61% | 98.11% |
| | 2 | 98.40% | 98.89% | 98.89% | 98.89% | 98.73% | 99.06% |
| scam-ham | 0 | 99.31% | 99.22% | 98.78% | 97.85% | 98.68% | 98.87% |
| | 1 | 99.41% | 99.46% | 99.07% | 98.17% | 99.26% | 99.02% |
| | 2 | 99.03% | 99.02% | 99.51% | 99.03% | 98.05% | 99.03% |

[1]O: original;
S: stemming;
P: pruning;
NOP: no punctuation.

Figure 16:
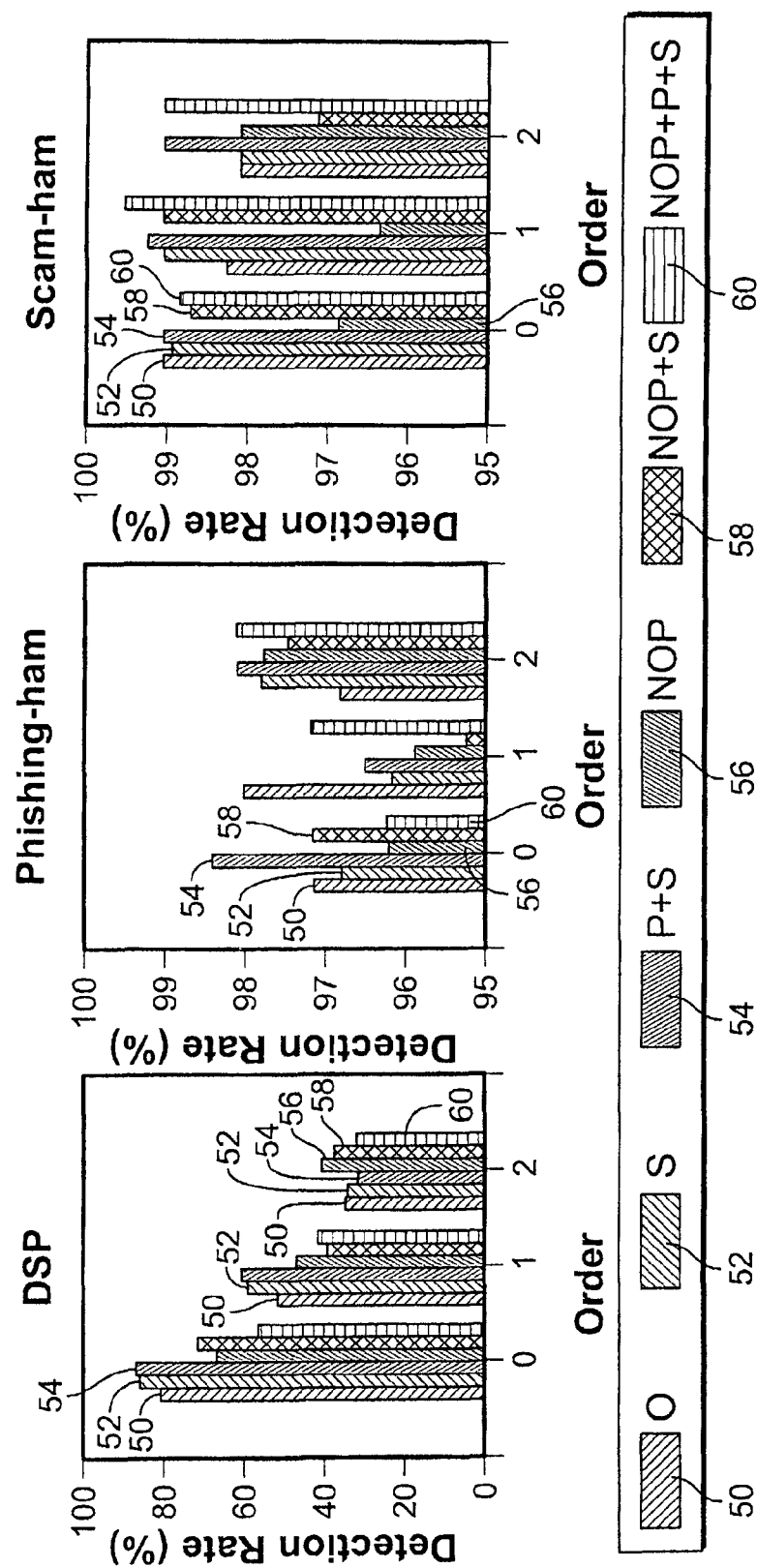
FIG. 16 is a set of graphs showing Word-based PPMC: detection rate and false positive rates O: original, S: stemming, P: pruning, NOP: no punctuation.

The average accuracy for the six cases of order 0 is 81.775% and for order 1 it is 77.84% and for order 2 it is 78.13%. Removing the punctuation affects the classification accuracy. The average accuracy with punctuation is 79.95% and without punctuation is 78.55%. Vocabulary pruning and stemming boost the performance and the best result is 84.11% for order 0. For the phishing-ham data set, all the experiments achieve better than 97% accuracy. The average accuracy for different orders is quite similar while order 2 improves the accuracy by 0:7%. Removing the punctuation degrades the performance by 0.1%. Vocabulary pruning and stemming help to strengthen the result and the best result is 99.05% for order 0. For scam-ham data set, all the experiments achieve very good accuracies and the worst accuracy is 97.85%. Removing punctuation degrades the result from 99.20% to 98.66% and stemming and pruning do not affect the performance much. The best result is 99.51% for order 2 with pruning and stemming. FIG. 16 shows the detection and false positive rates for a word-based PPMC model. For the DSP data set, the accuracy for the higher model order degrades, the detection rate drops drastically to about 40% and the false positive drops to below 10%. Clearly, this is an imbalanced performance. This may due to the insufficient amount of training data to support higher order models. Also, when collecting the data, all emails from a student selected to be the deceiver were labeled as deceptive and emails from the other one were labeled as truthful. However, the students acting as deceivers may not deceive in each email in reality. This could have corrupted the DSP data set. For the phishingham data set, the detection rate varies within a small range. For order 2, the results for all the six cases are quite close and indicate that the preprocessing procedure plays only a minor role when using a higher model order. For the scam-ham data set, the NOP procedure results in a lower false positive rate while a lower detection rate is also achieved compared to other preprocessing procedures.

From these results, Applicants conclude that word-based PPMC models with an order less than 2 are suitable to detect deception in texts and punctuation indeed plays a role in detection. In addition, applying vocabulary pruning and stemming can further improve the results on DSP and phishing-ham data sets. Since DSP and phishing-ham data sets are this makes the detection result imbalanced. For example, for order 4, 95% of the truthful emails are classified correctly while only 45% of the deceptive emails are classified correctly. Thus, for the DSP data set, orders higher than 2 are unsuitable for deception detection. This may be due to the insufficient amount of training data to justify complex models. For the phishing-ham and scam-ham data sets, higher model orders achieve better results in most cases. The best result is 98.90% for phishing-ham and 99.41% for scam-ham. From these experiments Applicants see that word-based PPMC outperforms the character-based PPMC.

TABLE 3.5

Accuracy of character-based detection for different PPMC model orders

| Data set | DSP | | Phishing-ham | | Scam-ham | |
|---|---|---|---|---|---|---|
| Order | Original | NOP | Original | NOP | Original | NOP |
| 0 | 62.16% | 58.49% | 95.40% | 93.16% | 95.31% | 90.80% |
| 1 | 78.02% | 68.83% | 98.26% | 98.09% | 98.68% | 98.19% |
| 2 | 77.96% | 79.14% | 98.24% | 98.74% | 99.03% | 98.05% |
| 3 | 78.14% | 77.93% | 98.09% | 98.73% | 99.41% | 99.01% |
| 4 | 80.50% | 76.76% | 98.90% | 97.63% | 99.41% | 99.02% |

From the result of the scam-ham data set, when a sufficient amount of training data can be achieved, higher order PPMC will get better performance. However, higher order models request larger memory and longer processing time. To analyze the relationship between the time requirement and order number, the scam email shown above "MY NAME IS GEORGE SMITH . . . " was tested with different orders in different cases. The computer on which the test was run had an Intel duo core CPU and 2 GB RAM. Table 3.6 and table 3.7 show the processing time of detection in word-level and character-level, respectively. The results show that the processing time for the higher orders is much longer than that of lower orders. Processing time for email without punctuation is slightly smaller than that of the original email since NOP will reduce the length of the email and number of items in the model note.

TABLE 3.6

Testing time of a scam email in word-level

| Order | O | S | P + S | NOP | NOP + S | NOP + P + S |
|---|---|---|---|---|---|---|
| 0 | 0.00359 s | 0.00422 s | 0.00356 s | 0.00297 s | 0.00309 s | 0.00343 s |
| 1 | 0.9318 s | 0.8613 s | 0.7884 s | 0.8931 s | 0.8328 s | 0.7345 s |
| 2 | 2.7910 s | 2.7429 s | 2.5513 s | 2.6028 s | 2.4732 s | 2.3595 s | not large in size, but diverse, the PPMC model note will be highly sparse. Stemming and vocabulary pruning mitigate the sparsity and boost the performance. For scam-ham data set, the size is relatively large and therefore stemming and vocabulary pruning do not influence the performance.

Figure 17:
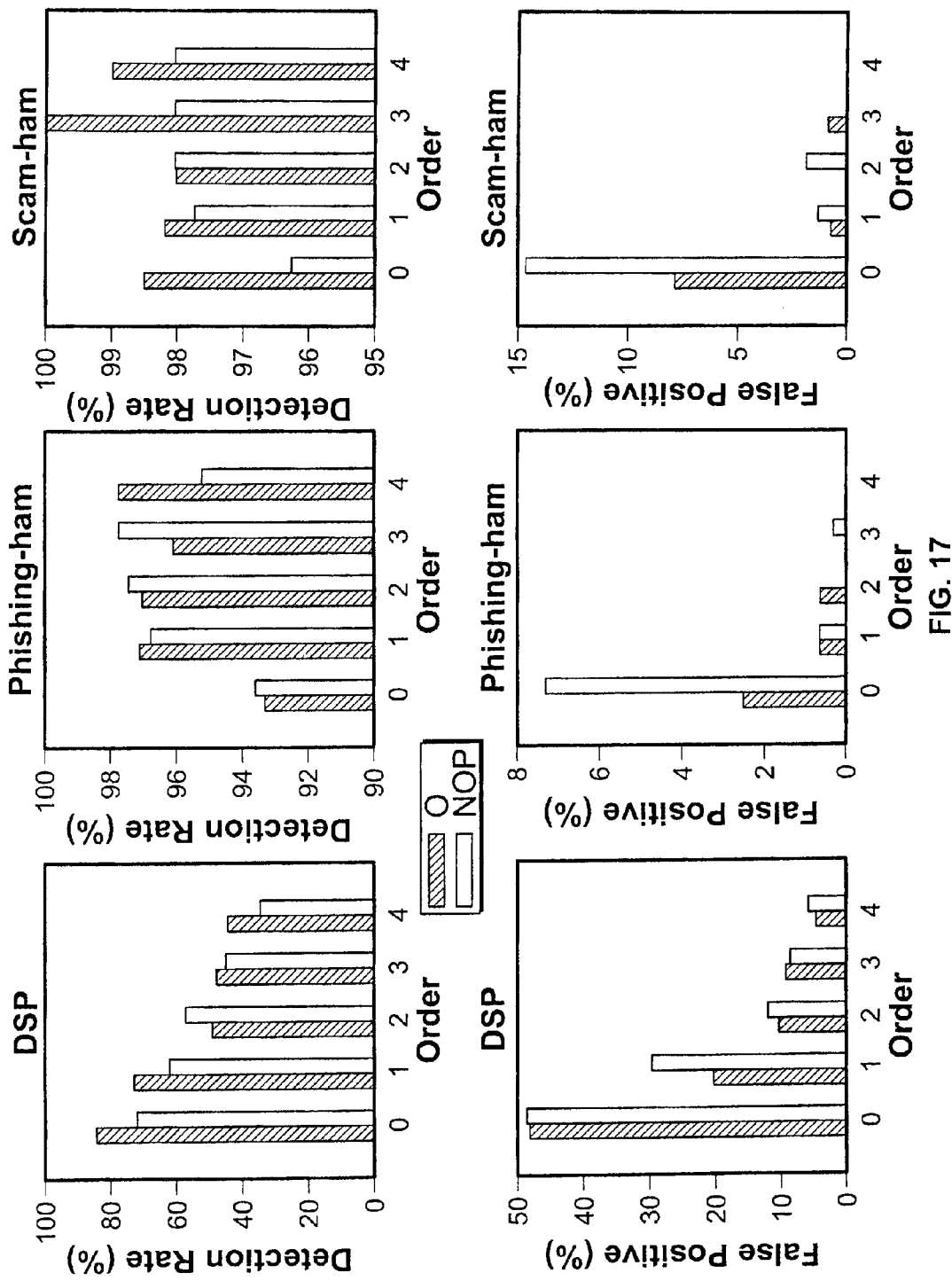
FIG. 17 is a set of graphs showing detection and false positive rates for character-based detection using different PPMC model orders, O: original, NOP: no punctuation.

Table 3.5 shows the accuracy of character-level detection with PPMC model orders ranging from 0 to 4. From the table, Applicants observe that, at the character-level, order 0 is not effective to classify the texts in all the three data sets. Punctuation also plays a role in classification while removing the punctuation degrades the performance in most of the cases. Increasing the order number improves the accuracy. FIG. 17 shows the detection rate and false positive for different model orders. For the DSP data set, although the accuracy increases for order 4, the detection rate decreases at the same time and

TABLE 3.7

Testing time of a scam email in character-level

| Order | 0 | 1 | 2 | 3 | 4 |
|---|---|---|---|---|---|
| O | 0.00200 s | 0.06027 s | 0.3612 s | 1.2796 s | 3.7704 s |
| NOP | 0.00202 s | 0.03947 s | 0.2427 s | 0.9002 s | 2.9609 s |

Experiment Results of AMDL

Figure 18:
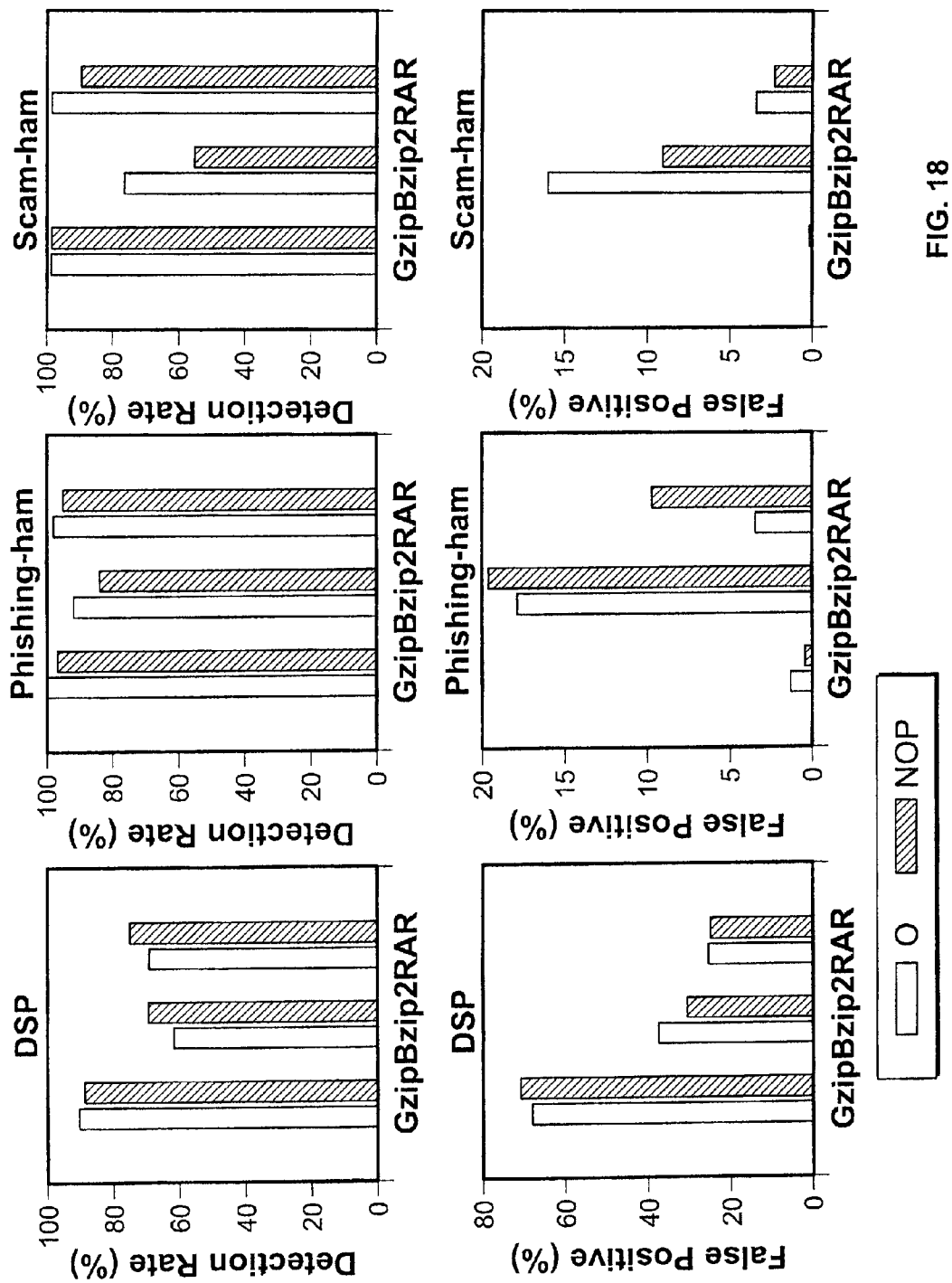
FIG. 18 is a set of graphs showing Detection and false positive rates for AMDL. O: original; NOP: no punctuation.

Applicants evaluated the effect of the AMDL using Gzip, Bzip2 and RAR on the three data sets. The experimental results are presented in table 3.8. The detection rate and false positive are shown in FIG. 18.

TABLE 3.8

Accuracy of AMDL

| Data set | DSP | | Phishing-ham | | Scam-ham | |
| --- | --- | --- | --- | --- | --- | --- |
| Method | Original | NOP | Original | NOP | Original | NOP |
| Gzip | 49.16% | 46.55% | 98.89% | 97.93% | 99.46% | 99.36% |
| Bzip2 | 62.28% | 63.12% | 86.81% | 81.69% | 80.09% | 72.79% |
| RAR | 72.92% | 75.22% | 97.03% | 92.46% | 99.42% | 93.59% |

For DSP, RAR is the best method among all. Gzip has a very poor result in DSP. It has very high detection rate in trade off high false positive. The punctuation in DSP does not plan a role in detection. Using Bzip2 and RAR, NOP gets better results. For phishingham and scam-ham, the performance of Gzip and RAR are closed. Gzip in original data achieves the best result. Getting rid of the punctuation degrades the results. As mentioned in the previous section, RAR is based on PPMII algorithm, which is a family of PPM algorithms. The difference between PPMII and PPMC is the escape policies. From our experiment result, the results of RAR are closed to PPMC, but not better than PPMC, which confirms the superiority of the PPMC.

One drawback of AMDL is the slow running time. Here we show the running time of testing a single scam email in table 3.9. Among the three methods, Bzip2 costs the shortest time while RAR spends the longest time in compression. The running time of RAR is comparative to the PPMC in order 4. Although Bzips run fast, it is still much slower than the PPMC in word-level. For the detection system which speed is important, the AMDL is unsuitable.

TABLE 3.9

Testing time of a scam email in AMDL

| method | Gzip | Bzip2 | RAR |
| --- | --- | --- | --- |
| O | 1.388 s | 1.093 s | 3.828 s |
| NOP | 1.387 s | 1.055 s | 3.257 s |

As noted above, an embodiment of the present disclosure investigates compression-based language models to detect deception in text documents. Compression-based models have some advantages over feature-based methods. PPMC modeling and experimentation at word-level and character-level for deception detection indicate that word-based detection results in higher accuracy. Punctuation plays an important role in deception detection accuracy. Stemming and vocabulary pruning help in improving the detection rate for small data sizes. To take advantage of the off-the-shelf compression algorithms, an AMDL procedure may be implemented and compared for deception detection. Applicants' experimental results show that PPMC in word-level can perform better with much shorter time for each of the three data sets tested.

Online Tool—"STEALTH"

Figure 19:
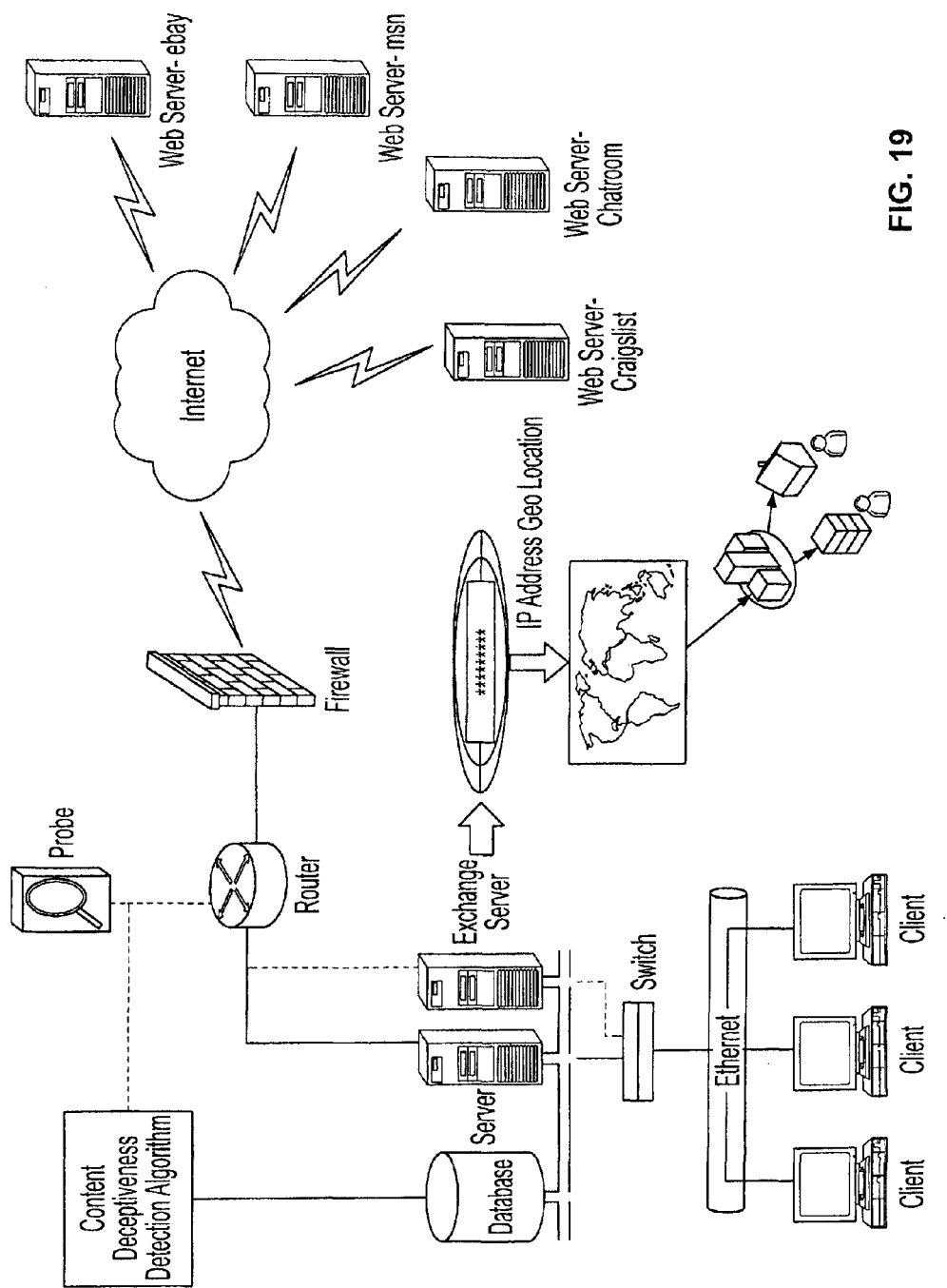
FIG. 19 is a schematic diagram of system architecture.
Figure 20:
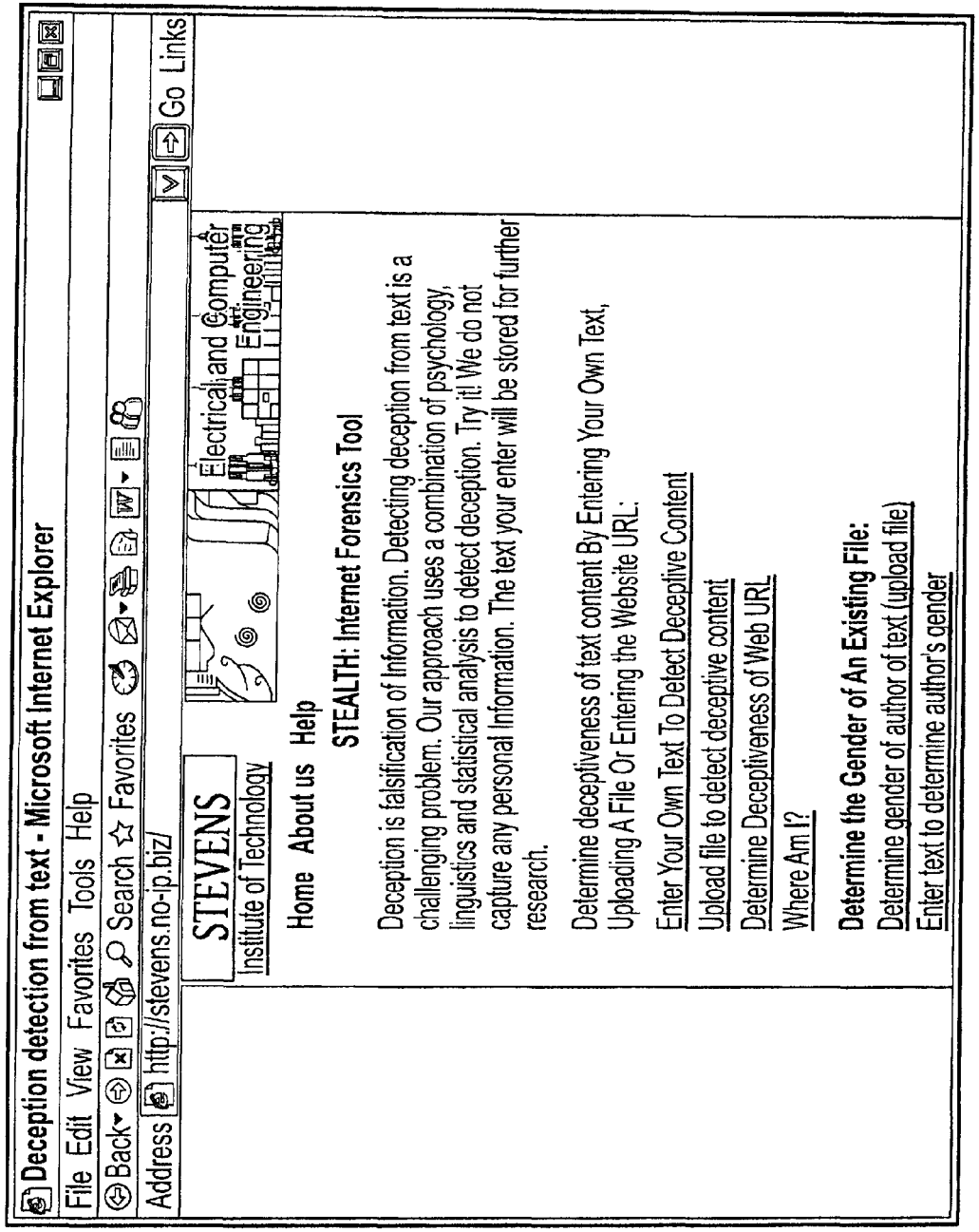
FIGS. 20, 20A, 20B and 21 are illustrations of user interface screens.

Applicant's have proposed several methods for deception detection from text data above. In accordance with an embodiment of the present disclosure, an online deception detection tool named "STEALTH" is built using a TurboGears framework the Python and Matlab computing environment/programming language. This online detection tool can be used by anyone who can access the Internet through a browser or through the web services and who wants to detect deceptiveness in any text. FIG. 19 shows an exemplary architecture of STEALTH. FIG. 20 is screenshot of an exemplary user interface. A first embodiment of STEALTH is based on a SPRT algorithm.

Figure 21:
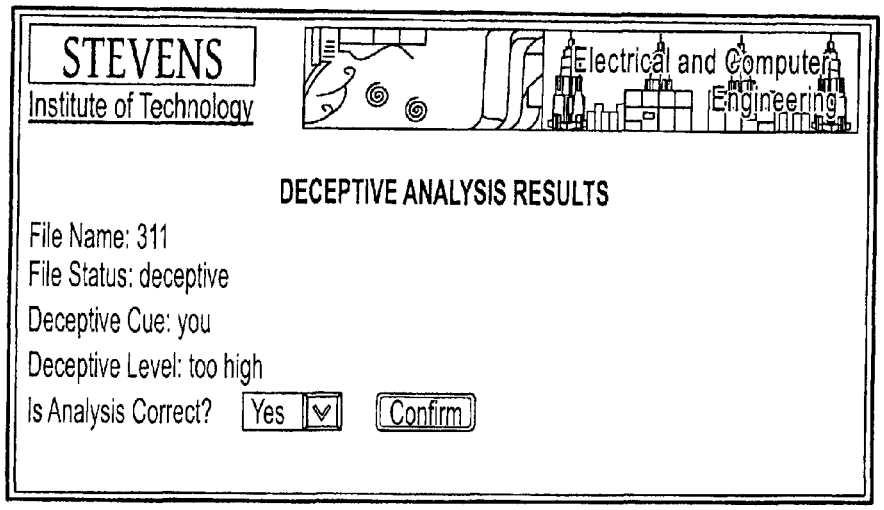

Applicants calculate the cues value with Matlab code according to LIWC's rules. On the online tool website, the users can type the content or upload the text file they want to test. The user then clicks the validate button, then the cue extraction algorithm and SPRT algorithm written in Matlab will be called by TurboGears and Python. After the algorithms are executed, the detection result, trigger cue and deception reason will be shown on the website. FIG. 21 shows one example of a screen reporting the results of a deceptive analysis. If the users are sure about the deceptiveness of the content, they can give the website feedback on the result, which, if accurate, can be used to improve the algorithm based upon actual performance results. Alternatively, users can indicate that they are not sure, if they do not know whether the content is deceptive or truthful.

Efficient SPRT Algorithm

In accordance with an embodiment of the present disclosure, to implement the SPRT algorithm, the cues' value should be extracted first. To extract the psycho-linguistic cues, most of the time, each word in the text must be compared with each word in the cue dictionary. This step uses most of the implementation time. Applicants noticed that most of the texts only need less than 10 cues to determine deceptiveness. In order to make the algorithm more efficient, in accordance with an embodiment of the present disclosure, the following efficient SPRT algorithm may be used:

Step 1, initiate $j = 0$, $p_1 = p_0 = 1$, $A = \frac{1-\beta}{\alpha}$, $B = \frac{\beta}{1-\alpha}$.
Step 2, $j = j + 1$, calculate the jth cue value $x_j$.
Step 3, find the probability $f_j(x_j : H_1)$ and $f_j(x_j : H_0)$,
$p_1 = f_j(x_j : H_1) * p_1$,
$p_0 = f_j(x_j : H_0) * p_0$,
ratio $= \frac{p_1}{p_0}$
If log(ratio) $\geq$ log(A), email is truthful, stop = 0
If log(ratio) $\leq$ log(B), email is deceptive, stop = 0,
If log(B) < log(ratio) < log(A), stop = 1.
Step 4, if stop = 0, terminate.
if stop = 1, repeat step 2 and step 3
Step 5, if stop = 1 and j = N,
If log(ratio) > 0 stop = 0, text is truthful.
If log(ratio) < 0 stop = 0, text is deceptive.

The comparison of running time for both the regular SPRT algorithm and the efficient SPRT algorithm used in the STEALTH online tool is listed in table 4.1. For both algorithms, $a=\beta=0.01$, $N=40$. The phishing-ham email data sets are used to get the cues' PDF. The computer on which the algorithm was executed had an Intel duo core CPU and 2 GB RAM.

TABLE 4.1

Comparison of both SPRT algorithms

| Files number | running time of efficient SPRT | running time of SPRT | save time |
| --- | --- | --- | --- |
| 123 DSP deceptive files | 77.035 seconds | 309.559 seconds | 75.11% |
| 294 DSP truthful files | 112.996 seconds | 531.488 seconds | 78.74% |

TABLE 4.1-continued

Comparison of both SPRT algorithms

| Files number | running time of efficient SPRT | running time of SPRT | save time |
| --- | --- | --- | --- |
| 315 phishing files | 194.52 seconds | 809.167 seconds | 75.96% |
| 319 ham files | 164.377 seconds | 733.154 seconds | 77.58% |

From table 4.1, it can be appreciated that the efficient algorithm can save about 75% of the running time in comparison to the regular SPRT algorithm on the online tool.

Case Studies

In order to check the validity and accuracy of the algorithms proposed and the online tool, three cases were studied. They related to phishing emails, tracing scams, and webcrawls of files from Craigslist.

Phishing Emails

Figure 22:
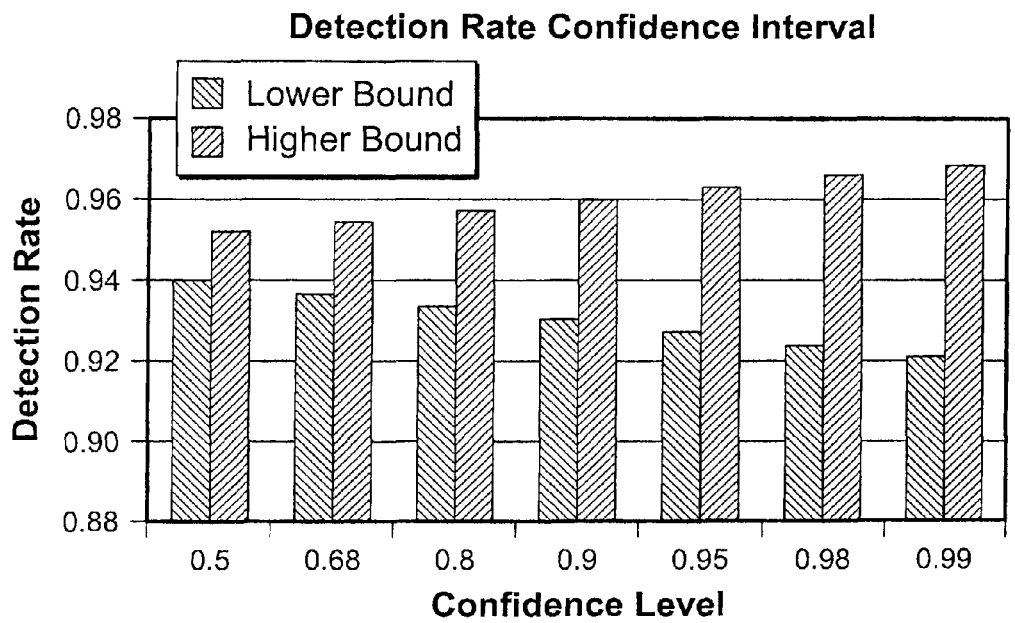
FIG. 22 is a graph of detection rate confidence interval.

To test Applicants' cues extraction code, the phishing and ham data set mentioned above may be used. The detection results were measured using the 10-fold cross validation in order to test the generality of the proposed method. FIG. 22 shows the confidence interval of the overall accuracy. The overall accuracy is the percentage of emails that are classified correctly. It shows that the algorithm worked well on phishing emails. Because no deceptive benchmark data set is publicly available, for the online tool, the phishing and ham emails obtained here were used to obtain the cue values' probability density functions.

Tracing Scams

A known website, as discussed in (2008, June) Thousand dollar bill. [Online]. Available: http://www.snopes.com/inboxer/nothingibillgate.asp, the disclosure of which is hereby incorporated by reference, collects some scams emails. The emails are of the type that promise rewards if you forward an email message to your friends. The emails said you will get rewards if you forward an email message to your friends. The rewards include cash from Microsoft, free computer from IBM, and so on. The named companies have indicated that these emailed promises are email scams, and they did not send out these kinds of emails. The foregoing website features 35 scam emails. After uploading all 35 scam emails to the Applicants' online tool, 33 of them are detected as deceptive. Another website, (2009, April) Scam or roma. [Online]. Available: http://scamorama.com, the disclosure of which is hereby incorporated by reference, has 125 scam emails. Upload the scams letter to our online tool, 111 of them can be detected as deceptive and the detection rate is about 89%. These two cases show that our online tool is applicable for tracing scams.

Webcrawls from Craiglist

In order to effectively detect hostile content on websites, the deception detection algorithm of an embodiment of the present disclosure is implemented on system with architecture shown in as seen in FIG. 19. A web crawler program is set to run on public sites such as Craigslist to extract text messages from web pages. These text messages are then stored in the database to be analyzed for deceptiveness. The text messages from the Craiglist are extracted and the links and hyperlinks are recorded in the set of visited pages. In experimentally exercising the system of the present disclosure, 62,000 files were extracted, and the above-described deception detection algorithm was applied to them. 8,300 files were found to be deceptive while 53,900 were found to be normal. Although the ground truth of these files was unknown, the discovered percentage or deceptive rate in Craigslist appears reasonable.

Variations on the STEALTH Online Tool

In an embodiment of the STEALTH tool, the above-described compression technique is integrated. Another embodiment combines both the SPRT algorithm and the PPMC algorithm, i.e., the order 0 word-level PPMC. The three data sets described above were combined to develop training model, then a fusion rule was applied on the detection result. If a text was detected as being deceptive by both SPRT and PPMC, then the result is. If both methods detect it as normal, the result is shown as normal. If any of the algorithms indicate text is deceptive, then the result is deceptive. Using this method, a higher detection rate may be achieved with a trade off of experiencing a higher false positive rate. FIG. 20 shows a user interface screen of the STEALTH tool in accordance with an embodiment of the present disclosure.

Authorship Similarity Detection

With the rapid development of computer technology, email is one of the most commonly used communication mediums today. Trillions of activities are exchanged through email each day. Clearly, this presents opportunities for illegitimate purposes. In many misuse cases, the senders attempt to hide their true identities to avoid detection, and the email system is inherently vulnerable to hiding a true identity. Successful authorship analysis of email misuse can provide empirical evidence in identity tracing and prosecution of an offending user.

Compared with conventional objects of authorship analysis, such as authorship identification in literary words of published articles, authorship analysis in email has several challenges, as discussed in O. de Vel, "Mining e-mail authorship," in *Proceedings of KDD*-2000 *Workshop on Text mining*, Boston, U.S.A, August 2000, the disclosure of which is hereby incorporated by reference.

First, the short length of the message may cause some identifying features to be absent (e.g., vocabulary richness). Second, the number of potential authors for an email could be large. Third, the number of available emails for each author may be limited since the users often use different usernames on different web channels. Fourth, the composition style may vary depending upon different recipients, e.g., personal emails and work emails. Fifth, since emails are more interactive and informal in style, one's writing styles may adapt quickly to different correspondents. However, humans are creatures of habit and certain characteristics such as patterns of vocabulary usage, stylistic and sub-stylistic features will remain relatively constant. This provides the motivation for the authorship analysis of emails.

In recent years, authorship analysis has been applied to emails and achieved significant progress. In previous research, a set of stylistic features along with email-specific features were identified and supervised machine learning methods as well as unsupervised machine learning approaches have been investigated. In O. de Vel, "Mining e-mail authorship," in *Proceedings of KDD*-2000 *Workshop on Text mining, Boston, U.S.A, August* 2000; O. Vel, A. Anderson, M. Comey, and G. M. Mohay, "Mining email content for author identification forensics," *ACM SIGMOD Record*, vol. 30, pp. 55-64, 2001 and M. W. Corney, A. M. Anderson, G. M.

Mohay, and 0. de Vel, "Identifying the authors of suspect email," http://eprints.qutedu.au/archive/00008021/, October 2008, the disclosure of which is hereby incorporated by reference, Support Vector Machine (SVM) learning method was used to classify the email authorship based on stylistic features and email-specific features. From this research, 20 emails with approximately 100 words each are found to be sufficient to discriminate authorship. Computational stylistics was also considered for electronic messages authorship attribution and several multiclass algorithms were applied to differentiate authors, as discussed in S. Argamon, M. Saric, and S. S. Stein, "Style mining of electronic messages for multiple authorship discrimination: first results," in *Proceedings of 2003 SIGKDD*, Washington, D.C., U.S.A, 2003, the disclosure of which is hereby incorporated by reference. 62 stylistic features were built from each email in a raw keystroke data format and a Nearest Neighbor classifier was used to classify the authorship in R. Goodman, M. Hahn, M. Marella, C. Ojar, and S. Westcott, "The use of stylometry for email author identification: a feasibility study." http://utopia.csis.pace.edu/cs691/2007-2008/team2/docs/7.'1 EAM2-TechnicalPaper.061213-Final.pdf, October 2008, the disclosure of which is hereby incorporated by reference which claimed that 80% of the emails were correctly identified. A framework for authorship identification of online messages was developed in R. Zheng, J. Li, H. Chen, and Z. Huang, "A framework for authorship identification of online messages: Writing-style features and classification techniques," *Journal of the American society for Information and Technology*, vol. 57, no. 3, pp. 378-393, 2006, the disclosure of which is hereby incorporated by reference.

In this framework, four types of writing-style features (lexical, syntactic, structural, and content-specific features) are defined and extracted. Inductive learning algorithms are used to build feature-based classification models to identify authorship of online messages. In E. N. Ceesay, O. Alonso, M. Gertz, and K. Levitt, "Authorship identification forensics on phishing emails," in *Proceedings of International Conference on Data Engineering (ICDE)*, Istanbul, Turkey, 2007, the disclosure of which is hereby incorporated by reference, the authors cluster phishing emails based on shared characteristics from the APWG repository. Because the authors of the phishing emails are unknown and can be from a large number of authors, they proposed methods to cluster the phishing emails into different groups and assume that emails in the same cluster share some characteristics, and it is more possibly generated from the same author or same organization. The methods they used are k-Means clustering unsupervised machine learning approach and hierarchical agglomerative clustering (HAC). A new method called frequent pattern is proposed on the authorship attribution in Internet Forensic, as discussed in F. Iqbal, R. Hadjidj, B. C. Fung, and M. Debbabi, "A novel approach of mining write-prints for authorship attribution in e-mail forensics," *Digital investigation*, vol. 5, pp. S42-S51, 2008, the disclosure of which is hereby incorporated by reference.

Previous work has mostly focused on the authorship identification and characterization tasks while very limited research has focused on the similarity detection task. Since no class definitions are available before hand, only unsupervised techniques can be used. Principal component analysis (PCA) or cluster analysis, as discussed in A. Abbasi and H. Chen, "Writeprints: A stylometric approach to identity-level identification and similarity detection in cyberspace," *ACM Transactions on Information Systems*, no. 2, pp. 7:1-7:29, March 2008, the disclosure of which is hereby incorporated by reference, can be used to find the similarity between two entities' emails and assign a similarity score to them. Then an optimal threshold can be compared with the score to determine the authorship. Due to the short length of emails, large pool of the potential authors and small number of emails for each author, to achieve high a level of accuracy in similarity detection is challenging even impossible. In A. Abbasi and H. Chen, "Writeprints: A stylometric approach to identity-level identification and similarity detection in cyberspace," *ACM Transactions on Information Systems*, no. 2, pp. 7:1-7:29, March 2008, the authors investigated the stylistic features and detection methods for identity-level identification and similarity detection in the electronic marketplace. They investigated a rich stylistic feature set including lexical, syntactic, structural, content-specific and idiosyncratic attributes. They also developed a writeprints technique based on Karhunen-Loeve transform for identification and similarity detection.

In accordance with an embodiment of the present disclosure, the Applicants address similarity detection on emails at two levels: identity level and message-level. Applicants use a stylistic feature set including 150 features. A new unsupervised detection method based on frequent pattern and machine learning methods is disclosed for identity-level detection. A baseline method principle component analysis is also implemented to compare with the disclosed method. For message-level, first, complexity features which measure the distribution of words are defined. Then, three methods are disclosed for accomplishing similarity detection. Testing described below which evaluated the effectiveness of the disclosed methods using the Enron email corpus.

Stylistic Features

There is no consensus on a best predefined set of features that can be used to differentiate the writing of different identities. The stylistic features usually fall into four categories: lexical, syntactical, structural, and content-specific, as discussed in R. Zheng, J. Li, H. Chen, and Z. Huang, "A framework for authorship identification of online messages: Writing-style features and classification techniques," *Journal of the American society for Information and Technology*, vol. 57, no. 3, pp. 378-393, 2006, the disclosure of which is hereby incorporated by reference.

Lexical features are the characteristic of both characters and words. For instance, frequency of letters, total number of characters per word, word length distribution, words per sentence are lexical features. Totally, 40 lexical features which were used in many previous research are adopted.

Syntactical features including punctuation and function words can capture an author's writing style at the sentence level. In many previous authorship analysis studies, one disputed issue in feature selection is how to choose the function words. Due to the varying discriminating power of function words in different applications, there is no standard function word set for authorship analysis. In accordance with an embodiment of the present disclosure, instead of using function words as features, Applicants introduce new syntactical features which compute the frequency of different categories of function words in the text using LIWC. LIWC is a text analysis software program to compute frequency of different categories. Unlike function word features, the features discerned by LIWC are able to calculate the degree to which people use different categories of words. For example, the "optimism" feature computes the frequency of words reflecting optimism (e.g. easy, best). These kinds of features will help to discriminate the authorship since the choice of such words is a reflection of the life attitude of the author and usually are generated beyond an author's control. Applicants adopted 44 syntactical LIWC features and 32 punctuation features in a feature set. Combining both LIWC features and punctuation features, there are 76 syntactical features in one embodiment of the present disclosure.

Structural features are used to measure the overall layout and organization of text, e.g., average paragraph length, presence of greetings, etc. In 0. de Vel, "Mining e-mail authorship," in *Proceedings of KDD-2000 Workshop on Text mining*, Boston, U.S.A, August 2000, 10 structural features are introduced. Here we adopted 9 structural features in our study.

Content-specific features are a collection of important keywords and phrases on a certain topic. It has been shown that content-specific features are important discriminating features for online messages R. Zheng, J. Li, H. Chen, and Z. Huang, "A framework for authorship identification of online messages: Writing-style features and classification techniques," *Journal of the American society for Information and Technology*, vol. 57, no. 3, pp. 378-393, 2006.

For online messages, one user may often send out or post messages involving a relatively small range of topics. Thus, content-specific features related to specific topics may be helpful in identifying the author of an email. In one embodiment, the Applicants adopt 24 features from LIWC in this category. Furthermore, since an online message is more flexible and informal, some users like to use net abbreviations. For this reason, the Applicants have identified the count of the frequency of net abbreviations used in the email as a useful content-specific feature for identification purposes.

In accordance with one embodiment of the present disclosure, 150 stylistic features have been compiled as probative of authorship. Table 5.1 shows the list of 150 stylistic features and LIWC features are listed in table 5.2 and table 5.3.

TABLE 5.1

List of stylistic features

| Category | Features |
| --- | --- |
| Lexical | LexicalTotal number of characters in words(Ch) |
| | Total number of letters (a-z)/Ch |
| | Total number of digital characters/Ch |
| | Total number of upper characters/Ch |
| | Average length per word (in characters) Word count (C) |
| | Average words per sentence |
| | Word length distribution (1-30)/N (30 features) |
| | Unique words/C |
| | Words longer than 6 characters/C |
| | Total number of short words (1-3 characters)/C |
| syntactical | Total number of punctuation characters/Ch Number of each punctuation (31 features)/Ch 44 function features from LIWC |
| Structural | Absence/present of greeting words Absence/present of farewell words |
| | Number of blank lines/total number of lines |
| | Average length of non blank line |
| | Number of paragraphs |
| | Average words per paragraph |
| | Number of sentences (S) |
| | Number of sentences beginning with uppercase/S |
| | Number of sentences beginning with lowercase/S |
| | 24 content-specific features from LIWC The number of net abbreviation/C |

The Enron Email Corpus

Because of privacy and ethical consideration, there are not many choices of the public available email corpus. Fortunately the Enron emails data set is available at 'http://www.c-s.cmu.edu/enron/. Enron was an energy company based in Houston, Tex. Enron went bankrupt in 2001 because of accounting fraud. During the process of investigation, the emails of employees were made public by the Federal Energy Regulatory Commission. It is a big collection of "real" emails. Here we use the Mar. 2, 2004 version of email corpus. This version of Enron email corpus contains 517,431 emails from 150 users, mostly senior management. The emails are all plain texts without attachments. Topics involved in the corpus include business communication between employees, personal chats between families, technical reports, etc. From the authorship aspect, we need to make sure the author of each email. Thus the emails in the sent folders (including. "sent", "sent-items" and "sent-emails") were chosen in our experiments. Since all users in the email corpus were employees of Enron, the authorship of the emails can be validated by the name. For each email, only the body of the sent content was extracted. The part of email header, reply texts, forward, title and attachment and signature were removed. All duplicated or carbon copied emails were removed.

TABLE 5.2

Syntactical features from LIWC in the feature set

| achieve | affect | article | assent |
| certain | cognitive processes | communication | discrepancy |
| feel | fillers | inhibition | future tense verb |
| I | inclusive | anxiety | motion |
| negative emotion | nonfluencies | optimism | other |
| present tense verb | pronoun | sad | see |
| past tense verb | physical | positive feelings | positive emotion |
| social | metaph | tentative | time |
| we | you | insight | sense |
| cause | prepositions | number | self |
| exclusive | hear | negations | other reference |

TABLE 5.3

Content-specific features from LIWC in the feature set

| body | death | eating | family | groom | human | space | leisure |
| religion | School | occupation | sexual | sleep | friends | anger | sports |
| swear | TV | music | money | job | home | up | down |

Since ultra-short emails may lack enough information and the length of emails are commonly not ultra-long, the emails less than 30 words were removed. Also, given the number of emails of each identity needed to detect authorship, only those authors having a certain minimum number of emails were chosen from the Enron email corpus.

Similarity Detection at the Identity-Level

In accordance with one embodiment of the present disclosure, a new method to detect the authorship similarity at the identity level based on the stylistic feature set is disclosed. As mentioned above, for similarity detection, only unsupervised techniques can be used. Due to the limited number of emails for each identity, traditional unsupervised techniques, such as PCA or clustering methods may not be able to achieve high accuracy. Applicants proposed method based on established supervised techniques will help adducing the depth of similarity between two identities.

Pattern Match

An intuitive idea of comparing two identities' emails is to capture the writing pattern of two identities and find how much they match. Thus, the first step in Applicants' learning algorithm is called pattern match. The writing pattern of an individual (identity) is the combinations of features that occur frequently in his/her emails, as described in F. Iqbal, R. Hadjidj, B. C. Fung, and M. Debbabi, "A novel approach of mining write-prints for authorship attribution in e-mail forensics," *Digital investigation*, vol. 5, pp. S42-S51, 2008, the disclosure of which is hereby incorporated by reference.

By matching the writing pattern of two identities, the similarity between them can be estimated. To define the writing pattern of an identity, we borrow the concept of frequent pattern, as described in R. Agrawal, T. Imielinski, and A. Swami, "Mining association rules between sets of items in large databases," *ACM SOGMOD Record*, no. 2, pp. 207-216, 1993, the disclosure of which is hereby incorporated by reference.

Developed in data mining area. Frequent pattern mining has been shown successful in many applications of pattern recognition, such as market basket analysis, drug design, etc.

Before describing the frequent pattern, the encoding process to get the feature items will first be described. The features extracted from each email are numerical values. To convert them into feature items, Applicants discretize the possible feature values into several intervals according to the interval number v. Then for each feature value, a feature item can be assigned to it. For example, if the maximum value of feature $f_1$ could be 1 and the minimum value could be 0, then the feature intervals will be [0-0.25], (0.25-0.5], (0.5-0.75], (0.75-1] with an interval number v=4. Supposing the $f_1$ value is 0.31, then the feature can be matched into one of them and is encoded as a feature item $f_{12}$. The 1 in $f_{12}$ is the index order of the feature while the 2 is the encoding number. For the feature value which is not in [0,1], a reasonable number will be chosen as the maximum value. After encoding, an email's feature items can be expressed like $\epsilon \{f_{12} f_{23} f_{34} f_{42} \ldots\}$.

Let U denote the universe of all feature items and a set of feature items $F \subseteq U$ is called a pattern. A pattern that contains k feature items is a k-pattern. For example, $F=\{f_{12} f_{35}\}$ is a 2-pattern and $F=\{f_{22} f_{46} f_{64}\}$ is a 3-pattern. For the authorship identification problem, the support of F is the percentage of emails that contains F as in equation (5.1). A frequent pattern F in a set of emails is that the support of F is greater than or equal to some minimum support threshold t, that is, support $\{F\}>t$.

$$\text{support}\{F\} = \frac{\text{number of emails contain } F}{\text{total number of emails}} \quad (5.1)$$

Given two identities' emails and setting up the interval number v, pattern order k and minimum support threshold t, the frequent pattern of each identity can be computed. For example, given k=2, author A has 4 frequent pattern $(f_{12}, f_{41})$, $(f_{52}, f_{31})$, $(f_{62}, f_{54})$ and $(f_{72}, f_{91})$. Author B has 4 frequent pattern $(f_{12}, f_{41})$, $(f_{52}, f_{31})$, $(f_{62}, f_{84})$ and $(f_{22}, f_{91})$. Then the pattern match is to find how many common frequent patterns among them and then a similarity score SSCORE is assigned to them as equation (5.2).

$$SSCORE = \frac{\text{number of common frequent pattern}}{\text{total number of possible frequent pattern}} \quad (5.2)$$

In this example, the number of common frequent pattern is 3. Assume the total number of possible frequent pattern is 20, the SSCORE is 0.15. Although different identities may share some similar writing patterns, Applicants propose that emails from the same identity will have more common frequent patterns.

Style Differentiation

Another aspect of Applicants' learning algorithm is style differentiation. In the previous description, the similarity between two identities was considered. Now, methods of differentiating between different identities will be considered. It has been shown that approximately 20 emails with approximately 100 words in each message are sufficient to discriminate authorship among multiple authors in most cases, as described in M. W. Corney, A. M. Anderson, G. M. Mohay, and O. de Vel. (2001) Identifying the authors of suspect email. [Online]. Available: http://eprints.qut.edu.au/archive/00008021/, the disclosure of which is hereby incorporated by reference.

To attribute an anonymous email to one of two possible authors, we can expect that the required number of emails from each identity may be less than 20 and the message can be shorter than 100 words. Since authorship identification using supervised techniques has achieved promising results, an algorithm in accordance with one embodiment of the present invention can based on this advantage. In style differentiation, given n emails from author A and n emails from author B, the objective is to assign a difference score between A and B. Assuming a randomly picked email from these 2n emails, i.e., one as test data and other 2n−1 emails as training data, when A and B are from different persons, the test email classification will achieve high accuracy using successful authorship identification methods. However, when A and B are from the same person, even very good identification techniques cannot achieve high accuracy. To assign an email to one of two groups of emails generated by the same person, the result will have an equal chance of showing that the test email belongs to A or B. Therefore, the accuracy of identification will reflect the difference between A and B. This is a motivation for Applicants' proposed style differentiation step. To better assess the identification accuracy among 2n emails, leave-one-out cross validation is used and the average correct classification rate is computed.

Proposed Learning Algorithm

An algorithm in accordance with one embodiment of the present disclosure can be implemented by the following steps:

Step 1: Get two identities (A and B), each with n emails, extract the features' values.

Step 2: Encode the features' values into feature items. Compute the frequent pattern of each identity according to the minimum support threshold t and pattern order k. Compute the common frequent pattern number and SSCORE.

Step 3: Compute the correct identification rate (R) using leave one out cross validation and machine learning method (e.g., decision tree). After running 2n comparisons, the correct identification rate $$DSCORE = \frac{\text{times of correct identification}}{2n}$$

can be computed.

Step 4: The final score where S=α*SSCORE+ (1−DSCORE) is a parameter chosen to achieve optimal results.

Step 5: Set a threshold T, and compare S with T. If S>7', the two identities are from the same person. If S<=T, the two identities are different person.

The above method is an unsupervised method, since no training data is needed and no classification information is known a priori. The performance will depend on the number of emails each identity has and the length of each email.

Applicants have tried three machine learning methods (K Nearest Neighbor (KNN), decision tree and SVM) in step 3. They are all well established and popular machine learning methods.

KNN (k-nearest neighbor) classification is to find a group of k objects in the training set, which are closest to the test object. Then the label of the predominant class in this neighborhood will be assigned to the test object. The KNN classification has three steps to classify an unlabeled object. First, the distance between the test object to all the training objects is computed. Second, the k-nearest neighbors are identified. Third, the class label of the test object is determined by finding the majority labels of these nearest neighbors. Decision tree and SVM, has been described above. For SVM, several different kernel functions were explored, namely, linear, polynomial and radial basis functions, and the best results were obtained with a linear kernel function, which is defined as:

$$k(x,x')=x \cdot x' \quad (5.3)$$

Principle Component Analysis (PCA)

To evaluate the performance of the algorithm, PCA is implemented to detect the authorship similarity. PCA is an unsupervised technique which transforms a number of possibly correlated variables into a smaller number of uncorrelated variables called principal components by capturing essential variance across a large number of features. PCA has been used in previous authorship studies and shown to be effective for online stylometric analysis, as discussed in A. Abbasi and H. Chen, "Visualizing authorship for identification," in *In proceedings of the 4th IEEE symposium on Intelligence and Security Informatics*, San Diego, Calif., 2006. In accordance with one embodiment of the present disclosure, PCA will combine the features and project them into a graph. The geographic distance represents the similarity between two identities' style. The distance is computed by averaging the pair wise Euclidean distance between two styles and an optimal threshold is obtained to classify the similarity.

Experiment Results

Before considering the predicting results, selected evaluation metrics will be defined: recall (R), Accuracy and F2 measure. Table 5.4 shows the confusion matrix for an authorship similarity detection problem. Recall (R) is defined as $$R = \frac{A}{A+B}.$$

The Accuracy is the percentage of identity pairs that are classified correctly and $$Accuracy = \frac{A+D}{A+B+C+D}.$$

As mentioned above, only a subset of the Enron emails will be used, viz., m authors, each with 2n emails are used. For each author, 2n emails are divided into 2 parts, each part having n emails. In total, there are 2m identities each with n emails. To test the detection of same author, there are m pairs. To test the detection of different authors, for each author, one part (n emails) is chosen and compared with other authors. There are then $$\binom{m}{2}$$

pairs in the different authors case. Since the examples in the different authors case and in the same author case are not balanced, $$\left(m \text{ vs } \binom{m}{2}\right),$$

another measure $$F_2 = \frac{2RQ}{R+Q},$$

$$Q = \frac{D}{C+D}$$

is defined, which considers the detection rate in both the different authors and the same author cases. The number of total authors m, the number of emails n and the minimum words each email has ($min_{wc}$) are changed to see how they influence the detection performance.

TABLE 5.4

A confusion matrix for authorship similarity detection

| Actual | Predicted | | |
|---|---|---|---|
| | Different authors Same author | Different authors A(+ve) C(−ve) | Same author B(−ve) D(+ve) |

Figure 24:
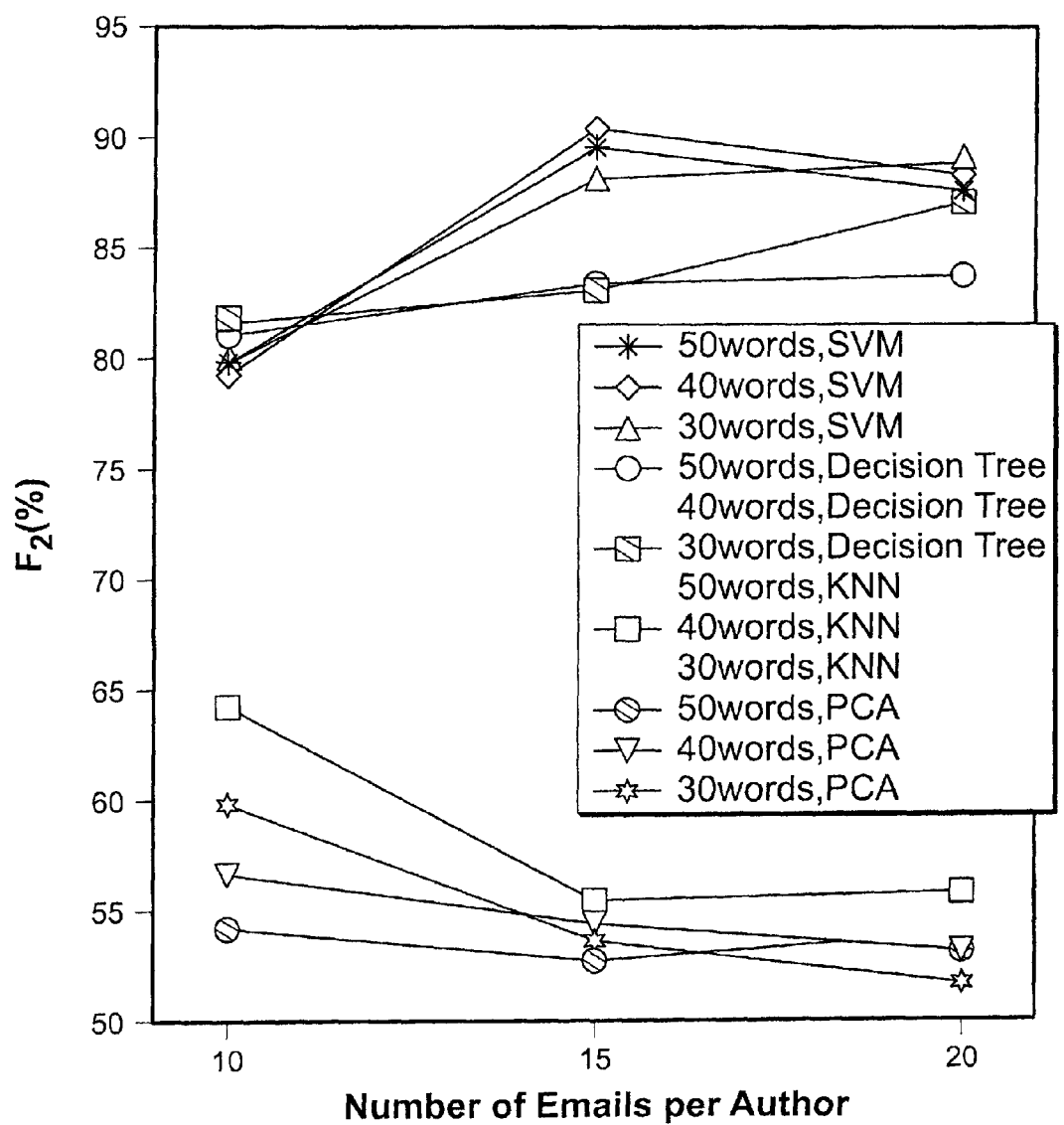
FIG. 24 is a graph of authorship similarity detection at identity-level m=25.

FIG. 24 shows the detection result when the author number m=25. In this test, the pattern order k is set to be 1, a=1.5, interval number v=100 and minimum support threshold t=0.7. Three methods, KNN, decision tree and SVM are used as the basic machine learning method separately in the style differentiation step. In the KNN method, K is set to be 1 and Euclidean distance is used. For the decision tree, Matlab is used to implement the tree algorithm and the subtrees are pruned. For the SVM, linear kernel function is used. Because the detection result depends on the chosen of threshold T, different T will get different results. To compare the performance of different methods, for each test, T is chosen to get the highest $F_2$ value. FIG. 24 shows the $F_2$ value of these three methods with a different emails number n and $min_{wc}$. PCA is also implemented and compared with Applicants' method.

FIG. 24 shows that using SVM as the basic machine learning method achieves the best result among the four methods and then the decision tree. Applicants' method outperforms PCA in all the cases. For the proposed method, using SVM and decision tree as the basic method, increasing the number of emails n will improve the performance. Also, increasing the length of the emails will lead to better results. Applicants found that when n is only 10, the SVM and decision tree perform closely and can achieve about 80% of $F_2$ value. Since SVM achieves the best result, only the detail results using SVM are listed in Table 5.5. The following tests also use SVM in step 3.

TABLE 5.5

The detection results in identity-level based on SVM (m = 25)

| n | $\min_{c}$ | Accuracy | R | Q | F2 |
|---|---|---|---|---|---|
| 10 | 30 | 76.62% | 76.00% | 84.00% | 79.80% |
| 15 | 30 | 88.31% | 88.33% | 88.00% | 88.17% |
| 20 | 30 | 87.08% | 86.33% | 92.00% | 89.25% |
| 10 | 40 | 76.00% | 75.33% | 84.00% | 79.43% |
| 15 | 40 | 88.92% | 88.67% | 92.00% | 90.30% |
| 20 | 40 | 85.54% | 85.00% | 85.23% | 88.36% |
| 10 | 50 | 76.62% | 76.00% | 84.00% | 79.80% |
| 15 | 50 | 87.69% | 87.33% | 92.00% | 89.61% |
| 20 | 50 | 84.31% | 83.67% | 92.00% | 87.64% |

Figure 25:
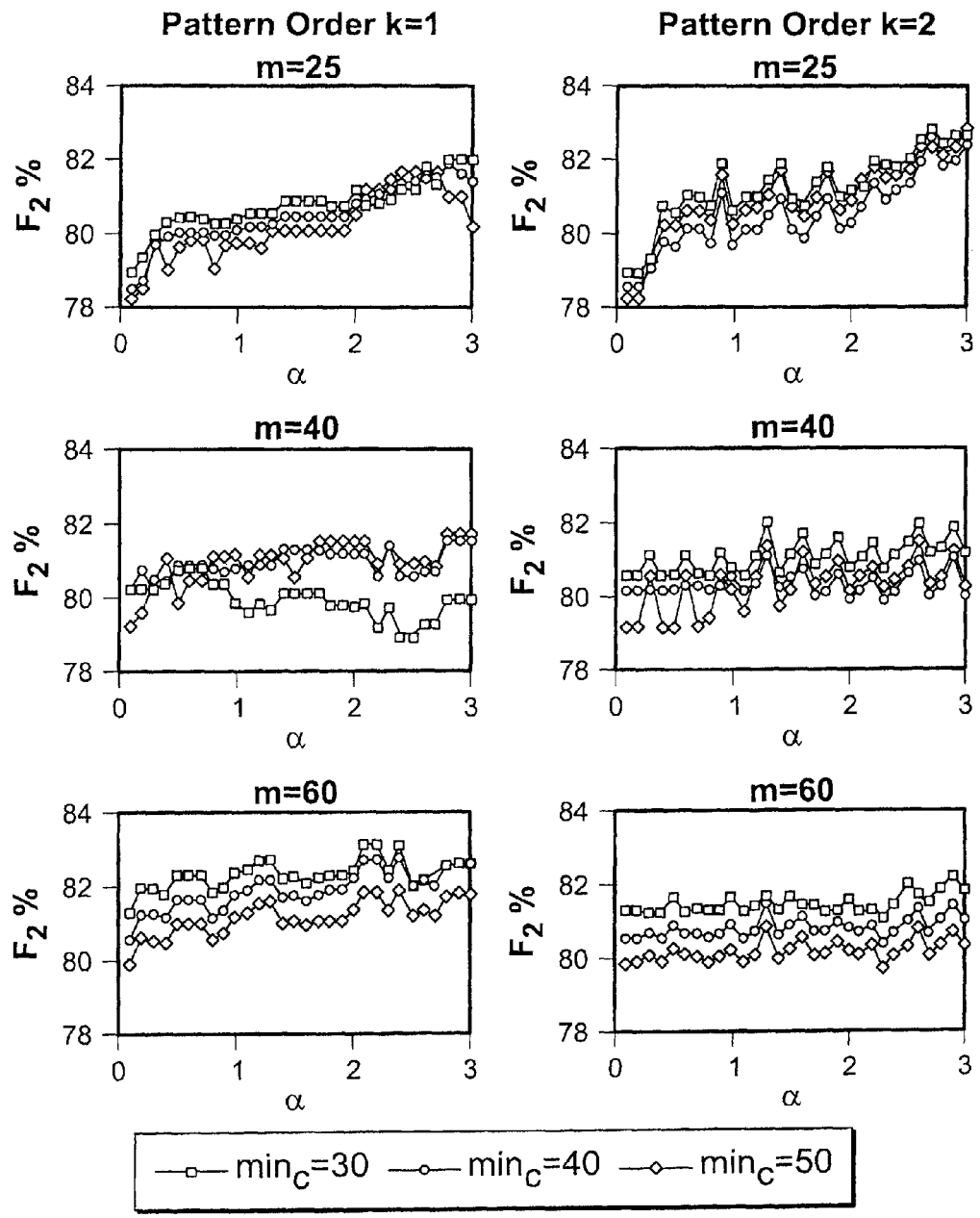
FIG. 25 is a set of graphs of authorship similarity detection.

To examine the generality of Applicants' method, Applicants compared the detection result using different numbers of authors m and different pattern order k. FIG. 25 shows the F2 value with different pattern order k, different author number m, different $\min_c$ and different a when the number of emails for each identity is n=10.

As shown in FIG. 25, for all cases, the lower bound of the detection result is about 78%. The number of pattern order k does not significantly influence the result. Changing a value leads to different results, but it does not vary much since a different optimal threshold T will be used to achieve the best $F_2$ result. The detection result with different author number is similar. The results show that Applicants' proposed method can detect two identities—each having 10 short emails, with an 80% of $F_2$ value. Table 5.6 shows the detection result when a=1.5, n=10, $\min_c$=30.

TABLE 5.6

The classification results with different number of authors
a = 1.5, n = 10, $\min_c$ = 30

| | m = 25 | | m = 40 | | m = 60 | |
|---|---|---|---|---|---|---|
| | k = 1 | k = 2 | k = 1 | k = 2 | k = 1 | k = 2 |
| Accuarcy | 76.62% | 73.85% | 83.29% | 83.90% | 75.03% | 80.16% |
| R | 76.00% | 72.33% | 83.46% | 84.23% | 74.46% | 80.06% |
| Q | 84.00% | 92.00% | 80.00% | 77.50% | 91.67% | 83.33% |
| F2 | 79.80% | 80.99% | 81.69% | 80.73% | 82.17% | 81.66% |

Similarity Detection in Message-Level

Message-level analysis is more difficult than identity-level analysis because usually only a short text can be obtained for each author. The challenge in detecting deception is how to design the detection scheme and how to define the classification features. In accordance with one embodiment of the present disclosure, Applicants describe below the distribution complexity features which consider the distribution of function words in a text. Several detection methods will described pertaining to message-level authorship similarity detection and the experiment results will be presented and compared.

Distribution Complexity Features

Stylistic cues, which are the normalized frequency of each type of words in the text, are useful in the similarity detection task at the identity-level. However, using only the stylistic cues, the information concerning the order of words and their position relative to other words is lost. For any given author, how do the function words distribute in the text? Are they clustered in one part of the text or are they distributed randomly throughout the text? Is the distribution of elements within the text useful in differentiating authorship? In L. Spracklin, D. Inkpen, and A. Nayak, "Using the complexity of the distribution of lexical elements as a feature in authorship attribution," in *Proceeding of LREC,* 2008, pp. 3506-3513, the complexity of the distribution of lexical elements was considered as features in the authorship attribution task. The authors found that by adding complexity features, the performance can be increased by 5-11%. In this section, we will consider the distribution complexity features. Since similarity detection at the message-level is difficult, Applicants propose that adding the complexity features will give more information about authorship.

Kolmogorov complexity is an effective tool to compute the informative content of a string s without any text analysis, or the degree of randomness of a binary string, denoted as K(s), which is the lower bound limit of all possible compressions of s. Due to the incomputability of K(s), every lossless compression C(s) can approximate the ideal number K(s). Many such compression programs exist. For example, zip and gzip utilize the LZW algorithms. Bzips uses Burrows-Wheeler transforms and Huffman coding. RAR is based on the PPM algorithm.

To measure the distribution complexity features words, a text is first mapped into a binary string. For example, to measure the complexity of article words' distribution, a token which is an article is mapped into "1" and otherwise, mapped into "0". Then a text will be mapped into a binary string containing the information of distribution of article words. The complexity is then computed using equation (5.4), $$\text{Complexity} = \min\left(1, \frac{2*C(x)}{|x|}\right). \quad (5.4)$$

where C(x) is the size of string x after it has been compressed by the compression algorithm C(.). |x| is the length of string x. For example, the complexity of binary strings "000011110000" and "100100100100" are quite different while the ratios are the same. In the present problem, nine complexity features will be computed for each email, including net abbreviation complexity, adpositions complexity, articles complexity, auxiliary verbs complexity, conjunctions complexity, interjections complexity, pronouns complexity, verbs complexity and punctuation complexity. To compute each feature, the text is first mapped into a binary string according to each feature's dictionary. Then the compression algorithm and equation (5.4) are run on the binary string to obtain the feature value.

Detection Methods

Because no authorship information is known a priori, only unsupervised techniques can be applied in similarity detection. Furthermore, since only one sample is available for each class, traditional unsupervised techniques, such as cluster, is unsuitable to solving the problem. Several methods to detect the authorship similarity detection at the message-level are described below.

Euclidean Distance

Given two emails, two cue vectors can be obtained. Applicants inquire as to whether it is possible to take advantage of these two vectors to determine the similarity of the authorship? A naive approach is to compare the difference between two emails. The difference can be expressed by the distance between two cue vectors. Since the cues' values are in different scales, before computing the distance, the cues' values are normalized using equation (5.5). For example, the "word count" is an integer while "article" is a number between [0,1]. After normalization, all the cue values will be between [0,1].

$$x_i = \frac{X_i - X_i \min}{X_i \max - X_i \min} \quad (5.5)$$

Where Xi is the value of ith cue, $X_i$min and $X_i$max are the minimum and maximum value of ith cue in the data set. Then the Euclidean distance in (5.6) is computed as the difference between two emails. n is the number of features.

$$d = |V_a - V_b| \quad (5.6)$$
$$= \sqrt{\sum_{i=1}^{n} |x_{ai} - x_{bi}|^2}$$

Usually, when two emails are from the same author, it will share some features. For example, some people like to use "Hi" as greeting words while others do not like to use greeting words. If we consider the difference between two feature vectors, for the emails from the same author, some variables' difference in two emails should be very small. While for different authors, the variables' difference might be larger. The difference will reflect in the distance. From this point, the distance can be used to detect similarity. The Euclidean distance will then be compared with a threshold to determine authorship.

Supervised Classification Methods

Since the difference of two cue vectors reflects the similarity of the authorship, if the difference in each cue as a classification feature is considered, advantage can be taken of promising supervised classification methods. For each classification, the difference vector C in equation (5.7) is used as the classification features. If many email pairs in the training data are used to get the classification features, then some properties of the features can be obtained and used to predict the new email pairs. Applicants propose using two popular classifiers, SVM and decision tree, as the learning algorithm.

$$C = |V_a - V_b| = [|x_{a1} - x_{b1}|, \ldots, |x_{an} - x_{bn}|] \quad (5.7)$$

Unlike the Euclidean distance method, training data set is required to train the classification model by using this supervised classification method. Since the classification feature is the difference between two emails in the data set, the diversity of the data set will play an important role in the classification result. For example, if the data set only contains emails from 2 authors, then no matter how many samples we run, the task is to differentiate emails between two authors. In this instance, a good result can be expected. However, this model is unsuitable to detect the authorship of emails from any other authors. Thus, without loss of generality, the data set used in the test should contain emails from many authors. The number of authors in the data set will influence the detection result.

Kolmogorov Distance

In the Euclidean distance method, the distance between two emails is computed based on the stylistic features. In recent times, information entropy measure has been used to classify the difference between strings. Taking this approach, we can estimate a message's informative content through compression techniques without the need for domain specific knowledge and cues extraction. Although Kolmogorov complexity can be used to describe the distribution of a binary string, it can also be used to describe the informative information of a text. Therefore, without feature extraction, Kolmogorov distance can be used to measure the difference between two texts. To compute the Kolmogorov distance between two emails, several compression-based similarity measures which have achieved empirical success in many other important applications were adopted in, as discussed in R. Agrawal, T. Imielinski, and A. Swami, "Mining association rules between sets of items in large databases," *ACM SOGMOD Record*, no. 2, pp. 207-216, 1993.

Namely:

(a) Normalized Compression Distance $$NCD(x, y) = \frac{C(xy) - \min\{C(x), C(y)\}}{\max\{C(x), C(y)\}}.$$

The NCD is an approach that is used widely for clustering. When x and y are similar, then NCD(x,y)=0. Otherwise, if NCD(x,y)=1, they are dissimilar.

(b) Compression-based Dissimilarity Measure $$CDM(x, y) = \frac{C(xy)}{C(x) + C(y)} \cdot CDM$$

was proposed without theoretical analysis and was successful in clustering and anomaly detection. The value of CDM is between [½, 1], where ½ shows pure similar and 1 shows pure dissimilar.

(c) The Chen-Li Metric $$CLM(x, y) = 1 - \frac{C(x) - C(x|y)}{C(xy)}.$$

The CLM metric is normalized to the range [0, 1]. A value of 0 shows complete similarity and a value of 1 shows complete dissimilarity.

In the definition of the above Kolmogorov distances, C(x) is the size of file x after it has been compressed by compression algorithm C(.). C(xy) is the size of file after compressing x and y together. The conditional compression C (x|y) can be approximated by C(x|y)=C(xy)−C(y) using the off-the-shelf programs. By computing the similarity measures using the compression programs, the similarity measure will be compared with a threshold to determine the authorship.

Experiment Results

Since the Enron email corpus contains far too many emails for the task, in a first experiment, a selected subset of emails from a number of authors was chosen as the test data set. To compare different methods, 25 authors each with 40 emails were used. The minimum length of each email is 50 words. For the Euclidean distance method and complexity distance methods, emails were randomly picked up from the data set. In total, 20,000 email pairs (10,000 for the different authors case and 10,000 for the same author case) were tested. A threshold was then chosen to achieve the best result. For the decision tree and SVM which require a training data set, each author's emails were divided into two subsets. 80% of each author's emails were treated as training emails while 20% were treated as test emails. The emails in training subsets were then compared to obtain the feature vectors to train the model. The author number in the data set M=25. Since the email pairs from the same author in the training subset is $$M * \binom{32}{2} = 496M,$$

496M email pairs from different authors were also randomly picked from the training subset. For the test subset, $$M * \binom{8}{2} = 28M$$

test email pairs from the same author can be generated. Then 28M test email pairs from different authors are also generated by randomly picking two emails from different authors. Table 5.7 shows the detection results of different methods.

TABLE 5.7

The detection result in message-level

| method | features | R | Q | Accuracy | F2 |
|---|---|---|---|---|---|
| Elucidean distance | stylistic | 62.08% | 52.95% | 57.52% | 57.15% |
| | stylistic + complexity | 68.77% | 47.60% | 58.24% | 56.26% |
| Decision tree | stylistic | 60.30% | 59.22% | 59.79% | 59.76% |
| | stylistic + complexity | 63.05% | 61.12% | 62.08% | 62.07% |
| SVM | stylistic | 72.10% | 45.67% | 58.89% | 55.92% |
| | stylistic + complexity | 71.60% | 46.28% | 58.94% | 56.22% |
| NCD | | 67.71% | 40.40% | 54.05% | 48.25% |
| CDM | | 73.03% | 37.83% | 55.43% | 49.84% |
| CLM | | 80.77% | 29.00% | 54.88% | 42.68% |

For message-level detection, since each time, only two short emails are available and compared, the unsupervised techniques do not achieve good results. The Euclidean distance method performs just a little better than a guess. The complexity distance methods can detect the different authorship good accuracy. However, they are poor on detecting the same authorship. For the supervised techniques, decision tree achieves better results than the SVM. Moreover, the complexity features can boost the detection result by about 3%. Since decision tree achieves the best performance, the influence of the number of authors on the result has been examined. Table 5.8 shows the detection results in message-level with different M. When only a small number of authors is considered, the detection accuracy increases. In a test using more than 10 authors, the detection accuracy is between 60% and 70%. When the number of authors decreases to 5 and 2, the accuracy increases dramatically. For only two authors, accuracy of about 88% can be achieved.

TABLE 5.8

The detection result in message-level with M

| Number of authors M | Accuracy | R | Q | F2 |
|---|---|---|---|---|
| 25 | 62.08% | 63.05% | 61.12% | 62.07% |
| 20 | 65.91% | 67.46% | 64.35% | 65.87% |
| 15 | 67.18% | 70.90% | 63.46% | 66.97% |
| 10 | 67.20% | 69.09% | 65.30% | 67.14% |
| 5 | 74.62% | 76.73% | 72.52% | 74.57% |
| 2 | 88.55% | 82.36% | 94.74% | 88.12% |

Webcrawling and IP-Geolocation

Hostile or deceptive content can arise from or target any person or entity in a variety of forms on the Internet. It may be difficult to learn the geographic location of the source or repository of content. An aspect of one embodiment of the present disclosure is to utilize the mechanisms of web-crawling and ip-geolocation to identify the geo-spatial patterns of deceptive individuals and to locate them. These mechanisms can provide valuable information to law enforcement officials, e.g., in the case of predatory deception. In addition, these tools can assist sites such as Craigslist, eBay, MySpace, etc to help mitigate abuse by monitoring content and flagging those users who could pose a threat to public safety.

With the explosion of the Internet it is very difficult for law enforcement officials to police and monitor the web. It would therefore be valuable to have tools to cover a range of deception detection services for general users and government agencies that is accessible through a variety of devices. It would be beneficial for these tools to be integrated with existing systems to allow organizations that do not have financial resources to invest in such a system to be able to access the tools at minimal or no cost.

Figure 26:
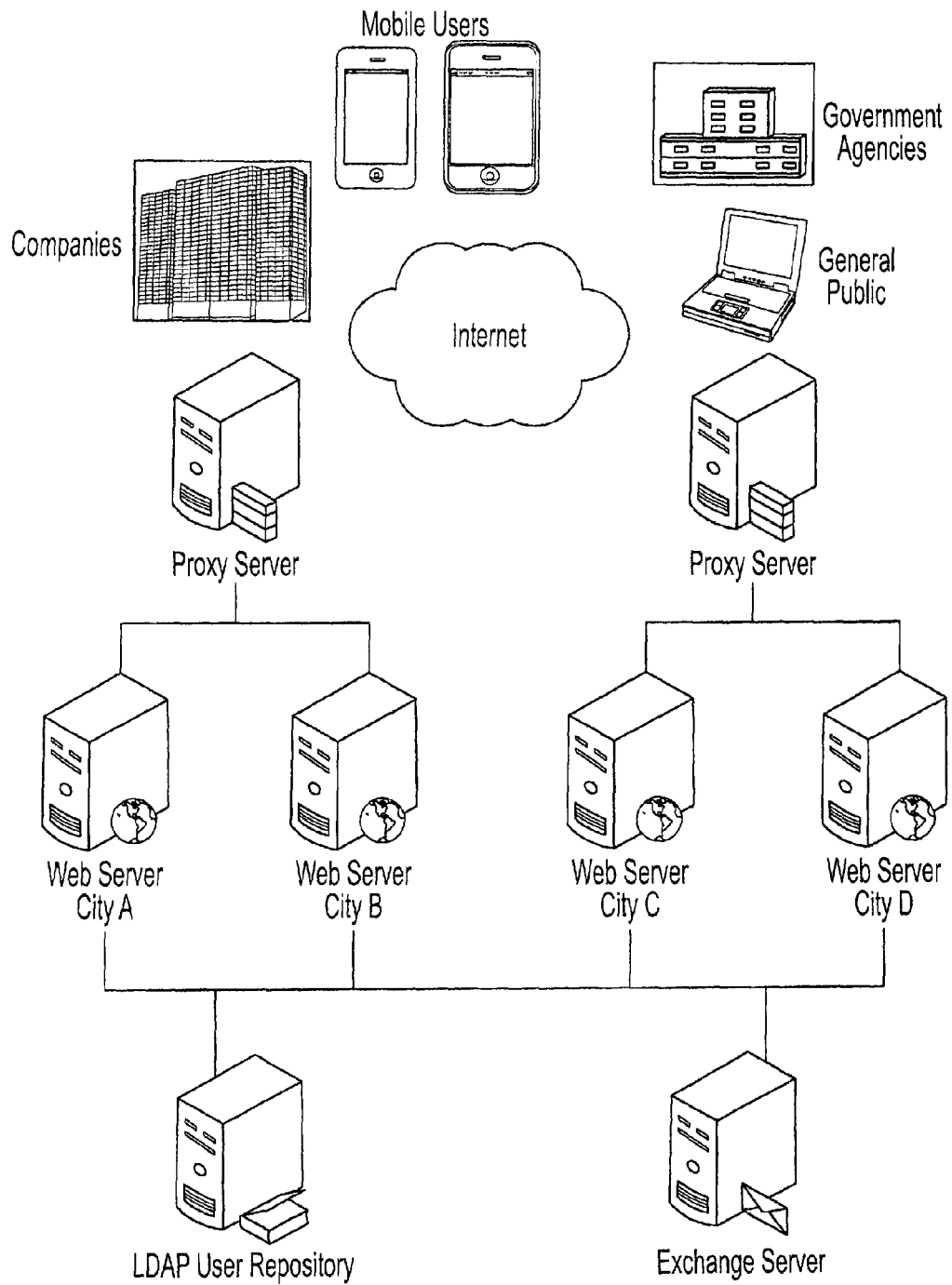
FIG. 26 is a schematic diagram of system architecture.

FIG. 26 illustrates a system for detection in accordance with one embodiment of the present disclosure and the following tools/services would be accessible to a client through a web browser as well as by client applications via web services:

1. Crawl website(s) and collect plain text from HTML, store URL location, and IP address.
2. Analyze text files for deceptiveness using several algorithms.
3. Determine gender of the author of a text document.
4. Detect deceptive content in social networking sites such as Facebook and Twitter; blogs; chat room content, etc.
5. Detect deceptiveness of text messages in mobile content (e.g., SMS text messages) via web services.
6. Identify physical location from IP address and determine spatial-temporal pattern of deceptive content.
7. Detect deceptive contents in email folder such as found in Gmail, Yahoo, etc.

Gender Identification

The origins of authorship identification studies date back to the 18th century when English logician Augustus de Morgan suggested that authorship might be settled by determining if one text contained more long words than another. Generally, men and women converse differently even though they technically speak the same language. Many studies have been undertaken to study the relationship between gender and language use. Empirical evidence suggests the existence of gender differences in written communication, face-to-face interaction and computer-mediated communication, as discussed in, M. Corney, 0. Vel, A. Anderson, and G. Mohay, "Gender-preferential text mining of e-mail discourse," in 18*th Annual Computer Security Applications Conference*, 2002, pp. 21-27, the disclosure of which is hereby incorporated by reference.

The gender identification problem can be treated as a binary classification problem in (2.13), i.e., given two classes, male, female, assign an anonymous email to one of them according to the gender of the corresponding author:

$$e \in \begin{cases} \text{Class}_1 & \text{if the author of } e \text{ is male} \\ \text{Class}_2 & \text{if the author of } e \text{ is female} \end{cases} \quad (2.13)$$

In general, the procedure of gender identification process can be divided into four steps:
1. Collect a suitable corpus of email as dataset.
2. Identify significant features in distinguishing genders.

3. Extract feature values from each email automatically.

4. Build a classification model to identify the gender of the author of any email.

In accordance with an embodiment of the present invention, 68 psycho-linguistic features are identified using a text analysis tool, called Linguistic Inquiry and Word Count (LIWC). Each feature may include several related words, and some examples are listed in table 2.1.

TABLE 2.1

EXAMPLES OF LIWC FEATURES

| Feature | words included in the feature |
| --- | --- |
| Negations | no, not, never |
| Anxiety | worried, fearful, nervous |
| Anger | hate, kill, annoyed |
| Sadness | crying, grief, sad |
| Insight | think, know, consider |
| Tentative | maybe, perhaps, guess |
| Certainty | always, never |
| Inhibition | block, constrain, stop |

An algorithm that may be used for gender identification is the Support Vector Machine (SVM) and it may be incorporated into the STEALTH on-line tool, described above.

One of the primary objectives of efforts in this field is to identify SPAM, but Applicants observe that Deception<>Spam. Not all SPAM is deceptive; a majority of SPAM is for marketing, and the assessment of SPAM is different than the assessment of deception.

Implementing Online Tool STEALTH

Deception Text

Analysis of deception of text can be determined either by entering text, or uploading a file. This can be done by clicking on the links illustrated in FIG. 20.

Figure 20A:
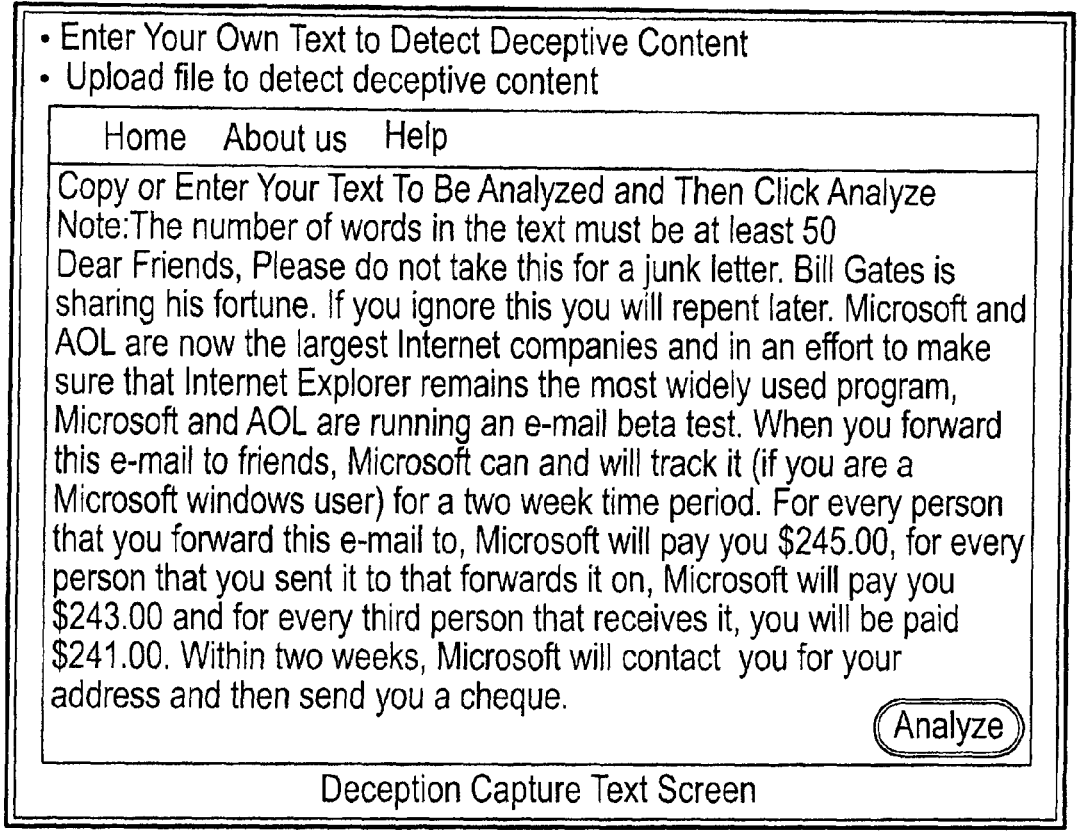

The screen shown in FIG. 20A is the interface that appears when the link "Enter Your Own Text to Detect Deceptive Content" is clicked.

In response, the user enters the text and clicks the Analyze button, then the cue extraction algorithm and SPRT algorithm written in MATLAB will be called by TurboGears and Python. After the algorithms have been executed, the detection result including deception result, trigger cue and deception reason will be shown on the website as illustrated in FIG. 21.

If the users are sure about the deceptiveness of the content, they can provide feedback concerning the accuracy of the result displayed on the website. Feedback from users may be used to improve the algorithm. Alternatively, users can indicate that they are "not sure" if they do not know whether the sample text is deceptive or not.

Figure 27:
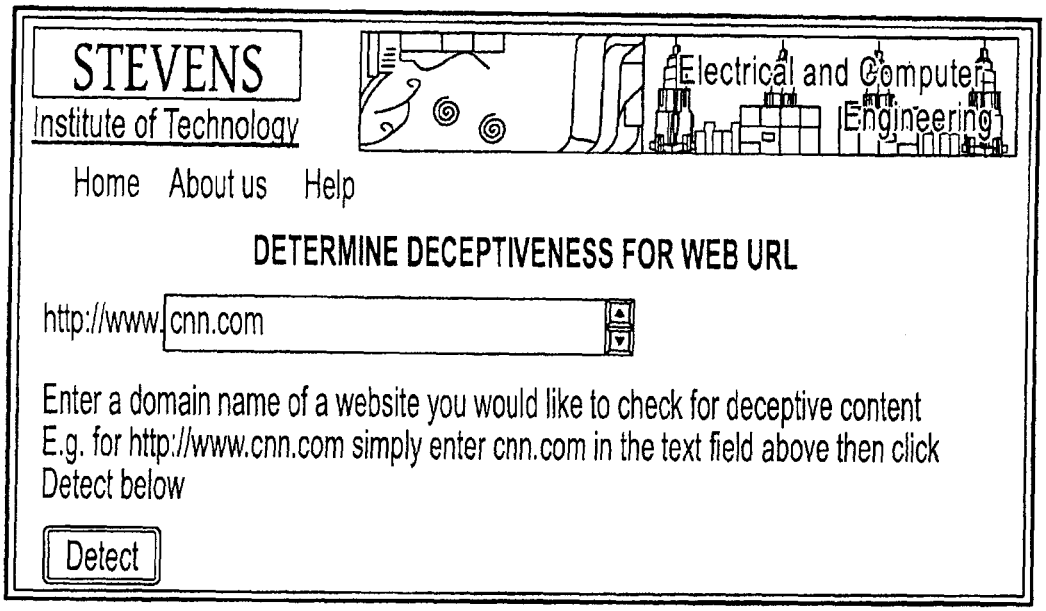
FIGS. 27-29 are illustrations of user interface screens.
Figure 28:
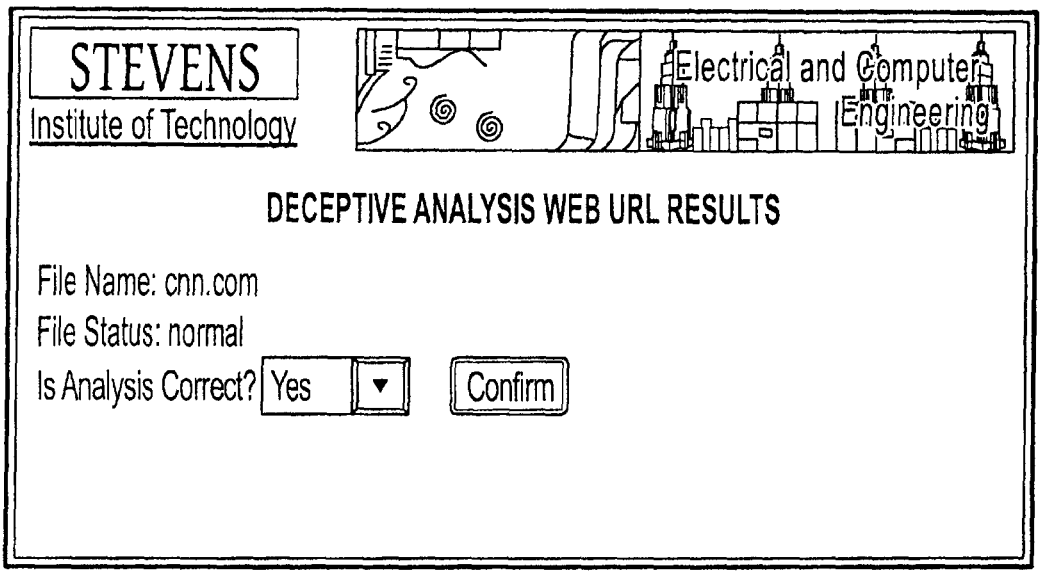

Analysis of whether a website is deceptive or not can be invoked by entering the URL of the target website on the STEALTH website and then clicking the Detect button, as illustrated in FIG. 27. When the button is clicked, text is extracted from the HTML associated with the target website and fed into the deception algorithm, which then performs the deception detection test, as illustrated in FIG. 28.

Gender Identification

Figure 20B:
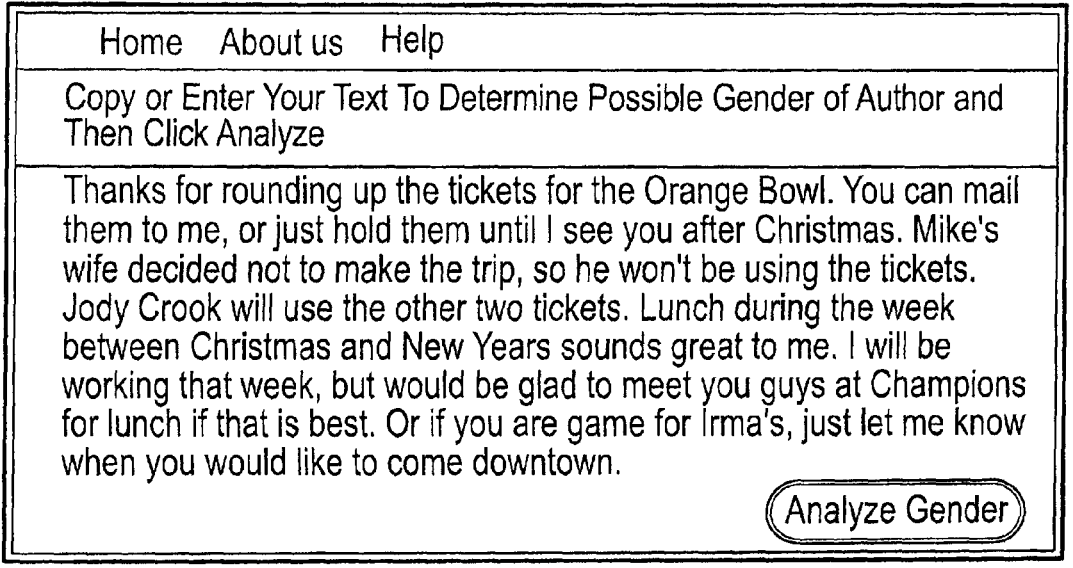

The STEALTH website performs gender identification of the author of a given text by the user entering the target text or uploading a target text file. This can be done by clicking on the appropriate link shown on FIG. 20, whereupon a screen like that shown in FIG. 20B is displayed (prior to insertion of text) and in response to selecting:

Determine gender of author of text (upload file)

Enter text to determine author's gender.

Figure 29:
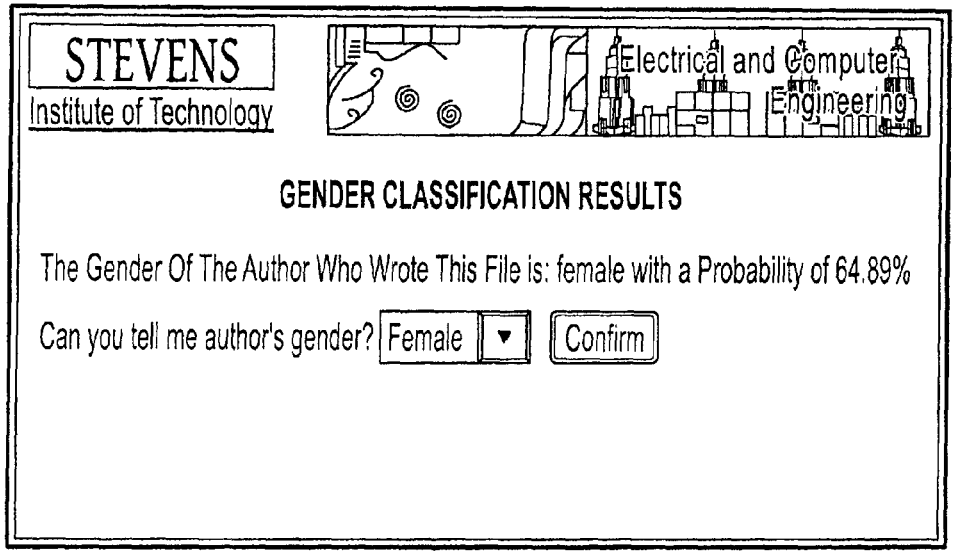

"Enter Your Own Text to Detect Deceptive Content". Here the user enters the text and clicks the Analyze Gender button, to invoke the Gender algorithm (written in MATLAB), which is called by TurboGears and Python. As shown in FIG. 29, after the Gender algorithm is executed, the gender identification result including gender and probability are displayed. The trigger cue and reason deception was concluded may also be shown on the website. The user is then asked to provide the true gender of the author of the text (if they know it). This User feedback can be used to improve the algorithm. Alternatively, the user can choose "Not Sure" if they do not know the gender of the author of the text.

Ip-Geolocation

IP geolocation is the process of locating an internet host or device that has a specific IP address for a variety of purposes, including: targeted internet advertising, content localization, restricting digital content sales to authorized jurisdictions, security applications, such as authenticating authorized users to avoid credit card fraud, locating suspects of cyber crimes and providing internet forensic evidence for law enforcement agencies. Geographical location information is frequently not known to users of online banking, social networking sites or Voice over IP (VoIP) phones. Another important application is localization of emergency calls initiated from VoIP callers. Furthermore, statistics of the location information of Internet hosts or devices can be used in network management and content distribution networks. Database-based IP geolocation has been widely used commercially. Database-based techniques such as whois database look-up, DNS LOC record, network topology hints on geographic information of nodes and routers, and measurement-based techniques such as round-trip time (RTT) captured using ping and RTT captured via HTTP refresh.

Database-based IP geolocation methods rely on the accuracy of data in the database. This approach has the drawback of inaccurate or misleading results when data is not updated or is obsolete, which is usually the case with the constant reassignment of IP addresses from the Internet service providers. A commonly used database is the previously mentioned whois domain-based research services where a block of IP addresses is registered to an organization, and may be searched and located. These databases provide a rough location of the IP addresses, but the information may be outdated or the database may have incomplete coverage.

An alternative IP geolocation method, measurement-based IP geolocation, may have utility when access to a database is not available or the results from a database are not reliable. In accordance with one embodiment of the present disclosure, a measurement-based IP geolocation methodology is utilized for IP geolocation. The methodology models the relationship between measured network delays and geographic distances using a segmented polynomial regression model and uses semidefinite programming in optimizing the location estimation of an internet host. The selection of landmark nodes is based on regions defined by k-means clustering. Weighted and non-weighted schemes are applied in location estimation. The methodology results in a median error distance close to 30 miles and significant improvement over the first order regression approach for experimental data collected from PlanetLab, as discussed in "Planetlab," 2008. [Online]. Available: http://www.planet-lab.org, the disclosure of which is hereby incorporated by reference.

The challenge with the Measurement-based IP geolocation approach is to find a proper model to represent the relationship between network delay measurement and geographic distance. Delay measurement refers to RTT measurement which includes propagation delay over the transmission media, transmission delay caused by the data-rate at the link, processing delay at the intermediate routers and queueing delay imposed by the amount of traffic at the intermediate routers. Propagation delay is considered as deterministic delay which is fixed for each path. Transmission delay, queueing delay and processing delay are considered as stochastic delay. The tools commonly used to measure RTT are traceroute, as discussed in "traceroute," October 2008. [Online]. Available: http://www.traceroute.org/ and ping, as discussed in "ping," October 2008. [Online]. Available: http://en.wikipedia.org/wiki/Ping, the disclosures of which are hereby incorporated by reference.

The geographic location of an IP is estimated using multilateration based on measurements from several landmark nodes. Here, landmark nodes are defined as the internet hosts whose geographical locations are known. Measurement-based geolocation methodology has been studied in T. S. E. Ng and H. Zhang, "Predicting internet network distance with coordinates-based approaches," in *IEEE INFOCOM*, June 2002; L. Tang and M. Crovella, "Virtual landmarks for the Internet," in *ACM Internet Measurement Conf* 2003, October 2003; F. Dabek, R. Cox, F. Kaashoek, and R. Morris, "Vivaldi: A decentralized network coordinate system," in *ACM SIGCOMM* 2004, August 2004; V. N. Padmanabhan and L. Subramanian, "An investigation of geographic mapping techniques for Internet hosts," in *ACM SIGCOMM* 2001, August 2001 and B. Gueye, A. Ziviani, M. Crovella, and S. Fdida, "Constraint-based geolocation of internet hosts," in *IEEE/ACM Transactions on Networking*, vol. 14, no. 6, December 2006, the disclosures of which are hereby incorporated by reference.

These methods use delay measurement between landmarks and the internet host, which has the IP address whose location is to be determined, to estimate distance and further find the geographic location of the host. Network coordinate systems such as T. S. E. Ng and H. Zhang, "Predicting internet network distance with coordinates-based approaches," in *IEEE INFOCOM*, June 2002; L. Tang and M. Crovella, "Virtual landmarks for the Internet," in *ACM Internet Measurement Conf.* 2003, October 2003 and F. Dabek, R. Cox, F. Kaashoek, and R. Morris, "Vivaldi: A decentralized network coordinate system," in *ACM SIGCOMM* 2004, August 2004, have been proposed to evaluate distance between internet hosts. A systematic study of the IP-to-location mapping problem was presented in V. N. Padmanabhan and L. Subramanian, "An investigation of geographic mapping techniques for Internet hosts," in *ACM SIGCOMM* 2001, August 2001, the disclosures of which are incorporated herein by reference. Geolocation tools such as GeoTrack, Geoping and GeoCluster were evaluated in this study. The Cooperative Association for Internet Data Analysis (CAIDA) provides a collection of network data and tools for study on the internet infrastructure, as discussed in "The cooperative association for internet data analysis," November 2008. [Online]. Available: http://www.caida.org, the disclosure of which is hereby incorporated by reference.

Gtrace, a graphical traceroute, provides a visualization tool to show the estimated physical location of an internet host on a map, as discussed in "Gtrace," November 2008. [Online]. Available: http://www.caida.org/tools/visualization/gtrace/, the disclosure of which is hereby incorporated by reference.

A study on the impact of internet routing policies to round trip times was presented in H. Zheng, E. K. Lua, M. Pias, and T. G. Griffin, "Internet routing policies and roundtrip-times," in *Passive and Active Measurement Workshop* (PAM 2005), March 2005, the disclosure of which is hereby incorporated by reference, where the problem posed by triangle inequality violations for the internet coordinate systems. Placement of landmark nodes was studied in A. Ziviani, S. Fdida, J. F. de Rezende, and O. C. M. B. Duarte, "Toward a measurement-based geographic location service," in *Passive and Active Measurement Workshop* (*PAM* 2004), April 2004, the disclosure of which is hereby incorporated by reference, to improve accuracy of geographic location estimation of a target internet host. Constraint-based IP geolocation has been proposed in B. Gueye, A. Ziviani, M. Crovella, and S. Fdida, "Constraint-based geolocation of internet hosts," in *IEEE/ACM Transactions on Networking*, vol. 14, no. 6, December 2006, where the relationship between network delay and geographic distance is established using the bestline method. The experiment results show a 100 km median error distance for a US dataset and 25 km median error distance for a European dataset. Topology-based geolocation method is introduced in E. Katz-Bassett, J. John, A. Krishnamurthy, D. Weltherall, T. Anderson, and Y. Chawathe, "Towards IP geolocation using delay and topology measurements," *Internet Measurement Conference* 2008, 2006. This method extends the constraint multilateration techniques by using topology information to generate a richer set of constraints and apply optimization techniques to locate an IP. Octant is a framework proposed in B. Wong, T. Stoyanov, and E. G. Sirer, "Octant: A comprehensive framework for the geolocalization of interne hosts," in *Proceedings of Symposium on Networked System Design and Implementation*, Cambridge, Mass., April 2007, the disclosure of which is hereby incorporated by reference, that considers both positive and negative constraints in determining the physical region of internet hosts taken into consideration of the information of where the node can or cannot be. It uses Bózier-bounded regions to represent a node position that reduces estimation region size.

The challenges in measurement-based IP geolocation include many factors. Due to the circuitousness of the path, it is difficult to find a suitable model to represent the relationship between network delay and geographic distance. Different network interfaces and processors render various processing delays. The uncertainty of network traffic makes the queueing delay at each router and host unpredictable. Furthermore, IP spoofing and use of proxies can hide the real IP address. In accordance with one embodiment of the present disclosure: (1) the IP address of the interne host is assumed to be authentic, not spoofed or hidden behind proxies. (To simplify notation, references to the host with an IP address whose location is to be determined are referred to as "IP" below); (2) Statistical analysis is applied in defining the characteristic of delay measurement distribution of the chosen landmark node; (3) Outlier removal technique is used to remove noisy data in the measurement; (4) k-means clustering is used to break down measurement data into smaller regions for each landmark node, where each region has a centroid that uses delay measurement and geographic distance as coordinates. (In this manner, selection of landmark nodes can be reduced to nodes within a region with a certain distance to the centroid of that region.); (5) a segmented polynomial regression model is proposed for mapping network delay measurement to geographic distance for the landmark nodes. (This approach gives fine granularity in defining the relationship between the delay measurement and the geographic distance.); (6) a convex optimization technique, semidefinite programming (SDP), is applied in finding an optimized solution for locating an IP-given estimated distance from known landmark nodes; (7) the software tools MATLAB, Python and MySQL are integrated to create the framework for IP geolocation.

IP Geolocation Framework

Figure 30:
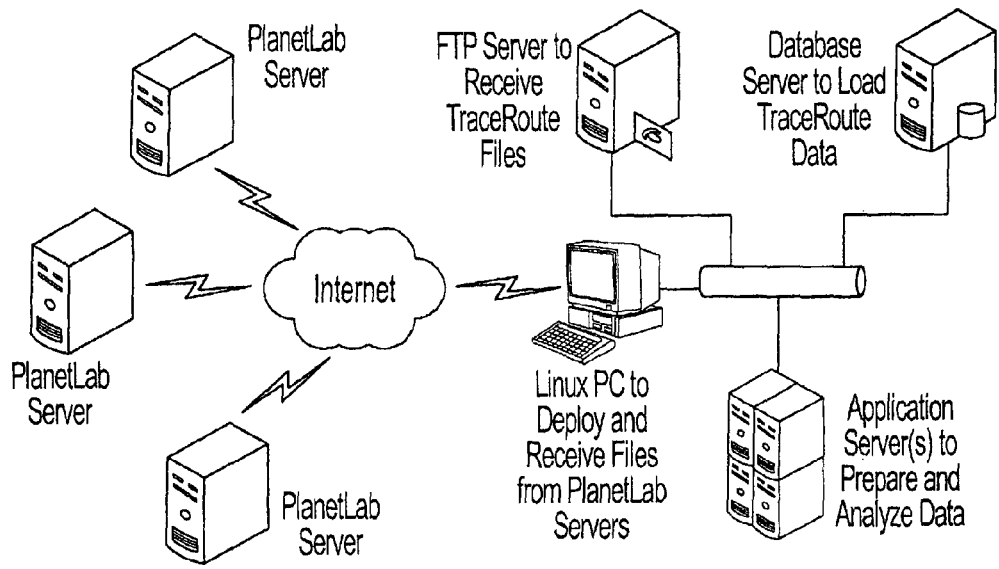
FIG. 30 is a schematic diagram of system architecture for IP geolocation.
Figure 31:
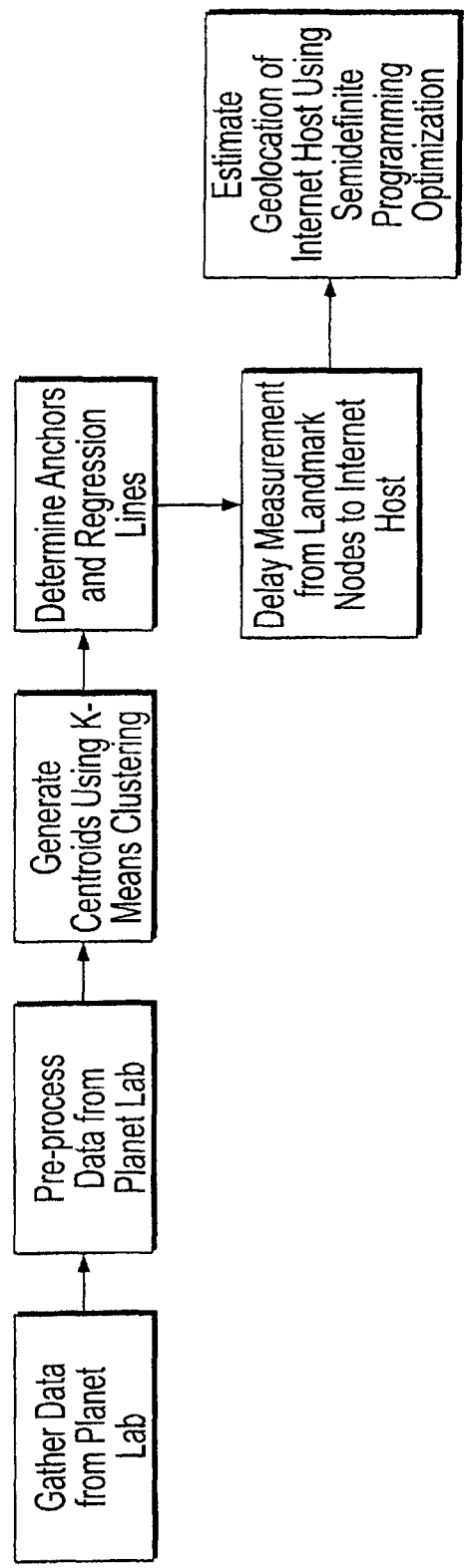
FIG. 31 is a flowchart of a process for geolocation.

In accordance with one embodiment of the present disclosure, the accuracy of the geographic location estimation of an IP based on the real-time network delay measurement from multiple landmark nodes is increased. The characteristics of each landmark node are analyzed and delay measurements from the landmark nodes to a group of destination nodes are collected. A segmented polynomial regression model for each landmark node is used to formulate the relationship between the network delay measurements and the geographic distances. Multilateration and semidefinite programming (a convex optimization method) are applied to estimate the optimized location of an interne host given estimated geographic distances from multiple landmark nodes. FIG. 30 shows the architecture of one embodiment of the present disclosure for preforming geolocation. The proposed framework is capable of preforming the following processes: data collection, data processing, data modeling and location optimization. FIG. 31 shows the flow chart of the processes.

Data Collection

PlanetLab, "Planetlab," 2008. [Online]. Available: http://www.planet-lab.org, may be used for network delay data collection. PlanetLab is a global research network that supports the development of new network services. It consists of 1038 nodes at 496 sites around the globe. Most PlanetLab participants share their geographic location with the PlanetLab network, which gives reference data to test the estimation errors of the proposed framework, i.e., the "Ground truth" (actual location) is known. Due to the difference of maintenance schedules and other factors, not all PlanetLab nodes are accessible at all times. In a test of the geolocation capabilities of an embodiment of the present disclosure, 47 nodes from North America and 57 nodes from Europe which give consistent measurements were chosen as landmark nodes to initiate round-trip-time measurements to other PlanetLab nodes. An embodiment of the present disclosure uses traceroute as our network delay measurement tool. However, other measurement tools can also be applied in the framework. To analyze the characteristics of each landmark node, traceroute measurements are taken from the chosen PlanetLab landmark nodes to 327 other PlanetLab nodes. A Python script is deployed to run the traceroute and collect results. In one test, traceroute was kicked off every few minutes, continuously for ten days on each landmark node to avoid blocking from the network.

Delay measurements generated by traceroute are RTT measurements from a source node to a destination node. RTT is composed of propagation delay along the path, $T_{prop}$, transmission delay, $T_{trans}$, processing delay, $T_{proc}$, and queueing delay, $T_{que}$, at intermediate routers/gateways. Processing delays in high-speed routers are typically in the order of a microsecond or less. RTT in the order of milliseconds were observed. In this circumstance, processing delays are considered insignificant and are not considered. For present purposes, RTT is denoted as the sum of propagation delay, transmission delay and queueing delay, as shown in Eq. 4.1.

$$RTT = T_{prop} + T_{trans} + T_{que}. \quad (4.1)$$

Propagation delay is the time it takes for the digital data to travel through the communication media such as optical fibers, coaxial cables and wireless channels. It is considered deterministic delay, which is fixed for each path. One study has shown that the speed of digital data travels along fiber optic cables is ⅔ the speed of light in a vacuum, c, R. Percacci and A. Vespignani, "Scale-free behavior of the interne global performance," vol. 32, no. 4, April 2003. This sets an upper bound of the distance between two internet nodes, given by $$d_{max} = \frac{RTT}{2}\frac{2}{3}C.$$

Transmission delay is defined as the number of bits (N) transmitted divided by the transmission rate (R), $$T_{trans} = \frac{N}{R}.$$

The transmission rate is dependent on the link capacity and traffic load of each link along the path. Queueing delay is defined as the waiting time the packets experience at each intermediate router to be processed and transmitted. This is dependent on the traffic load at the router and the processing power of the router. Transmission delay and queueing delay are considered as stochastic delay.

Data collection over the Internet through PlanetLab nodes presents some challenges, e.g., arising from security measures that were taken at the immediate routers. More particularly: (a) traceroute may be blocked, resulting in missing values in the measurements. In some cases, the path from one end node to another end node is blocked for probing packets resulting in incomplete measurements.

Data Processing

Figure 32:
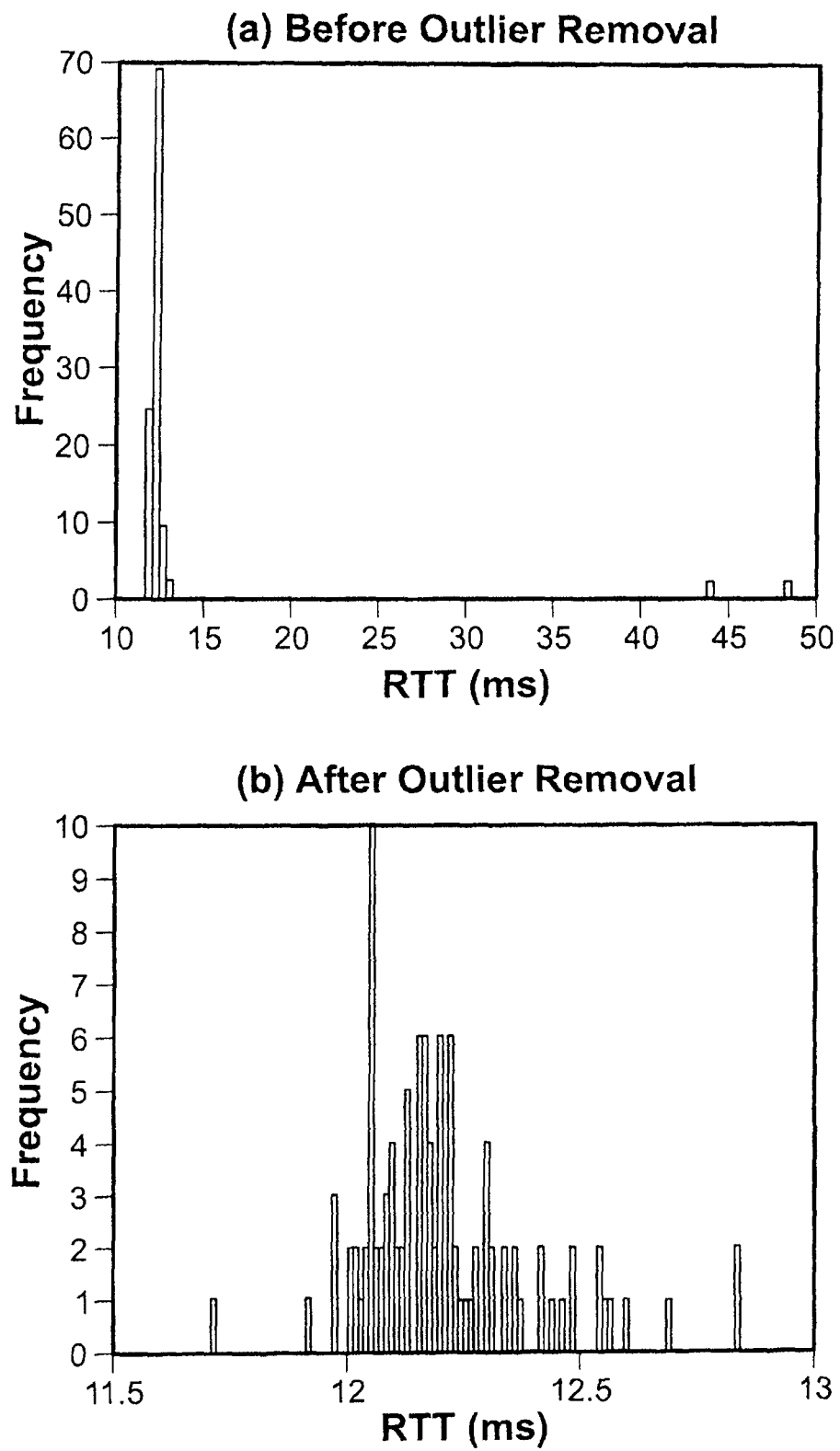
FIG. 32 is a set of Histograms of RTT measurements from PlanetLab nodes before (a), (c) and (e) and after outlier removal (b), (d) and (f)
Figure 32:
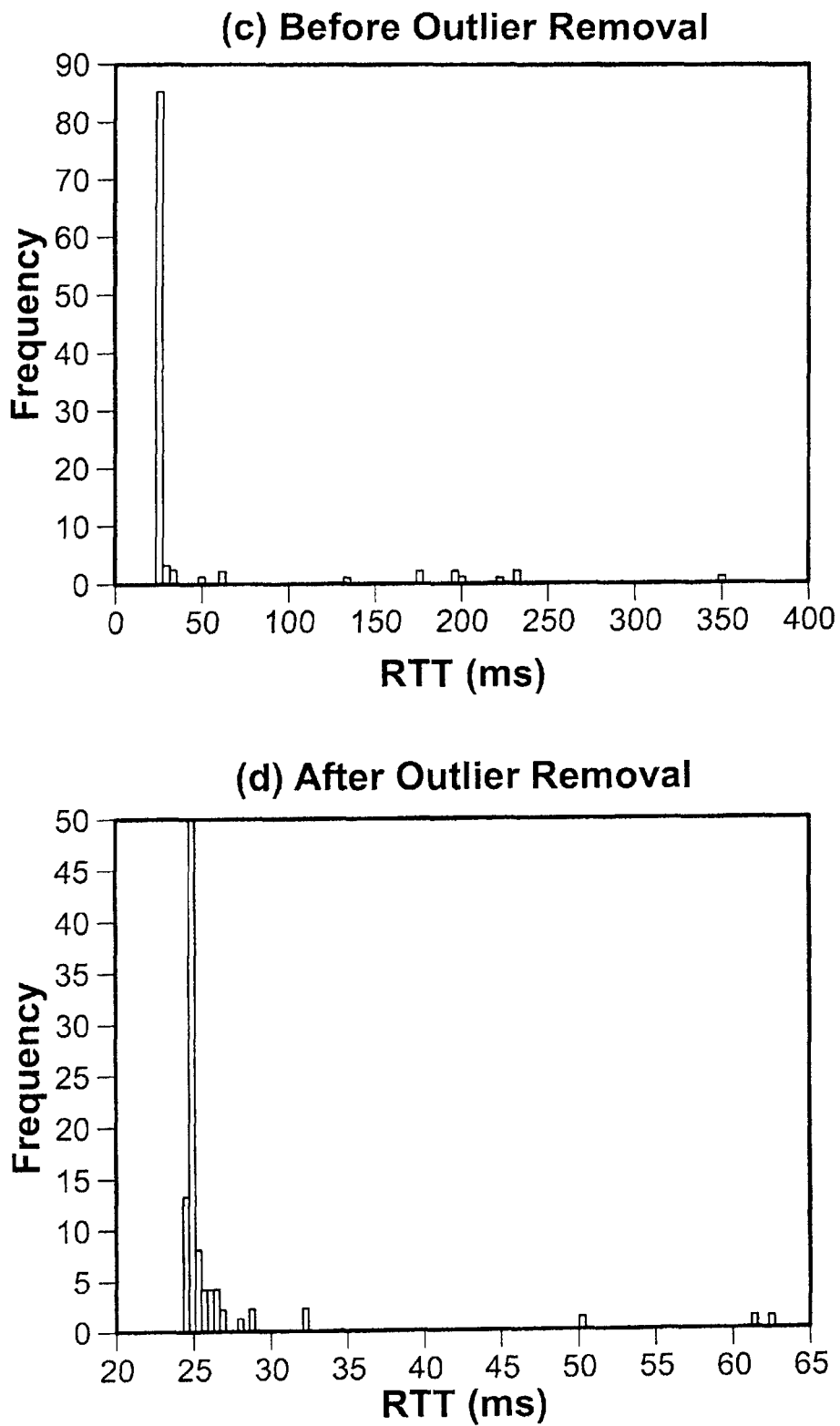
Figure 32:
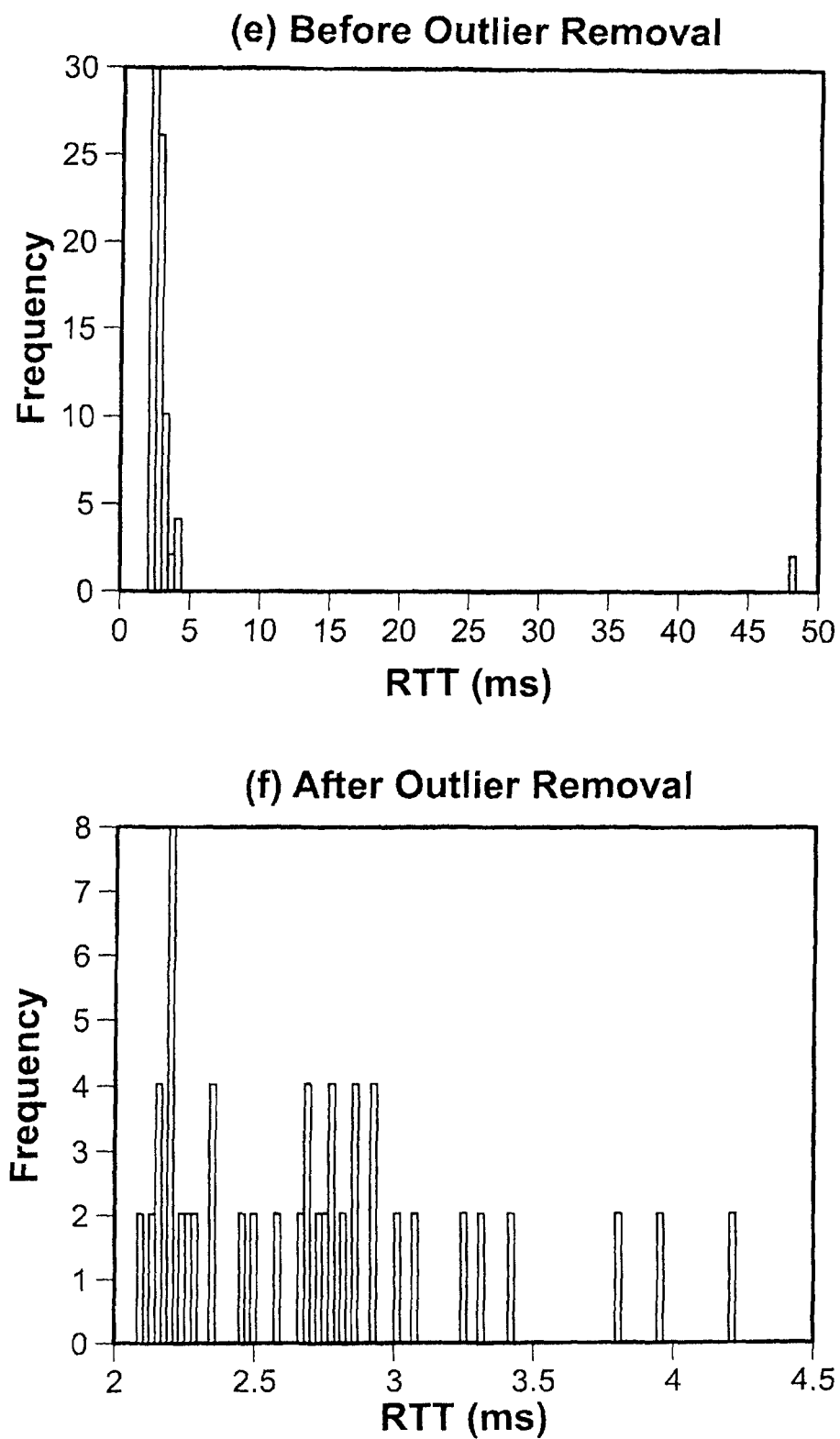

In accordance with one embodiment of the present disclosure, a first step in analyzing the collected data is to look at the distribution of the observed RTTs. At each landmark node, a set of RTTs is measured for a group of destinations. A histogram can be drawn to view the distribution of RTT measurements. By way of explaining this process, FIGS. 32a, 32c and 32e show histograms of RTT measurements from three source nodes to their destined nodes in PlanetLab before outlier removal. The unit of RTT measurement is the millisecond, ms. FIG. 32a shows that most of the RTT measurements fall between 10 ms and 15 ms with high frequency, while few measurements fall into the range between 40 ms to 50 ms. The noisy observations between 40 ms and 50 ms are referred to as outliers. These outliers could be caused by variations in network traffic that creates congestion on the path, therefore resulting in longer delays and can be considered as noise in the data. To reduce this noise, an outlier removal method is applied to the original measurement. The set of RTT measurements between the node i and node j is represented as $T_{ij}$, where $T_{ij} = \{t_1, t_2, \ldots, t_n\}$, and n is the number of measurements.

We define the outliers as $t_i - \mu(T) > 2\sigma$, where $0 \le i \le n$.

Here, $\mu(T)$ is the mean of the set of data T and a is the standard deviation of the observed data set.

The histogram after outlier removal is presented in FIGS. 32b, 32d and 32f. The data shown in FIG. 32g reflecting outlier removal can be considered a normal distribution. In FIG. 32d, the distribution of RTT ranges from 20 ms to 65 ms after outlier removal. While a high frequency of RTT measurements lies between 20 ms and 40 ms, an iterative outlier removal technique can be applied in this case to further remove noise. FIG. 32f shows an example when RTT is short (within 10 ms). The RTT distribution tends to have high frequency on the lower end.

Figure 33:
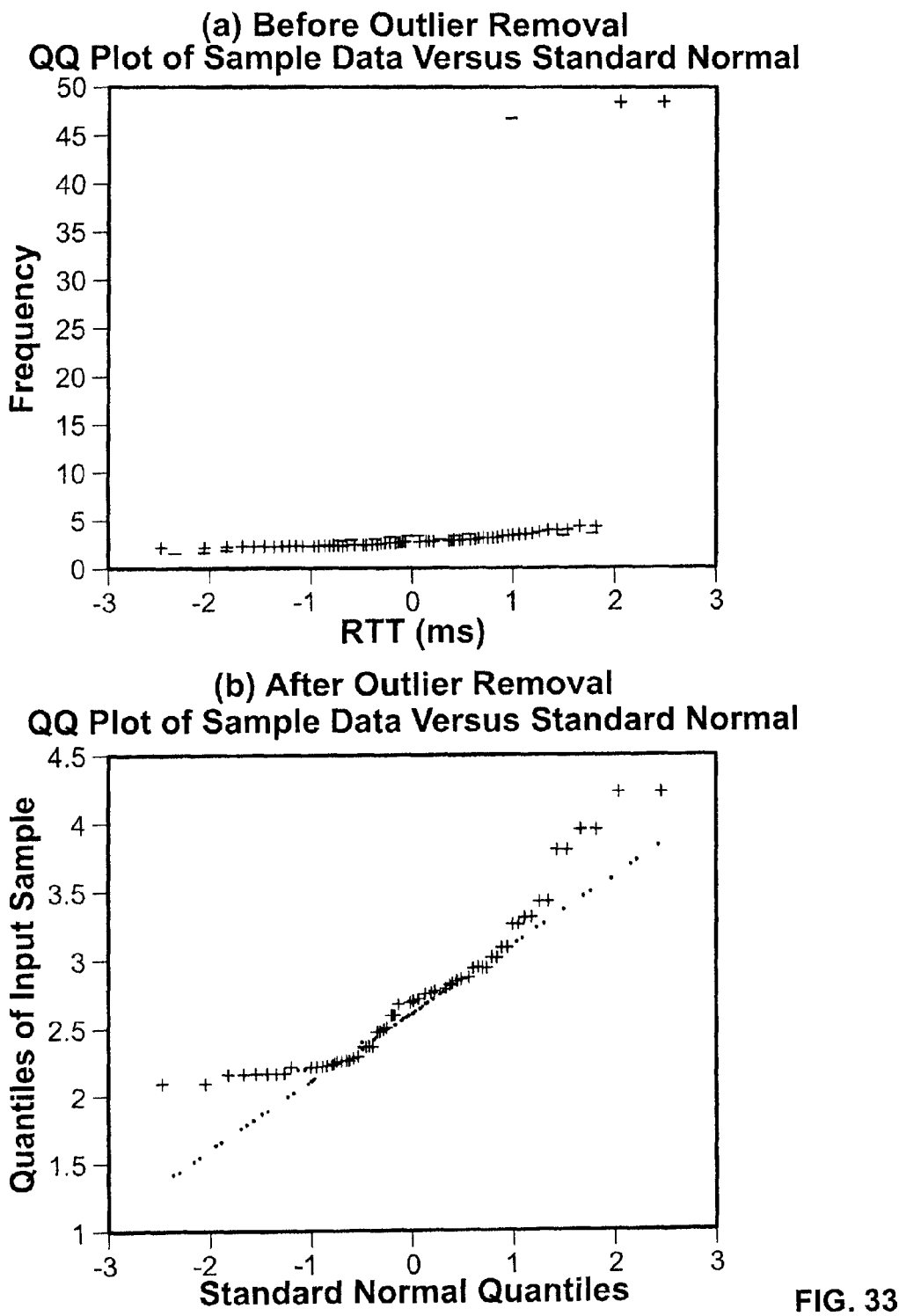
FIG. 33 is a pair of Q-Q plots of RTT measurements from PlanetLab nodes before (a) and after (b) outlier removal.
Figure 34:
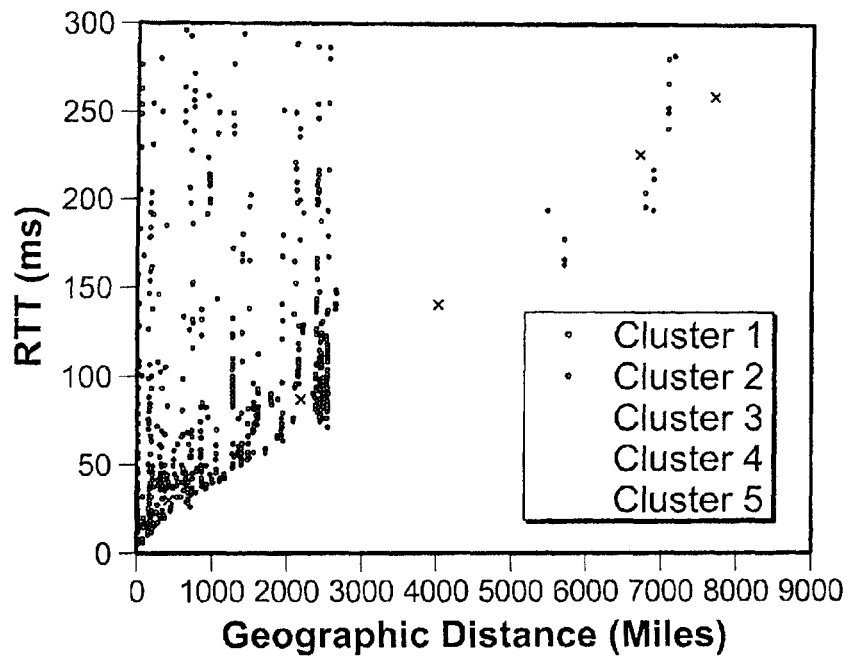
FIG. 34 is a graph of k-means clustering for collected data for PlanetLab node planetlab1.rutgers.edu 36.

FIG. 33 shows the Q-Q plots of the RTT measurements from PlanetLab nodes before and after the outlier removal. It is shown that outliers are clearly present in the upper right corner in FIG. 33a. After outlier removal, it has a close to normal distribution as shown in FIG. 33b k-means is an iterative clustering algorithm widely used in pattern recognition and data mining for finding statistical structures in data. The algorithm starts by creating singleton clusters around k randomly sampled points from the input list, then assigns each point in that list to the cluster with the closest centroid. This shift in the contents of the cluster causes a shift in the position of the centroid. The algorithm keeps re-assigning points and shifting centroids, until the largest centroid shift distance is smaller than the input cutoff. In the present application, k-means is used to analyze the characteristics of each landmark node. The data is grouped based on the RTT measurements and geographic distances from each landmark node into k clusters. This helps to define the region of the IP so the selection of landmarks can be chosen with a closer proximity to the destined node. Each data set includes a pair of values that represents the geographic distance between two PlanetLab nodes and the measured RTT. Each cluster has a centroid with a set of values (RTT, distance) as coordinates. The k-means algorithm is used to generate the centroid. FIG. 34 shows an example of k-means clustering for data collected at PlanetLab node planetlab1.rutgers.edu with k=5. Each dot represents an observation of (RTT, distance) pair in the measurements. The notation 'x' represents the centroid of a cluster. This figure shows the observed data prior to outlier removal. Therefore, sparsely scattered (RTT, distance) pairs with short distance and large RTT values are observed.

In the k-means clustering process, "k=20" is used as the number of clusters for each landmark node. Once a delay measurement is taken for an IP using random landmark selection, the region of the IP where the delay measurement will be mapped to one of the k clusters is estimated. Further measurements can be taken from the landmark nodes that are closer to the centroid of that cluster.

characterize the relationship between geographic distance, y, and network delay, x, where a and b are the first order coefficients, as shown in Eq. 4.2.

$$y = ax + b. \quad (4.2)$$

Figure 35:
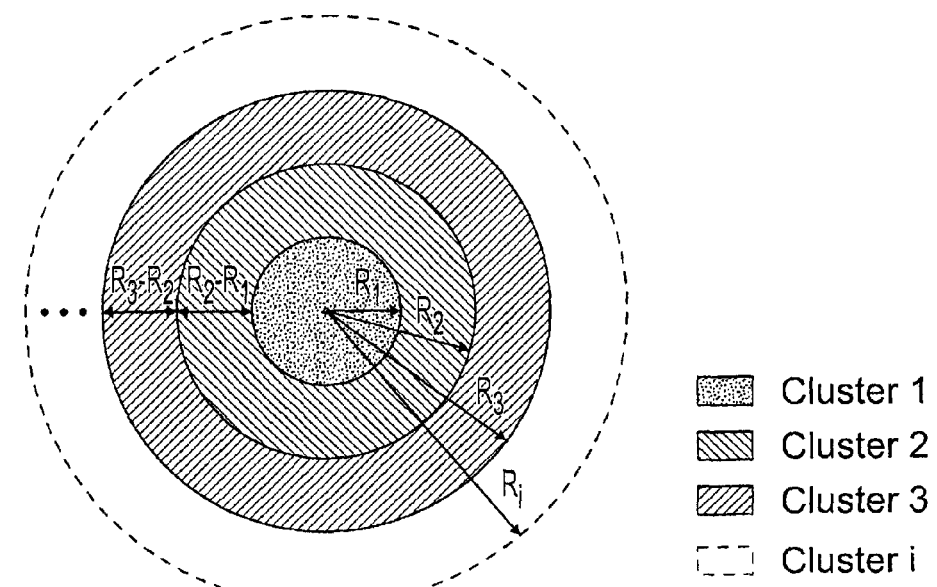
FIG. 35 is a schematic diagram of a segmented polynomial regression model for a landmark node.

In accordance with one embodiment of the present disclosure, a regression model that analyzes the delay measurement from each landmark node is analyzed based on regions with different distance ranges from the landmark node. Applicants call this regression model the segmented polynomial regression model, since the delay measurement is analyzed based on range of distance to the landmark node. FIG. 35 shows an example of this approach. After the data is clustered into k clusters for a landmark node, the data is segmented into k groups based on distance to the landmark node. Cluster 1 (C1) includes all delay measurements taken from nodes within $R_1$ radius of the landmark node. Cluster 2 (C2) includes delay measurements between $R_1$ and $R_2$. Cluster i ($C_i$) includes delay measurements between $R_{i-1}$ and $R_i$.

Each region is represented with a regression polynomial to map RTT to geographic distance. Each landmark node has its own set of regression polynomials that fit for different distance regions. Finer granularity is applied in modeling mapping from RTT to distance to increase accuracy. The segmented polynomial regression model is represented as Eq. 4.3.

$$y = \sum_{i=0}^{k} a_i x^i, x \in C_1, \ldots C_k \quad (4.3)$$

First order regression analysis has widely used the relationship between geographic distance and network delay. Applicants studied different orders of regression lines in the proposed segmented polynomial regression model for each landmark node and found that lower order regression lines provide better fit than higher order regression lines for the given data set. Table 4.2 shows an example of the coefficients of the segmented polynomial regression model for PlanetLab node planetlab3.csail.mit.edu.

TABLE 4.1

Coefficients of segmented regression polynomials for PlanetLab node planetlab3.csail.mit.edu.

| Region | $a_0$ | $a_1$ | $a_2$ | $a_3$ | $A_4$ |
|---|---|---|---|---|---|
| $C_1$ | −0.000002 | 0.001579 | −0.327457 | 20.946144 | −15.044738 |
| $C_2$ | 0 | 0.000223 | −0.112349 | 10.955965 | 448.473577 |
| $C_3$ | −0.000065 | 0.02321 | −2.836962 | 137.305958 | −837.6261 |
| $C_4$ | 0.000043 | −0.018368 | 2.768478 | −169.190563 | 5756.416625 |
| $C_5$ | −0.000006 | 0.004554 | −1.152234 | 118.721352 | −1839.132 |

Segmented Polynomial Regression Model for Delay Measurements and Geographic Distance The geographic distance of the PlanetLab nodes where delay measurements are taken to the landmark node ranges from a few miles to 12,000 miles. Studies discussed in A. Ziviani, S. Fdida, J. F. de Rezende, and O. C. M. B. Duarte, "Improving the accuracy of measurement-based geographic location of internet hosts," in *Computer Networks and ISDN Systems*, vol. 47, no. 4, March 2005 and V. N. Padmanabhan and L. Subramanian, "An investigation of geographic mapping techniques for internet hosts," in *ACM SIGCOMM* 2001, August 2001, the disclosure of which is hereby incorporated by reference, investigate deriving a least square fitting line to

TABLE 4.2

Coefficients of first order regression approach for PlanetLab node planetlab3.csail.mit.edu.

| Region | $a_0$ | $a_1$ |
|---|---|---|
| R | 22.13668 | 402.596536 |

Figure 36:
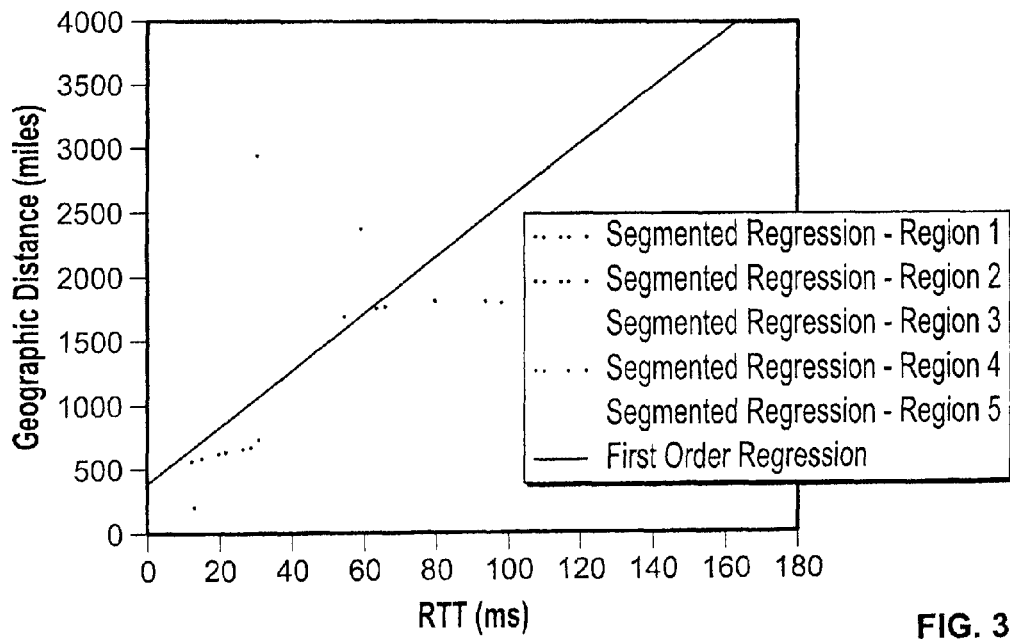
FIG. 36 is a graph of segmented polynomial regression and first order linear regression for PlanetLab node planetlab3.csail.mit.edu.

In testing, Applicants found that the best fitting order is poly order 4 for the given dataset. FIG. 36 shows the plot of the segmented polynomials in comparison with the first order linear regression approach for the same set of data for PlanetLab node planetlab3.csail.mit.edu. Due to the discontinuity of delay measurements versus geographic distances, the segmented polynomial regression is not continuous. Applicants take the means of overlapping observation between the adjacent regions to accommodate measurements that fall in this range. It can be shown that the segmented polynomial regression provides more accurate mapping of geographic distance to network delay compared to the linear regression approach especially when RTT is small or the distance range is between 0 to 500 miles using the same set of data. The improved results of segmented polynomial regression versus a first order linear regression approach is described below. An algorithm in accordance with one embodiment of the present disclosure's segmented polynomial regression is listed below.

---

Algorithm 2: Polynomial Regression Algorithm

---

Input: SourceIP, MinParameterDistance, MaxParameterDistance,
    IncrementLevel, PolyOrder
Output: Error
StartIntervalDistance=MinParameterDistance
EndIntervalDistance=StartIntervalDistance+IncrementLevel
while EndIntervalDistance<=MaxParameterDistance do
| Retrieve Source LandMark By StartIntervalDistance,
| EndIntervalDistance and SourceIP
| if Source Landmark exists then
| | Save LandMark,
| | StartIntervalDistance,EndIntervalDistance,PolyOrder in
| | Anchor Summary Table
| | MinIntervalDistance=EndIntervalDistance
| | else
| | | EndIntervalDistance=EndIntervalDistance+IncrementLevel
| | end
| end
end
foreach Landmark in Anchor Summary Table do
| if Regression Line DOES NOT Exist For Parameters
| (Landmark,StartIntervalDistance,EndIntervalDistance,PolyOrder)
| | then Generate Regression Line For Above Parameters
| end
| Compute Estimated Distance Using Regression Line based on
| parameters in Anchor Summary Table
| if (Estimated Distance<MaxParameterDistance ×2) AND
| (Estimated Distance>0) then
| | Save Estimated Distance in File For Convex Optimization
| | Routine
| end
| else
| | Generate Regression Line For
| | Source.MinParameterDistance,MaxParameterDistance
| | Compute New Estimated Distance Using Regression Line
| | based on parameters
| | Source,MinParameterDistance,MaxParameterDistance
| | if (New Estimated Distance<MaxParameterDistance×2) AND
| | ( New Estimated Distance>0) then
| | | Save Estimated Distance in File For Convex Optimization
| | | Routine
| | end
| end
end
Determine SemiDefinite Optimization Based On Distance File

---

4.4 Multilateration

Multilateration is the process of locating an object based on the time difference of arrival of a signal emitted from the object to three or more receivers. This method has been applied in localization of Internet host in B. Gueye, A. Ziviani, M. Crovella, and S. Fdida, "Constraint-based geolocation of Internet hosts," in *IEEE/ACM Transactions on Networking*, vol. 14, no. 6, December 2006.

Figure 37:
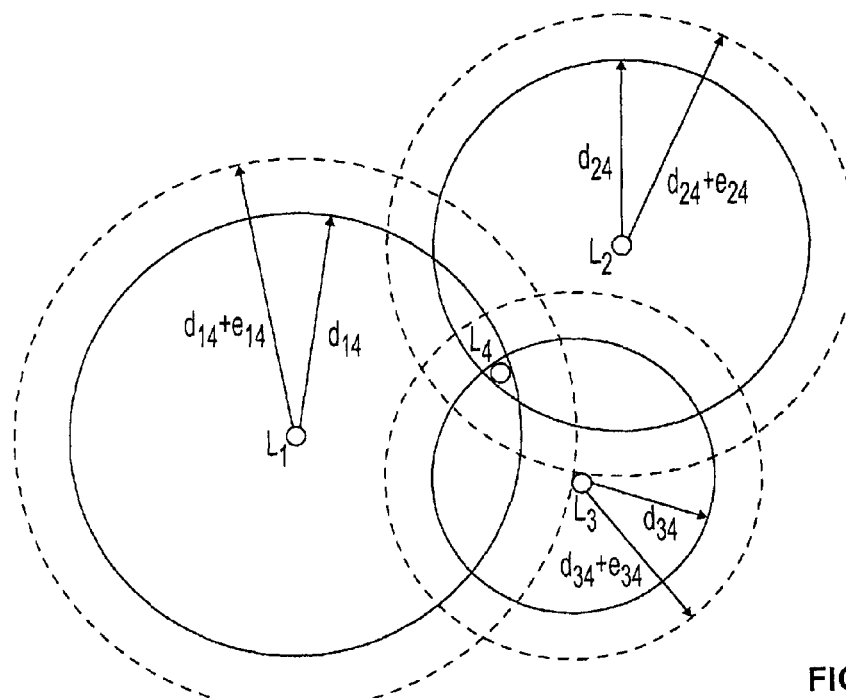
FIG. 37 is a schematic drawing of Multilateration of IP geolocation.

FIG. 37 shows an example of multilateration that uses three reference points L1, L2 and L3 to locate an Internet host, L4. In this example, round trip time to the internet host $L_4$ with IP whose location is to be determined is measured from three internet hosts with known locations $L_1$, $L_2$, and $L_3$. Geographic distances from L1, L2, and L3 to the L4 are represented as $d_{14}$, $d_{24}$, and $d_{34}$, which is based on propagation delay. $e_{14}$, $e_{24}$, and $e_{34}$ are additive delay from transmission and queueing delays. The radius of the solid circle shows the lower bound of the estimated distance. The radius of the dotted circle is estimated using a linear function of round trip time, as discussed in B. Gueye, A. Ziviani, M. Crovella, and S. Fdida, "Constraint-based geolocation of internet hosts," in *IEEE/ACM Transactions on Networking*, vol. 14, no. 6, December 2006. The circle around each location shows the possible location of the IP. The overlapping region of the three circles indicates the location of the IP. Due to the circuitousness of routing paths and variations of round trip time measurement under different traffic scenario, it is difficult to find a good estimate between RTT and geographic distance. We apply our segmented polynomial regression model explained in the previous subsection to represent the relationship between RTT and geographic distance to give fine granularity in modeling. We use this approach to map the mean measured RTT between node j to node j to a geographic distance, $\hat{d}_{ij}$.

Location Optimization Using the Semidefinite Programming Model

Given estimated distances from landmark nodes to an IP, multilateration can be used to estimate the location of the IP. Applicants have applied a convex optimization scheme, semidefinite programming, in calculating the optimized location of the IP. Semidefinite programming is an optimization technique commonly used in sensor network localization, as discussed in P. Biswas, T. Liang, K. Toh, T. Wang, and Y. Ye, "Semidefinite programming based algorithms for sensor network localization," in *ACM Transactions on Sensor Networks*, vol. 2, no. 2, 2006, pp. 188-220, the disclosure of which is hereby incorporated by reference.

We use the following notations in this section. For example, a network in $R^2$ with m landmark nodes and n hosts with IP addresses which are to be located. The location of the landmark node is $a_k$ in $R^2$, k=1, ..., m, and the location of IP is $x_i$ in $R^2$, i=1, n. The Euclidean distance between two IPs $x_i$ and $x_j$ is denoted as $d_{ij}$. The Euclidean distance between an IP and a landmark node is $d_{i,k}$. The pairwise distance between IPs are denoted as $(i, j) \in N$, and the distance between landmark nodes and IP is $(i, k) \in M$.

The location estimation optimization problem can be formulated as minimizing the mean square error problem below:

$$\min_{(x_1, \ldots, x_n) \in R^2} \left\{ \sum_{(i,j) \in N} \gamma_{ij} \left| \|x_i - x_j\|^2 - d_{ij}^2 \right| + \sum_{(i,k) \in M} \gamma_{ik} \left| \|x_i - a_k\|^2 - d_{ik}^2 \right| \right\} \quad (4.4)$$

where $\gamma_{ij}$ is the given weight. In our study, we use $$\begin{cases} \gamma_{ij} = 1, & \text{all distance contraints are given equal weight,} \\ \gamma_{ij} = \dfrac{1}{d_{ij}}, & \text{weight is given in reverse proprotion to distance constraint,} \\ \gamma_{ij} = \dfrac{d_{ij}}{\sum d_{ij}}, & \text{weight is given based on the proportion of the distance constraint over the total distar.} \end{cases}$$

$X=[x_1, x_2, \ldots, x_n] \in R^{2 \times n}$ denotes the position matrix that needs to be determined. $A=[a_1, a_2, \ldots, a_m] \in R^{2 \times m}$ denotes the $i^{th}$ unit vector in $R^n$.

The Euclidean distance between two IPs is $\|x_i - x_j\|^2 = e_{ij}^T X^T X e_{ij}$, where $e_{ij} = e_i - e_j$.

The Euclidean distance between an IP and the landmark node is $\|x_i - a_j\|^2 = a_{ij}^T [X, I_d]^T [X, I_d] a_{ij}$, where $a_{ij}$ is the vector obtained by appending $-a_j$ to $e_i$.

Let $\epsilon = N \cup M$, $Y = X^T X$, $g_{ij} = a_{ij}$ for $(i,j) \in \mathcal{M}$ and $g_{ij} = [e_{ij}; 0_d]$ for $(i,j) \in \mathcal{N}$. Equation 4.4 can be written in matrix form as:

$$\min_{(i,j) \in E} \{\gamma_{ij} |g_{ij}^T [Y, X^T; X, I_d] g_{ij} - d_{ij}^2 : Y = X^T X\}, \quad (4.5)$$

Problem 4.5 is not a convex optimization problem. To relax the problem to a semidefinite program (SDP), the constraint $Y = X^T X$ is related to $Y \succeq X^T X$. Let $\mathcal{K} = Z: Z = [Y, X^T; X, I_d] \succeq 0$. The SDP relaxation of problem 4.5 can be written as SDP problem as in 4.6.

$$v^* := \min_{z \in \mathcal{K}} \left\{ g(Z; D) := \sum_{(i,j) \in E} \gamma_{ij} |g_{ij}^T Z g_{ij} - d_{ij}^2| \right\}. \quad (4.6)$$

To solve the above problem, we used CVX, a package for specifying and solving convex programs. The computational complexity of SDP is analyzed in [51]. To locate n IPs, the computational complexity is bounded by $O(n^3)$.

Test Results

In accordance with one embodiment of the present disclosure, the framework is implemented in MATLAB, Python and MySQL. Python was chosen because it provides the flexibility of C++ and Java. It also interfaces well with MATLAB and is supported by PlanetLab. The syntax facilitates developing applications quickly. In addition Python provides access to a number of libraries that can be easily integrated into the applications. Python works among different operating systems and is open source.

A database is essential for analyzing data because it allows the data to be sliced and snapshots of the data to be taken using different queries. In accordance with one embodiment of the present disclosure, MySQL was chosen, which provides the same functionality as Oracle and SQL Server provided, but is open source. MATLAB is a well-known tool for scientific and statistical computation which complements the previously mentioned tool selections choices.

Figure 38:
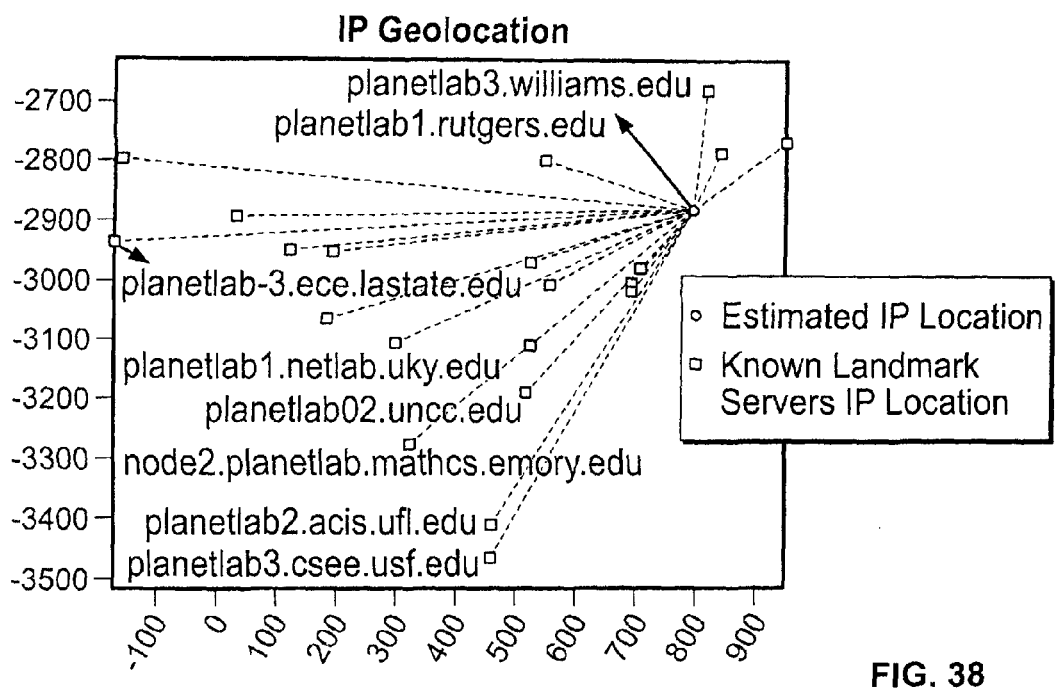
FIG. 38 is graph of location estimation of PlanetLab node planetlab1.rutgers.edu using an SDP approach.

In accordance with one embodiment of the present disclosure, CVX is used as the SDP solver. The regression polynomials for each landmark node were generated using data collected from PlanetLab. The model was tested using the PlanetLab nodes as destined IPs. The mean RTT from landmark nodes to an IP is used as the measured network delay to calculate distance. The estimated distance $\hat{d}_{ij}$ is input to the SDP as the distance between landmark nodes and IP. The longitude and latitude of each landmark is mapped to a coordinate in $R^2$, which is the component of position matrix X. FIG. 38 shows an example of the location calculated using the SDP-given delay measurements from a number of landmark nodes. The coordinates are mapped from the longitude and latitude of each geographic location. The squares represents the location of the landmark nodes. The circle represents the real location of the IP. The dot represents the estimated location using SDP.

Figure 39:
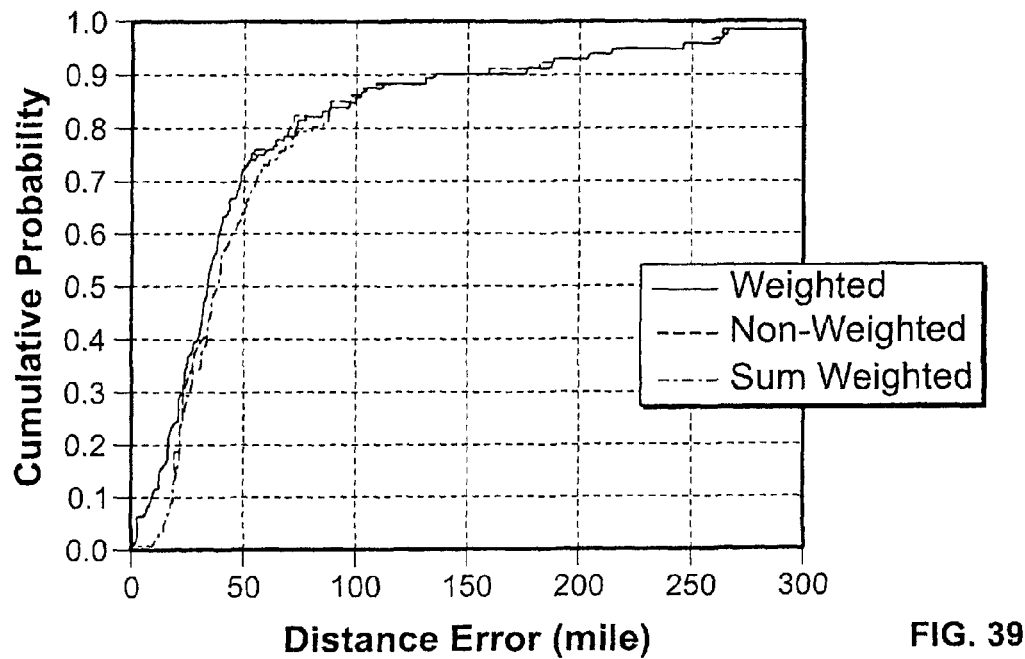
FIG. 39 is a graph of the cumulative distribution function (CDF) of distance error for European nodes using landmark nodes within 500 miles to centroid.
Figure 40:
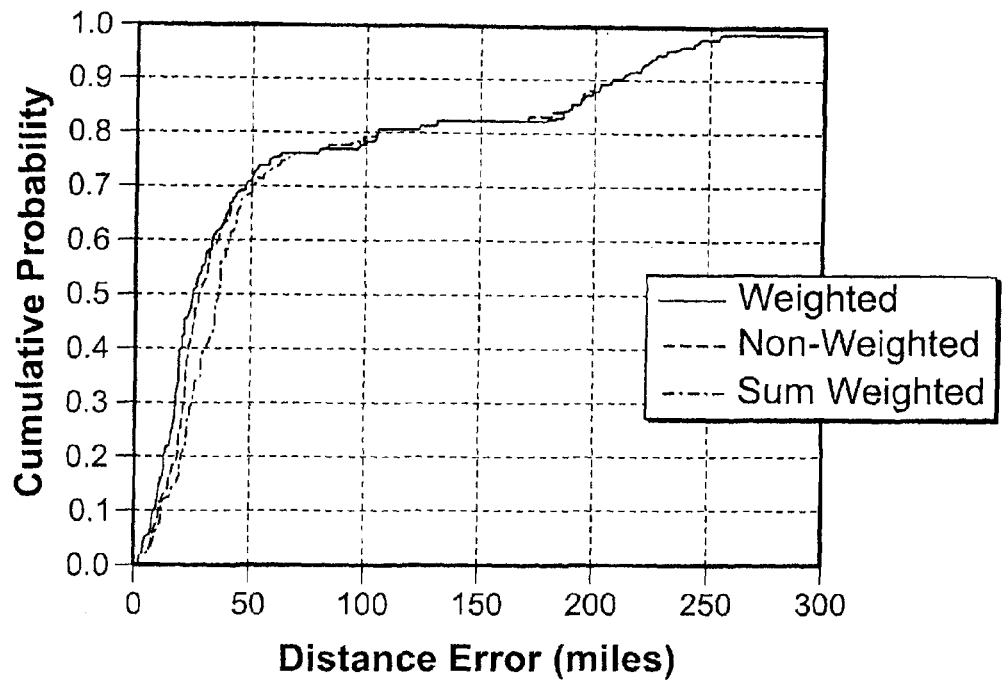
FIG. 40 is a graph—CDF of distance error for North American nodes using landmark nodes within 500 miles to centroid.

In this test, the results of locating an IP from multiple landmarks with three schemes are shown, namely non-weighted ($\gamma=1$), weighted ($\gamma=1/d_{ij}$) and sum-weighted ($\gamma=d_{ij}/\Sigma d_{ij}$) for the distance constraint in SDP. FIG. 39 shows the cumulative distribution function (CDF) of the distance error in miles for European nodes using landmark nodes within 500 miles to the region centroid. FIG. 40 shows the CDF of the distance error in miles for North American nodes using landmark nodes within 500 miles.

Figure 41:
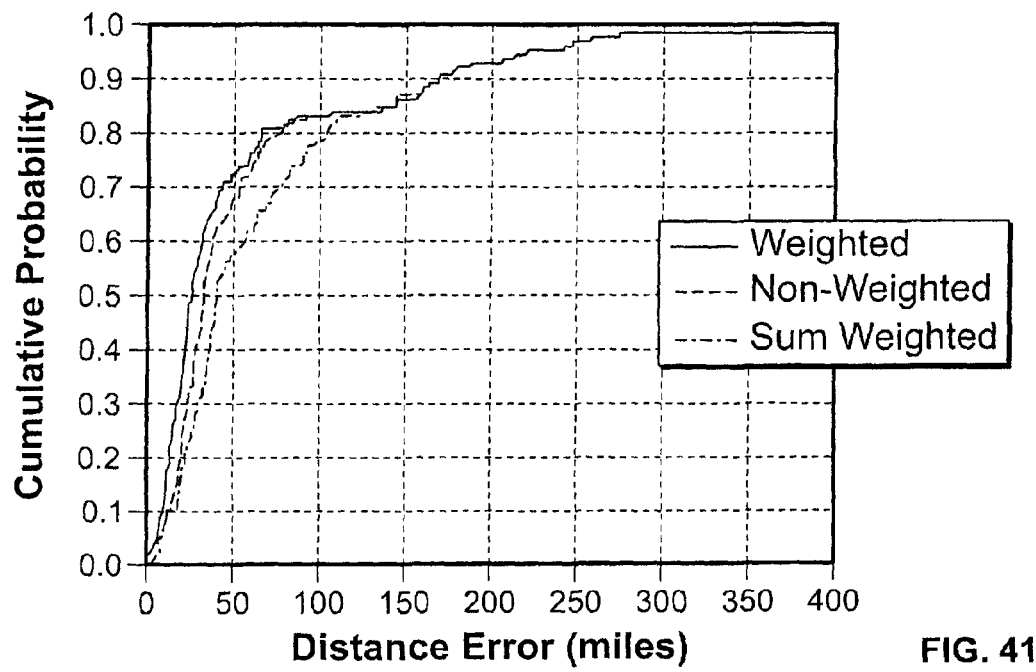
FIG. 41 is a graph—CDF of distance error for North American nodes using landmark nodes within 1000 miles to centroid.

FIG. 41 shows the CDF of the distance error in miles for European nodes using landmark nodes within 1000 miles. The results show that a weighted scheme is better than non-weighted and sum-weighted schemes. The test shows a 30 miles median distance error for European nodes using landmark nodes within 500 miles and 36 and 38 miles median distance errors for US PlanetLab nodes using landmark nodes within 500 and 1000 miles, respectively. The results of Applicants' segmented polynomial regression approach with the first order linear regression approach were compared using the same set of data.

Figure 42:
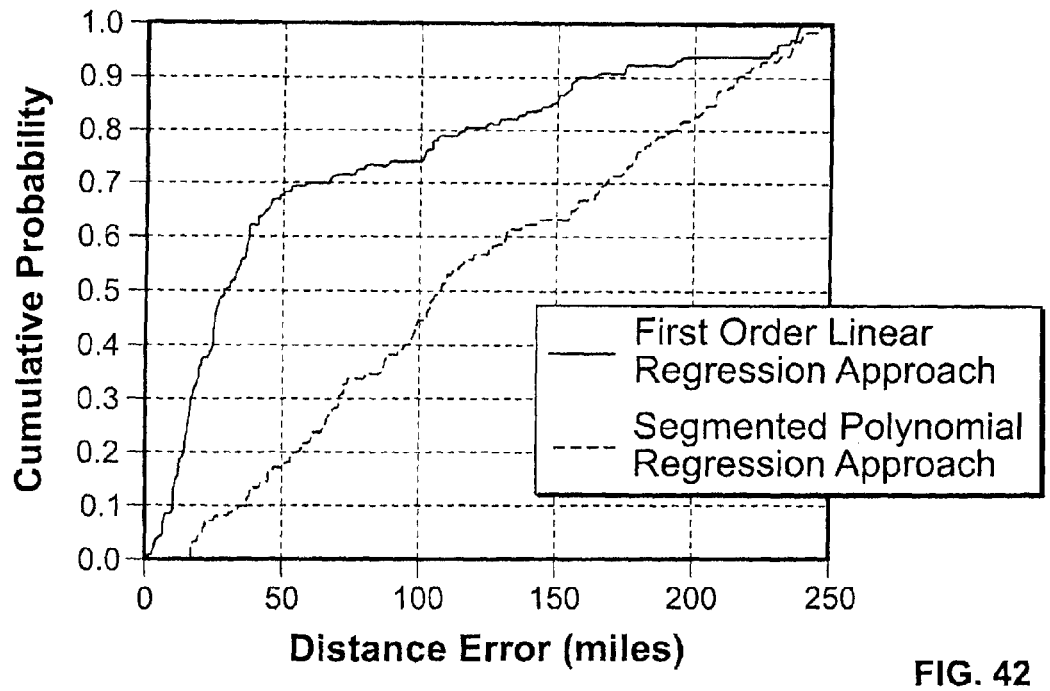
FIG. 42 is a graph—CDF of distance error for North American nodes using segmented regression lines and best line approaches.
Figure 43:
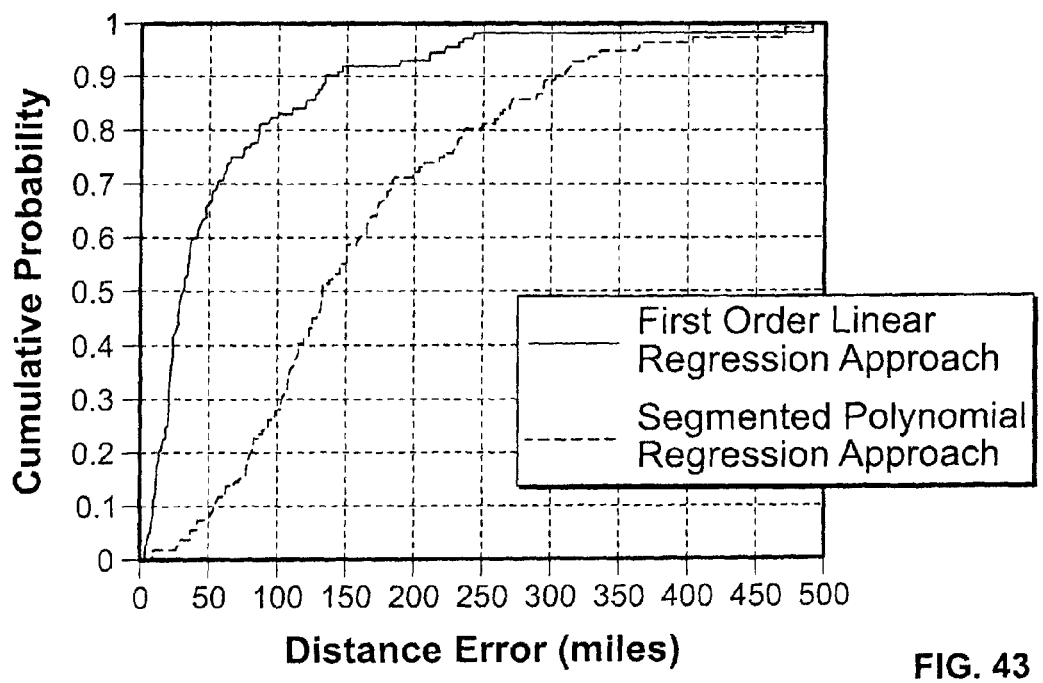
FIG. 43 is a graph—CDF of distance error for European nodes using segmented regression lines and best line approaches.

FIGS. 42 and 43 show the CDF comparison with the proposed segmented polynomial regression approach and the first order linear approach for the North American nodes and European nodes respectively. The results show significant improvement in error distance by Applicants' segmented polynomial regression approach over the first order linear regression approach.

Figure 44:
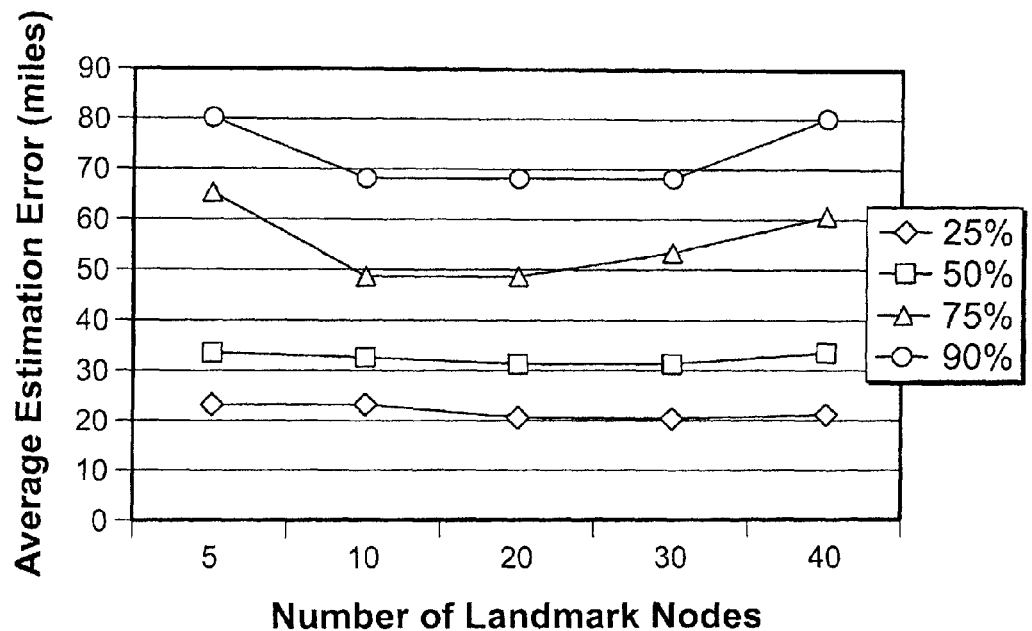
FIG. 44 is a graph of average distance error as a function of number of landmark nodes for European nodes.

FIG. 44 shows different percentile levels of distance error as a function of landmark nodes for North American nodes. It shows that the average distance error is less than 90 miles for all percentile levels. When the number of landmark nodes increases to 10, the average distance error becomes stable. Some increase in distance error happens at higher percentile when the number of landmark nodes increases to 40. This is because North America has a larger area and the selection of landmark nodes may be out of the chosen region of the cluster.

Figure 45:
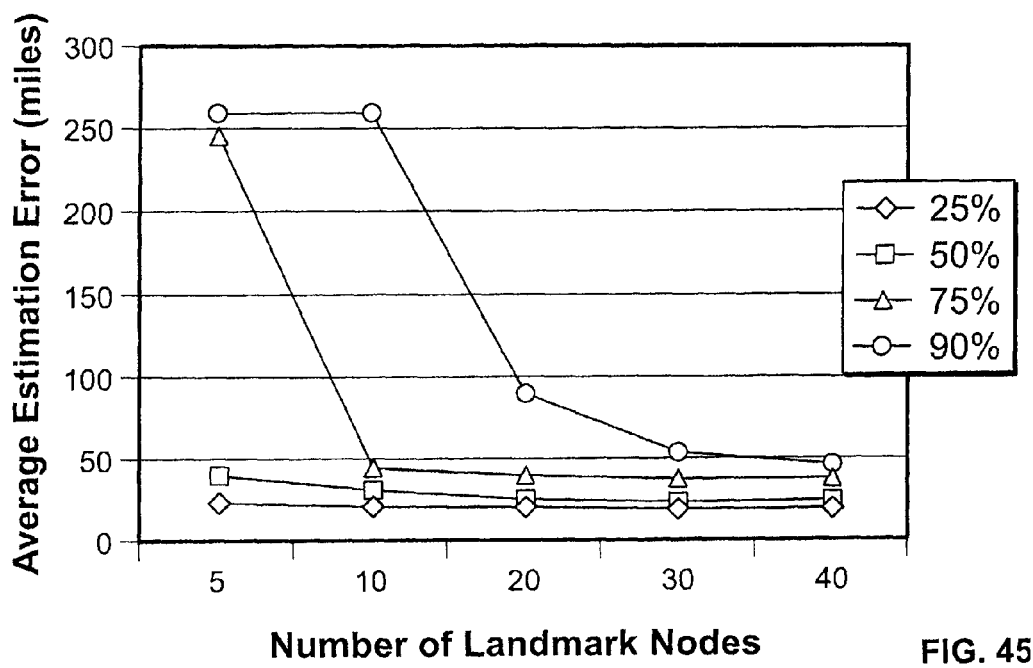
FIG. 45 is a graph of average distance error as a function of number of landmark nodes for European nodes.

FIG. 45 shows different percentile distance error as a function of landmark nodes for European nodes. It can be shown that the average distance error of percentile 75% and 90% are around 250 miles using 5 landmark nodes. When the number of landmark nodes increases to 20, the average distance error reduces significantly. Using 20 landmark nodes reduces the average distance error below 100 miles. The above results show significant improvements compared, e.g., to the results achieved by the Constraint-based Geolocation (CBG) in B. Gueye, A. Ziviani, M. Crovella, and S. Fdida, "Constraint-based geolocation of internet hosts," in *IEEE/ACM Transactions on Networking*, vol. 14, no. 6, December 2006.

Web Crawling for Internet Content

A web crawler can be used for many purposes. One of the most common applications in which web crawlers are used is with search engines. Search engines use web crawlers to collect information about information that is on public websites. When the web crawler visits a web page it "reads" the visible text, the associated hyperlinks and the contents of various tags. The web crawler is essential to the search engines functionality because it helps determine what the website is about and helps index the information. The website is then included in the search engine's database and its page ranking process.

Other applications associated with web crawlers may include linguists using a web crawler to perform a textual analysis such as determining what words are commonly used in the Internet. Market researchers may use a web crawlers in analyzing market trends. In most of these applications, the nature of these web crawlers is to collect information on the Internet. In accordance with one embodiment of the present disclosure, Applicants determine deceptiveness of web sites using Applicants' web crawler that gathers plain text from HTML web pages.

Web Crawler Architecture

Figure 46:
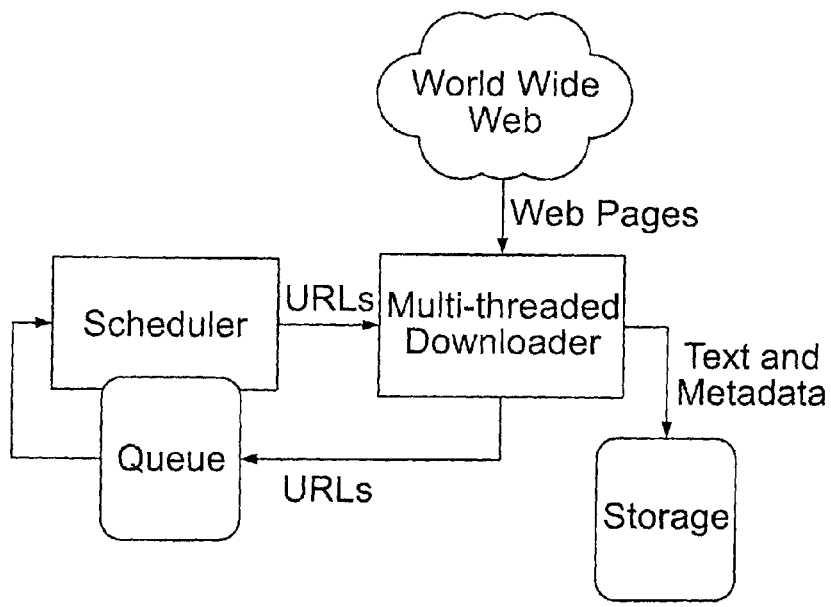
FIG. 46 is a schematic diagram of a Web crawler architecture.

The most common components of a crawler include a: queue, fetcher, extractor and content repository. The queue contains URLs to be fetched. It may be a simple memory based, first in, first out queue, but usually it's more advanced and consists of host-based queues, a way to prioritize fetching of more important URLs, an ability to store parts or all of the data structures on a disk and so on. The fetcher is a component that does the actual work of getting a single piece of content, for example one single HTML page. The extractor is a component responsible for finding new URLs to fetch, for example by extracting that information from an HTML page. The newly discovered URLs are then normalized and queued to be fetched. The content repository is a place where you store the content. This architecture is illustrated below in FIG. 46 and is described in M. Grant and S. Boyd, "Cvx: Matlab software for disciplined convex programming (web page and software)," November 2008. [Online]. Available: http://stanford.edu/boyd/cvx.

Common Web Crawling Algorithms

There are two important characteristics of the web that make Web crawling difficult:

(1) there are a large volume of web pages; and (2) the high rate of change of the web pages. A large number of web pages implies that the web crawler can only download a fraction of the web pages and hence it is beneficial that the web crawler is intelligent enough to prioritize download, as discussed in S. Shah, "Implementing of an effective web crawler," *Technical Report*, the disclosure of which is hereby incorporated by reference.

As to the rate of change of content, by the time the crawler is downloading the last page from a site, the page may have changed or a new page has been placed/updated to the site.

Shkapenyuk and Suel (Shkapenyuk and Suel, 2002) noted that: "While it is fairly easy to build a slow crawler that downloads a few pages per second for a short period of time, building a high-performance system that can download hundreds of millions of pages over several weeks presents a number of challenges in system design, I/O and network efficiency, and robustness and manageability, as discussed in S. V. and S. T, "Design and implementation of a high performance distributed crawler," in *Proceedings of 18th International Conference on Daa Engineering (ICDE)*, San Jose, USA, 2002, the disclosure of which is hereby incorporated by reference.

There are many types of web crawler algorithms that can be implemented in applications. Some of the common types are Path-Ascending crawler, Focussed Crawler, Parallel Crawler. Descriptions of these algorithms are provided below.

Path-Ascending Crawler

In accordance with one embodiment of the present disclosure, the crawler is to download as many resources as possible from a particular website. That way a crawler would ascend to every path in each URL that it intends to crawl. For example, when given a seed URL of http://foo.org/a/b/page.htmL it will attempt to crawl /a/b/, /a/, and /. The advantage with path-ascending crawler is that they are very effective in finding isolated resources. This 'is illustrated in Algorithm 2 above, and this was how the crawler for STEALTH was implemented.

Parallel Crawler

Figure 47:
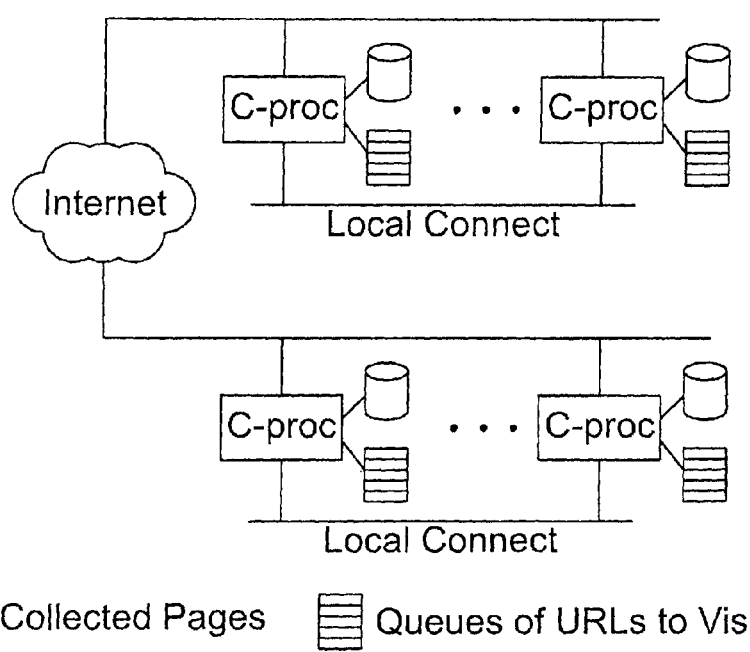
FIG. 47 is a schematic diagram of a parallel Web crawler.

The web is vast and it is beneficial to fetch as many URLs as possible. In the above technique of Path-Ascending Crawling it is difficult to sometimes break out of the URL. For example, in the URL above, http://foo.org/a/b/page.htmL if page.html has more links then the crawler may end up going deeper and deeper. With a parallel crawler each CPU on a cluster or server will start with its own pool of URLs. So processor 1 will have pool $u_1$, u2, $u_3$, . . . $u_n$ and processor n will have $u_1, u_2, u_3, \ldots u_r$. Potentially, URLs that are common to more than one CPU could be crawled between the processors but this is difficult to manage. FIG. 47 shows a parallel Web crawler Focussed Crawler The importance of a page for a crawler can also be expressed as a function of the similarity of a page to a given query. Web crawlers that attempt to download pages that are similar to each other are called focused crawler or topical crawlers. The concepts of topical and focused crawling were first introduced by F. Menczer, "Arachnid: Adaptive retrieval agents choosing heuristic neighborhoods for information discovery," in *Machine Learning: Proceedings of the 14th International Conference (ICML97)*, Nasville, USA, 1997; F. Menczer and R. K. Belew, "Adaptive information agents in distributed textual environments," in *Proceedings of the Second International Conference On Autonomous Agents*, Minneapolis USA, 1998 and by S. Chakrabarti, M. van den Berg, and B. Dom, "Focused crawling: a new approach to topic-specific web resource discovery," in *COMPUTER NETWORKS*, 1997, pp. 1623-1640, the disclosures of which are hereby incorporated by reference.

The main problem in focused crawling is that in the context of a web crawler, we would like to be able to predict the similarity of the text of a given page to the query before actually downloading the page. A possible predictor is the anchor text of links; this was the approach taken by E. Lazowska, D. Notkin, and B. Pinkerton, "Web crawling: Finding what people want," in *Proceedings of the First World Wide Web Conference*, Geneva, Switzerland, 2000, the disclosure of which is hereby incorporated by reference, a crawler developed in the early days of the web. Diligenti proposed to use the complete content of the pages already visited to infer the similarity between the driving query and the pages that have not been visited yet, as discussed in M. Dillegenti, F. Coetzee, S. Lawrence, C. Giles, and M. Gori, "Focused crawling using context graphs," in *In 26th International Conference on Very Large Databases, VLDB 2000*, 2000, pp. 527-534, the disclosure for which are hereby incorporated by reference.

The performance of a focused crawling depends mostly on the richness of links in the specific topic being searched, and a focused crawling usually relies on a general web search engine for providing starting points.

STEALTH Web Crawler Implementation

In accordance with one embodiment of the present disclosure, the search focus is on HTML extensions and avoid other content type such as mpeg, jpeg and javascript, and extract the plain text.

It is beneficial for the STEALTH engine is to have clean text as much as possible, so an HTML Parser is incorporated to extract and transform the crawled web page to a plain text file which is used as input to the STEALTH engine. Parsing HTML is not straightforward due to the fact that standards are not followed by those who create these pages. The challenge in removing text from HTML is identifying opening and self closing tags, e.g. <html> and attributes associated to the structure of an HTML page. In between tags there might be text data that we have to extract. Today, the enriched web applications that exist on many web pages contain java script. Java script allows the creation of dynamic web pages based on the criteria selected by users. Selecting a drop down on a web page will change the landscape of how the page is viewed, and may influence the content that is produced. This becomes an increasing challenge in stripping or parsing text from HTML.

In accordance with one embodiment of the present disclosure, the initial parameters for the execution of a web crawler can be a set of URLs (u1, u2, u3 . . . ), which are referred to as seeds. For each URL, 14 sets of links are obtained that would contain further set of hyperlinks, uik. Upon discovering the links and hyperlinks, they are recorded in the set of visited pages. This process is repeated on each set of pages and continues until there are no more pages or a predetermined number of pages have been determined. Before long, the Web Crawler discovers links to most of the pages on the web, although it takes some time to actually visit each of those pages. In algorithmic terms, the Web Crawler is performing a traversal of the web graph using a modified breadth-first approach. As pages are retrieved from the web, the Web Crawler extracts the links for further crawling and feeds the contents of the page to the indexer. This is illustrated by the pseudo code figure below.

Algorithm 3: Psuedo Code Web Crawler

```
Input: URLPool,DocumentIndex
while UrlPool not Empty do
|  url= pick URL from urlPool
|  doc=download url
|  newURLs=extract URLs from doc
|  Insert doc into documentIndex
|  Insert url into indexedUrls
|  foreach u in newURLs do
|  |  if u not in indexedUrls then
|  |  |  add u to UrlPool
|  |  end
|  end
end
```

Python Language Choice of Implementation

In accordance with one embodiment of the present disclosure, Python was chosen to implement the above algorithm. Python has an extensive standard library, which is one of the main reasons for its popularity. The standard library has more than 100 modules and is always evolving. Some of these modules include regular expression matching, standard mathematical functions, threads, operating systems interfaces, network programming and standard interne protocols.

In addition, there is a large supply of third-party modules and packages, most of which are also open source. One of the requirements for the crawler is to parse plain text from HTML. Python has a rich HTML Parser library. In addition, Python also seems to have a rich set of APIs that allow you to develop rich applications and interact with other software such as MATLAB and MySQL. It does not take many lines of code to do complicated tasks. Listed below is Python code for a web crawler in accordance with one embodiment of the present disclosure.

Web Crawl Implementation

```
if len(argv)>1:
    url-argv[1]
else:
    try:
        parent_url=raw_input('Enter starting URL:')
    except (Keyboardinterrupt, EOFError):
        parent_url="
if not parent_url:
    parent_url='http://newyork.craigslist.org/mnh/fns/
NonDomain_Urls.append(parent_url)
```

Web Crawl Implementation

```
While (NonDomain_Urls):
    NonDomainUrl=NonDomain_Urls.pop( )
    print "Processing Domain URL",NonDomainUrl
    Domain_Urls.append(NonDomainUrl)
    while (Domain_Urls):
        url=Domain_Urls.pop( )
        getPage(url,NonDomainUrl)
```

The process of extracting the links from a web page, generating the text, and storing the links in the MySQL database is shown in the following algorithm.

Get Page Implementation

```
def getPage(url;parent_url):
    //add to already crawled list
    already_crawled.append(url)
    links=RetrieveLinks(url)
    for link in links:
        for avoid in AvoidLinks:
            check='r'+avoid
            text=re.findall(checklink)
            If len(text)>0:
                position=links.index(link)
        for eachLink in links:
            if eachLink not in already_crawled:
                if find(eachLink.parent_url)==-1:
                    NonDomain_Urls.append(eachLink)
                    //...discarded, not in domain
                else:
                    if eachLink not in Domain_Urls:
                        //"Link Not In Q"
                        Domain_Urls.append(eachLink)
                        if EndsWithHTML(eachLink):
                            print eachLink
                            texttosave=RetrieveTextFromHTML(eachLink:
                            nameoffile=GetHTMLName(eachLink)+'txt'
                            SaveToMySQLdb(eachLink,nameoffile)
                            WriteExtractedFile(texttosave,nameoffile)
                //..new: added to Q
                else:
                    //print # discarded already in !
            else:
                //'...discarded l3redv processed'
```

Test Results

In order to effectively detect hostile content on websites, the deception detection algorithm is implemented in the system as seen in FIG. 19. A web crawler program is set to run on public sites such as Craigslist to extract text messages from web pages. These text messages are then stored in the database to be analyzed for deceptiveness. Upon discovering the links and hyperlinks, they were recorded in the set of visited pages. In a first test, 62,000 files were created and when run against the deception algorithm, 8,300 files were found to be deceptive while 53,900 where found to be normal. Although we do not know the ground truth of these files, the percentage of files found to be deceptive is reasonable for Craigslist.

While the crawling process is running, the URLs of the websites can be displayed on the screen, e.g.:

"Processing Domain URL http://newyork.craigslist.org/mnh/fns/1390189991.html
http://newyork.craigslistorg/mnh/fns/1390306169.html,"
etc.
and stored in a MySQL database and displayed on the screen, e.g.,
"No. spiderurl filename deceptive indicator deceptive level
1. http://newyorkcraigslist.org/mnh/fns/1390189991.html 1390189991.txt 0

2. http://newyork.craigslist.org/mnh/fns/1390306169.html 1390306169.txt 0"

and the deception algorithm will start processing the URLs using the locations stored in the MySQL database. The screen shows the storage of where the files are created and also the execution of the deception engine, e.g., "FILE NAME=1389387563.txt

FILE TYPE=DECEPTIVE

DECEPTIVE_CUE=social

DECEPTIVE_LEVEL=too high

FILE NAME=1389400325.txt

FILE TYPE=normal" etc.

Figure 48:
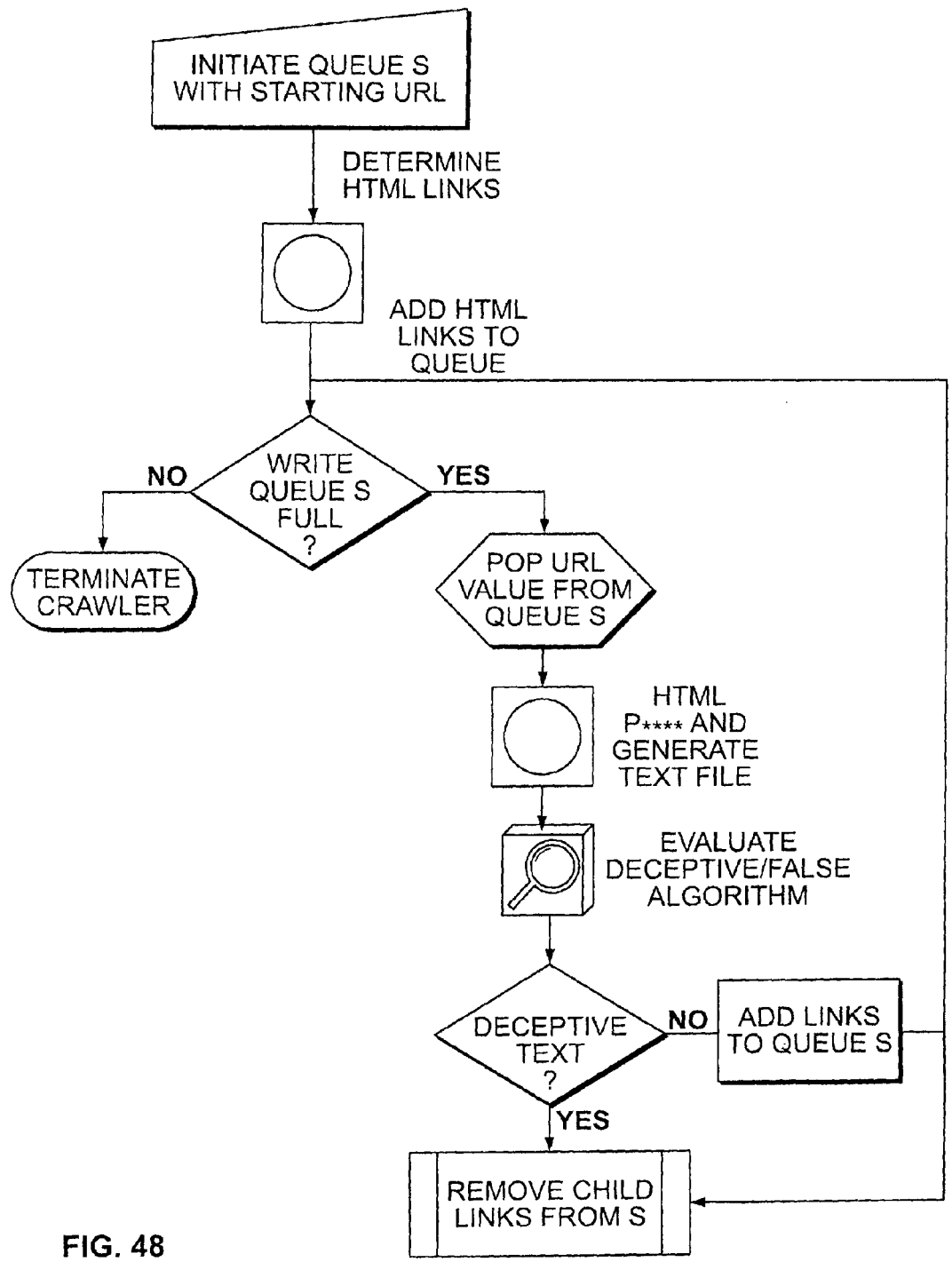
FIG. 48 is a flow chart of Web crawling and deception detection.

The overall process of deception and web crawling is shown in FIG. 48. Some of the issues that the crawler can encounter is being blocked by the Website, e.g. Craigslist and that the resources of the server are highly utilized. The deception component can be moved to another server to distribute utilization. An embodiment of the present disclosure can provide value to organizations in which there are a large number of postings that are likely to occur on a daily basis such as Craigslist, eBay, etc., since it is difficult for web sites like this to police the postings.

Figure 49:
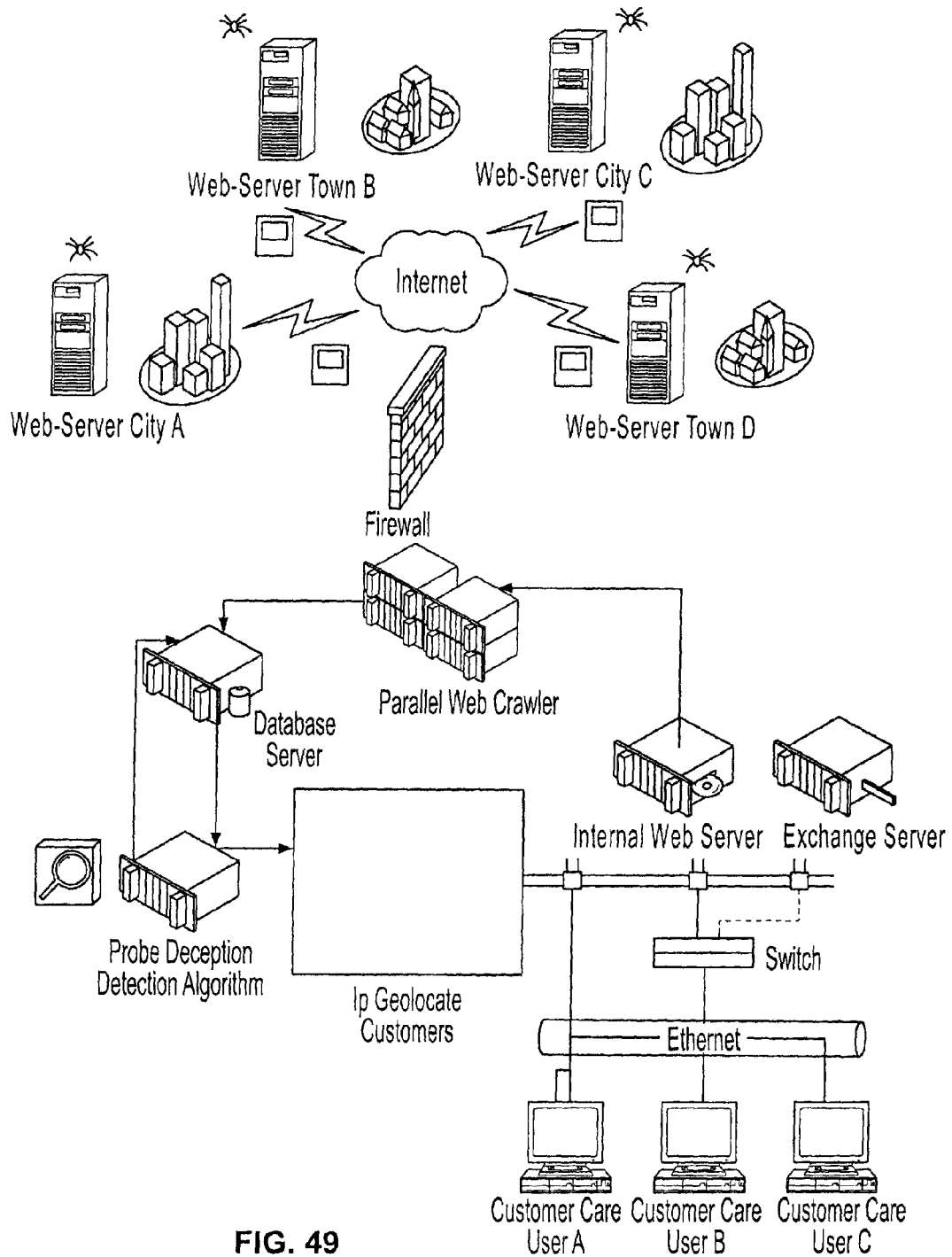
FIG. 49 is a schematic diagram of a deception detection architecture for large enterprises.

FIG. 49 shows an architecture in accordance with one embodiment of the present disclosure that would perform online "patrolling" of content of postings. As applied to Craigslist, e.g., the following operations could be performed:

(1) Parallel web crawl postings from many Craiglist sites.

(2) Determine geographic location of postings from IP addresses of users who posted content.

(3) Execute detection probe on crawled content.

(4) Identify potential threats and notify law enforcement officials for further investigation.

Implementing Web Services—STEALTH

In accordance with one embodiment of the present disclosure, Applicants' on-line tool STEALTH has the capability of analyzing text for deception and providing that functionality conveniently and reliably to on-line users. Potential users include government agencies, mobile users, the general public, and small companies. Web service offerings provide inexpensive, user-friendly access to information to all, including those with small budgets and limited technical expertise, which have historically been barriers to these services. Web services are self-contained, self-describing, modular and "platform independent." By designing web services for deception detection, this provides capacity to distribute the technology widely to entities where deception detection is vital in their operations. The wider the distribution, the more data that may be collected, which may be utilized to enhance existing training sets for deception and gender identification.

Overview of Web Services

The demand for web services is growing and many organizations are using them for many of their enterprise applications. Web services are distributed computing technology. Exemplary distributed computing technologies are listed below in Table 6.1. These technologies have been successfully implemented, mostly on intranets. Challenges associated with these protocols include the complexity of implementation, binary compatibility, and homogenous operating environment requirements.

TABLE 6.1

Distributed Computing Technology

| | | | |
|---|---|---|---|
| 1 | CORBA | Common Object Request Broker Architecture | Object Management Group(OMG) |
| 2 | IIOP | Internet Inter ORB Protocol | Object Management Group (OMG) |
| 3 | RMI | Remote Method Implementation | Sun Microsystems |
| 4 | DCOM | Distributed Component Object Mode | Microsoft |

Figure 50:
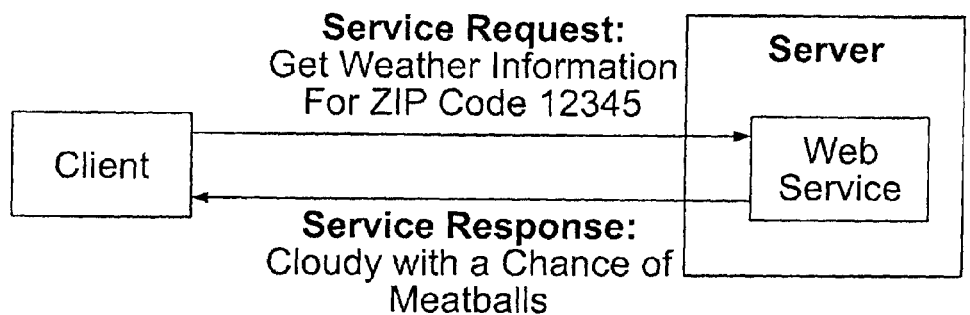
FIGS. 50 and 51 are schematic diagrams of Web service weather requests.

Web services provide a mechanism that allows one entity to communicate with another entity in a transparent manner. If Entity A wishes to get information, and Entity B maintains it, Entity A makes a request to B and B determines if this request can be fulfilled and, if so, sends a message back to A with the requested information. Alternatively, the response indicates that the request cannot be complied with. FIG. 50 shows a simple example of a the client program requesting information from a web weather service. Rather than the client developing a costly and complex program on its own, the client simply accesses this information via a web service, which runs on a remote server and the server returns the forecast.

Web services allow: (1) reusable application-components; and feature the ability to connect existing software, solving the interoperability problem by giving different applications a way to link their data; and (2) the exchange of data between different applications and different platforms.

Figure 51:
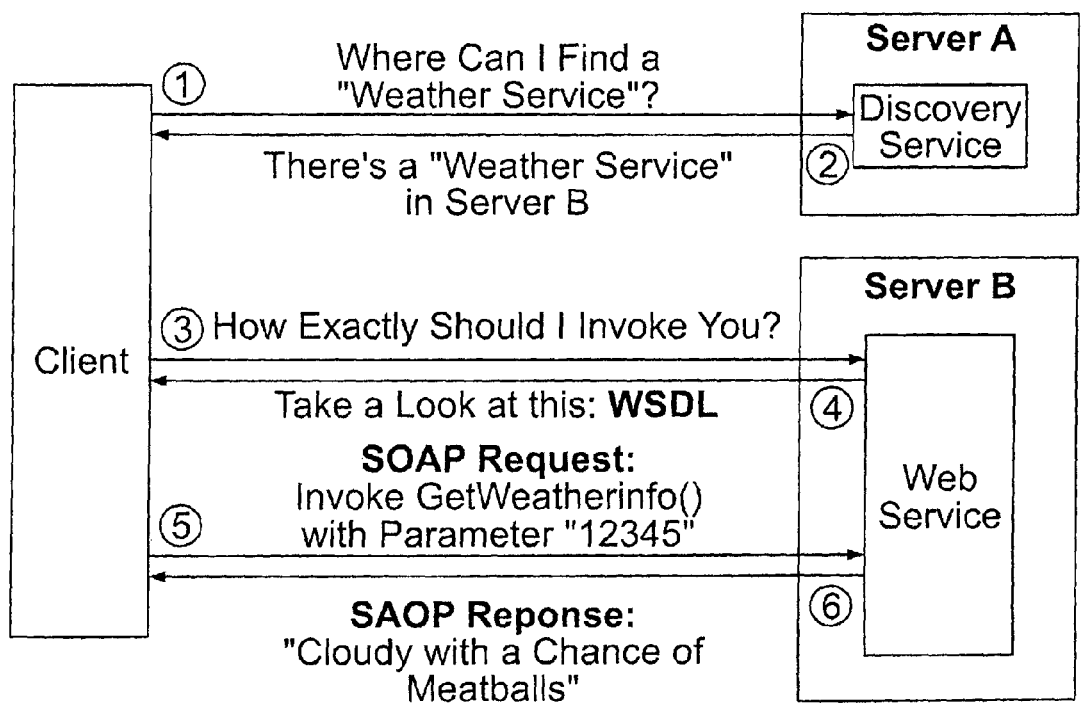

The difference between using a web browser and a web service is that a web page requires human interaction (humans interact with web pages), e.g., to book travel, post a blog, etc. In contrast, software interacts with web services. One embodiment of the present disclosure is described above, as using STEALTH to interact with web pages accessible on the Internet. In another embodiment of the present disclosure, one or more of the deception detection functions of the present disclosure is provided as a web service, which, for many entities, would be a more practical choice. FIG. 51 shows a more detailed web service mechanism of how a client program would request a weather forecast via a web service.

More particularly:

1. If the URL of the web service were not known, the first step will be to discover a web service that meets the client's requirements of a public service that can provide a weather forecast. This is done by contacting a discovery service which is itself a web service. (If the URL for the web service is already known, then this step can be skipped.)

2. If needed, the discovery service will reply, telling what servers can provide the service required. As illustrated, the web service from step 1 has informed that Server B offers this service, and since web services use the HTTP protocol, a particular URL would be provided to access the particular service that Server B offers.

3. If the location of a web service is known, the next necessary information is how to invoke the web service. Using the example of seeking weather information for a particular city, the method to invoke might be called "string getCityForecast(int CityPostalCode)," but it could also be called "string getUSCityWeather(string cityName, bool is Farenheit)." As a result, the web service must be asked to describe itself (i.e, tell how exactly it should be invoked).

Looking at another illustrative analogy that illustrates the above example. One could consider the problem of a friend who needs to be picked up from the airport. As the host, you might need certain information, such as the airport to which your friend is flying: LGA, EWR, JFK and you need the flight number, time, etc. Illustrated below in Table 6.2 is an illustration of a friend requesting a ride from the airport. This shows the Actor being the Friend (the client) and the Host is acting like the Server, as well as a description of the request and the implementation. The web service replies in a language called WSDL. In Step 3, the WSDL would have provided more details on the method implementation: "Provide Flight Details (airport, time, airline, and flight no.) to the client, calling for attribute types, such as "string," "int," etc.

TABLE 6.2

Web Service Ride from Airport Request

| Step | Actor | Request | Invocation Method |
|---|---|---|---|
| 1 | Friend | Need ride from airport on 27th of May | PickMeUpFromAirport(date) |
| 2 | Host | Provide flight details: time, airport, flight no, airline | ProvideFlightDetails(airport, time, airline, flightno) |
| 3 | Friend | Newark on Air Canada Flight 773 at 6:30 PM | ProvideFlightDetails(EWR, 1830, AC, 773) |

After learning where the web service is located and how to invoke it, the invocation is done in a language called SOAP. As an example, one could send a SOAP request asking for the weather forecast of a certain city. A suitable web service would reply with a SOAP response which includes the forecast asked for, or maybe an error message if the SOAP request was incorrect. Table 6.3 illustrates the possible responses from the host in the ride-from-the-airport example. Typical responses would be "Yes, I will pick you up," "I will be parked outside arrivals," or "I cannot make it please take a cab or my friend will be outside to pick you up."

TABLE 6.3

Web Service Ride Response from host

Response From Host

Sorry I have a meeting take a cab to my address 110 Washington St Hoboken NJ use this number 555-5555 for pickup Sure I will be able to pick you up Meet Me in the Departure Level of Terminal A Door I I will be in a Honda Civic
I can't make it but my friend Lin will pick you up. He will be waiting outside the security area

XML

XML is a standard markup language created by the World Wide Web Consortium (W3C), the body that sets standards for the web, which may be used to identify structures in a document and to define a standard way to add markup to documents. XML stands for eXtensible Markup Language. Some of the key advantages of XML are: (1) Easy data exchange—it can be used to take data from a program like MSSQL (Microsoft SQL), convert it into XML, then share that XML with other programs and platforms. Each of the receiving platforms can then convert the XML into a structure the platform uses, allowing communication between two platforms which are potentially very different; (2) Self-describing data; (3) the capability to create unique languages—XML allows you to specify a unique markup language for specific purposes. Some existing XML-based languages include: Banking Industry Technology Secretariat (BITS), Bank Internet Payment System (BTPS), Financial Exchange (IFX) and many more. The following code illustrates an XML-based mark-up language for deception detection.

XML Structure Deception of Crawled Websites

```
<?xml version="1.0" encoding="UTF-8"?>
<crawledsites>
    <site>
        <deceptiveindictor>Normal</deceptive indicator>
        <deceptivecue>Normal</deceptivecue>
        <deceptivelevel>Normal</deceptivelevel>
        <url>http://www.nfl.com/redskins/cambell</url>
    </site>
    <site>
```

-continued

XML Structure Deception of Crawled Websites

```
        <deceptiveindictor>Normal</deceptiveindicator>
        <deceptivecue>Normal</deceptivecue>
        <deceptivelevel>Normal</deceptivelevel>|
        <url>http://www.quackit.com/xml/tutorial</url>
    </site>
</crawledsites>
```

This XML file is generated from the MySQL database in STEALTH. The structure is based on determining deceptiveness on crawled URLs. Each markup is identified by the tags <site>. This XML file could, e.g., be sent to another entity that wants information concerning deceptive URLs. The other entity may not have the facility to web crawl and perform deception analysis on the URLs, however, if the required XML structure or protocol is set up, then the XML file could be parsed and the resultant data fed into the inquiring entity's relational database of preference. This example illustrates a structural relationship to HTML. HTML is also markup language, but the key difference between HTML and XML is that an XML structure is customizable. HTML utilizes 100 pre-defined tags to allow the author to specify how each piece of content should be presented to the end user.

HTTP Web Service

HTTP web services are programmatic ways of sending and receiving data from remote servers using the operations of HTTP directly. Table 6.4 shows the services that can be performed via HTTP.

TABLE 6.4

HTTP Service Operations

| HTTP TYPE | Description |
|---|---|
| GET | Receive Data |
| POST | Send Data |
| PUT | Modify Data |
| DELETE | Delete Data |

HTTP services offer simplicity and have proven popular with the different sites illustrated below in Table 6.5. The XML data can be built and stored statically, or generated dynamically by a server-side script, and all major languages include an HTTP library for downloading it. The other convenience is that modern browsers can format the XML data in a manner in which you can quickly navigate.

TABLE 6.5

Examples pure-XMP HTTP services

| Organization | Service Offering |
|---|---|
| Amazon API | Retrieve product information from the Amazon.com online store. |
| National Weather Service (United States) | Offers weather alerts as a web service |
| Atom API | Manages web-based content |
| Syndicated feeds from weblogs and news sites | Brings you up-to-the-minute news from a variety of sites. |

The problem with HTTP and HTTPS relative to web services is that these protocols are "stateless," i.e., the interaction between the server and client is typically brief and when there is no data being exchanged, the server and client have no knowledge of each other. More specifically, if a client makes a request to the server, receives some information, and then immediately crashes due to a power outage, the server never knows that the client is no longer active.

SOAP Web Service

SOAP is an XML-based packaging scheme to transport XML messages from one application to another. It relies on other application protocols such as HTTP and Remote Procedure Call (RPC). The acronym SOAP stands for Simple Object Access Protocol which was the original protocol definition. Notwithstanding, SOAP is far from simple and does not deal with objects. Its sole purpose is to transport or distribute the XML messages. SOAP was developed in 1998 at Microsoft with collaboration from UserLand and DevelopMentor. An initial goal for SOAP was to provide a simple way for applications to exchange Web Protocol data.

SOAP is a derivative of XML as well as XML-RPC and provides the same effect as earlier distributing technologies such as CORBA, IIOP, RPC. SOAP is text-based, however, which makes working with SOAP easier and more efficient because it is quicker to develop and easier to debug. Since the messages are text based, processing is easier. It is important to note that SOAP works as an extension of HTTP services.

As described above, services can retrieve a web page by using HTTP GET, and to submit data HTTP uses HTTP POST. SOAP is an extension to these concepts. SOAP uses these same mechanics to send and receive XML messages, however, the web server needs a SOAP Processor. SOAP processors are evolving to support Web Services Security Standards. The use of SOAP it depends on the specific web service application. SOAPless solutions work for the simplest web services. There are many publicly available web services listed on XMethods, or searchable on a UDDI registry. Most web services currently provide only a handful of basic functions, such as retrieving a stock price, obtaining a dictionary word definition, performing a math function, or reserving an airline ticket. All those activities are modeled as simple query-response message exchanges. HTTP was designed as an effortless protocol to handle just such query-response patterns—a reason for its popularity. HTTP is a fairly stable protocol and it was designed to handle these types of requests. Simple web services can piggyback on HTTP's mature infrastructure and popularity by directly sending business-specific XML messages via HTTP operations without an intermediary protocol.

SOAP is needed for web-accessible APIs that are not a series of message exchanges. In general, the less complex the application, the more practical to use HTTP Web Services. It is not practical to have an API that has a single method with that method consuming one parameter and returning an int, string, decimal or some simple value type. In that case it is better to implement an HTTP web service. Both SMTP and HTTP are valid application layer protocols used as Transport for SOAP, but HTTP has gained wider acceptance since it works well with today's Internet infrastructure, in particular, network firewalls. To appreciate the difference between HTTP and SOAP consider the structure of SOAP, which features an envelope, a header and a body.

The SOAP Envelope is the top-level XML element in a SOAP Message. It indicates the start and end of a message, and defines the complete package. SOAP Headers are optional, however, if a header is present, it must be the first child of the envelope. SOAP Headers may be used for to provide security, in that a sender can require that the receiver understand a header. Headers speak directly to the SOAP processors and can require that the processor reject the entire SOAP message if it does not understand the header. The SOAP Body is the main data payload of the message. It contains the information that must be sent to the ultimate recipient. and is the place where the XML document of the application initiating the SOAP request resides.

For a Remote Procedure Call, the body contains the method name, arguments and a web service. In figure FIG. 6.5 below we can see this is a RPC with method name={analyzetext}, argument={I can give you a loan interest free just call me at (212) 555-5555} which is a text to be analyzed and web service={www.stevens.edu/deception/myservices}. The capability to execute an RPC is a key SOAP feature that plain XML over HTTP does not possess.

SOAP Request

```
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body xmlns:m="http://www.stevens.edu/deception/myservices">
<m:analyzetext>
```

SOAP Request

```
<m:data>I can give you a loan interest free just all me at (212)555-5555
</m:data>
</m:analyzetext>
</soap:Body>
<soap:Envelope>
```

The SOAP Response has the same structure as the SOAP Request. The response structure shown in FIG. 6.6 uses a naming convention that easily identifies this as a response.

SOAP Response

```
<?xml version="1.0"?>
<soap:Envelope
xmlns:soap="http://www.w3.org/2001/12/soap-envelope"
soap:encodingStyle="http://www.w3.org/2001/12/soap-encoding">
<soap:Body xmlns:m="http://www.stevens.edu/deception/myservices">
<m:analyzetextresults>
<m:result>deceptive/you/too high</m:result>
</m:analyzetextresults>
</soap:Body>
```

WSDL

WSDL is an XML-based language for describing web services and how to access them. The acronym stands for Web Services Description Language. It is XML based and is used to locate where web services are and how to access them. Table 6.6 shows the layout of WSDL. The first part of the structure is <definitions> and establishes the namespaces.

TABLE 6.6

WSDL Structure

| | |
|---|---|
| <types> | Data Types Used By the Service to maintain neutrality among platforms it uses XML syntax to define data types |
| <message> | The Messages Used By The Service similar to the parameters of a method call |
| <portType> | Operations Performed By Web Service key in defining the web service through defining web service, operations and messages |
| <binding> | Communication Protocols Used by the Web Service |

In accordance with one embodiment of the present disclosure, a WSDL structure for Deception Detection Services, is illustrated below in FIG. 6.7.

STEALTH Web Services Implementation

```
class MyWSController (WebServicesRoot) :
    @wsexpose (str)
    @wsvalidate (str)
    def detect_text (self, data) :
        result=ValidateTextMatlabEXE (data, ' webservice ')
        return result
    @wsexpose (str)
    @wsvalidate (str)
    def detect_gender (self, data) :
        inputfilename=' webservice ' + ' .txt '
        WriteExtractedFile (data, inputfilename)
        filename=SETPATH+"\ \ "+inputfilename
        featuredtextlocation=GENDERPATH+"\ \ "+"featuredtext_"+inputfilename
        gender.GenerateFeatureValueText ( inputfilename)
        featuredtextlocation=GENDERPATH+"\ \ "+"featuredtext_"+inputfilename
        result=ValidateTextForGender (featuredtextlocation)
        values=result . split ('\n')
        return values
    @wsexpose (str)
    @wsvalidate (str, str)
    def GetLatLon (self, location1, location2) :
        lat, lon=yahoo.GetLatLonCoordinates ( location1, location2 )
        coordinate=str ( lat) +' , '+str( lon)
        return coordinate
class Root (controllers. RootController) :
    myservices = MyWSController ( 'http://stevens.edu/deception/myservices/ ' )
```

WSDL is essential for XML/SOAP services. In object modeling tools such as Rational Rose, SELECT, or similar design tools, when class objects are defined with methods and attributes, these design tools can also generate C++ or Java Method Stubs so the developer knows the constraints he or she is dealing with in terms of the methods of implementation. Likewise WSDL creates schema for the XML/SOAP objects and interfaces so developers can understand how the web services can be called. It is important to note that SOAP and WSDL are dependent; that is, the operation of a SOAP service is constrained to the definition defined in the input and output messages of WSDL.

WSDL contains XML schemes that describe the data so that both the sender and receiver understand the data being exchanged. WSDLs are typically generated by automated tools that start with the application meta data that are transformed into XML Schemas and are then merged into the WSDL File.

UDDI

UDDI stands for Universal Description and Discovery and Integration. In the more elaborate weather forecast example described above, described the discovery of web services was described. This is a function of UDDI, viz., to register and publish web services definitions. A UDDI repository manages information about service types and service providers and makes this information available for web service clients. UDDI provides marketing opportunities, allowing web service clients to discover products and services that are available and describing services and business processes programmatically in a single, open, and secure environment.

In accordance with an embodiment of the present disclosure, if deception detection was registered as a service with UDDI then other entities could discover the service and use it.

Restful Web Service

Representational State Transfer (REST) has gained widespread acceptance across the web as a simpler alternative to SOAP- and Web Services Description Language (WSDL)-based web services. Web 2.0 service providers, including Yahoo and Twitter have declined to use SOAP and WSDL-based interfaces in favor of an easier-to-use to access to their services. In accordance with one embodiment of the present disclosure, an implementation of deception detection for Twitter Social Networking, described more fully below, uses REST Services. Restful web services strictly use the HTTP Protocol. The core functionality of Restful Services are illustrated in the following table.

TABLE 6.7

Restful Service Function Calls

| Function | Description |
|---|---|
| GET | Retrieve a Resource |
| POST | To Create a resource |
| PUT | To Change the State of a resource or to update it |
| REMOVE | To remove or delete a resource |

What follows is an example of how a deception detection system in accordance with one embodiment of the present invention could use Restful APIs in the framework. Design principles establish a one-to-one mapping between create, update, and delete (CRUD) operations and HTTP methods.

Listing 3. HTTP GET request
GET /ClosestProxies/ip HTTP/1.1
Host: myserver
Accept: application/xml Proxy servers may be incorporated into an embodiment of the present disclosure. Restful Web Service may be utilized to return the closest server to which the client can then make the request. This also helps to distribute the load. Restful Services may also be employed in Applicants' Twitter Deception Detection Software which is described below.

Implementation

In accordance with one embodiment of the present disclosure, the web service solution may be implemented using TurboGears (TG). In one embodiment, the web services included deception detection, gender identification, and geolocation and could be invoked from an iPhone. TurboGears (TG) web services provides a simple API for creating web services that are available via SOAP, HTTP→XML, and HTTP→JSON. The SOAP API generates WSDL automatically for Python and even generates enough type information for statically typed languages (Java and CSharp, for example) to generate good client code. TG web services: (1) support SOAP, HTTP+XML, HTTP+JSON; (2) can output instances of your own classes; (3) works with TurboGears 1.0 and was reported to work with TurboGears 1.1.

STEALTH Web Services Implementation

```
class MyWSController (WebServicesRoot) :
    @wsexpose (str)
    @wsvalidate (str)
    def detect_text (self, data) :
        result=ValidateTextMatlabEXE (data, ' webservice ')
        return result
    @wsexpose (str)
    @wsvalidate (str)
    def detect_gender (self, data) :
        inputfilename=' webservice ' + ' .txt '
        WriteExtractedFile (data, inputfilename)
        filename=SETPATH+"\ \ "+inputfilename
        featuredtextlocation=GENDERPATH+"\ \ "+"featuredtext_"+inputfilename
        gender.GenerateFeatureValueText ( inputfilename)
        featuredtextlocation=GENDERPATH+"\ \ "+"featuredtext_"+inputfilename
        result=ValidateTextForGender (featuredtextlocation)
        values=result . split ('\n')
        return values
    @wsexpose (str)
    @wsvalidate (str, str)
    def GetLatLon (self, location1, location2) :
        lat, lon=yahoo.GetLatLonCoordinates ( location1, location2 )
        coordinate=str ( lat) +' , '+str( lon)
        return coordinate
class Root (controllers. RootController) :
    myservices = MyWSController ( 'http://stevens.edu/deception/myservices/ ')
```

The implementation of TG web services is illustrated above. The instantiation or declaration of the web services is highlighted in the rectangular box. The implementation is straightforward; it reuses the existing modules which the STEALTH website uses, which is why the code is very simple. The @wsexpose decorator is the return value of the web service, and the @wsvalidate are the input parameters which are passed from the client to the web service. The following Table shows the methods, inputs, and below that an example of invocation of the service is provided.

TABLE 6.8

STEALTH Web Service Functions

| Method | Input Parameter Name(s) | Input Parameter Type |
| --- | --- | --- |
| detect_gender | data | String |
| detect_text | data | String |
| GetLatLon | location 1, location 2 (Optional) | String, String |

1. detect_gender

{data}=As we discussed yesterday, I am concerned there has been an attempt to manipulate the El Paso San Juan monthly index. A single buyer entered the marketplace on both September 26 and 27 and paid above market prices (4.70-4.80) for San Juan gas with the intent to distort the index At the time of these trades, offers for physical gas at significantly (10 to 15 cents) lower prices were bypassed in order to establish higher trades to report into the index calculation.

2. detect_text

{data}=ff you're reading this, you're no doubt asking yourself, 'Why did this have to happen?' "the message says. "The simple truth is that it is complicated and has been coming for a long time.

3. GetLatLon flocationll=nyc flocation21.""

In accordance with the foregoing, the web services can be accessed by any language and operating system. The client programs access the services using HTTP, which has the underlying transport. Should the services be accessed by businesses or government agencies, then the requests should be able to pass through corporate firewalls. In generating output to the iPhone, the services return XML so that the clients can parse the results from XML and display. As described below, a call to the geolocation service (the GetLatLon web service), the detect_gender and/or detect_text service, XML is also be generated and can optionally be invoked and the results reviewed on an iPhone or other digital device.

Modern systems rely on application servers to act as transaction-control managers for various resources involved in a transaction. Most databases and messaging products, and some file systems, support open Group's XA specification. The goal of XA is to allow multiple resources (such as databases, application servers, message queues, etc.) to be accessed within the same transaction. The web services model suffers from a lack of any XA-compliant, two-phase commit resource controllers. Several groups have begun work on defining a transaction-control mechanism for web services, as discussed in Overcoming web services challenges with smart design. [Online]. Available: http://soa.sys-con.com/node/39458, the disclosure of which is hereby incorporated by reference.

The mechanisms these groups have been working are: (1) OASIS: Business Transaction Protocol; (2) ebXML: Business Collaboration Protocol; and (3) Tentative Hold Protocol. In general, a web service invocation will take longer to execute that an equivalent direct query against a local database. The call will be slower due to the HTTP overhead, the XML overhead, and the network overhead to a remote server. In most cases, applications and data providers aren't optimized for XML transport, but are translating data from a native format into an XML format, as discussed in Overcoming web services challenges with smart design. [Online]. Available: http://soa.sys-con.com/node/39458, the disclosure of which is hereby incorporated by reference.

Read-only web services that provide weather forecasting, and stock quotes provide reasonable response, but for transactions that require a purchase in which banking and or credit card information is provided, it is preferred that the web services support a retry or status request to assure the customer that their transaction is complete. The lack of a two-phase approach is a big challenge facing web services in these types of transactions. In accordance with one embodiment of the present disclosure, web service processing time is less than 5 seconds (taking into account the complexity of the algorithm, and the use of MATLAB). This is a modest amount of time considering the intense numerical computation that is involved, which is a far more sophisticated service request than getting a stock quote. One embodiment of a web service n accordance with the present disclosure provides the analysis of text for to determine the gender of the author. One approach to accomplish time efficiency is to remove the database transaction layer and use the processing time for evaluating the text. Another approach is to reduce the XML overhead. In one embodiment, when the service is called a simple XML result is returned which reduces the burden of transport over the network and the client time of parsing and evaluating the XML object. Other alternatives include implementing the detection algorithm(s) implemented in Object C and eliminating the use of MATLAB. In that instance, a database transaction to capture user information and an authentication mechanism may be added. In accordance with an embodiment of the present disclosure, the web service may be invoked by an nInternet Browser, e.g., to invoke the geolocation function, which returns a latitude, longitude of the IP location.

Deception Detection in Social Networks

With the dramatic increase in the spread and use of social networking, the threat of deception grows as well. One embodiment of the present disclosure, provides the function of analyzing deception in social networks. To this end Application Programming Interfaces (APIs) for the social networks of Twitter and Facebook that could easily be integrated into the system were identified. Preferably, the APIs are not complicated to use and require minimum to zero configuration. Further, the API should be supported by the social network or has a large group of developers that are actively using the API in their applications. For evaluating text for deceptiveness, social network APIs that extract the following information would be of interest: (1) Tweets from Twitter; (2) User Profile from Twitter; (3) Read Wall Posts for Users in Facebook; and (4) Blogs for Groups in Facebook.

Social Networking APIs

APIs provide the "black box" concept for software developers to simply call a method and return an output. The developer does not have to know the exact implementation of the method. The method signature is more than sufficient for the developer to proceed. Applicants identified Facebook and Twitter as candidates for APIs.

Facebook

The Facebook API for Python called minifb has minimal activity and support in the Python community, and currently it is not supported by Facebook. Microsoft SDK has an extensive API which is supported by Facebook and allows development of Facebook applications in a .NET Environment. Python, Microsoft, and other APIs require authentication to Facebook to have a session and token so the API methods can be invoked.

Twitter

Twitter has excellent documentation on the API and support for Python. This API also has the ability to query and extract tweets based on customized parameters leading to greater flexibility. For example, tweets can be extracted by topic, user and date range. Listed below are some examples of tweet(s) retrieval, as discussed in Twitter api documentation. [Online]. Available: http://apiwilci.twitter.com/TwitterAPI-Documentation, the disclosure of which is hereby incorporated by reference.

Search Tweets by Word http://search.twitter.com/search.atom?q=twitter.

Search on Tweets Sent from User http://search.twitter.com/search.atom?q=from%hoboro Twitter and Facebook use Restful Web Services, (Representational State Transfer—REST), described above. Facebook's API requires authentication, whereas Twitter does not. This feature of Twitter's Restful Web Service results in a thin client web service which can be easily implemented in a customized application. A negative attribute of Twitter is the rate limit. One of the aspects of the present disclosure, along with analyzing the deceptiveness of tweets, is to determine geographic location. User Profile Information from the tweet is only allowed at 150 requests per hour. A request to have an IP on a server whitelisted may result in an allowance of 20,000 transactions per hour. Recently, Yahoo and Twitter are collaborating in geolocation information. Twitter is going to be using Yahoo's Where on Earth IDs (WOEIDs) to help people track trending topics. WOEID 44418 is London and WOEID 2487956 is San Francisco, as discussed in Yahoo geo blog woeids trending on twitter. [Online]. Available: http://www.ygeoblog.com/2009/11/woeids-are-trending-on-twitter/, the disclosure of which is hereby incorporated by reference.

If the tweets contain this WOEID then the rate limit will be a non-factor.

Python has an interface to Twitter called twython that was implemented in an embodiment of the present disclosure. The API methods for twython are listed in table 7.1.

TABLE 7.1

Python Twitter API Calls

| Method | Description |
| --- | --- |
| searchTwitter | Searches on topic and retrieve tweets |
| showUser | Returns the User Profile |

Detecting Deception on Twitter

In accordance with one embodiment of the present disclosure, an objective for detecting deception on Twitter is to determine the exact longitude and latitude coordinates of the twitter ID, the individual who sent the tweet. The location of Twitter users can be obtained by calling ShowUser in the Python API method above, however, the Twitter user is not required to provide exact location information in their profile. For example, they can list their location such as nyc, Detroit 123, London, etc. Yahoo provides a Restful API web service which provides longitude and latitude coordinates, given names of locations, like those above. An embodiment of the present disclosure incorporates Yahoo's Restful Service with two input parameters, i.e., location1 and location2. For example, to determine the longitude and latitude of nyc, the following URL call can be made: http://stevens.no-ip.biz/myservices/GetLatLon?location1=nyclocation2=". This URL could be invoked from an iPhone or other digital device.

After determining the geographic coordinates of Tweets, the next task is have them displayed on a map so that the resultant visually perceptible geographic patterns indicate deception (or varacity). The origin of the Tweet in itself may indicate deception. For example, a Tweet ostensibly originating from a given country concerning an eyewitness account of a sports event taking place in that country may well be deceptive if it originates in a distant country. In accordance with an embodiment of the present disclosure, JavaScript along with the Google Maps API may be used to make the map and plot the coordinates. To create dynamic HTML with javascript, newer releases of TurboGears provide better capabilities, but PHP is a suitable alternative. PHP works well with JavaScript and can be used to create dynamic queries and dynamic plots based on the parameters that a user, chooses. Resources are available that show how to build Google Maps with PHP. In accordance with one embodiment of the present disclosure, another web server which runs PHP and Apache is utilized. The MySQL database is shared between both web resources and is designed such that the PHP web server has access to read the data only and not create, delete, or update data that is generated by the TurboGears Web Server.

Architecture and Implementation

Figure 52:
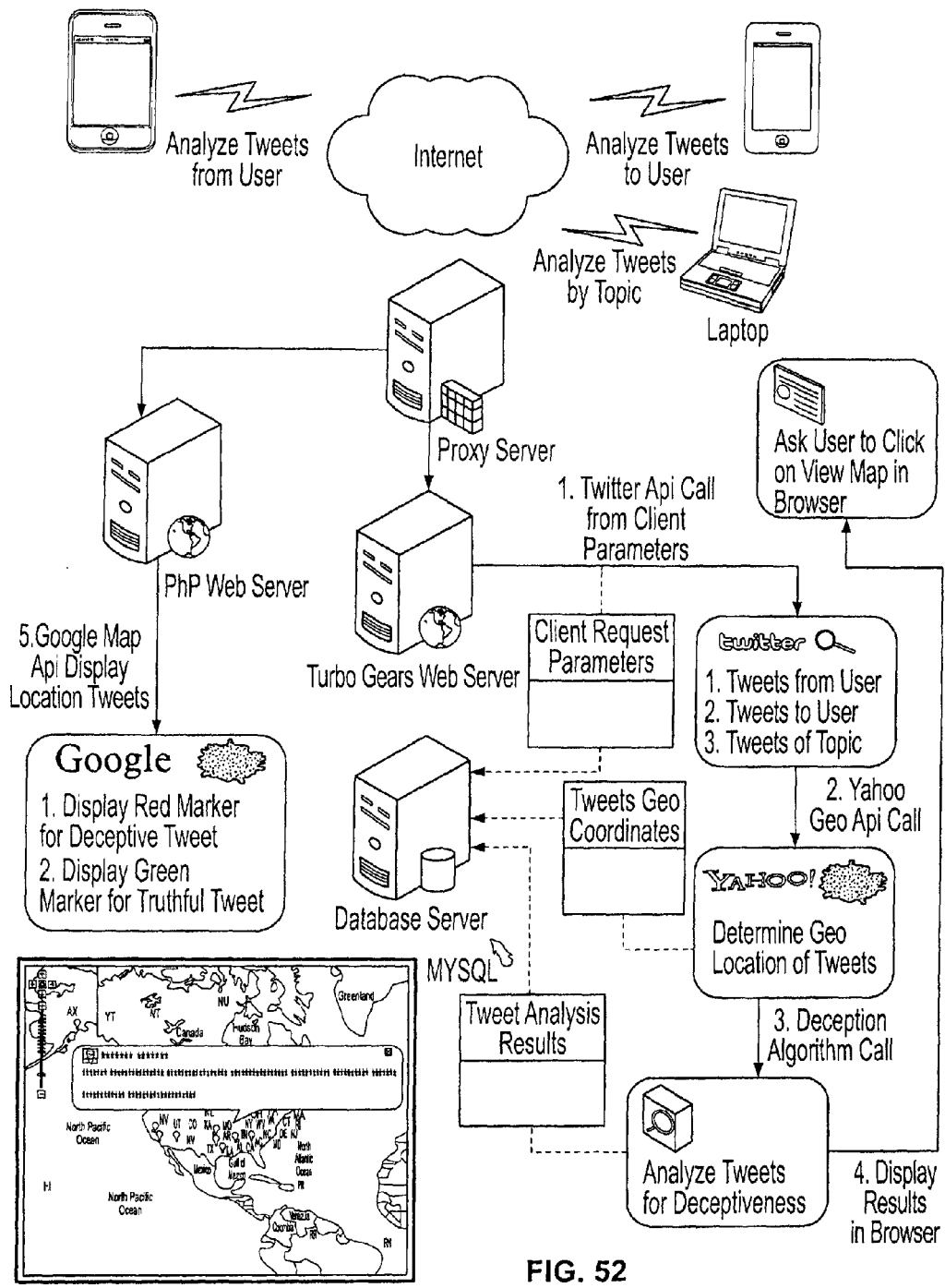
FIG. 52 is a schematic diagram of a Twitter deception detection architecture.

FIG. 52 illustrates the architecture of a system in accordance with one embodiment of the present disclosure for detecting deception in Twitter communications. From a mobile phone, laptop, or home PC, the user can analyze the tweets for deceptiveness by the following search options:

1. Search For tweets by Topic or Keyword.
2. Search for Tweets sent From a specific Twitter ID.
3. Search for Tweets sent To a specific Twitter ID.
4. Search for tweets by Topic or Keyword and sent to a specific Twitter ID.

Figure 53:
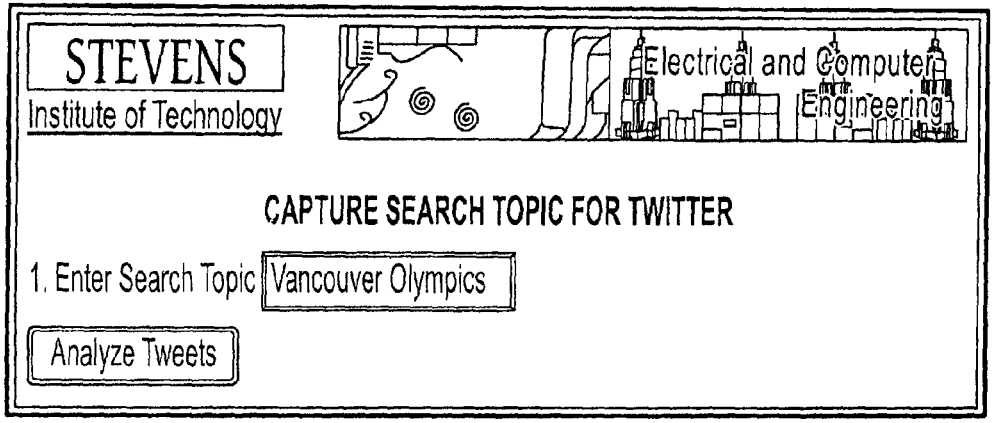
FIGS. 53 and 54 are illustrations of user interface screens.

FIG. 53 is a screen shot that appears when the first item is selected. Similarly when the user selects items 2 or 3, a screen shot will appear to capture the Twitter ID. When option 4 is selected to analyze tweets on a topic and a Twitter ID, the following processes are performed on the TurboGears Web Server:

1. Gather tweets from Twitter API (Python Tython AI/URL Dynamic Query).
2. Determine the geographical coordinates of tweets using the Yahoo Geo API web service step.
3. Perform deception Analysis via deception engine.

When the tasks are completed, the results are returned back to the browser for the user to view, as illustrated below.

TWITTER Analysis Results

| Tweet | Deceptive/Normal | Twitter UserId | Location 1 | Location 2 |
|---|---|---|---|---|
| Vancouver 2010 Winter Olympics: Canadian hearts glow as Games set http://bit.ly/9kzR63 vancouver 2010 winter olympics | deceptive | lmcklnzey | Unknown | Unknown |
| RT @builderscrap: Came across interesting article: Vancouver Winter Olympics go green with recycled metals for medals in the Guardian http://bit.ly/NRP9Z | truth | LesPOwens | Chester | unknown |
| OLYMPICS TICKETS 2010 VANCOUVER OLYMPIC TICKET HOLDER AND LANYARD-NEW\| http://bit.ly/aoHclq http://eCa.sh/SUPER | deceptive | glencumbie | Burleson | Tx |
| Keller Fay Study Finds Vancouver Olympics Coverage Is Stimulating Millions of . . . http://bit.ly/a2xe8H | deceptive | nickstekovic | | unknown |
| olympics: Martin Mars to water-bomb Vancouver harbour today (Victoria Times Colonist): VANCOUVER-British Columbi . . . http://bit.ly/9tdj4B | deceptive | fanpage_ca | Vancouver | unknown |
| Photo Gallery: Best of Olympics Day 11: Photos from Day 11 of the 2010 Vancouver Winter Olympics. http://tinyurl.com/yb9eo6k | deceptive | 937theFan | Pittsburgh | PA |
| Came across interesting article: Vancouver Winter Olympics go green with recycled metals for medals in the Guardian http://bit.ly/NRP9Z | truth | builderscrap | UK | unknown |
| What to watch today at the Olympics: VANCOUVER, British Columbia - - - No man has ever won four Alpine skiing medals at a http://url4.eu/1Sll9 | truth | sportstweets54 | Unknown | Unknown |
| 2010 Winter Olympics Vancouver Opening Ceremonies http://bit.ly/9BySRj | deceptive | SubtextWriter | Los Angeles | unknown |
| This is the winning bid video for the 2010 Winter Olympics won by the city of Vancouver/Whistler, British Columb . . . http://zmarter.com/7B999 | truth | Z_HotTopic | WORLD | unknown |

Figure 54:
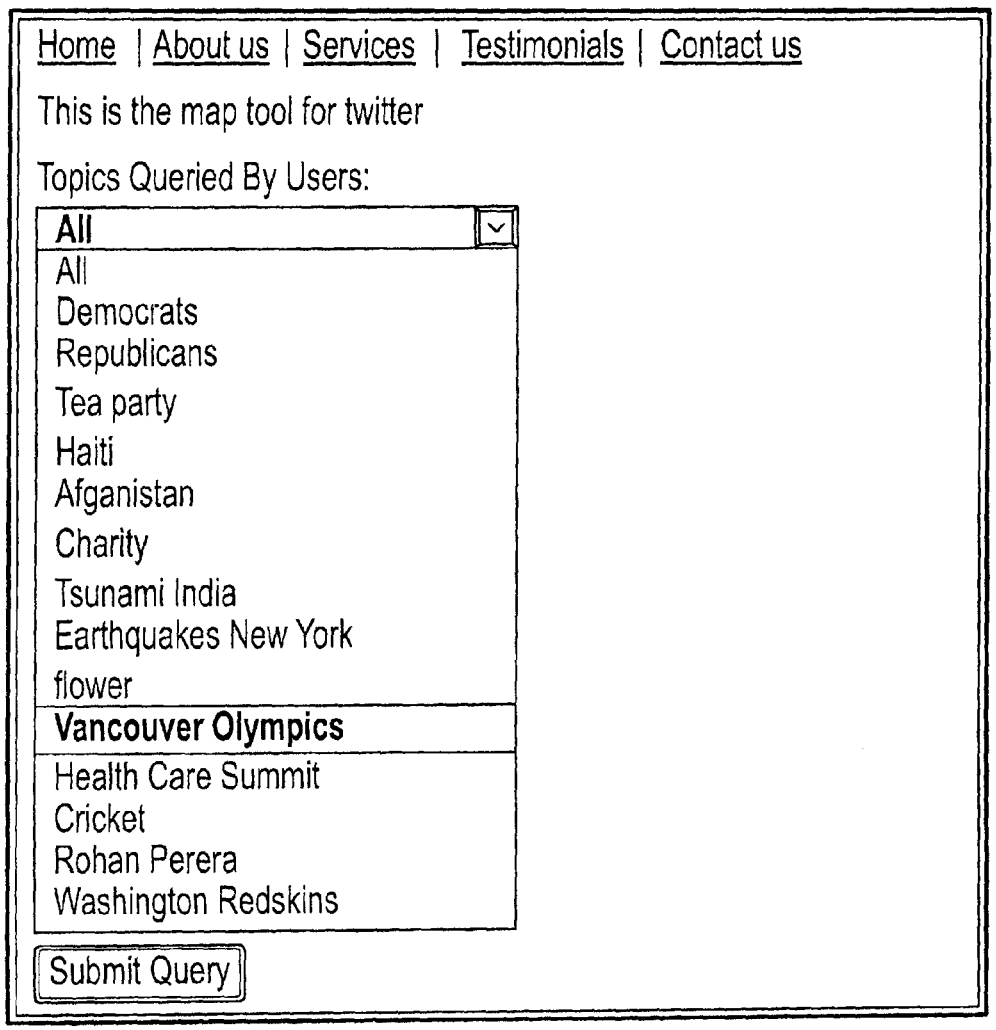
Figure 55:
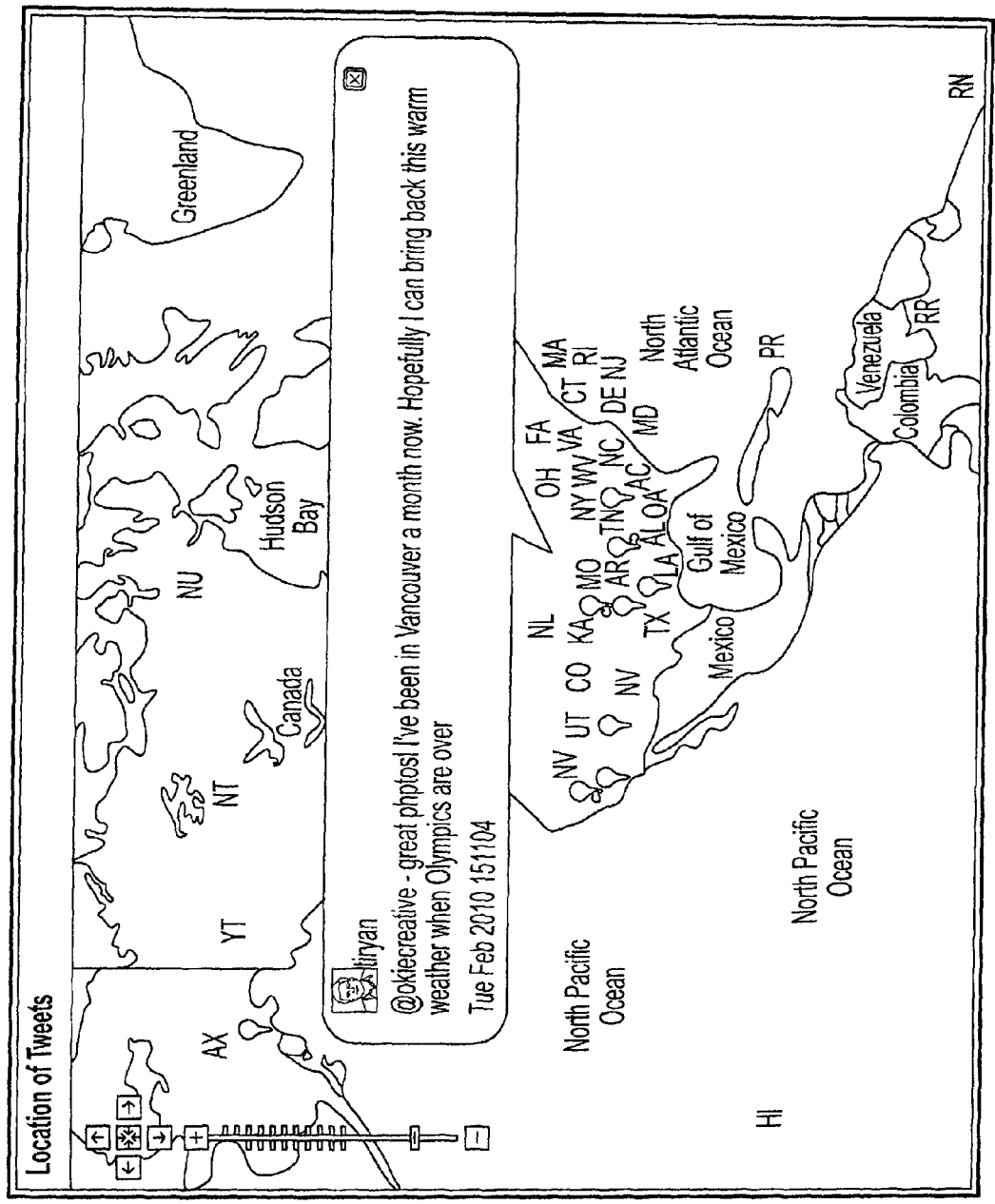
FIG. 55 is an illustration of a user interface screen reporting Tweets on a particular topic.

FIG. 54 shows a drop down box with the user electing to see the results for tweets on the topic, "Vancouver Olympics." The results will be retrieved from the MySQL table for Twitter Geo Information and displayed back to the user on the web browser as shown in FIG. 55. On the map output markers of various colors may be provided. For example, red markers may be used to illustrate a deceptive tweet location, and green to represent truthful tweets. When the cursor is moved over a particular marker, the tweet topic is made visible to the user of the deception detection system. As discussed in the earlier section, PHP permits creation of customized maps visualizing data in many forms. Instead of viewing the topic, Twitter User ID, or the actual tweet itself, may be displayed. A comprehensive set of maps can be created dynamically with different parameters.

The present disclosure presents an interne forensics framework that bridges the cyber and physical world(s) and could be implemented in other environments such as Windows and Linux and expanded to other architectures such as .NET, Java, etc. The present disclosure may be implemented for a Google app engine, iPhone Application or Mailbox deception plugin.

Integration into .NET Framework

The .NET framework is a popular choice for many developers who like to build desktop and web application software. With .NET, the framework enables the developer and the system administrator to specify method level security. It uses industry-standard protocols such as TCP/IP, XML, SOAP and HTTP to facilitate distributed application communications. Embodiments of the present disclosure include: (1) Converting deception code to DLLs and import converted components in .NET; (2) Using IronPython in .NET.

Figure 56:
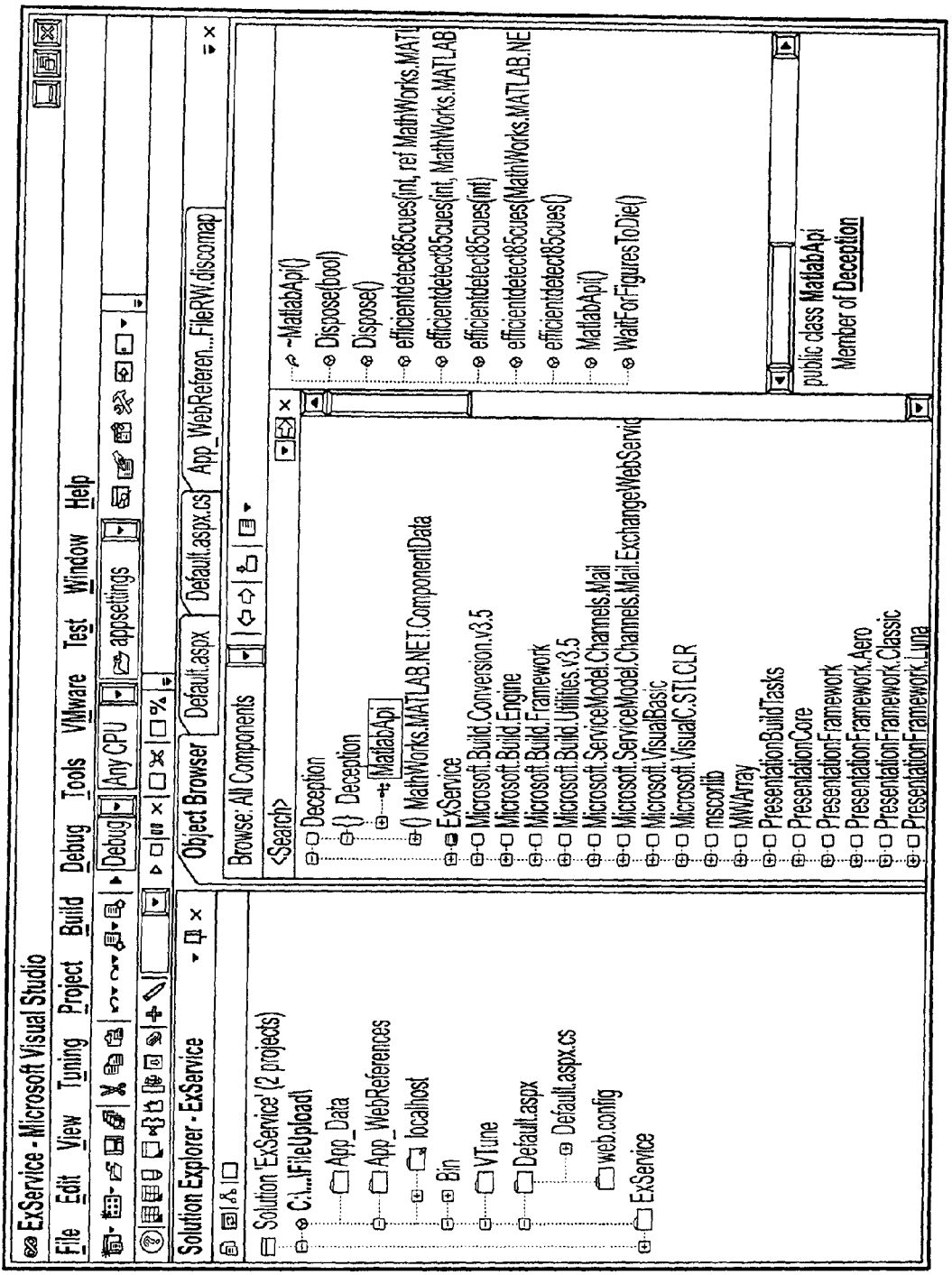
FIG. 56 is an illustration of a user interface screen showing a Dll component reference in .NET.

MATLAB offers a product called MATLAB Builder NE. This tool allows the developer to create .NET and COM objects royalty free on desktop machines or web servers. Taking deception code in MATLAB and processing with MATLAB Builder NE results in DLLs which can be used in a Visual Studio, C Sharp workspace as shown in FIG. 56.

Figure 57:
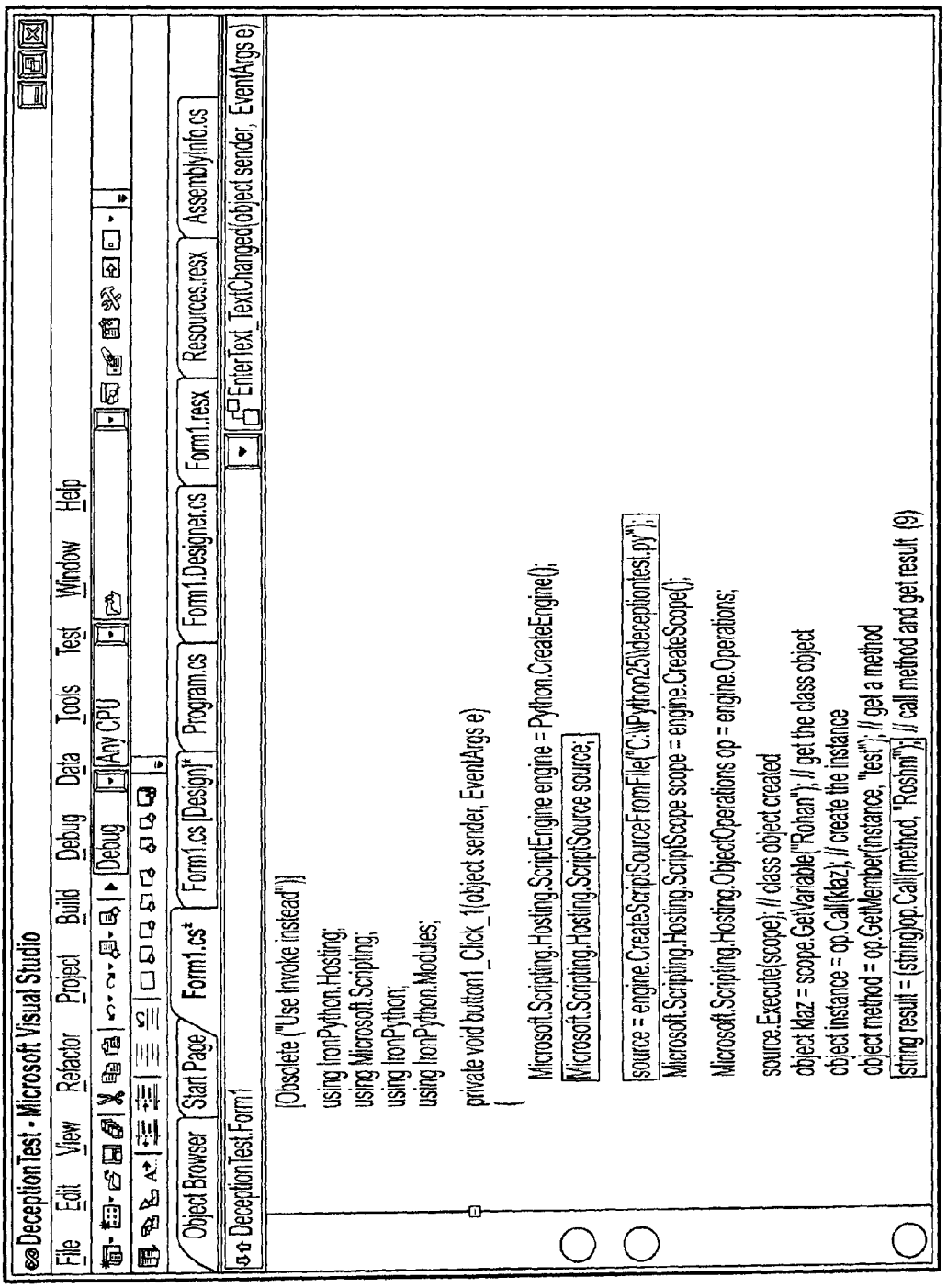
FIG. 57 is an illustration of a user interface screen showing calling a Python function in .NET.

IronPython from Microsoft works with the other .NET family of languages and adds the power and flexibility of Python. IronPython offers the best of both worlds between the .NET framework libraries and the libraries offered by Python. FIG. 57 shows a Visual Studio .NET setup for calling a method from a Python .py file directly from .NET.

Google App Engine

The Google App Engine lets you run your web applications on Google's infrastructure. Python software components are supported by the app engine. The app engine supports a dedicated Python runtime environment that includes a fast Python interpreter and the Python standard library. Listed below are some advantages for running a web application in accordance with an embodiment of the present disclosure on Google App Engine:

1. Dynamic web serving, with full support for common web technologies.

2. APIs for authenticating users and sending email using Google Accounts.

3. A fully featured local development environment that simulates Google App Engine on your computer.

4. Cost efficient hosting.

5. Reliability, performance and security of Google's infrastructure.

iPhone Application

As described above, web services in accordance with an embodiment of the present disclosure can be invoked by a mobile device such as an iPhone to determine deception. However, in the examples presented, a URL was used to launch the web service. A customized GUI for the iPhone could also be utilized.

Mailbox Deception Plug-in

In the current marketplace there are many email SPAM filters. In accordance with an embodiment of the present disclosure, the deception detection techniques disclosed are applied to analyzing emails for the purpose of filtering deceptive emails. For this purpose, a plug-in could be used or the deception detection function could be invoked by an icon on Microsoft Outlook or another email client to do deception analysis in an individual's mailbox. Outlook Express Application Programming Interface (OEAPI) created by Nextra is an API that could be utilized for this purpose.

Coded/Camouflaged Communications

Alternative Architecture

In accordance with one embodiment of the present disclosure, the deception detection system and algorithms described above can be utilized to detect coded/camouflaged communication. More particularly, terrorists and gang members have been known to insert specific words or replace some words by other words to avoid being detected by software filters that simply look for a set of keywords (e.g., bomb, smuggle) or key phrases. For example, the sentence "plant trees in New York" may actually mean "plant bomb in New York."

In another embodiment the disclosed systems and methods can be used to detect deception employed to remove/obscure confidential content to bypass security filters. For example, A federal government employee modifies a classified or top secret document so that it bypasses software security filters. He/she can then leak the information through electronic means, otherwise undetected.

Figure 58:
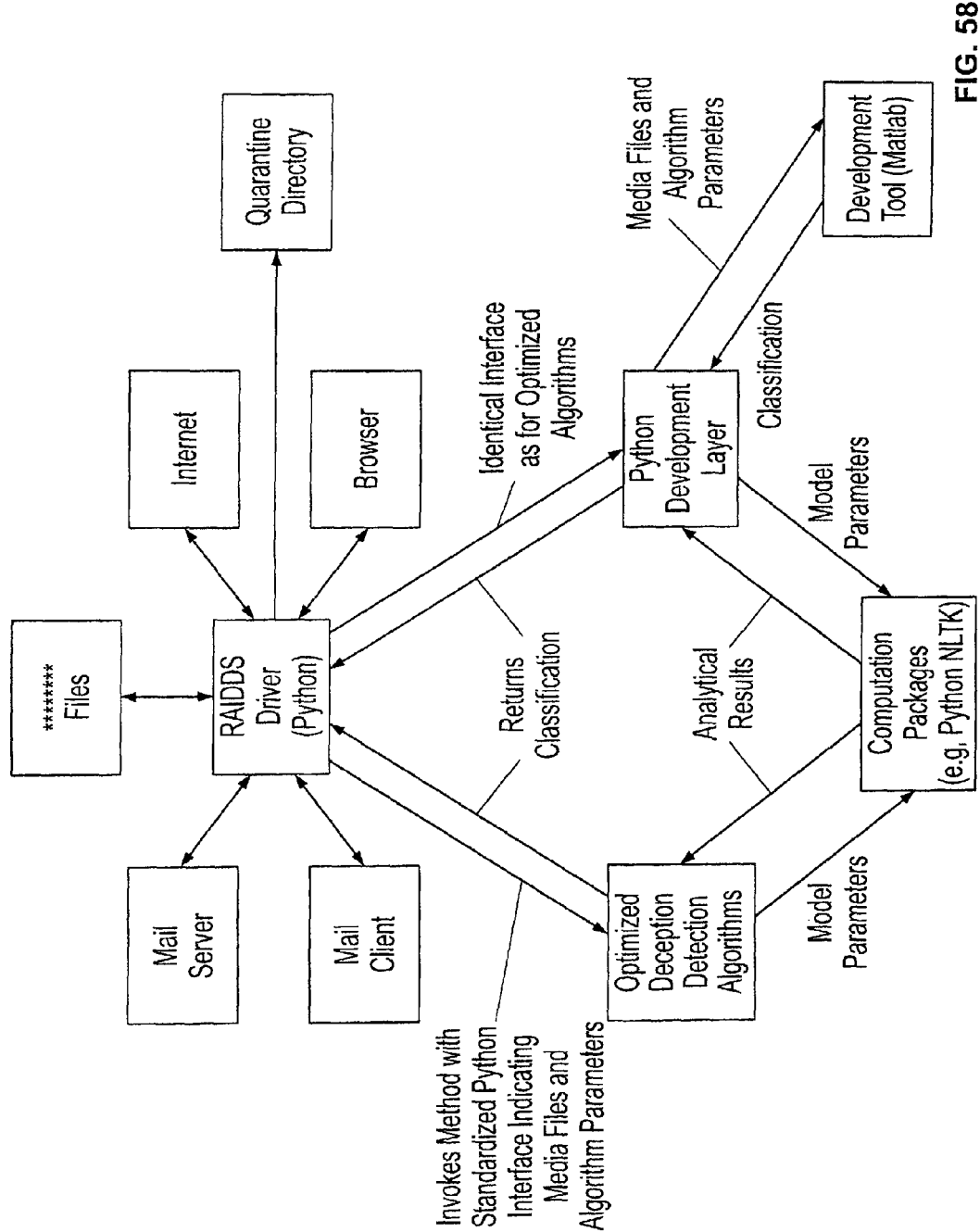
FIG. 58 is a schematic diagram of a deception detection system architecture.

FIG. 58 shows a Deception Detection Suite Architecture in accordance with another embodiment of the present disclosure and having a software framework that will allow a plug-and-play approach to incorporate a variety of deception detection tools and techniques. The system has the ability to scan selected files, directories, or drives on a system, to scan emails as they are received, to scan live interactive text media, and to scan web pages as they are loaded into a browser. The system can also be used in conjunction with a focussed web crawler to detect publicly posted deceptive text content. To address the changing strategies of deceivers, an embodiment of the present disclosure may be platform independent Rapid Deception Detection Suite (RAIDDS) equipped with the following capabilities:

1. RAIDDS, run as a background process above the mail server, filtering incoming mail and scanning for deceptive text content.

2. RAIDDS, running as a layer above the internet browser, scans browsed URLs for deceptive content.

3. RAIDDS like the previously described embodiments, scans selected files, directories or system drives for deceptive content, with the user selecting the files that are to be scanned.

4. RAIDDS can optionally de-noise each media file (using diffusion wavelet and statistical analysis), create a corresponding hash entry, and determine if multiple versions of the deceptive document may be appearing. This functionality allows the user to detect repeated appearances of altered documents.

The user RAIDDS also has the ability to select the following operational parameters:

1. For each type of media (email; URL; document—.doc, .txt, .pdf; SMS; etc.): the specific deception detection algorithms to be employed, the acceptable false alarm rate for each algorithm. detection fusion rules with accepted levels of detection, false alarm probabilities, and delay or alternatively, to use default settings.

2. Data pre-processing methods (parameters of diffusion wavelets, outlier thresholds, etc.), or default settings.

3. Level of detail in the dashboard (types and number of triggered psycho-linguistic features, stylometric features, higher dimension statistics, deception context, etc.) graphical outputs.

4. Categorization of collected/analyzed data in a database for continuous development and enhancement of the deception detection engine.

RAIDDS System Architecture

Figure 59:
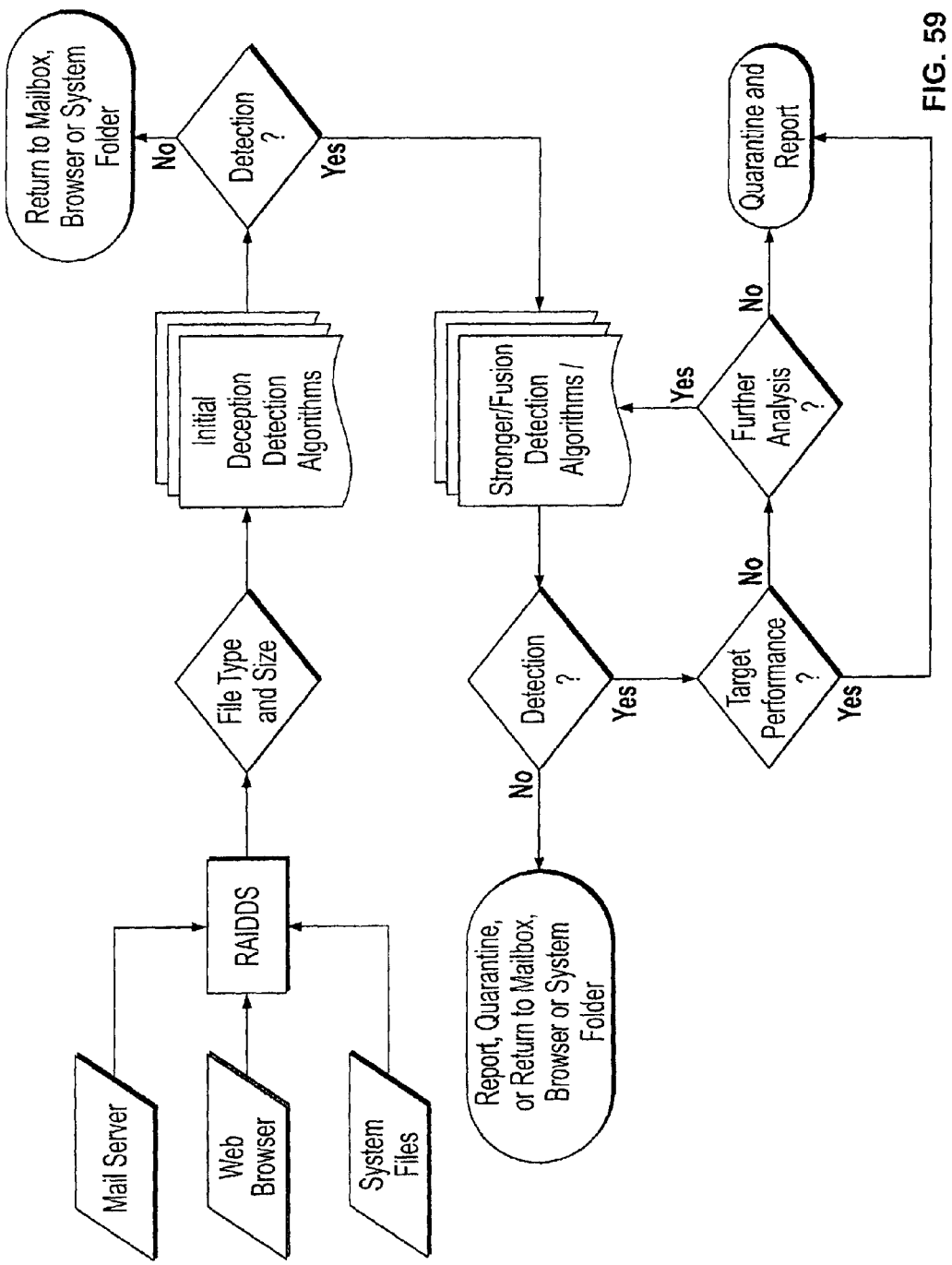
FIG. 59 is a flow chart of deception detection.

FIG. 59 shows the data flow relative to the RAIDDS embodiment. FIG. 59 shows an application of the RAIDDS architecture to analyze, deceptive content in Twitter in real time. Two design aspects of RAIDDS are: (1) a plug-and-play architecture that facilitates the insertion and modification of algorithms; and (2) a front end user interface and a back end dashboard for the analyst, which allows straightforward application and analysis of all available deception detection tools to all pertinent data domains.

The above-noted Python programming language provides platform-independence, object-oriented capabilities, a well developed API, and developed interfaces to several specialized statistical, numerical and natural language processing (e.g., Python NLTK [8]) tools.

Object Oriented Design

The object-oriented design of RAIDDS provides scalability, i.e., addition of new data sets, data pre-processing libraries, improved deception detection engines, larger data volume, etc. This allows the system to be adaptable to changing deceptive tactics. The core set of libraries may be used repeatedly by several components of the RAIDDS. This promotes computational efficiency. Some examples of these core libraries include machine learning algorithms, statistical hypothesis tests, cue extractors, stemming and punctuation removal, etc. If new algorithms are added to the library toolkit they may draw upon these classes. This type of object oriented design enables RAIDDS to have a plug-and-play implementation thus minimizing inefficiencies due to redundancies in code and computation.

End User Interface and Analyst Dashboard

The user interface is the set of screen(s) presented to an end user analyzing text documents for deceptiveness. The dashboard may be used by a forensic analyst to obtain fine details such as the psycho-linguistic cues that triggered the deception detector, statistical significance of the cues, decision confidence intervals, IP geolocation of the origin of the text document (e.g., URL), spatiotemporal patterns of deceptive source, deception trends, etc. These interfaces also allow the end user and the forensic analyst to customize a number of outputs, graphs, etc. The following screens can be used for the user interface and the dashboard, respectively.

Opening screen: User chooses the text source domain: mail server, web browser, file folders, crawling (URLs, Tweets, etc.).

Second screen: User specifies the files types for scanning (.txt, .html, .doc, .pdf, etc.); data pre-processing filter Pop-up Screen: For each file format selected, user specifies the type of deception detection algorithm that should be employed for the initial scan. Several choices will be presented on the screen: machine learning based classifiers, non-parametric information theoretic classifiers, parametric hypothesis test, etc.

Pop-up Screen: For each deception classifier class, user specifies any operational parameters that must be specified for that algorithm. (such as acceptable false alarm rate, detection rate, number of samples (delay) to use, machine learning kernels, etc.)

Pop-up Screen: The user chooses the follow-up action after seeing the scan results. The user may choose from:
1. mark, quarantine or delete the file.
2. perform additional fine grain analysis of the file, with a series of more computationally intensive tools such as decision fusion, in an attempt to filter out false alarms or geolocate the source of the document using IP address and display on a map, etc.
3. Decode the original message if the deception class detects the document contains a coded message.
4. Send a feedback about the classifier decision to the RAIDDS engine by pressing the "confirm" or "error" button
5. Take no action:

End User Interface Screens

Opening screen: Analyst chooses the domain for deception analysis results (aggregated over all users or for an individual user): mail server, web browser, file folders, crawling (URLs, Tweets, etc.).

Second screen: Statistics and graphs of scan results for files types (.txt, .html, .doc, .pdf, etc.), deceptive source locations, trends in deceptive strategies, etc. Visualization of the data set captured by during the analysis process.

Pop-up screen: Update RAIDDS deception detector and other libraries with new algorithms, data sets, etc.

Pop-up Screen: Save the analysis results in suitable formats (e.g., xml, .xls, etc.)

Analyst Dashboard Screens

What follows is an example of the screens used in a specific use context, viz., an end user is reading several ads in craigslist for an apartment rental.

Opening screen: User chooses Craigslist postings (URLs) to be analyzed for deceptiveness.

Second screen: User chooses RAIDDS to analyze the Craigslist text content only for RAIDDS analysis (posted digital images are ignored).

Pop-up screen: User chooses from a list of deception detection methods (possibly optimized for Craigslist ads) presented by RAIDDS or chooses default values.

Pop-up screen: User chooses chooses from a set of operational parameters or uses default values. RAIDDS then downloads the craiglist posting (as the user reads it) in the background and sends it to the RAIDDS corresponding deception analysis engine.

Pop-up screen: If the craigslist text ad is classified to be deceptive an red warning sign is displayed on the screen. The user may then choose a follow-up action from a list—e.g., flag it as "spam/overpost" in craiglist.

Detecting Coded Messages

Coded communication by word substitution in a sentence, is an important deception strategy prevalent on the Internet. In accordance with an embodiment of the present disclosure these substitutions may be detected depending on the type and intensity of the substitution. For example, if a word is replaced by another word of substantially different frequency then a potentially detectable signature is created, as discussed in D. Skillicorn, "Beyond keyword filtering for message and conversation detection," in *IEEE International Conference on Intelligence and Security Informatics,* 2005, the disclosure of which is hereby incorporated by reference.

However, the signature is not pronounced if one word is substituted by another of the same or similar frequency. Such substitutions are possible, for instance, by querying Google for word frequencies, as discussed in D. Roussinov, S. Fong, and D. B. Skillicorn, "Detecting word substitutions: Pmi vs. hmm." in *SIGIR. ACM,* 2007, pp. 885-886, the disclosure of which is hereby incorporated by reference.

Applicants have investigated the detection of word substitution by detecting words that are out of context, i.e., the probability of a word co-occurring with other words in close proximity is low using AdaBoost based learning, as discussed in N. Cheng, R. Chandramouli, and K. Subbalakshmi, "Detecting and deciphering word substitution in text," *IEEE Transactions on Knowledge and Data Engineering, preprint*, pp. 1-5, March 2010, the disclosure of which is here by incorporated by reference.

Other methods that are available for a more limited context include, as discussed in S. Fong, D. Roussinov, and D. B. Skillicorn, "Detecting word substitutions in text," *IEEE Transactions on Knowledge and Data Engineering*, vol. 20, no. 8, pp. 1067-1076, 2008 and D. Roussinov, S. Fong, and D. B. Skillicorn, "Detecting word substitutions: Pmi vs. hmm." in *SIGIR. ACM,* 2007, pp. 885-886.

In accordance with one embodiment of the present disclosure, a Python implementation of the algorithm in N. Cheng, R. Chandramouli, and K. Subbalakshmi, "Detecting and deciphering word substitution in text," *IEEE Transactions on Knowledge and Data Engineering, preprint*, pp. 1-5, March 2010 is integrated into RAIDDS.

File System Interface

Python classes may be used to create a communication interface layer between the RAIDDS core engine and the file system of the computer containing the text documents. These classes will be used to extract the full directory tree structure and its files given a top level directory. The target text files can therefore be automatically extracted and passed to the core engine via the interface layer for analysis. The interface layer identifies files of different types (e.g., .doc, .txt) and passes them to appropriate filters in the core engine.

Email System Interface

RAIDDS is able to analyze emails and email (text) attachments. The system features an interface between the RAIDDS core engine and the email inbox for two popular applications: gmail and Outlook. The open source gmail API and the Microsoft Outlook API is used for this development. Upon the arrival of each email an event is triggered that passes the email text to the core engine via the interface for analysis. The result of the analysis (e.g., deceptive, not deceptive, deception-like) is color-coded and displayed along with the message in the inbox folder. The user is also given the following choices to mark the email as: "not deceptive", "report deceptive" after seeing the analysis result. Users can configure the system so that emails detected to be deceptive are automatically moved to a "deceptive-folder".

Browser Plug-in

When a user browses the Internet, RAIDDS can analyze the web page text content for deceptiveness in the background. To implement this functionality a RAIIDS plug-in for the Firefox browser using Mozilla Jetpack software development kit may be used. Another approach to implementing this functionality would be to scan the cache where contents are downloaded.

General Purpose API

One of the key goals of RAIDDS is that it be scalable, i.e., provides the capability to add new deception detection methods, incorporate new statistical analysis of results for the dashboard, etc. To this end, a few general purpose APIs and configuration files are utilized. If a client wants to add their own custom detection methods they will be able to do it using these general purpose APIs.

Graphical User Interface

Adobe Flex may be utilized for all GUI implementation since it provides a visually rich set of libraries.

Detecting Coded Communication

Let $\Sigma$ be a vocabulary consisting of all English words. A word substitution encoding is a permutation in which every word of the vocabulary in the sentence $M=m_1m_2 \ldots m_l$ is replaced consistently by another word to give the coded sentence $C=c_1c_2 \ldots c_l$. A key for a word substituting encoder is a transformation $K: \Sigma \rightarrow \Sigma$ such that $M K(ci)K(c_2) \ldots K(c_1)$ (or equivalently $C=K^{-1}(m_1) K^{-1}(m_2) \ldots K^{-1}(mi)$. However, in practice, only some particular watch list words ($w \subseteq \Sigma$) in a sentence maybe replaced instead of all the words, to get a coded message. This is done to bypass detectors that scan for words from a watch list (e.g, "bomb"). Therefore, the goal of the deception detector is to detect a coded message and even detect which word was substituted.

Detecting coded communication can be modeled as a two class classification problem: Class$_l$: normal message and Class2: coded message. A four step process can be used to detect coded communication:

1. Using a corpus of normal sentences create a corpus of coded sentences by substituting particular words
2. Identify significant features and extract feature values from each word automatically
3. Build a word substitution detection model by training a statistical classifier
4. Detect the substituted word(s) in a target sentence The one million word Brown Corpus of Present-Day American English used popularly in computational linguistics research may be utilized. The Python natural language toolkit has built-in functions to access this corpus. The data is formatted in pure ASCII format, sentences delimited, tokens delimited and tags separated from tokens by a forward slash. Each tag consists of a base part-of speech tag and optional modifiers. The modifiers are eliminated except the suffix 41 for words in titles (e.g. nn-tl).

The 100-million word British National Corpus (BNC) is used for comparing word frequencies to create word substituted coded messages. There is a lemmatized frequency list for the 6318 words with more than 800 occurrences in the entire corpus. The list used in our analysis is ordered—highest to lowest frequencies, including rank numbers, frequencies, words and part of speech information. The data is preprocessed. POS tags are removed after retrieving the POS information and sentences with more than 20 or less than 5 words are discarded. According to the BNC lemma list, as discussed in BNC database and word frequency lists. [Online]. Available: http://www.kilgarriff.co.uk/bncreadme-.html, the disclosure of which is hereby incorporated by reference, some target words in each of the original sentences are substituted to get the corresponding word substituted coded sentence. The sentences are not used if the candidate target word is not in the BNC lemma list. This results in two subsets of sentences, labeled as normal text and coded text. Three groups of word substituted texts are created in order to study the efficiency of the detection algorithm, and each subset contains more than 1,000 sentences.

Twenty-one features are extracted to distinguish normal text from coded text. Example features are frequency of target word, frequency of left k-gram, frequency of k-gram for bag of words, sentence oddity metric, pointwise mutual information, etc. Yahoo! Web Search API is used to query for word frequency information. To speed up the query process, we use Yahoo!'s open search web services platform—the BOSS (Build your Own Search Service) Mashup Framework—in our experiments, which is an experimental Python library that provides SQL-like constructs for mashing up the BOSS API with third-party data sources, as oracles for querying the natural frequencies of words, bags of words, and strings. Then all the words in a target sentence is represented by a 21-dimension labeled feature vector. A decision tree may be used and an AdaBoost classifier designed.

Figure 60:
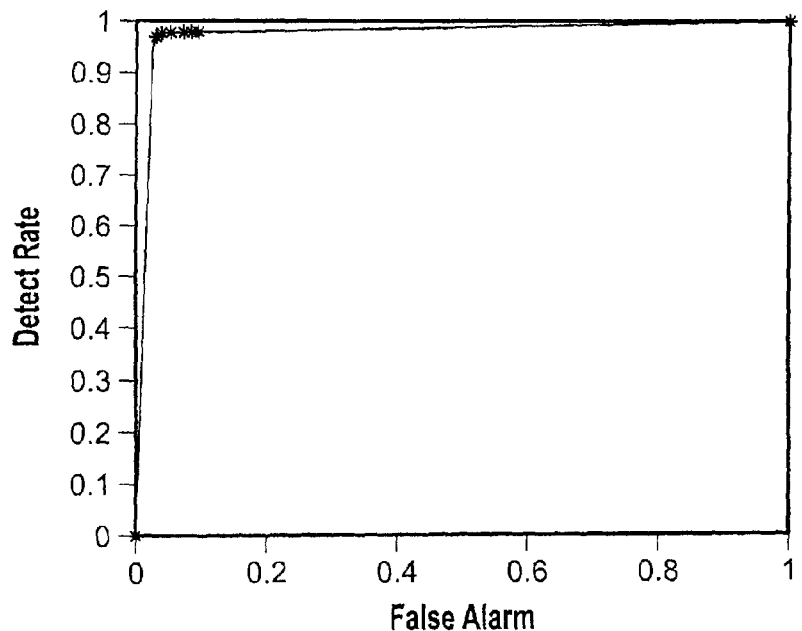
FIG. 60 is graph of an ROC curve for a word substitution deception detector.

Several experiments to examine the performance of the proposed detector resulted in the detection of word substitution with an accuracy of 96.73%, the receiver operating characteristic curve (ROC) for the detector is shown in FIG. 60.

Gender Classification from Text

While identifying the correct set of features that indicate gender is an open research problem, there are three machine learning algorithms (support vector machine, Bayesian logistic regression and AdaBoost decision tree) that may be applied for gender identification based on the proposed features. Extensive experiments on large text corpora (Reuters Corpus Volume 1 newsgroup data and Enron email data) indicate an accuracy up to 85.1% in identifying the gender. Experiments also indicate that function words, word based features and structural features are significant gender discriminators.

Additional Applications for Deception Detection

Deception detection has wide applications. Any time two or more parties are negotiating, or monitoring adherence to a negotiated agreement, they have a need to detect deception. Here we will focus on a few specific opportunities and present our approach to meeting those needs:

Human Resources and Security Departments of Corporations:

Embellishment of accomplishments, outright falsification of education and employment records are endemic among applicants to corporate positions. HR professionals are constantly trying to combat this phenomenon, doing extensive background checking, and searching for postings on the Internet that give a more detailed picture of applicants. RAIDDS can significantly assist HR professionals in this effort and improve their productivity. In addition, the Corporate Security departments investigating internal security incidents in their companies have a need to assess deception or the lack thereof in the statements made by their employees.

Academic Institutions:

Embellishment of accomplishments, falsification of records, plagiarizing essays or even have some one else write the essays is a fairly common occurrence in academic applications. RAIDDS can be customized for this set of customers.

Government Agencies:

The need for deception detection can be identified in at least three different situations for Government customers. Firstly, the HR and internal security needs described above apply to government agencies as well, since they are similar to large enterprises. Secondly, a large number of non-government employees are processed every year for security clearance, which involves lengthy application forms including narratives, as well as personal interviews. RAIDDS can be used to assist in deception detection in the security clearance process. Thirdly, intelligence agencies are constantly dealing with deceptive sources and contacts. Even the best of the intelligence professionals can be deceived, as was tragically demonstrated when seven CIA agents were recently killed by a suicide bomber in Afghanistan. Certainly the suicide bomber, and possibly the intermediaries who introduced him to the CIA agents, were indulging in deception. Written communication in these situations can be analyzed by RAIDDS to flag potential deception.

Internet Users:

RAIDDS can be offered as a deception detection web service to Internet users at large on a subscription basis, or as a free service supported by advertising revenues.

An embodiment of the present disclosure may be utilized to detect deceptiveness of text messages in mobile content (e.g., SMS text messages) via web services.

Figure 61:
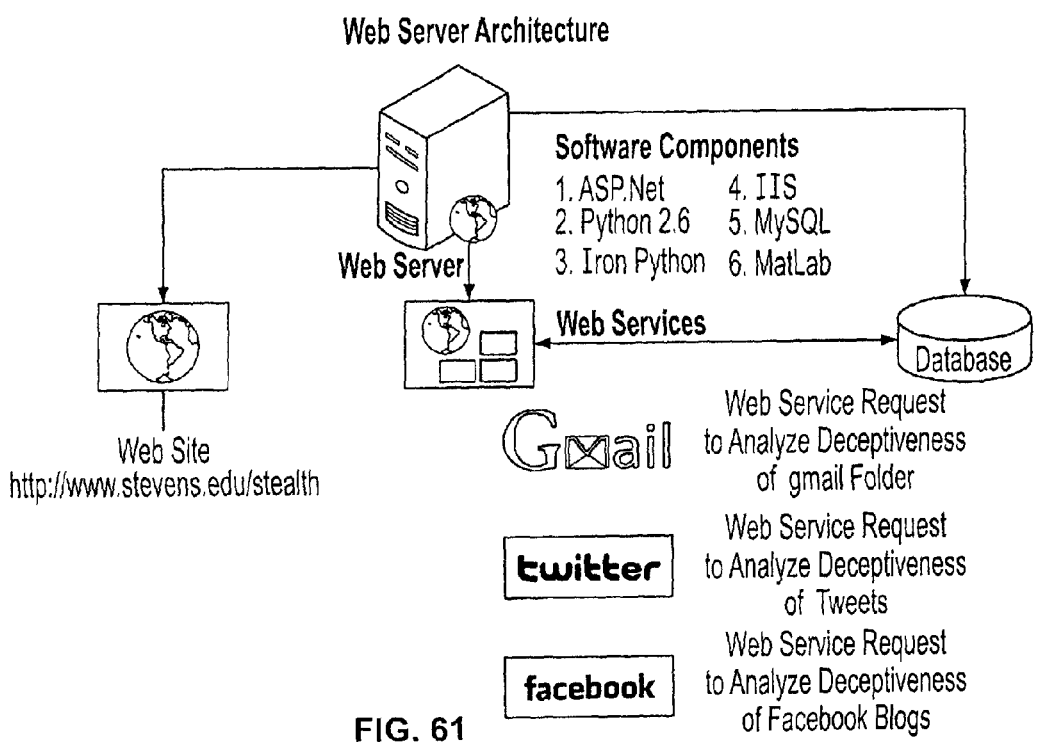
FIG. 61 is a schematic diagram of system architecture.

FIG. 61 illustrates the software components that will reside on the web application server(s)

Web Services

Web-Services are self-contained, self-describing, modular and key point "platform independent". By designing web services for deception detection this invention expanding the use to all users on the internet from mobile, home users, etc.

The website described above can be considered to be an http web service; but other protocols may also be used. A common and popular web service is SOAP and this is the we adopt for the proposed architecture.

Alternative Embodiments

As an alternative embodiment, voice recopition software modules can be used to be used to identify deceptiveness in voice; speech to text conversion can be used as a pre-processing step; language translation engines can be used for pre-processing text document in non-English languages, etc.

As an alternative embodiment web services and web architecture can be migrated over to an ASP.net framework for a larger capacity.

As an alternative embodiment, the deception algorithm can be converted or transposed into a C library for more efficient processing In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system. While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, nonvolatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time. Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system. Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements, the scope of which should be accorded the broadest interpretation so as to encompass all such modifications and similar structures. The present disclosure includes any and all embodiments.

As can be appreciated, Appendices A-D includes additional embodiments of the present disclosure, and are incorporated herein by reference in their entirety. In one embodiment, psycho-linguistic analysis using the computer implemented methods of the present disclosure can be utilized to detect coded messages/communication, detect false/deceptive messages, determine author attributes such as gender, and/or determine author identity. In another embodiment, psycho-linguistic analysis using the computer implemented methods of the present disclosure can be utilized to automatically identify deceptive websites associated with a keyword search term in a search result. For example, have a check mark next to the deceptive websites appearing in a Google or Yahoo search result. In yet another embodiment, psycho-linguistic analysis using the computer implemented methods of the present disclosure can be utilized to analyze outgoing e-mails. This may be used to function as a mood checker and prompt the user to revise the e-mail before sending if the mood is determined to be angry and the like. As can be appreciated, the mood may be determined by psycho-linguistic analysis as discussed above, and parameters may be set to identify and flag language with angry mood and the like.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

We claim:

1. A system for detecting deception in
human communication expressed in digital form with a computer, comprising:
at least one processor, wherein the processor executes an instruction set for receiving a given text input for classification as either truthful or deceptive and performing a combination of psycho-linguistic cue analysis and statistical analysis/modeling, including
(A) identifying psycho-linguistic cues in the text; and
(B) statistically modeling the cues to indicate deceptiveness or truthfulness of text, wherein the modeling is by unweighted cues matching and applying a threshold standard of probability of accuracy, the unweighted cues having either an increasing trend indicative of deceptive text or a decreasing trend indicative of truthful text and wherein deceptive coefficients for all cues are added to determine a deceptive value which is compared to a threshold to determine deceptiveness or non-deceptiveness.

2. The system of claim 1, wherein the cues are extracted from sample text data using LIWC.

3. The system of claim 1, wherein the modeling is by weighted cues matching utilizing the distinction between cues as to their differentiating power between true and deceptive text, the weight of the cues being computed by Simulated Annealing (SA).

4. A system for detecting deception in
human communication expressed in digital form with a computer, comprising:
at least one processor, wherein the processor executes an instruction set for receiving a given text input for classification as either truthful or deceptive and performing a combination of psycho-linguistic cue analysis and statistical analysis/modeling, including
(A) identifying psycho-linguistic cues in the text; and
(B) statistically modeling the cues to indicate deceptiveness or truthfulness of text, wherein the modeling is by a sequence of cues from the text of length n as a Markov chain, determining two transition probability matrices from training data containing deceptive and truthful texts, computing the probability of the n consecutive states of the sequence of cues using the transition probability matrices yielding two probability values, one associated with deceptive text and the other associated with truthful text, the greater probability indicating whether the text is deceptive or truthful.

5. The system of claim 1, wherein the modeling is by a sequence of cues using a sequential probability ratio test (SPRT).

6. The system of claim 5, wherein, before SPRT, the cues are sorted according to their relative importance by utilizing the ratio of mean probabilities and the central of the probability density functions (PDFs), then in the SPRT algorithm, using the most important cues first to reduce the average test sequence length.

7. The system of claim 5, wherein, the SPRT is truncated by combining the SPRT technique and the fixed length test technique to avoid large test samples.

8. The system of claim 5, wherein the SPRT is an efficient SPRT algorithm.

9. The system of claim 5, wherein, SPRT and Prediction by Partial Matching/Method C (PPMC) are applied sequentially as supplemental filters to indicate deception.

10. A system for detecting deception in human communication expressed in digital form with a computer, comprising:
at least one processor, wherein the processor executes an instruction set for receiving a given text input for classification as either truthful or deceptive and of performing an analysis of the text using a compression-based language model assuming the source model to be a Markov process, then using Prediction by Partial Matching (PPM), wherein first training data having deceptive text and second training data having truthful text are obtained and PPMC models are computed from both the truthful and deceptive training data, then the cross-entropy of the text to be classified with the models from the truthful and the deceptive data is computed to determine if the cross entropy is less between the text to be classified and the deceptive PPMC model than the between the text to be classified and the truthful PPMC model and if so, then the text is classified as deceptive, otherwise it is classified as truthful.

11. The system of claim 10, wherein the text to be classified is preprocessed by at least one of tokenization, stemming, pruning, removal of punctuation, tab line and paragraph indicators (NOP).

12. The system of claim 10, wherein the compression-based language model uses an Appropriate Minimum Description Length (AMDL) approach using a training set of truthful documents concatenated into a single file that is compressed and a training set of deceptive documents that are concatenated into a single file that is compressed;
   calculating the cross-entropy of the text to be classified with the concatenated deceptive training set and the concatenated truthful training set and based on the comparison of respective cross entropies, classifying the text as truthful or deceptive.

13. The system of claim 10, wherein the analysis is available to users over the Internet to operate on text input that is computer mediated communication and providing a conclusion as to truthfulness/deceptiveness of the text to the user after the analysis.

14. The system of claim 13, wherein the text is at least one of an email, a digital document, a short message, a text message, a Tweet, a user profile, a post, a blog content, an interactive message, contents of a website, a coded message and data pertaining to a personal record.

15. The system of claim 13, wherein the system has a capability of testing accuracy of the authorship of the text by using at least one of LIWC, analysis of stylistic features, pattern matching, frequent patterns, Principle Component Analysis (PCA), calculation of Euclidean distance between the cue vectors derived from two compared messages, similarity of message using Kolmogorov complexity with at least one of Normalized Compression distance (NCD), Compression Based Dissimilarity Measure (CDM) and Chen-Li Metric (CLM).

16. The system of claim 13, wherein the system has a capability of testing accuracy of the gender of the author of the text by identifying distinguishing features of text indicating gender in a training data set; reviewing the text to be classified using psycho-linguistic features and LIWC, extracting gender indicative features; and classifying the author of the text by gender.

17. The system of claim 13, wherein the system has a capability of ascertaining the location of the source of the text via geolocation by at least one of measurement based geolocation using a segmented polynomial regression model, semidefinite programming and k-means clustering of landmark nodes and by multilateration.

18. The system of claim 13, wherein the system has a capability of a web crawler which automatically retrieves text from selected URLs; subjects text located at the selected URLs to deception categorization; stores URL and IP address and reports results to a user.

19. The system of claim 13, wherein the system periodically patrols content at selected URLs on a continual basis and notifies relevant persons of results.

20. The system of claim 13 provided as at least one of a web service, an app and a plug-in.

21. The system of claim 13, wherein the system runs in the background of a user's computer automatically evaluating text in at least one of emails, Internet websites and interactive communications.

22. The system of claim 13, wherein the system has a user interface and an analyst dashboard.

23. The system of claim 13, wherein the system is available to wireless devices.

* * * * *